(12) United States Patent
Jaffa et al.

(10) Patent No.: US 12,470,634 B1
(45) Date of Patent: Nov. 11, 2025

(54) SYSTEMS AND METHODS FOR SYNCHRONIZING DATA STRUCTURES IN COMPUTER NETWORKS AND DISTRIBUTED COMPUTING ENVIRONMENTS

(71) Applicant: DK Crown Holdings Inc., Boston, MA (US)

(72) Inventors: Greg Jaffa, Wayne, NJ (US); Daniel Sahl, Henderson, NV (US)

(73) Assignee: DK Crown Holdings Inc., Boston, MA (US)

( * ) Notice: Subject to any disclaimer, the term of this patent is extended or adjusted under 35 U.S.C. 154(b) by 0 days.

(21) Appl. No.: 18/810,005

(22) Filed: Aug. 20, 2024

(51) Int. Cl.
*H04L 67/146* (2022.01)
*H04L 67/303* (2022.01)

(52) U.S. Cl.
CPC .......... *H04L 67/146* (2013.01); *H04L 67/303* (2013.01)

(58) Field of Classification Search
CPC .............................. H04L 67/303; G06F 9/5044
See application file for complete search history.

(56) References Cited

U.S. PATENT DOCUMENTS

| | | | | |
|---|---|---|---|---|
| 11,308,768 B2* | 4/2022 | Hirsch | ............... | G07F 17/3244 |
| 11,837,051 B2* | 12/2023 | Morris | ............... | G07F 17/3293 |
| 2019/0333337 A1* | 10/2019 | Hirsch | ............... | G07F 17/3223 |
| 2022/0415127 A1* | 12/2022 | Morris | ............... | G07F 17/3262 |

* cited by examiner

*Primary Examiner* — Esther B. Henderson
(74) *Attorney, Agent, or Firm* — Foley & Lardner LLP

(57) ABSTRACT

Systems and methods for synchronizing data structures in computer networks and distributed computing environments are disclosed. A system can provide a network resource to a client device corresponding to a network profile, establish a network communication session with the client device, and transmit instructions for network application formatting during the network communication session. The system can receive a second request for a network exchange during the network communication session. The system can determine that a path for an object of the network communication session satisfies at least one intersection criterion, the at least one intersection criterion associated with at least one second transmission value. The system can update a second data structure of the network profile.

20 Claims, 67 Drawing Sheets

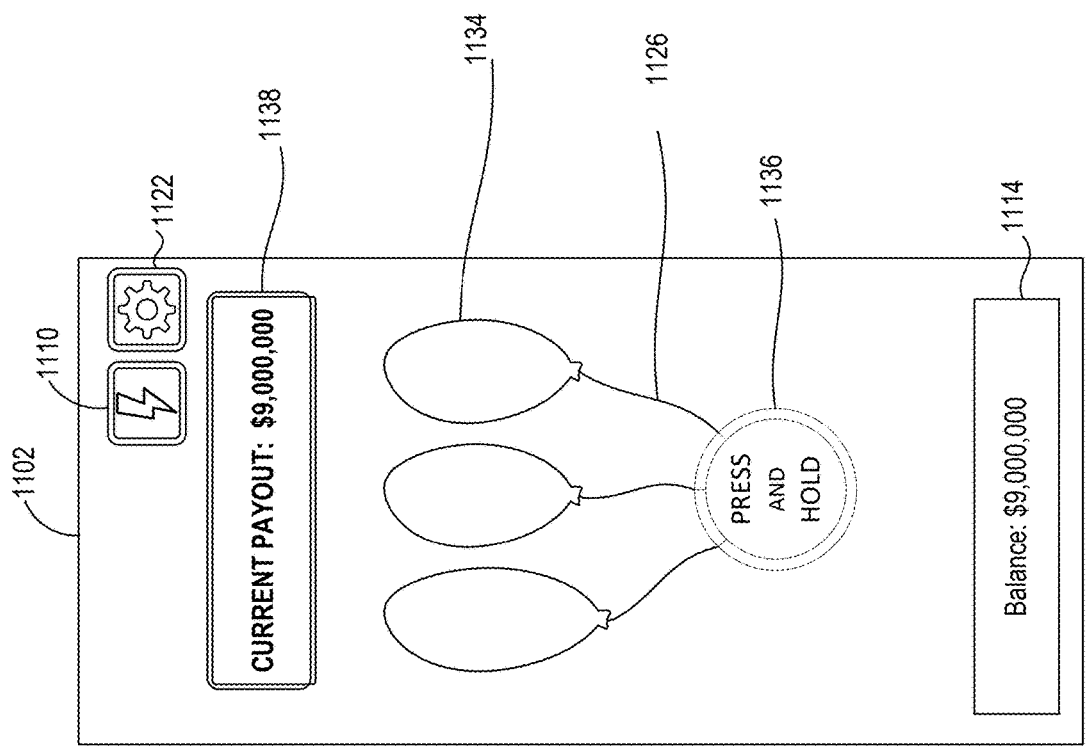

SYSTEMS AND METHODS FOR SYNCHRONIZING DATA STRUCTURES IN COMPUTER NETWORKS AND DISTRIBUTED COMPUTING ENVIRONMENTS

BACKGROUND

Providing synchronized information is useful for networked computing environments including multiple computing systems. Information can be shared using different formats or protocols. It is challenging to provide synchronized information efficiently in computing systems via computer networks having different types of computing devices.

SUMMARY

The systems and methods of this technical solution provide techniques for synchronized information sharing between multiple computing devices, which can provide additional notifications, alerts, or other content in connection with live events. Due to their real-time nature, it can be challenging to share up-to-date information network events between multiple computing devices, including between servers and client devices that access those servers. The systems and methods of this technical solution address these and other issues by providing synchronized data structures within network communication sessions. The synchronized data structures can include metadata generated to facilitate efficient and accurate data transfer between computing devices even in computer networks with large numbers of computing devices.

One aspect of the present disclosure relates to a system. The system can provide a network resource to a client device corresponding to a network profile. The system can establish, responsive to at least one packet identifying a request, a network communication session with the client device accessing the network resource. The system can transmit, to the client device, instructions for network application formatting during the network communication session. The system can receive, from the client device, a second request for a network exchange during the network communication session. The request storing a data structure having at least one first transmission value for the network communication session. The system can, responsive to the second request, determine that a path for an object of the network communication session satisfies at least one intersection criterion, the at least one intersection criterion associated with at least one second transmission value. The system can update, responsive to determining that the path for the object of the network communication session satisfies the at least one intersection criterion, a second data structure of the network profile according to the at least one second transmission value and a metric of the network exchange determined based on the at least one first transmission value.

In some implementations, the system can establish the network communication session using an identifier of the network profile. In some implementations, the at least one intersection criterion corresponds to a predetermined probability value for the network communication session. In some implementations, the instructions cause the client device to generate a graphical user interface for the network communication session. In some implementations, the system can generate (i) a first random number to determine the at least one second transmission value of the at least one intersection criterion, and (ii) a second random number used to determine the metric of the network exchange.

In some implementations, the at least one intersection criterion comprises a plurality of intersection criteria. In some implementations, the system can determine that the path for the object of the network communication session satisfies the plurality of intersection criteria. In some implementations, the system can transmit a network communication to comprising second instructions to modify a graphical user interface presented at the client device according to the metric of the network exchange. In some implementations, the system can receive a third request for a second network exchange during the network communication session. In some implementations, the system can transmit, to the client device, second instructions for to update the network communication session in response to the third request. In some implementations, the system can synchronize at least one data structure with the client device during the network communication session. In some implementations, the system can generate the instructions for network application formatting to graphically represent the at least one intersection criterion within a graphical user interface presented at the client device.

Another aspect of the present disclosure relates to a method. The method includes providing a network resource to a client device corresponding to a network profile. The method includes establishing, responsive to at least one packet identifying a request, a network communication session with the client device accessing the network resource. The method includes transmitting, to the client device, instructions for network application formatting during the network communication session. The method includes receiving, by the at least one server, from the client device, a second request for a network exchange during the network communication session. The request stores a data structure having at least one first transmission value for the network communication session. The method includes, responsive to the second request, determining, by the at least one server, that a path for an object of the network communication session satisfies at least one intersection criterion, the at least one intersection criterion associated with at least one second transmission value. The method includes updating, responsive to determining that the path for the object of the network communication session satisfies the at least one intersection criterion, a second data structure of the network profile according to the at least one second transmission value and a metric of the network exchange determined based on the at least one first transmission value.

In some implementations, the method includes establishing the network communication session using an identifier of the network profile. In some implementations, the method includes the at least one intersection criterion corresponds to a predetermined probability value for the network communication session. In some implementations, the instructions cause the client device to generate a graphical user interface for the network communication session. In some implementations, the method includes generating, by the at least one server, (i) a first random number to determine the at least one second transmission value of the at least one intersection criterion, and (ii) a second random number used to determine the metric of the network exchange.

In some implementations, the at least one intersection criterion comprises a plurality of intersection criteria. In some implementations, the method includes determining, by the at least one server, that the path for the object of the network communication session satisfies the plurality of intersection criteria. In some implementations, the method includes transmitting, by the at least one server, a network communication to comprising second instructions to modify a graphical user interface presented at the client device according to the metric of the network exchange. In some implementations, the method includes receiving, by the at least one server, a third request for a second network exchange during the network communication session.

In some implementations, the method includes transmitting, by the at least one server, to the client device, second instructions for to update the network communication session in response to the third request. In some implementations, the method includes synchronizing, by the at least one server, at least one data structure with the client device during the network communication session. In some implementations, the method includes generating, by the at least one server, the instructions for network application formatting to graphically represent the at least one intersection criterion within a graphical user interface presented at the client device.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of 'a,' 'an,' and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIGS. 11A, 11B, 11C, 11D, 11E, and 11F depict further diagrams of example graphical user interfaces that may be displayed in connection with network communication sessions established according to the techniques described herein, in accordance with one or more implementations;

DETAILED DESCRIPTION

Below are detailed descriptions of various concepts related to, and implementations of, techniques, approaches, methods, apparatuses, and systems for synchronizing data structures in computer networks and distributed computing environments. The various concepts introduced above and discussed in greater detail below may be implemented in any of numerous ways, as the described concepts are not limited to any particular manner of implementation. Examples of specific implementations and applications are provided primarily for illustrative purposes.

For purposes of reading the description of the various implementations below, the following descriptions of the sections of the Specification and their respective contents may be helpful. Section A describes a network environment and computing environment to implement embodiments described herein. Section B describes systems and methods for synchronizing data structures in computer networks and distributed computing environments.

The systems and methods of this technical solution provide techniques for synchronized information sharing between multiple computing devices, which can provide additional notifications, alerts, or other content in connection with live events. Due to their real-time nature, it can be challenging to share up-to-date information network events between multiple computing devices, including between servers and client devices that access those servers. The systems and methods of this technical solution address these and other issues by providing synchronized data structures within network communication sessions. The synchronized data structures can include metadata generated to facilitate efficient and accurate data transfer between computing devices even in computer networks with large numbers of computing devices.

A. Computing and Network Environment for

Figure 1A:
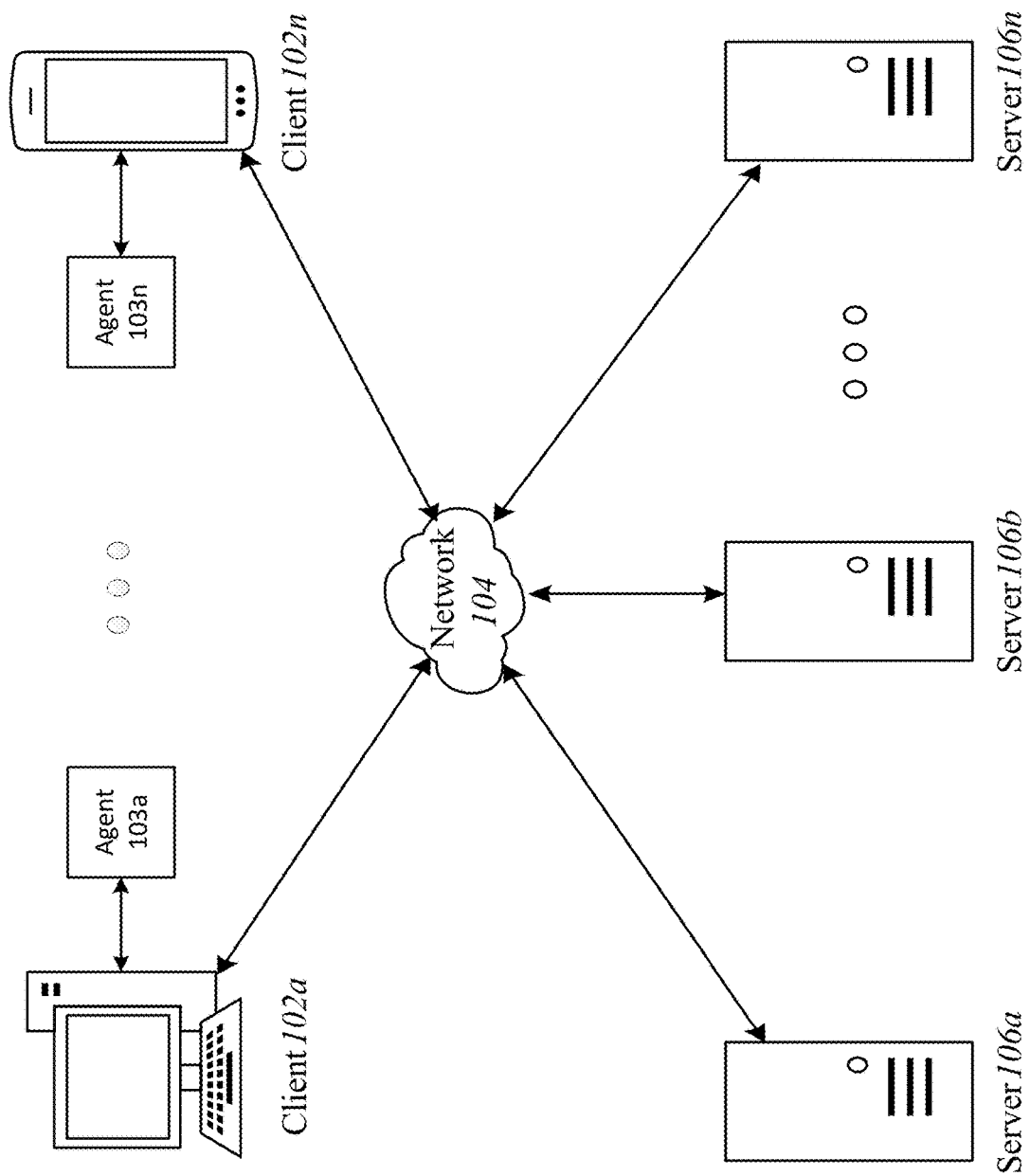
FIG. 1A is a block diagram depicting an embodiment of a network environment comprising a client device in communication with a server device.

Referring to FIG. 1A, an embodiment of a network environment is depicted for synchronizing data structures in computer networks and distributed computing environments. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more agents 103a-103n and one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel, or satellite band. The wireless links may also include any cellular network standards used to communicate among mobile devices, including standards that qualify as 1G, 2G, 3G, 4G, or 5G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN) (e.g., Intranet), a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 (not shown) or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous-one or more of the servers 106 or remote machines 106 can operate according to one type of operating system platform (e.g., WINDOWS NT, manufactured by Microsoft Corp. of Redmond, Washington), while one or more of the other servers 106 can operate according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks 104. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft, or others. Hosted hypervisors may run within an operating system on a second software level. Examples of hosted hypervisors may include VMware Workstation and VIRTUALBOX.

Management of the machine farm 38 may be decentralized. For example, one or more servers 106 may comprise components, subsystems, and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 106 may be in the path between any two communicating servers.

Figure 1B:
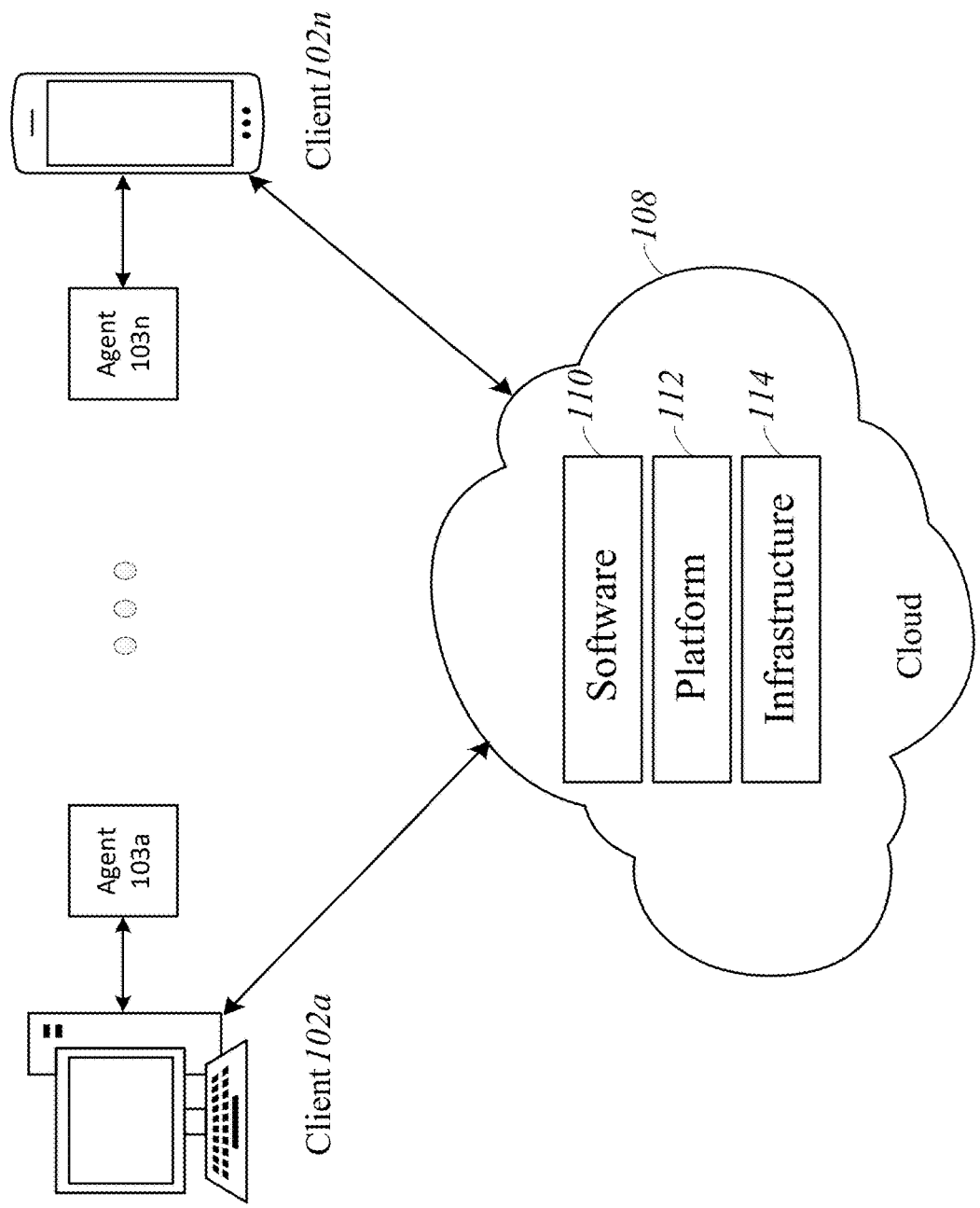
FIG. 1B is a block diagram depicting a cloud computing environment comprising a client device in communication with cloud service providers.

Referring to FIG. 1B, a cloud computing environment is depicted for synchronizing data structures in computer networks and distributed computing environments. A cloud computing environment may provide client 102 with one or more resources provided by a network environment. The cloud computing environment may include one or more clients 102a-102n, in communication with respective agents 103a-103n and with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms, or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds 108 may be connected to the servers 106 over a public network 104. Private clouds 108 may include private servers 106 that are physically maintained by clients 102 or owners of clients. Private clouds 108 may be connected to the servers 106 over a private network 104. Hybrid clouds 108 may include both the private and public networks 104 and servers 106.

The cloud 108 may also include a cloud based delivery, e.g., Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington; RACKSPACE CLOUD provided by Rackspace US, Inc., of San Antonio, Texas; Google Compute Engine provided by Google Inc. of Mountain View, California; or RIGHTSCALE provided by RightScale, Inc., of Santa Barbara, California. PaaS providers may offer functionality provided by IaaS, including, e.g., storage, networking, servers, or virtualization, as well as additional resources such as, e.g., the operating system, middleware, or runtime resources. Examples of PaaS include WINDOWS AZURE provided by Microsoft Corporation of Redmond, Washington; Google App Engine provided by Google Inc.; and HEROKU provided by Heroku, Inc., of San Francisco, California. SaaS providers may offer the resources that PaaS provides, including storage, networking, servers, virtualization, operating system, middleware, or runtime resources. In some embodiments, SaaS providers may offer additional resources, including, e.g., data and application resources. Examples of SaaS include GOOGLE APPS provided by Google Inc.; SALESFORCE provided by Salesforce.com Inc. of San Francisco, California; or OFFICE 365 provided by Microsoft Corporation. Examples of SaaS may also include data storage providers, e.g., DROPBOX provided by Dropbox, Inc., of San Francisco, California; Microsoft SKYDRIVE provided by Microsoft Corporation; Google Drive provided by Google Inc.; or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages, including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g., GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
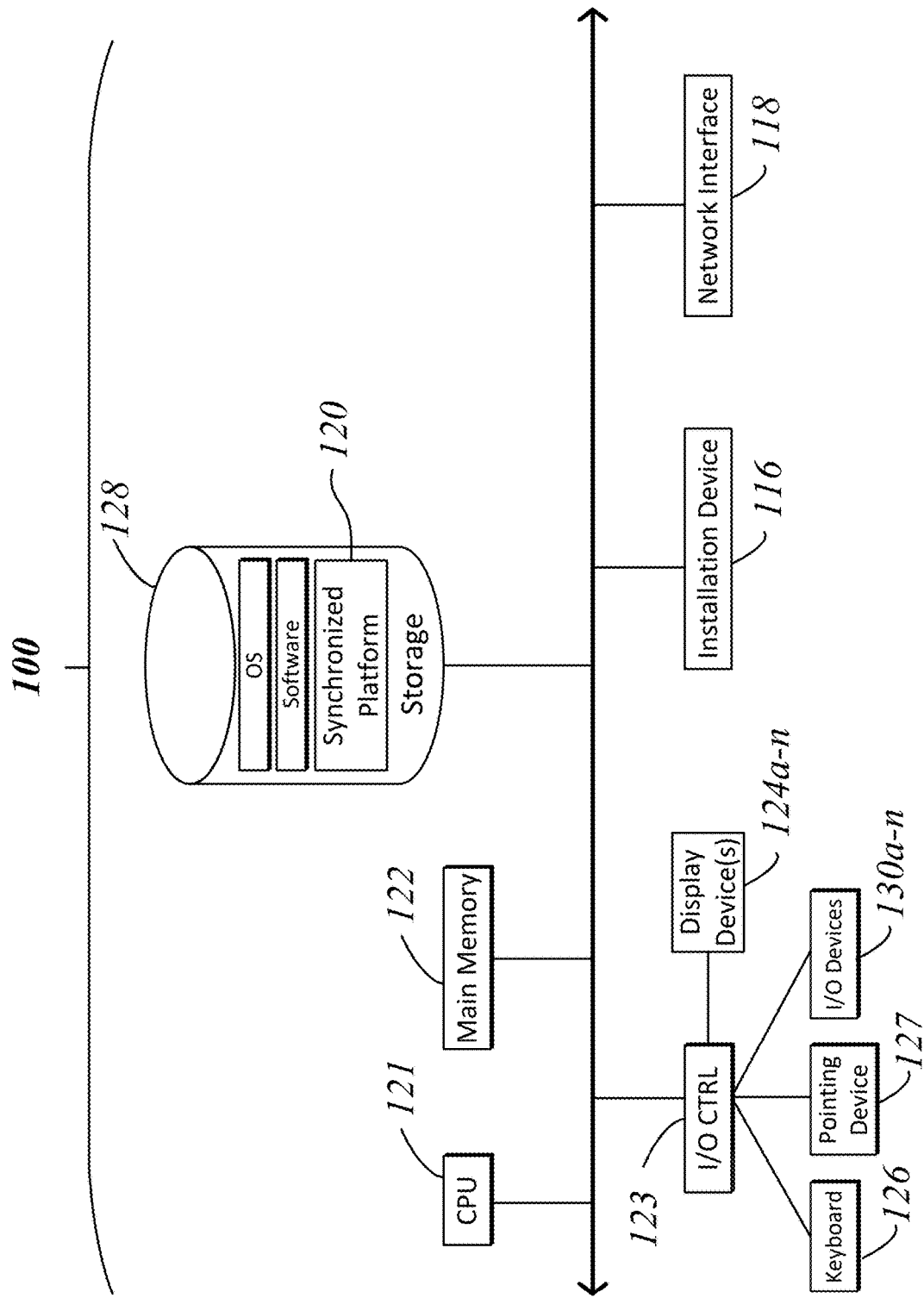
FIGS. 1C and 1D are block diagrams depicting embodiments of computing devices useful in connection with the methods and systems described herein.
Figure 1D:
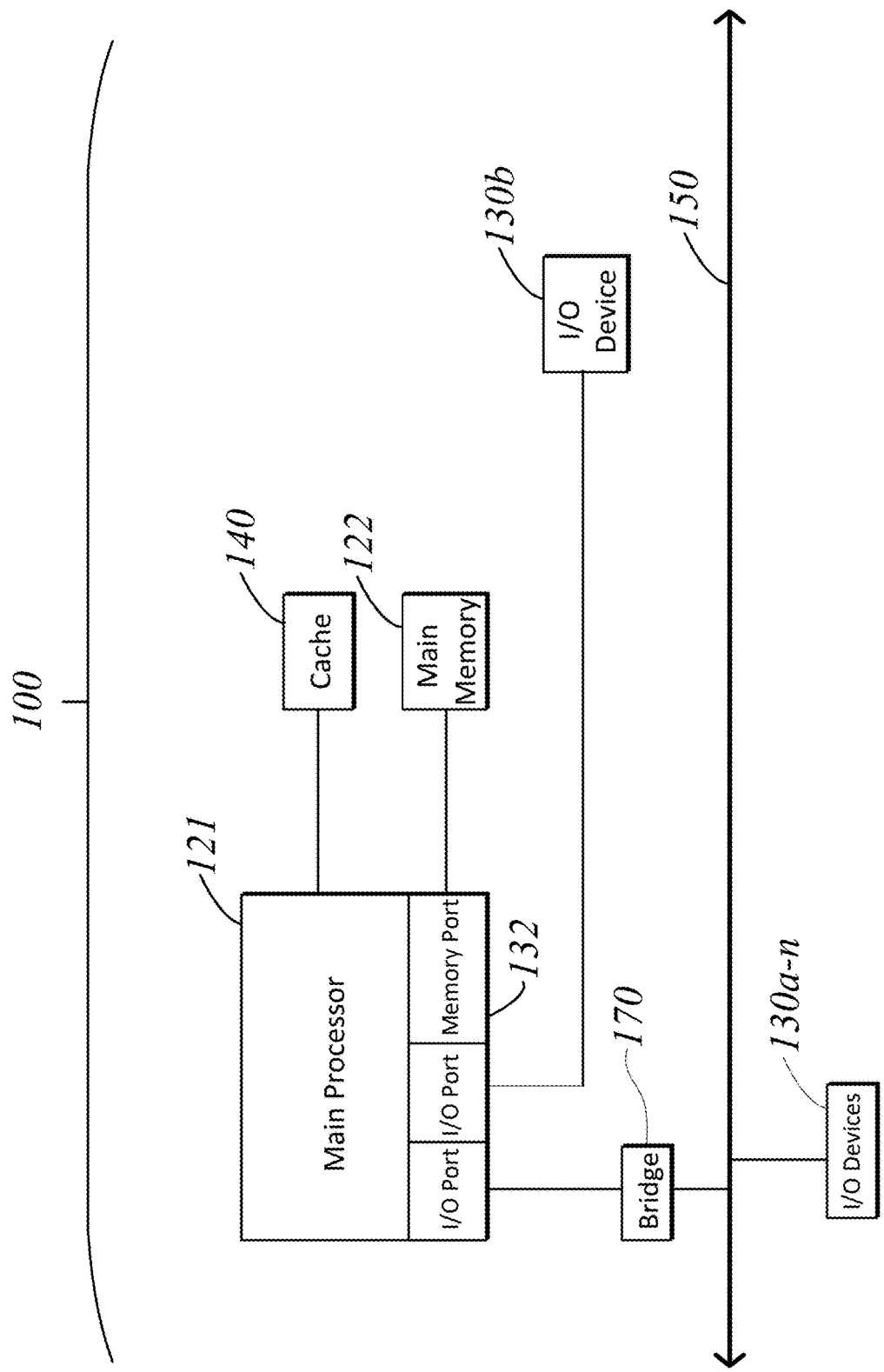

The client 102 and server 106 may be deployed as and/or executed on any type and form of computing device, e.g., a computer, network device or appliance capable of communicating on any type and form of network and performing the operations described herein. FIGS. 1C and 1D depict block diagrams of a computing device 100 useful for practicing an embodiment of the client 102 or a server 106, for synchronizing data structures in computer networks and distributed computing environments. As shown in FIGS. 1C and 1D, each computing device 100 includes a central processing unit 121 and a main memory unit 122. As shown in FIG. 1C, a computing device 100 may include a storage device 128, an installation device 116, a network interface 118, an I/O controller 123, display devices 124a-124n, a keyboard 126, and a pointing device 127, e.g., a mouse. The storage device 128 may include, without limitation, an operating system, software, and synchronized platform 120, which can implement any of the features of the data processing system 205 described herein below in conjunction with FIG. 2. As shown in FIG. 1D, each computing device 100 may also include additional optional elements, e.g., a memory port 132, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g., those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5, INTEL CORE i7, and INTEL CORE i9.

Main memory unit 122 may include one or more memory chips capable of storing data and allowing any storage location to be directly accessed by the microprocessor 121. Main memory unit 122 may be volatile and faster than storage 128 memory. Main memory units 122 may be dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FcRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 132. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus 150 while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provide for facial recognition which may be utilized as an input for different purposes including authentication and other commands. Some devices 130a-130n provides for voice recognition and inputs, including, e.g., Microsoft KINECT, SIRI for IPHONE by Apple, Google Now, or Google Voice Search.

Additional devices 130a-130n have both input and output capabilities, including, e.g., haptic feedback devices, touch-screen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality, including, e.g., pinch, spread, rotate, scroll, or other gestures. Some touch-screen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices 130a-130n may be controlled by an I/O controller 123 as shown in FIG. 1C. The I/O controller 123 may control one or more I/O devices 130a-130n, such as, e.g., a keyboard 126 and a pointing device 127, e.g., a mouse or optical pen. Furthermore, an I/O device 130 may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g., a USB bus, a SCSI bus, a Fire Wire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or autostereoscopic. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect, or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g., one or more hard disk drives or redundant arrays of independent disks) for storing an operating system or other related software, and for storing application software programs such as any program related to the synchronized platform 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software 110 can be run from a bootable medium, for example, a bootable CD, e.g., KNOPPIX, a bootable CD for GNU/Linux that is available as a GNU/Linux distribution from knoppix.net.

Client device 100 may also install software 110 or application from an application distribution platform 112. Examples of application distribution platforms 112 include the App Store for iOS provided by Apple, Inc.; the Mac App Store provided by Apple, Inc.; GOOGLE PLAY for Android OS provided by Google Inc.; Chrome Webstore for CHROME OS provided by Google Inc.; and Amazon Appstore for Android OS and KINDLE FIRE provided by Amazon.com, Inc. An application distribution platform 112 may facilitate installation of software 110 on a client device 102. An application distribution platform 112 may include a repository of applications on a server 106 or a cloud 108, which the clients 102a-102n may access over a network 104. An application distribution platform 112 may include an application developed and provided by various developers. A user of a client device 102 may select, purchase, and/or download an application via the application distribution platform 112.

Furthermore, the computing device 100 may include a network interface 118 to interface to the network 104 through a variety of connections, including, but not limited to, standard telephone lines, LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol, e.g., Secure Socket Layer (SSL) or Transport Layer Security (TLS), or the Citrix Gateway Protocol manufactured by Citrix Systems, Inc., of Ft. Lauderdale, Florida. The network interface 118 may comprise a built-in network adapter, network interface card, PCMCIA network card, EXPRESSCARD network card, card bus network adapter, wireless network adapter, USB network adapter, modem, or any other device suitable for interfacing between the computing device 100 and any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to, WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc., of Cupertino, California; and Linux, a freely-available operating system, e.g., Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, a PLAYSTATION 4, PLAYSTATION 5, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, NINTENDO WII U, or a NINTENDO SWITCH device manufactured by Nintendo Co., Ltd., of Kyoto, Japan, an XBOX 360, an XBOX ONE, an XBOX ONE S, an XBOX ONE X, an XBOX SERIES S, or an XBOX SERIES X, manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats, including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet, e.g., the IPAD line of devices by Apple; GALAXY TAB family of devices by Samsung; or KINDLE FIRE, by Amazon.com, Inc., of Seattle, Washington. In other embodiments, the computing device 100 is an eBook reader, e.g., the KINDLE family of devices by Amazon.com, or NOOK family of devices by Barnes & Noble, Inc., of New York City, New York.

In some embodiments, the communications device 102 includes a combination of devices, e.g., a smartphone combined with a digital audio player or portable media player. For example, one of these embodiments is a smartphone, e.g., the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g., a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Synchronizing Data Structures in Computer Networks and Distributed Computing Environments The systems and methods of this technical solution provide techniques for synchronized information sharing between multiple computing devices, which can provide additional notifications, alerts, or other content in connection with live events. Due to their real-time nature, it can be challenging to share up-to-date information network events between multiple computing devices, including between servers and client devices that access those servers. The systems and methods of this technical solution address these and other issues by providing synchronized data structures within network communication sessions. The synchronized data structures can include metadata generated to facilitate efficient and accurate data transfer between computing devices even in computer networks with large numbers of computing devices.

Figure 2:
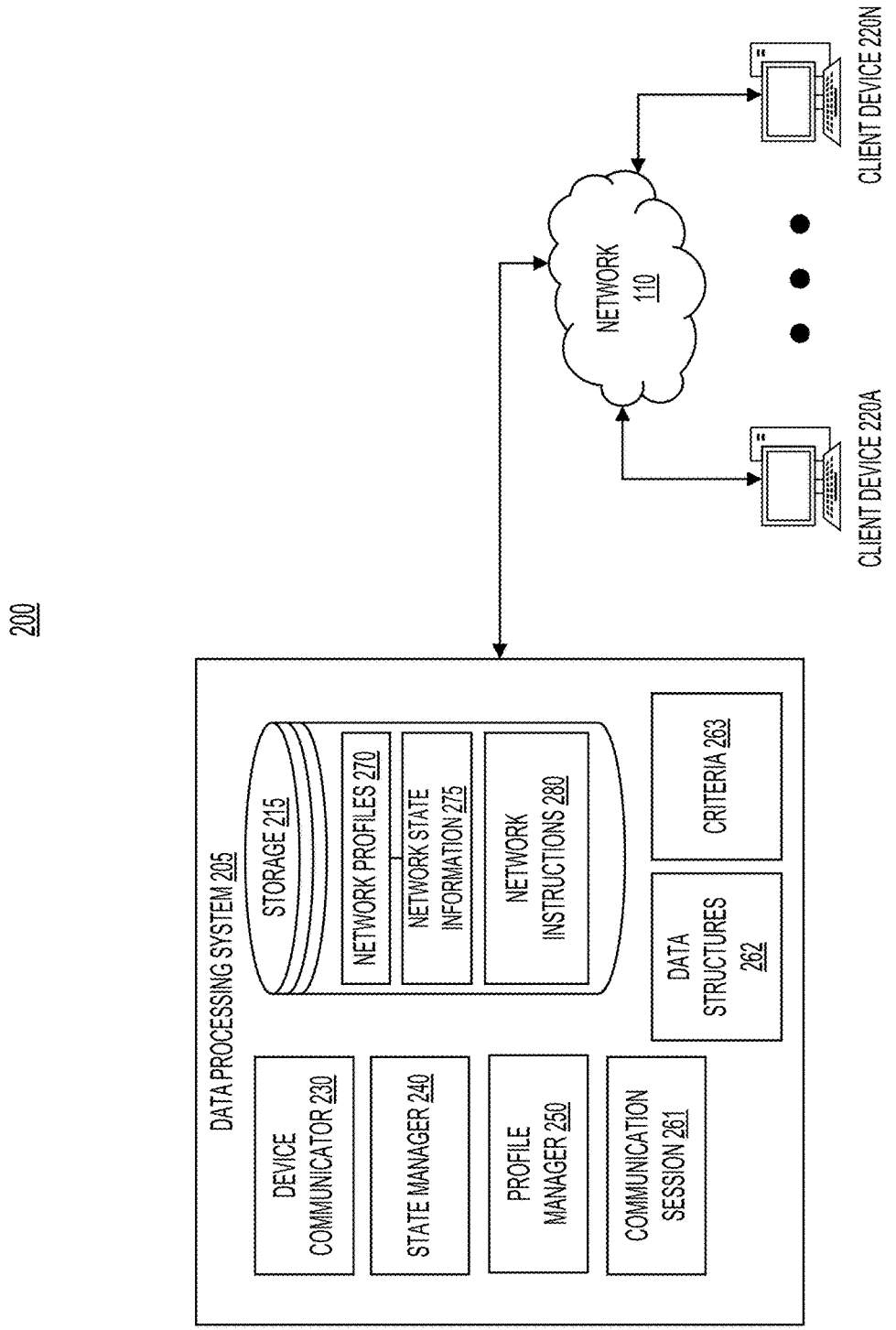
FIG. 2 is a block diagram of an example system for synchronizing data structures in computer networks and distributed computing environments, in accordance with one or more implementations.

Referring now to FIG. 2, illustrated is a block diagram of an example system 200 synchronizing data structures in computer networks and distributed computing environments, in accordance with one or more implementations. In FIG. 2, the system 200 can include at least one data processing system 205, at least one network 210, and one or more client devices 220A-220N (sometimes generally referred to as client device(s) 220). In FIG. 2, the data processing system 205 can include at least one device communicator 230, at least one state manager 240, at least one profile manager 250, and at least one storage 215. The storage 215 can include one or more network profiles 270 (sometimes referred to herein as "player profiles 270"), network state information (sometimes referred to herein as "game state information 275"), and one or more network instructions 280. The data processing system 205 is shown as including one or more communication sessions 261, one or more data structures 262, and one or more criteria 263.

Each of the components (e.g., the data processing system 205, the network 210, the client devices 220, components thereof, etc.) of the system 200 can be implemented using the hardware components or a combination of software with the hardware components of a computing system, such as the server 106, the client computing system 102, or the computing system 100 described in connection with FIGS. 1A-1D, or any other computing system described herein.

The data processing system 205 can include at least one processor and a memory, e.g., a processing circuit. The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 205 can include one or more computing devices or servers that can perform various functions as described herein. The data processing system 205 can include any or all of the components and perform any or all of the functions of the server 106, the client computing system 102, or the computing system 100 described in connection with FIGS. 1A-1D, or any other computing system described herein.

The network 210 can include computer networks such as the Internet, local, wide, metro or other area networks, intranets, satellite networks, other computer networks such as voice or data mobile phone communication networks, and combinations thereof. The data processing system 205 of the system 200 can communicate via the network 210, for example with one or more client devices 220. The network 210 may be any form of computer network that can relay information between the data processing system 205, the one or more client devices 220, and one or more information sources, such as web servers or external databases, amongst others. In some implementations, the network 210 may include the Internet and/or other types of data networks, such as a local area network (LAN), a wide area network (WAN), a cellular network, a satellite network, or other types of data networks.

The network 210 may also include any number of computing devices (e.g., computers, servers, routers, network switches, etc.) that are configured to receive and/or transmit data within the network 210. The network 210 may further include any number of hardwired and/or wireless connections. Any or all of the computing devices described herein (e.g., the data processing system 205, the one or more client devices 220, the server system 400, the client computing system 414, etc.) may communicate wirelessly (e.g., via Wi-Fi, cellular, radio, etc.) with a transceiver that is hardwired (e.g., via a fiber optic cable, a CAT5 cable, etc.) to other computing devices in the network 210. Any or all of the computing devices described herein (e.g., the data processing system 205, the one or more client devices 220, the server 106, the client computing system 102, the computing system 100, etc.) may also communicate wirelessly with the computing devices of the network 210 via a proxy device (e.g., a router, network switch, or gateway).

Each of the client devices 220 can include at least one processor and a memory, e.g., a processing circuit. The memory can store processor-executable instructions that, when executed by processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The client devices 220 can include one or more computing devices or servers that can perform various functions as described herein. The one or more client devices 220 can include any or all of the components and perform any or all of the functions of the client computing system 102 or the computing system 100 described in connection with FIGS. 1A-1D, or any other computing system described herein.

Each client device 220 can include, but is not limited to, a mobile device (e.g., a smartphone, tablet, etc.), a television device (e.g., smart television, set-top box, et.), a personal computing device (e.g., a desktop, a laptop, etc.) or another type of computing device. Each client device 220 can be implemented using hardware or a combination of software and hardware. Each client device 220 can include a display or display portion. The display can include a display portion of a television, a display portion of a computing device, or another type of interactive display (e.g., a touchscreen, a display, etc.) and one or more input/output (I/O) devices (e.g., a mouse, a keyboard, digital keypad). The display can include one or more portions, for example, to display multiple in-game events as described herein. The display can include a touch screen displaying an application, such as the gaming applications described herein. The display can include a border region (e.g., side border, top border, bottom border).

In some implementations, the display can include a touch screen display, which can receive interactions from a player. The interactions can result in interaction data, which can be stored and transmitted by the processing circuitry of the client device 220. The interaction data can include, for example, interaction coordinates, an interaction type (e.g., click, swipe, scroll, tap, etc.), and an indication of an actionable object with which the interaction occurred. Each client device 220 can include an input device that enables a player to interact with and/or select one or more actionable objects as described herein. For example, a touchscreen display can enable interaction with one or more visual indications provided through the display of each mobile (or client) device 220, and responsive to an interaction (e.g., select, click-on, touch, hover), the client device 220 can generate an indication identifying a player input and/or selection of a wager, an in-game event, or an indication to participate in a bonus event, among others.

Each client device 220 can include a device identifier, which can be specific to each respective client device 220. The device identifier can include a script, code, label, or marker that identifies a particular client device 220. In some implementations, the device identifier can include a string or plurality of numbers, letters, characters or any combination numbers, letters, and characters. In some implementations, each client device 220 can have a unique device identifier. Each client device 220 can include a client application, which can be a gaming application that communicates with the data processing system 205 to play games, as described herein. The client application can include an application executing on each client device 220 or provided to the client device 220 by the data processing system 205.

The application can include a web application, a server application, a resource, a desktop, or a file. In some implementations, the application can include a local application (e.g., local to a client device 220), hosted application, Software as a Service (SaaS) application, virtual application, mobile application, and other forms of content. In some implementations, the application can include or correspond to applications provided by remote servers or third-party servers. In some implementations, the application can access the network profiles 270, the network state information 275, or the network instructions 280, stored and maintained at the storage 215, and generate one or more actionable objects, such as the actionable objects described herein below in connection with FIGS. 3A-22, to a user (sometimes referred to herein as a "player") through a client device 220. Such actionable objects can include player-selectable hyperlinks, buttons, graphics, videos, images, or other application features that generate a signal that is processed by the application executing on the respective client device 220.

In some implementations, one or more client devices 220 can establish one or more communication sessions 261 with the data processing system 205. The one or more communication sessions 261 can each include a channel or connection between the data processing system 205 and the one or more client devices 220. The one or more communication sessions 261 can each include an application session (e.g., virtual application), an execution session, a desktop session, a hosted desktop session, a terminal services session, a browser session, a remote desktop session, a URL session and/or a remote application session. Each communication session 261 can include encrypted and/or secure sessions, which can include an encrypted file, encrypted data or traffic. The client devices 220 can each use the communication session 261 established with the data processing system 205 to carry out any of the functionalities described herein. For example, the application executing on a client device 220 can perform any of the client-side operations described herein, including displaying any of the user interfaces shown in FIGS. 3A-22, or any other types of user interfaces described herein.

Each of the client devices 220 can be computing devices configured to communicate via the network 210 to access information resources, such as web pages via a web browser, or application resources via a native application executing on a client device 220. When accessing information resources (e.g., instructions/assets for displaying/presenting, modifying, or otherwise navigating graphical user interface (s), etc.) the client device can execute instructions (e.g., embedded in the native applications, in the information resources, etc.) that cause the client devices to display various application interfaces, such as the user interfaces described herein below in conjunction with FIGS. 3A-22. The application interfaces can be, for example, application interfaces that present different types of network information, or other types of interactive graphical user interfaces. In general, the graphical user interfaces may include various different types of interactive or non-interactive assets (e.g., images, video, animations, graphics, audio, etc.) that is presented to a user via the input/output interfaces of a client device 220.

In response to interactions with user interface elements, the client devices 220 can transmit information, such as network profile information (e.g., changing profile parameters, changing login information, any information stored in a network profile 270, etc.), interaction information, selections of wager amounts, selections of gaming participation events, or other signals to the data processing system 205. In some implementations, a client device 220 can transmit a request to initiate a gaming session, and requests for network resources during a communication session 261. The request can include, for example, a request to play a particular game (e.g., can include a game identifier, etc.). The request 261 can include one or more data structures 262, which may specify various network/transmission values used by the data processing system 205 (or the components thereof) to perform various operations described herein. The transmission values may include any type of information associated with the client device 220, including user-provided information. In one example, the transmission values may include a wager amount. The request can be transmitted as or may include a hypertext transfer protocol (HTTP or HTTPS) request message, a file transfer protocol message, an e-mail message, a text message, or any other type of message that can be transmitted via the network 210.

The data processing system 205 is shown as including the storage 215. The storage 215 can be a computer-readable memory that can store or maintain any of the information described herein. The storage 215 can maintain one or more data structures, which may contain, index, or otherwise store each of the values, pluralities, sets, variables, vectors, numbers, or thresholds described herein. The storage 215 can be accessed using one or more memory addresses, index values, or identifiers of any item, structure, or region maintained in the storage 215. The storage 215 can be accessed by the components of the data processing system 205, or any other computing device described herein, via the network 210. In some implementations, the storage 215 can be internal to the data processing system 205. In some implementations, the storage 215 can exist external to the data processing system 205 and may be accessed via the network 210. For example, the storage 215 may be distributed across many different computer systems (e.g., a cloud computing system) or storage elements and may be accessed via the network 210 or a suitable computer bus interface.

The data processing system 205 can store, in one or more regions of the memory of the data processing system 205, or in the storage 215, the results of any or all computations, determinations, selections, identifications, generations, constructions, or calculations in one or more data structures indexed or identified with appropriate values. Any or all values stored in the storage 215 may be accessed by any computing device described herein, such as the data processing system 205, to perform any of the functionalities or functions described herein. In implementations where the storage 215 forms a part of a cloud computing system, the storage 215 can be a distributed storage medium in a cloud computing system and can be accessed by any of the components of the data processing system 205, by the one or more client devices 220 (e.g., via the user interface similar to that depicted in FIGS. 3A-22, etc.), or any other computing devices described herein.

The storage 215 can store one or more network profiles 270 associated with a user (sometimes referred to herein as a "player") of a client device 220. In some implementations, the network profiles 270 may sometimes be referred to as "player profiles 270". A network profile 270 of a player can be a user profile that includes information about the player and information about one or more of the client devices 220 used to access the data processing system 205 using the network profile 270. For example, identifiers of the network profile 270 can be used to access the functionality of the data processing system 205 (e.g., by logging into the data processing system 205 via one or more web-based interfaces). The identifiers can include a username, a password, an e-mail address, a phone number, a personal identification number (PIN), a secret code-word, device identifiers for use in a two-factor authentication technique, among others. The network profile 270 can store information about wagers, games, and gaming events that are performed by the player via the data processing system 205. The network profile 270 can store a credit balance, wager information or side wager information (e.g., an amount of a wager/side wager, a timestamp associated with a wager/side wager, information about gaming conditions or game state information that resulted in a side wager, a client device identifier of a client device that was used to place the wager/side wager, etc.). The network profile 270 can store information about a client device used to access the data processing system 205 such as an IP address, a MAC address, a GUID, a network profile name (e.g., the name of a user of the client device 220, etc.), device name, among others. In some implementations, the network profile 270 can be created by the data processing system 205 in response to the network profile creation request transmitted by a client device 220. The network profile creation request can include any of the network profile information described herein.

The storage 215 can store or maintain network state information 275 associated with each of the one or more network profiles 270, for example, in one or more data structures. The network state information 275 can include information for games previously or currently played or otherwise accessed by a client device 220 using a corresponding network profile 270. In some implementations, a client device 220 accessing the data processing system 205 may not be associated with a network profile 270. In such implementations, the data processing system 205 can automatically create a network profile 270 using an identifier of the client device 220 provided by the client device 220. The network state information 275 can include any information relating to one or more communication sessions 261 between a client device 220 and a data processing system 205. In some implementations, the network state information 275 can include application state information for one or more network applications provided by the data processing system 205 to a client device 220. For example, the network state information 275 can include information relating to wagers, additional/side wagers, hands, actions, interactions, or other data provided by the client device 220 during a play of a game or according to any other network application provided by the data processing system 205. As described in further detail herein, the state manager 240 can maintain (e.g., store, update, etc.), in corresponding network state information 275, a respective network state of applications as they are being accessed for multiple users accessing the data processing system 205. The network state information 275 can include one or more data structures that include any information related to a network state, including any values or data stored for an application instance accessed via a communication session 261. In an example of a game, the network state information 275 can include information such as current cards held by a player (e.g., in a blackjack game, poker game, or another card game, etc.), wager information, information about whether the player has indicated a desire to participate in additional bonus award opportunities, or any other state data described herein.

In another example, the network state information 275 can include turn information (e.g., which user has the current turn, how many game turns have elapsed, etc.) for one or more applications/games provided via the data processing system 205. In some implementations, information used to update the network state information 275 can be received as a play of the game occurs (e.g., as the play is processed by the data processing system 205 according to the game instructions, etc.). The network state information 275 can include options that a player may take at each portion of a game, and any actions (e.g., interactions, pausing/waiting for a particular duration at stored timestamps, etc.) the client device 220 takes in response to said options. In some implementations, if multiple hands are being controlled by a player via the client device 220 for a single play of a card game (e.g., multiple hands for a single round of blackjack, poker, or another card game, etc.), the network state information 275 can include state information for each of the hands under control of the player. In addition, the network state information 275 can include information relating to the conditions of additional wagers.

In some implementations, the network state information 275 can include information relating to one or more plays of a roulette game with one or more bonus regions. This information includes the current state of the roulette wheel, the bets placed by players, the payout odds for each bet, the active bonus regions, and the outcome history (e.g., win or loss) of previous gameplays. The network state information 275 can also include whether the current play (sometimes referred to as a "round" or a "play" of the roulette game) satisfies any predetermined bonus conditions (or game conditions) based on the outcome.

The storage 215 can store or maintain network instructions 280. The network instructions 280 may include various instructions for one or more network applications that may be accessed at/provided by the data processing system 205. The network instructions 280 may include instructions for modifying the network state information 275 for a given communication session 261. The network instructions 280 may include instructions to receive, transmit, and/or generate one or more data structures 262. In some implementations, the network instructions 280 may include instructions that compare various values stored as part of the network state information 275 to one or more criteria 263. The criteria 263 may include thresholds, conditions, values, path information, or other comparison information used by one or more network applications provided by the data processing system 205.

In some implementations, the network instructions 280 can include display/presentation instructions, which may specify various assets, network configuration information, or other information used to provide various network applications to the client devices 220. The network instructions 280 can include instructions to play various games (e.g., roulette games, including roulette games with bonus regions). The network instructions 280 can specify one or more game events that occur in response to a particular game state. The network instructions can include instructions to play a game from start to finish, for example, by streaming gaming content to each of the client devices 220 that initiate play of a particular game, or by executing the network instructions and displaying content via a local display device. The network instructions 280 can be stored in one or more data structures that are indexed by a game name (e.g., blackjack, poker, rummy, craps, sic bo, Klondike, any other game, etc.). The network instructions 280 can be processor executable instructions that cause the data processing system 205 to provide one or more games to a client device 220 via a communication session.

In some implementations, the network instructions 280 can include artificial intelligence models (e.g., machine learning models, neural network, decision trees, ruled-based lookup table, etc.) that cause the data processing system 205 to play an opposing entity to a player of one of the games in the network instructions 280. For example, the artificial intelligence model can provide a simulated dealer in a blackjack game, a simulated player in a poker game, or other simulated players, dealers, or game entities. In some implementations, the network instructions 280 can include network instructions that allow a play of a game to progress with multiple hands. For example, in a multi-hand card game, the network instructions 280 can include instructions that accommodate multiple hands being controlled by a single player.

The network instructions 280 can include, or may include instructions for generating, odds information, which can be stored as probability values of certain in-game events occurring. The odds information may further define one or more probability distributions that may be sampled to determine an outcome of one or more events in the game according to the network instructions 280. In some implementations, the odds information may be altered based on actions taken by the player, or the odds information can correspond to the likelihood of one or more outcomes (e.g., an expected value of player loss, an expected value of player win, etc.). For example, in roulette games with bonus regions described herein, the odds may define the probability of a ball landing in a specific pocket and the ball intersecting with one or more bonus regions on the track of the roulette wheel. A paytable for roulette games with bonus regions can specify awards, if any, associated with different pockets and bonus regions, and the odds information provides the underlying probabilities for those combinations in some implementations.

The network instructions 280 can also cause the network state information 275 for a game to be updated as the game is played via a client device 220. For example, in some implementations, the network instructions can update the odds information in response to an indication (e.g., as stored in the network state information 275, etc.) to participate in an additional bonus opportunity, such as a bonus play of the game, a separate bonus game, or a side wager or insurance bet that may result in an additional or alternative award.

In some implementations, where the network instructions 280 provide instructions for a game that implements a side wager, the network instructions 280 can specify the conditions under which the player is able to place the side wager and the conditions under which the player is to be awarded with awards according to a side wager when a corresponding side wager condition is met (e.g., at game termination, on player win, on player loss, etc.). Each of the components of the data processing system 205 can access, update, or modify the network profiles 270, the network state information 275, or the network instructions 280, to carry out functionalities.

In some implementations, the network instructions 280 can provide instructions for a roulette game with bonus regions. In a brief overview of the example network instructions 280, the data processing system 205 can generate a graphical user interface displaying a roulette wheel with a track that may have one or more bonus regions. The bonus regions may be defined as areas on the roulette wheel that, when intersected by a roulette ball traversing the track, can result in different payouts, bonus awards, or other in-game conditions. A spin of the roulette wheel (e.g., a play of the roulette game) may conclude when a ball lands in one of the numbered pockets on the roulette wheel. If the player's selected number matches the one where the ball lands in the winning pocket, the data processing system 205 can dynamically update the graphical user interface to reflect an award amount and a bonus value corresponding to the bonus region(s). Throughout the roulette game, the data processing system 205 can dynamically update the graphical user interface to reflect any changes in the network state information 275.

Referring now to the operations of the data processing system 205, the device communicator 230 can establish a communication session 261 (sometimes referred to herein as a game session) with a client device in response to a request from a client device 220. Establishing the communication session 261 may include generating network state information 275 for the network profile 270 used to access the data processing system 205 to initiate the play of the game. The request to establish a game session may include a request to play a game, which may be received in one or more messages from an application executing on the client device 220. The message, or request, can indicate that a player intends to play a game provided by the data processing system 205. The message can include an indication of a network profile 270 with which to use for the functionalities related to the game (e.g., placing wagers using earned credits, purchasing additional credits, etc.).

The message can include an identifier of a particular game to play. In some implementations, the device communicator 230 can provide the client device 220 with instructions to display one or more games to play in a list, allowing the player to select a game from the list. In response to an interaction indicating a selection, the client device 220 can transmit a signal identifying a game to the data processing system 205. Using the selection, the data processing system 205 can communicate a user interface for the game generated according to the game instructions 280 for the game and the network state information 275 for the game session. Such graphical user interfaces are shown in FIGS. 3A-22.

The data processing system 205 can provide various types of network applications to the client devices 220 via one or more communication sessions 261. The application(s) may be selected via one or more user interfaces with which a user can interact to modify network state information 275. In some implementations, the game can a card-based game, which can include (but is not limited to) poker, blackjack, rummy, or other similar games, a slot machine game, a game of chance, a grid-based game, a navigation game, among other types of games/applications. Furthermore, in some implementations, the game can be a dice-based game, which can include (but is not limited to) a game of craps, sic bo, or Klondike.

A play of a game can be a single "round" or play-through of a game to a termination condition (e.g., a condition after which the player has won or lost the wagers for a single instance of the game, etc.). To initiate a play of the game, or during a play of the game, the device communicator 230 can receive one or more network communications/requests that include data structures 262 specifying wagers from the client device 220 (e.g., in response to corresponding user interface elements presented at the client device 220, as described herein). The wager(s) may specify a wager amount. The wager amount provided by the client device 220 can be a specified amount of credits, such as 2, 5, 25, 200, 500, or 2000 credits. In some implementations, the player can specify a custom number or fractional number of credits used in the game, each of which may correspond to a respective condition, outcome, or aspect of the game. In some implementations, the wagers may include side wagers, additional wagers, or other wagers placed prior to or during a play of the game.

The client device 220 (or an application executing on the client device 220) can receive data relating to the requested game from the device communicator 230. The data relating to the requested game can include or may be generated based on network state information 275, which can be maintained by the state manager 240, as described herein. The device communicator 230 may determine updated information to provide to the client device 220 based on the network state information 275 for the game, which is initialized and updated by the state manager 240.

The state manager 240 updates and maintains the network state information 275, which may refer to the current state of one or more network applications described herein. In some implementations, the network state information 275 can maintain a state of a card game, a slot machine game, or a roulette game, including the current state of the roulette wheel, the bets placed by player(s), the payout odds for each bet, the active bonus regions, and the outcome history of previous spins. The state manager 240 can maintain the outcome of each gameplay (e.g., win or loss) and whether the current play satisfies any predetermined bonus conditions based on the outcome. The state manager 240 can update the network state information 275 based on player interactions and network instructions 280. For example, the state manager 240 can update the network state information 275 when the player places a wager, the roulette wheel spins, the ball lands in a numbered pocket, or when any predetermined bonus condition (or game conditions) is satisfied.

The profile manager 250 can create, modify, or delete network profiles 270 stored within storage 215. The profile manager 250 can store and organize player information, including account details, preferences, and gaming history, among others. The profile manager 250 can generate profile information based on data received from the client devices 220. This allows the profile manager 250 to capture activity across different gaming applications and different devices, and store records of that activity in the network profile 270. The profile manager 250 can provide gaming statistics (e.g., historical game outcomes), and game progress to a requesting client device 220.

The profile manager 250 can update credit balances, game statistics, and other relevant information based on the outcomes of games played by a client device 220. The profile manager 250 can receive data about game results from the client devices 220 or the state manager 240 and use this information to make adjustments to the network profile 270. For example, if a player wins a roulette game with a $10 wager, the profile manager 250 can increase the credit balance of the corresponding network profile 270 by an award amount (the amount of the wager plus any amount won from the roulette game). Similarly, the profile manager 250 can record game statistics such as the number of wins, losses, and ties, as well as the player's average bet size, win percentage, and longest winning streak. This allows players to track their progress and review their gaming history.

Although the foregoing as been described in a client-server arrangement, it should be understood that in some implementations, the data processing system 205 may locally execute one or more of the network applications. In such implementations, player profiles 270 may be maintained and/or accessed via one or more remote servers via the network 210. In such implementations, the data processing system 205 can include one or more display devices to present various graphical user interfaces described herein, as well as any suitable input device (e.g., buttons, switches, actuators, etc.) to receive input to interact with the applications provided via the data processing system 205. In some implementations, the data processing system 205 can include one or more physical receptacles, which may receive physical wager items (e.g., cards, chips, tokens, etc.) to enable users to provide wagers for various game applications provided via the data processing system 205.

Referring now to example implementation of a roulette game, the data processing system 205 can receive a wager and generate a graphical user interface presenting a roulette wheel with a track and multiple pockets. The track of the roulette wheel can include one or more bonus regions, each of which can be associated with a respective multiplier. The data processing system can update the graphical user interface based on a ball intersecting with the bonus region(s) during the play of the roulette game and landing in a pocket. The data processing system 205 can adjust a credit balance upon determining whether the ball intersects with the bonus regions and whether an outcome of the game results in an award amount. The credit balance can then be adjusted based on the award amount, if any, and the bonus values (or multiplier values) associated with the bonus regions. The data processing system can update and display updated information on the graphical user interface, such as the player's credit balance, the award amount, and the bonus values (or multiplier values) associated with the bonus regions. Example graphical user interfaces showing an example implementation of a roulette game are shown in FIGS. 3A-3C.

Figure 3A:
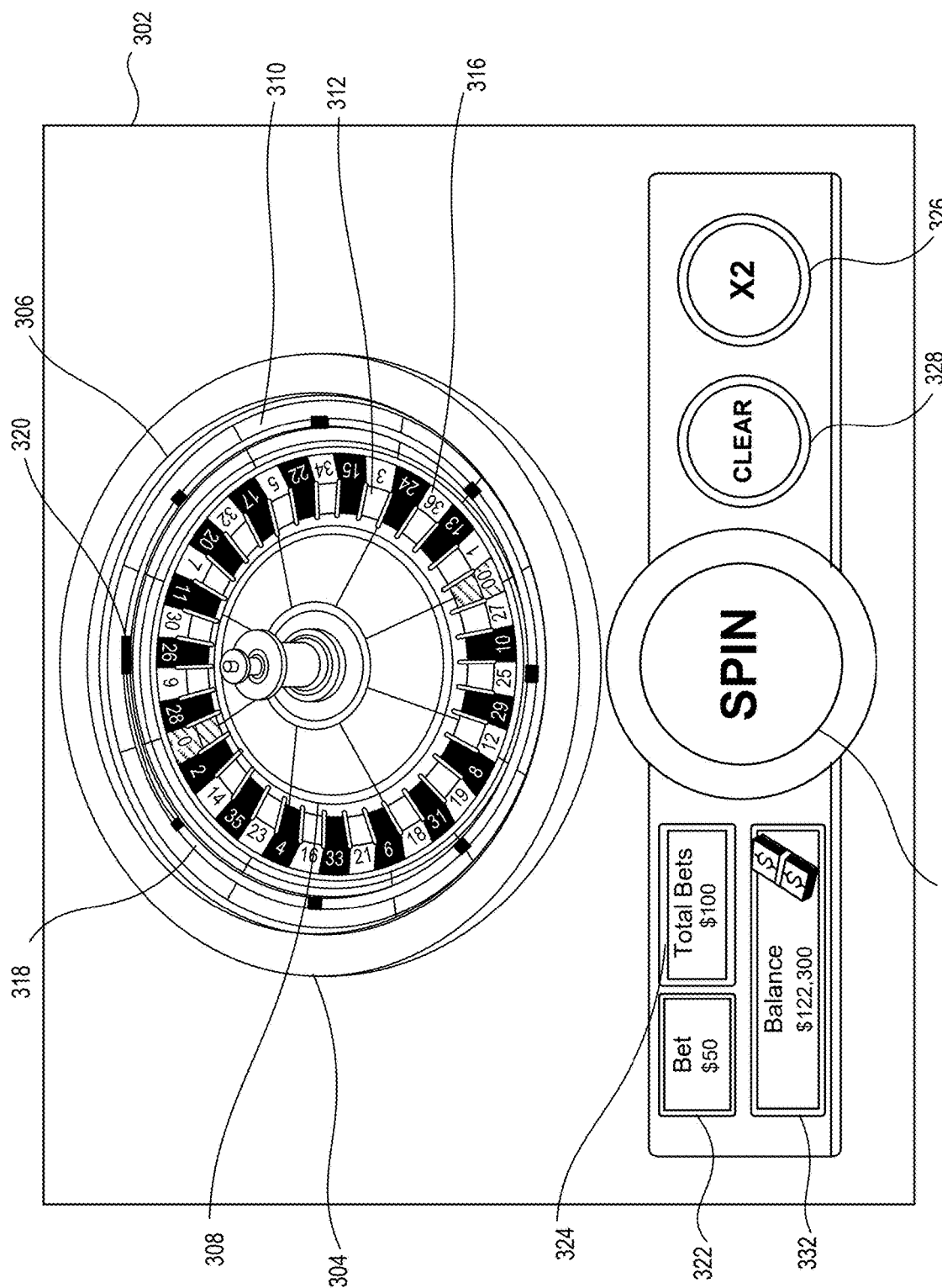
FIGS. 3A, 3B, and 3C depict example diagrams of graphical user interfaces that may be displayed in connection with network communication sessions established according to the techniques described herein, in accordance with one or more implementations.
Figure 3B:
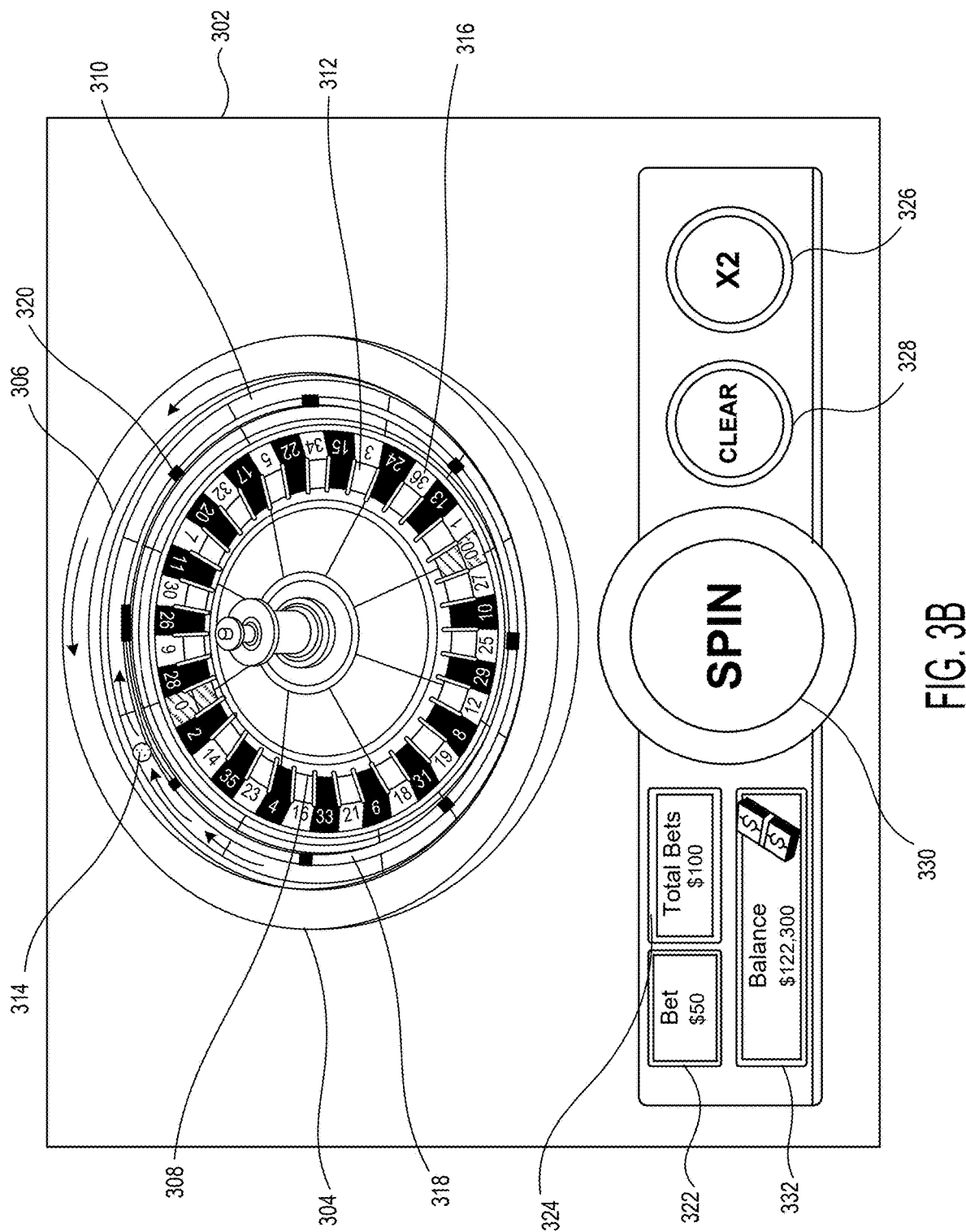
Figure 3C:
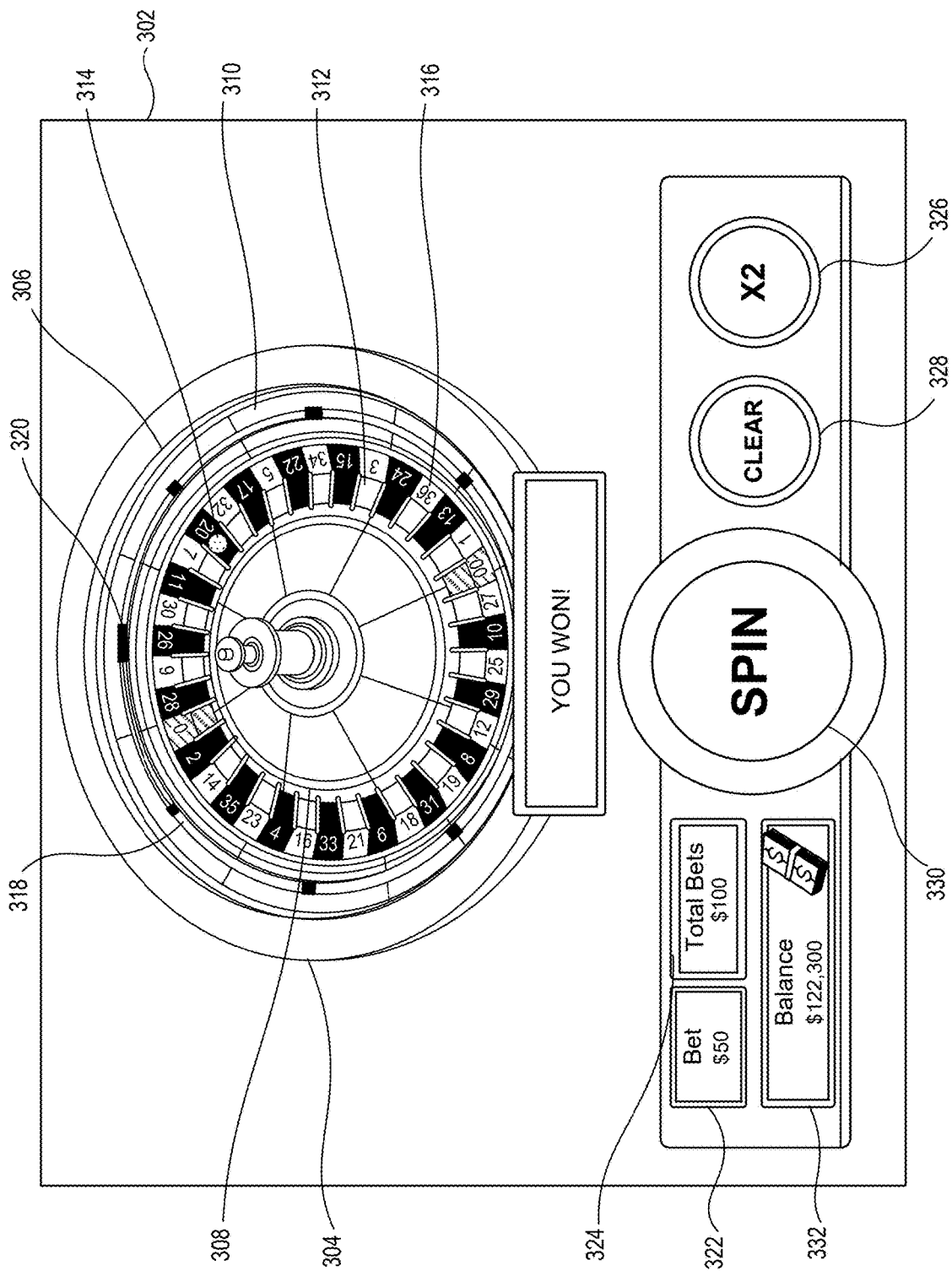

Referring now to FIG. 3A in the context of the components described in connection with FIGS. 1A-D and 2, a graphical user interface 302 is presented on a client device 220 for initiating a play of a roulette game. As discussed above, the device communicator 230 facilitates communication between the client device 220 and the data processing system 205, allowing players to interact with a graphical user interface 302 and transmit their actions to the data processing system 205. As players engage with the graphical user interface 302, their actions, such as placing bets or initiating the game, may be captured and stored in their network profile 270.

As depicted in FIG. 3A, the graphical user interface 302 displays a visual representation of a roulette wheel 304 for a play of the roulette game. The roulette wheel 304 can include an outer edge 306 and an inner edge 308 and may be represented as a circular device on the graphical user interface 302. The roulette wheel 304 is shown as including a track 310 and multiple pockets 312. The track 310 can be designed around the outer edge 306 of the roulette wheel 304 for an object 314 (referred to herein as a "ball") to "roll" on. The ball may be animated in the graphical user interface 302 as traversing a path (e.g., a network path) around the track 310 to land in one of the pockets 312, for example, in response to a play of the roulette gaming being initiated. In this example, the track 310 may be divided into a predetermined number of pocket numbers 316 (e.g., 38 pockets ranging from 0 to 36). The pocket numbers 316 may be shown in different colors (e.g., black, white, red, light gray, green, etc.) on the graphical user interface 302. For example, the pocket numbers 316 corresponding to numbers "0" and "00" can be displayed as light gray, while the remaining compartments 316 can be shown as alternating white and black. In some implementations, the pocket numbers 316 can be colored red, black, or green (alone or in combinations thereof).

The pockets 312 as shown may be small indentations around the inner edge 308 of the roulette wheel 304 where the ball 314 can land. In some implementations, the pockets can be represented as slightly concave indentations on the graphical user interface 302. The pockets 312 can also be colored, and each pocket 314 may correspond to one of the numbers of the track 310. On the track 310 of the roulette wheel 304, one or more deflectors 320 can be placed (or presented by the graphical user interface 302) to disrupt the trajectory of the ball 314.

In some implementations, the graphical user interface 302 can be updated to present a number of bonus regions 318 on the track 310 between one or more deflectors 320, making the bonus regions 318 less likely to be traversed in some instances. In some implementations, the number of bonus regions 318 may be predetermined (e.g., 8 or any positive integer in this example). In this example, corresponding bonus regions 318 are shown as extending between adjacent deflectors 320 and connecting each of the deflectors 320 along the track 310 shown in the graphical user interface 302. The bonus regions 318 may be shown as colored segments on the graphical user interface 302. In some implementations, bonus regions 318 can be visually distinct from each other on the graphical user interface 302. In some implementations, a single bonus region 318 can be extended between two deflectors 320 on the graphical user interface 302. In some implementations, one or more bonus regions 318 can be placed (or presented on the graphical user interface 302) next to each other or may even overlap on the track 310. Although shown in this example as thin lines extending between the deflectors 320, it should be understood that the bonus regions 318 may have any size, shape, or orientation, and may be positioned at any location on the roulette wheel shown in the graphical user interface 302. For example, the bonus regions 318 may be polygonal in shape, and may be placed (or presented) at random locations on the track 310. In some implementations, the data processing system 205 may randomly select the positions of the bonus regions 318 by generating a random number for each bonus region 318. In some implementations, the data processing system 205 may predetermine the positions of the bonus regions 318 based on the network instructions 280.

In some implementations, the data processing system 205 can be configured to assign to the roulette wheel 304 a plurality of bonus regions 318 at predetermined locations around the track 310 of the roulette wheel 304. Each bonus region 318 of the plurality of bonus regions 318 can have the same or different length. The data processing system 205 can determine the length of each bonus region 318 as well as the location on the track 310 of the roulette wheel 304 where the bonus region 318 is to be presented on the visual representation of the roulette wheel 304.

In some implementations, the data processing system 205 may use a random number generator or another type of distribution to determine, upon initiating the play of the game, which bonus regions that the ball 314 is to "intersect" with and which pocket 312 the ball 314 is to "land" in (e.g., determine the outcome of the game prior to animating the ball 314 on the track 310 in the graphical user interface 302). Once the data processing system 205 selects or determines the pocket number 316 to land on and any bonuses associated with bonus regions 318 that are to be intersected, the data processing system 205 can then generate an animation to show the ball 314 traversing a path that satisfies the bonus amount and ultimately showing the ball 314 landing in the pocket 312 corresponding to the determined pocket number 316.

The graphical user interface 302 can present several interactive elements. A player can interact with the graphical user interface 302 to place a wager. In some implementations, a separate wagering interface may be utilized to place a wager for the game, including, for example, via the wager receiver 265. In the example graphical user interface 302 shown in FIG. 3A, a player can interact with a bet button 322 to place a wager for a play of the roulette game. The wager information is then transmitted from the client device 220 to the data processing system 205. The data processing system 205 receives and processes the wager and initiates a play of the roulette game. The network profile 270 is also updated with the wager information. A balance region 332 displays the amount of credits available for the player to wager on the game. The amount shown in the balance region 332 may be determined from the credit balance specified in the network profile 270 of the player. The balance region 332 may be updated in response to interactions with the bet button 322. Wagers made for the play of the game can be subtracted from the credit balance of the player.

A total bets indicator 324 can be displayed on the graphical user interface 302 that indicates the total amount of money that has been wagered for a play of the roulette game. The data processing system 205 can update the total bets indicator 324 to reflect an updated bet amount whenever a player interacts with the bet button 322. A multiplier button 326 is also present that, when interacted with, can cause the bet amount to be updated to double the value of the player's wager. The graphical user interface 302 can display a clear button 328 that, when interacted with, may cause the wager to be reset (e.g., removed or erased). In some implementations, the graphical user interface 302 can be updated via the clear button 328 to reset the wager amount to a default value.

The roulette wheel 304 presented on the graphical user interface 302 can be an interactive element that the player can interact with to select a pocket 312 corresponding to a number. The network state information 275 is updated to reflect the player's selection. In some implementations, a player can select a number by tapping on an eligible betting location on a game board or by dragging and dropping a number of gaming resources (e.g., chips) to a desired betting location. Once the wager and the number have been selected, players can interact with a spin button 330, which may cause the graphical user interface 302 to be updated to show the roulette wheel 304 spinning and the ball 314 rolling on the track 310, as shown in connection with FIG. 3B. In some implementations, a player may select multiple pockets 312 (e.g., multiple discrete pockets, a range of pockets) rather than a single pocket 312. In some implementations, the play may select a color (e.g., black, white, etc.) rather than a single pocket 312.

Referring now to FIG. 3B, in the context of the components described in connection with FIG. 2, an updated graphical user interface 302 is presented on the client device in response to an interaction with the spin button 330 shown in FIG. 3A. The ball 314 can be seen spinning on the track 310 in the opposite direction of the roulette wheel 304 on the graphical user interface 302. As the ball 314 spins, the ball 314 may be shown as bouncing off the deflectors 320 and intersect with one or more bonus regions 318. The data processing system 205 updates the network state information 275 whenever the ball 314 intersects with a bonus region 318 during a play of the roulette game. In some implementations, each bonus region 318 can correspond to a predetermined multiplier value.

In some implementations, the data processing system 205 can determine which bonuses will be awarded. For example, the data processing system 205 may use a random number generator to select one or more bonus regions 318. Once the bonus regions 318 have been selected, the data processing system 205 may select the path that the ball 314 will need to take to intersect with the selected bonus regions 318. The data processing system 205 may use a physical simulation of the ball 314 on the roulette wheel 304 to determine the path of the ball 314. The data processing system 205 may take into account the initial conditions of the ball 314, such as its speed and direction, as well as the properties of the roulette wheel 304, such as its size, shape, and weight. In some implementations, the data processing system 205 may also consider the properties of the bonus regions 318, such as their size and shape, among others.

If the ball 314 intersects with a bonus region 318 (e.g., satisfies one or more criteria 263), the data processing system 205 updates the network state information 275 based on the multiplier value for that bonus region 318. For example, if a bonus region 318 has a multiplier value of "2" and the player bets $10 on the number that the ball lands on, the player can win $20. In some implementations, the data processing system 205 can cause the graphical user interface 302 to add or remove bonus regions 318 as well as change the multiplier values for the bonus regions 318 based on the network instructions 280 or player preference. In some implementations, the multiplier value associated with a bonus region 318 can be predetermined based on the odds of a ball 314 intersecting with the corresponding bonus region 318 during the play of the roulette game. This means that the higher the odds of a ball 314 intersecting with a bonus region 318, the lower the multiplier value will be, and vice versa. In some implementations, the odds of the ball 314 intersecting with a bonus region 318 may be represented by the size of a bonus region 318 (e.g., with larger bonus regions representing a higher chance of intersection by the ball 314).

In some implementations, the data processing system 205 can use a lookup table to store the multiplier values for the bonus regions 318. The lookup table can be indexed by the bonus region identifiers, such as a colors, shapes, or other identifiers to help with identification for the data processing system 205. The data processing system 205 can update the credit balance of the network profile 270 by the corresponding multiplier value of the bonus region(s) 318, based on whether the ball 314 lands on the number, range of values, color, or other identifier that the player selected, resulting in an award amount, as shown in connection with FIG. 3C.

Referring now to FIG. 3C in the context of the components described in connection with FIG. 2, a graphical user interface 302 is presented on a client device 220 depicting that a win condition has been satisfied. As described herein, upon selecting a number (e.g., "20" in this example) on the roulette wheel 304 and interacting with the spin button 330, the graphical user interface 302 is updated to show the ball 314 spinning on the roulette wheel 304. As the ball 314 spins on the track 310 of the roulette wheel 304 and deflects by hitting one or more deflectors 320, the ball 314 may or may not intersect with the bonus region(s) 318.

The data processing system 205 updates the network state information 275 to reflect the bonus regions 318 that the ball 314 intersects with. In some implementations, the data processing system 205 can update the network state information 275 to reflect the total number of bonus regions 318 that the ball 314 intersects with. For example, if the ball 314 intersects with two bonus regions 318 (can be same or different bonus regions 318), the network state information 275 can be updated to reflect the two bonuses. To track the number of bonus regions 318 that the ball 314 intersects with, the data processing system 205 may use a counter, which can be initialized to zero before the ball 314 is spun. As the ball 314 spins around the roulette wheel 304, the counter may be incremented every time the ball 314 intersects with a bonus region 318 until the ball 314 lands in the pocket 312. In some implementations, the data processing system 205 may use a list to track (or identify) the bonus regions 318 that the ball 314 intersects with. The list can be initialized to an empty list before the ball 314 is spun. As the ball 314 spins around the roulette wheel 304, each bonus region 318 that the ball 314 intersects with is added to the list, until the ball 314 lands in the pocket 312. In some implementations, the data processing system 205 can identify the last bonus region 318 that the ball 314 intersects with and update the credit balance with the corresponding multiplier of that bonus region 318. The multiplier value can be stored in a lookup table or in the network state information 275 itself.

The data processing system 205 can update the credit balance by adjusting an award amount using the multiplier value(s) once the outcome corresponding to a win condition is satisfied. In this example, the win condition is satisfied as the ball 314 lands on the number (e.g., 30) selected by the player, resulting in an award amount based on the network instructions 280. The award amounts corresponding to win conditions can be predetermined based on the odds of a ball 314 landing on a specific number, range of values, color, or other identifier on the roulette wheel 304. For example, the odds of winning when betting on multiple pockets 312 are higher than when betting on a single pocket 312. Similarly, the odds of winning when betting on a color are higher than when betting on a single pocket 312. However, the higher the probability of winning, the lower the payout will be, as may be dictated by the network instructions 280 or the standard roulette game rules.

The data processing system 205 can update the graphical user interface 302 to provide feedback to the player, indicating that a win condition has been satisfied. The feedback can include various sensory elements, such as visual, auditory, or tactile (e.g., haptic) feedback. The data processing system 205 can also update the network profile 270 in response to the play being won. In some implementations, upon satisfying the win condition, the data processing system 205 may sum the multiplier values of the corresponding bonus regions 318 that the ball 314 intersects with and apply the resulting sum to the award amount. In some implementations, the data processing system 205 may apply the multiplier value of the last bonus region 318 that the ball 314 intersects with. In some implementations, the multiplier values may be multiplicatively applied, potentially resulting in a very large multiplier value.

If the ball 314 does not land on a number selected by the player, the data processing system 205 may determine that the play of the roulette game results in a loss condition and update the credit balance of the network profile 270 by decrementing the wager selected for the play of the roulette game. In some implementations, if the outcome of the play, based on the multiplier value(s) applied to the award amount, satisfies a predetermined threshold, the data processing system 205 may identify that a bonus condition has been satisfied. Upon satisfying the bonus condition, the data processing system 205 may provide one or more additional awards, including but not limited to an additional game play or a bonus award amount. The specific bonus award may be predetermined based on the network instructions 280. In some implementations, one or more of the bonus regions 318 may correspond to, and provide, additional awards rather than multipliers, including but not limited to an additional game play or a bonus award amount.

The adjustment in the credit balance can be made based on the computed bonus award and the individual award amounts calculated for each outcome. In some implementations, the data processing system 205 can increase the credit balance in the player's network profile 270 by the sum of the bonus award amount and the award amount for each successful outcome. However, if the bonus award condition is not satisfied, resulting in a zero bonus award amount, the data processing system 205 can increase the credit balance only by the award amounts for the winning outcomes. In cases where the bonus award is credited to the player before the completion of the game, the data processing system 205 can update the credit balance of the network profile 270 by adding the award amounts for the winning outcomes to the credit balance.

Figure 4:
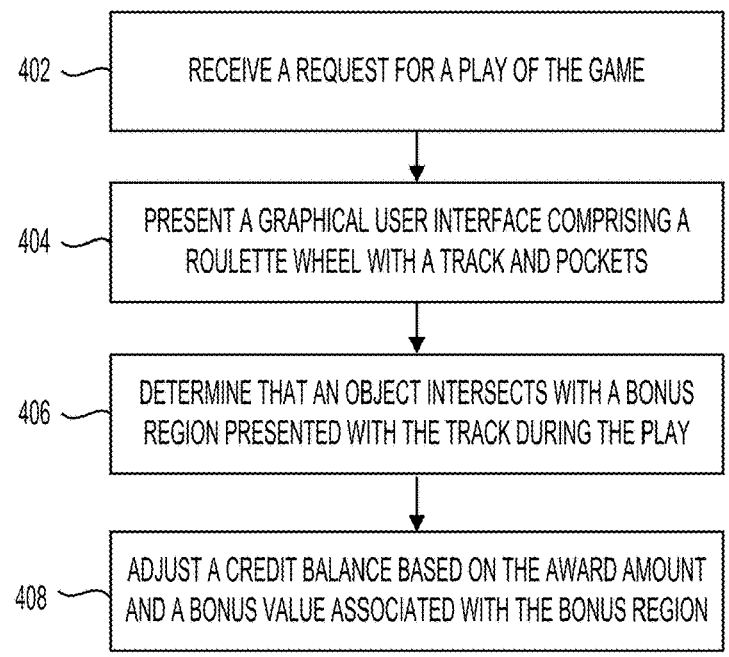
FIG. 4 depicts an example flow diagram of an example network application that may be accessed via network communication sessions established according to the techniques described herein, in accordance with one or more implementations.

Referring now to FIG. 4, depicted is an illustrative flow diagram of a method 400 for providing a roulette game with bonus regions. The method 400 can be executed, performed, or otherwise carried out by a data processing system. A data processing system (e.g., the data processing system 205) can be remote to one to one or more client devices and communicate with the one or more client devices via a computer network. In some implementations, the operations of method 400 can be performed by a standalone gaming device (e.g., without communicating with a gaming server to perform the method steps). In a brief overview of method 400, the gaming server can receive a request for a play of the roulette game (STEP 402), present a graphical user interface including a roulette wheel with a track and pockets (STEP 404), determine that an object intersects with a bonus region presented with the track during the play (STEP 406), and adjust a credit balance based on an award amount and a bonus value associated with the bonus region (STEP 408).

In further detail of method 400, the data processing system can receive a request for a play of the roulette game (STEP 402). The request (e.g., wager in this example) can be received in one or more messages received from a client device. The message, or request, can indicate that a player intends to play a game provided by the data processing system. The message can include an indication of a player profile with which to access functionalities related to the game (e.g., placing wagers using earned credits, purchasing additional credits, etc.). The wager can be provided via a graphical user interface (e.g., the graphical user interface 202 of FIG. 2A). The wager amounts provided can be a specified amount of credits, such as 2, 5, 25, 200, 500, or 2000 credits. In some implementations, the player can specify a custom number or fractional number of credits used in the game. Once the wager has been selected, the client device can transmit a request to place the wagers for the play of the game.

Upon receiving the request, the data processing system can generate a graphical user interface having a roulette wheel with a track and pockets (STEP 404). The roulette wheel can include an outer edge and an inner edge and may be represented as a circular device on the graphical user interface. The roulette wheel is shown (e.g., in FIG. 2A) as including a track and multiple pockets. The track can be designed around the outer edge of the roulette wheel for an object (referred to herein as a "ball") to "roll" upon. The ball may be animated in the graphical user interface as traversing a path around the track to land in one of the pockets, for example, in response to a play of the roulette gaming being initiated. The track may be divided into a predetermined number of pocket numbers (e.g., 48 pockets ranging from 0 to 46). The pocket numbers may be shown in different colors (e.g., black, white, red, light gray, green, etc.) on the graphical user interface. For example, the pocket numbers corresponding to numbers "0" and "00" can be displayed as light gray, while the remaining compartments can be shown as alternating white and black. In some implementations, the pocket numbers can be colored red, black, or green (alone or in combinations thereof). On the track of the roulette wheel, one or more deflectors can be placed to disrupt the trajectory of the ball.

In some implementations, the graphical user interface can be updated to present a number of bonus regions on the track between one or more deflectors, making the bonus regions less likely to be traversed in some instances. In some implementations, the number of bonus regions may be predetermined (e.g., 8 or any positive integer in this example). In this example, corresponding bonus regions are shown as extending between, and connecting, each of the deflectors along the track shown in the graphical user interface. The bonus regions may be shown as colored segments on the graphical user interface. In some implementations, bonus regions can be visually distinct from each other on the graphical user interface. In some implementations, a single bonus region can be extended between two deflectors on the graphical user interface. In some implementations, one or more bonus regions can be placed (or presented on the graphical user interface 202) next to each other or may even overlap on the track. Although shown in this example as thin lines extending between the deflectors, it should be understood that the bonus regions may have any size, shape, or orientation, and may be positioned at any location on the roulette wheel shown in the graphical user interface. For example, the bonus regions may be polygonal in shape, and may be placed (or presented) at random locations on the track. In some implementations, the data processing system may randomly select the positions of the bonus regions by generating a random number for each bonus region. In some implementations, the data processing system may predetermine the positions of the bonus regions based on the game instructions.

In some implementations, the data processing system can be configured to assign to the roulette wheel a plurality of bonus regions at predetermined locations around the track of the roulette wheel. Each bonus region of the plurality of bonus regions can have the same or different length. The data processing system can determine the length of each bonus region as well as the location on the track of the roulette wheel where the bonus region is to be presented on the visual representation of the roulette wheel.

In some implementations, the data processing system may use a random number generator or another type of distribution to determine, upon initiating the play of the game, which bonus regions that the ball is to "intersect" with and which pocket the ball is to "land" in (e.g., determine the outcome of the game prior to animating the ball on the track in the graphical user interface). Once the data processing system selects or determines the pocket number to land on and any bonus multipliers associated with the bonus regions, the data processing system can generate an animation to show the ball traversing a path that shows bonus amount and ultimately showing the ball landing in the pocket corresponding to the determined pocket number.

During gameplay, the ball spins on the track in the opposite direction of the roulette wheel on the graphical user interface. As the ball spins, the ball may be shown as bouncing off the deflectors and intersect with one or more bonus regions. The data processing system updates the game state information whenever the ball intersects with a bonus region during a play of the roulette game (STEP 406). In some implementations, each bonus region can correspond to a predetermined multiplier value. In some implementations, the data processing system can determine which bonuses will be awarded. For example, the data processing system may use a random number generator to select one or more bonus regions. Once the bonus regions have been selected, the data processing system may select the path that the ball will need to take to intersect with the selected bonus regions. The data processing system may use a physical simulation of the ball on the roulette wheel to determine the path of the ball. The data processing system may take into account the initial conditions of the ball, such as its speed and direction, as well as the properties of the roulette wheel, such as its size, shape, and weight. In some implementations, the data processing system may also consider the properties of the bonus regions, such as their size and shape, among others. In some implementations, the data processing system may use a random number generator or another type of distribution to determine, upon initiating the play of the game, which bonus regions that the ball is to "intersect" with and which pocket the ball is to "land" in (e.g., determine the outcome of the game prior to animating the ball on the track in the graphical user interface). In such implementations, the data processing system may access the game instructions 280 to extract odds information for each potential outcome (e.g., intersection with bonus regions, odds of landing in any particular pocket, range of pockets, or pockets corresponding to a color, etc.), and use the odds information to determine an outcome for the play based on one or more random number generated using a random number generator (or pseudo random number generator).

In some implementations, the data processing system updates the game state information based on the multiplier value for the bonus region that the ball interacts with. For example, if a bonus region has a multiplier value of "2" and the player bets $10 on the number that the ball lands on, the player can win $20. In some implementations, the data processing system can cause the graphical user interface to add or remove bonus regions as well as change the multiplier values for the bonus regions based on the game instructions or player preference. In some implementations, the multiplier value associated with a bonus region can be predetermined based on the odds of a ball intersecting with the corresponding bonus region during the play of the roulette game. This means that the higher the odds of a ball intersecting with a bonus region, the lower the multiplier value will be, and vice versa. In some implementations, the odds of the ball intersecting with a bonus region may be represented by the size of a bonus region (e.g., with larger bonus regions representing a higher chance of intersection by the ball). The data processing system can update the credit balance of the player profile by the corresponding multiplier value of the bonus region(s), based on whether the ball lands on the number, range of values, color, or other identifier that the player selected, resulting in an award amount, as shown in connection with FIG. 2C.

The data processing system updates the game state information to reflect the bonus regions that the ball intersects with. The data processing system can update the game state information to reflect the total number of bonus regions that the ball intersects with. For example, if the ball intersects with two bonus regions (can be same or different bonus regions), the game state information can be updated to reflect the two bonuses.

The data processing system can update the credit balance by adjusting an award amount using the multiplier value(s) once the outcome corresponding to a win condition is satisfied (STEP 408). The award amounts corresponding to win conditions can be predetermined based on the odds of a ball landing on a specific number, range of values, color, or other identifier on the roulette wheel. For example, the odds of winning when betting on multiple pockets are higher than when betting on a single pocket Similarly, the odds of winning when betting on a color are higher than when betting on a single pocket. However, the higher the probability of winning, the lower the payout will be, as may be dictated by the game instructions or the standard roulette game rules.

The adjustment in the credit balance is made based on the computed bonus amount and the individual award amounts calculated for each outcome. In some implementations, the data processing system can increase the credit balance in the player profile of the player by the sum of the bonus amount and the award amount for each successful outcome. However, if the bonus award condition is not satisfied, resulting in a zero bonus amount, the data processing system can increase the credit balance only by the reward amounts for the winning outcomes. In cases where the bonus award is credited to the player before the completion of the game, the data processing system can update the credit balance of the player profile by adding the reward amounts for the winning outcomes to the credit balance. The data processing system can store additional metadata relating to the plays of the game, including but not limited to the award amount(s) won, along with corresponding timestamps indicating the time the award amount(s) were won, in the player profile.

At least one aspect of the present disclosure is directed to a system. The system can include one or more processors coupled to memory. The one or more processors may receive a request for a play of a roulette game. The request may include a wager and a selection corresponding to at least one pocket of a plurality of pockets. Upon receiving the wager, the one or more processors may cause presentation of a graphical user interface including a roulette wheel having a track and a plurality of pockets. The track may include a plurality of bonus regions, where the plurality of bonus regions includes the bonus region. The plurality of bonus regions can be visually distinct from each other. Further, each bonus region of the plurality of bonus regions can be associated with a respective multiplier. The one or more processors may determine that an object is to intersect with a bonus region presented with the track during the play of the roulette game. The one or more processors may adjust, in response to determining that the object is to intersect with the bonus region and that an outcome of the play of the roulette game results in an award amount, a credit balance based on the award amount and a bonus value associated with the bonus region.

In some implementations, the one or more processors may generate a first random number identifying a number of bonus regions to be intersected and a second random number indicating a pocket of the plurality of pockets. In some implementations, the one or more processors may adjust the credit balance based on a paytable comprising the bonus value associated with the bonus region. In some implementations, the one or more processors may update the presentation of the graphical user interface to include a notification in response to determining that the object is to intersect with the bonus region. In some implementations, the one or more processors may cause the presentation of the object traversing a trajectory generated based on the bonus region with which the object is to intersect. In some implementations, the one or more processors may determine that the outcome of the play satisfies a bonus condition. In some implementations, the one or more processors may initiate a bonus game responsive to determining that the outcome of the play satisfies the bonus condition.

At least one aspect of the present disclosure is directed to a method. Upon receiving a request, which may include a wager and a selection corresponding to at least one pocket of a plurality of pockets, the method can include causing presentation of a graphical user interface including a roulette wheel having a track and a plurality of pockets. The track may include a plurality of bonus regions, where the plurality of bonus regions includes the bonus region. The plurality of bonus regions can be visually distinct from each other. Further, each bonus region of the plurality of bonus regions can be associated with a respective multiplier. The method can include determining that an object is to intersect with a bonus region presented with the track during the play of the roulette game. The method can include adjusting, in response to determining that the object is to intersect with the bonus region and that an outcome of the play of the roulette game results in an award amount, a credit balance based on the award amount and a bonus value associated with the bonus region.

The method can include generating a first random number identifying a number of bonus regions to be intersected and a second random number indicating a pocket of the plurality of pockets. The method can include adjusting the credit balance based on a paytable comprising the bonus value associated with the bonus region. The method can include updating the presentation of the graphical user interface to include a notification in response to determining that the object is to intersect with the bonus region. The method can include causing the presentation of the object traversing a trajectory generated based on the bonus region with which the object is to intersect. The method can include determining that the outcome of the play satisfies a bonus condition. The method can include initiating a bonus game responsive to determining that the outcome of the play satisfies the bonus condition.

Referring now to one example implementation of a counter-based slot machine game, the data processing system 205 can receive a wager and generate a graphical user interface with multiple reels that include various symbols. After the completion of each spin, the data processing system 205 can determine the combination of symbols displayed on the reels. If the combination of symbols satisfies a loss condition, the data processing system 205 can increment a counter 530 that tracks the number of losses. If the combination of symbols displayed on the reels satisfies a bonus condition, the data processing system 205 can provide a number of additional plays based on the value of the counter 530. The data processing system 205 can provide additional plays until a tracked number of wins resulting from the additional plays is equal to the value of the counter 530. In some implementations, for each additional play, the counter 530 is decremented, and the additional plays are provided until the counter 530 is equal to zero or another predetermined value. The data processing system 205 can update and display updated information (e.g., the counter, the tracked number of wins, etc.) on the graphical user interface. Example graphical user interfaces showing an example implementation of a counter-based slot machine game are shown in FIGS. 5A-5D.

Figure 5A:
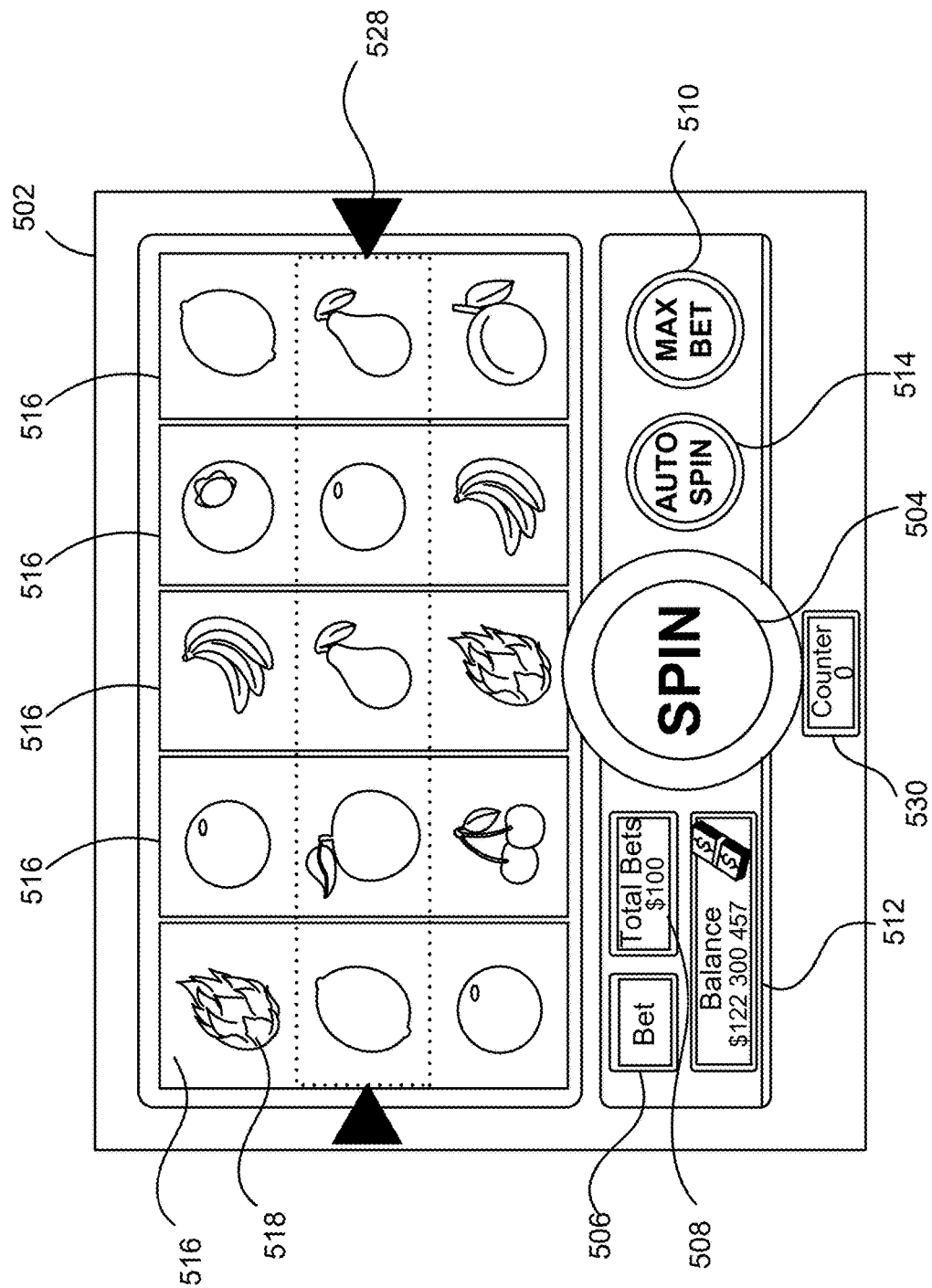
FIGS. 5A, 5B, 5C, and 5D depict further diagrams of example graphical user interfaces that may be displayed in connection with network communication sessions established according to the techniques described herein, in accordance with one or more implementations.

Referring now to FIG. 5A in the context of the components described in connection with FIG. 2, a graphical user interface 502 is presented on a client device 220, for example, in response to a request for a counter-based slot machine game. As discussed above, the device communicator 230 facilitates communication between the client device 220 and the data processing system 205, allowing players to interact with the graphical user interface 502 and transmit their actions to the data processing system 205. As players engage with the graphical user interface 502, their actions, such as placing bets or initiating the game, may be captured and stored in their player profile 270.

As depicted in FIG. 5A, the graphical user interface 502 displays a slot machine with vertical columns (hereinafter referred to as "reels" 516) of symbols 518. The number of reels 516 displayed in the graphical user interface 502 for a play of the slot machine game can be any positive integer. In the provided illustration, five reels 516 are displayed on the graphical user interface 502. The symbols 518 displayed on the reels 516 can correspond to a diverse range, such as fruits, numbers, letters, or any thematic elements suitable for the game's context. However, in the provided illustration, the symbols displayed on the reels are all different fruits.

The graphical user interface 502 displays several interactive elements. For example, a player can interact with the graphical user interface 502 to place a wager. Any type of wagering interface may be utilized to place a wager for the game, including, for example, via the wager receiver 265. In the example graphical user interface 502 shown in FIG. 5A, a player can interact with a bet button 506 to place a wager for the play of the game. The wager information is then transmitted from the client device 220 to the data processing system 205. The data processing system 205 receives and processes the wagers, incorporating them into the game logic. The player profile 270 is also updated with the wager information. Moreover, a total bets indicator 508 displayed on the graphical user interface 502 indicates the total amount of money that has been wagered for the play of the game. The data processing system 205 can update the total bets indicator 508 to reflect an updated bet amount whenever a player interacts with the bet button 506. The graphical user interface 502 also displays a maximum bet button 510 that enables a player to instantly set the bet amount to the maximum allowable amount, as determined by the rules of the game or the player's preferences. In response to interaction with the maximum bet button 510, the data processing system 205 can update the total bets indicator 508 to reflect the maximum bet amount. Furthermore, a balance region 512 on the graphical user interface 502 displays an amount of credits available for the player to wager on the game, which may be retrieved from the player profile 270 of the player.

Once a wager has been placed, players can initiate the game by interacting with a spin button 504. In response to interaction with the spin button 504, the data processing system 205 can cause the graphical user interface 502 to be updated to reflect a set of randomly selected symbols 518 on the reels 516. In some implementations, the data processing system 205 can generate the set of symbols 518 to display on the reels 516 in a grid. In some implementations, the data processing system 205 can assign a number to each reel 216 and determine which symbol appears on the reel 516. For example, the data processing system 205 can assign the number 1 to the first reel 516, the number 2 to the second reel 516, and so on. The data processing system 205 can then randomly select a symbol, or in some implementations a set of symbols (shown here as three vertically positioned symbols on each reel 516) for each reel 516. In some implementations, the data processing system 205 can randomly select symbols to display on the reels using one or more random numbers and a lookup table. The lookup table would contain a list of all the possible symbols, and each symbol would be associated with a number. The data processing system 205 can then randomly select a number from the lookup table, and the symbol associated with that number can appear on the reel 516. In some implementations, the graphical user interface 502 may enable a player to select an autospin mode by interacting with an autospin button 514, as described in connection with FIG. 5B.

Figure 5B:
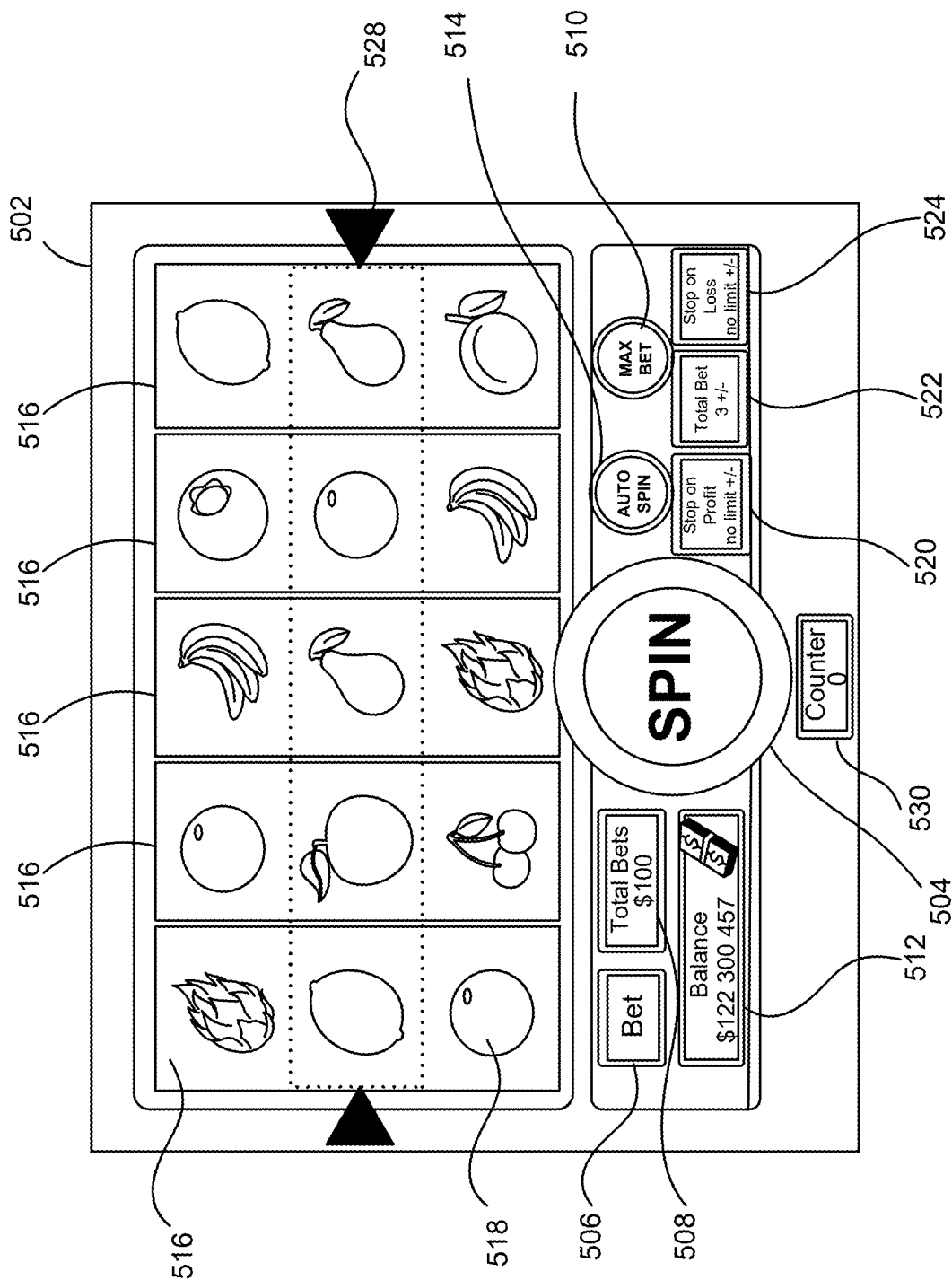

Referring now to FIG. 5B in the context of the components described in connection with FIG. 2, a graphical user interface 502 is presented on a client device 220 for an autospin mode. In this mode, the data processing system 205 can enable players to set certain parameters for the autospin mode. For example, players can specify a profit limit using the profit limit button 520, which, when specified, causes the data processing system 205 to execute the autospin mode until a certain profit threshold is reached. In some implementations, players can define the total number of bets to place for the autospin mode using the total bet button 522. In some implementations, the total bets may start at a specified amount and increment by a fixed value (e.g., 3) each time the total bet button 522 is interacted with. In some implementations, players can set a loss limit using the loss limit button 524. A loss limit, when implemented, causes the data processing system 205 to stop the autospin mode if the accumulated losses exceed the loss limit.

In an implementation where the player selects the autospin mode, the data processing system 205 can then generate random symbols 518 on the reels 516 and determine outcomes for one or more spins of the reels 516 based on the parameters set by the player. The graphical user interface 502 is dynamically updated to display the results of each autoplayed spin(s) while causing the data processing system 205 to adjust the credit balance of the player profile 270 in accordance with the outcome of each spin. The data processing system 205 determines, at the conclusion of each spin, the total number of credits lost and/or the total profit of all spins executed via the autospin mode and compares those value(s) to corresponding selections made via the profit limit button 520 and/or the loss limit button 524. If either of the thresholds are satisfied, the data processing system 205 can terminate the autospin mode. The data processing system 205 can increment a counter 530 for each spin in the autospin mode to track the total number of bets made, which may be compared to the value specified via the total bet button 522. If the threshold is satisfied, the data processing system 205 can terminate the autospin mode.

Figure 5C:
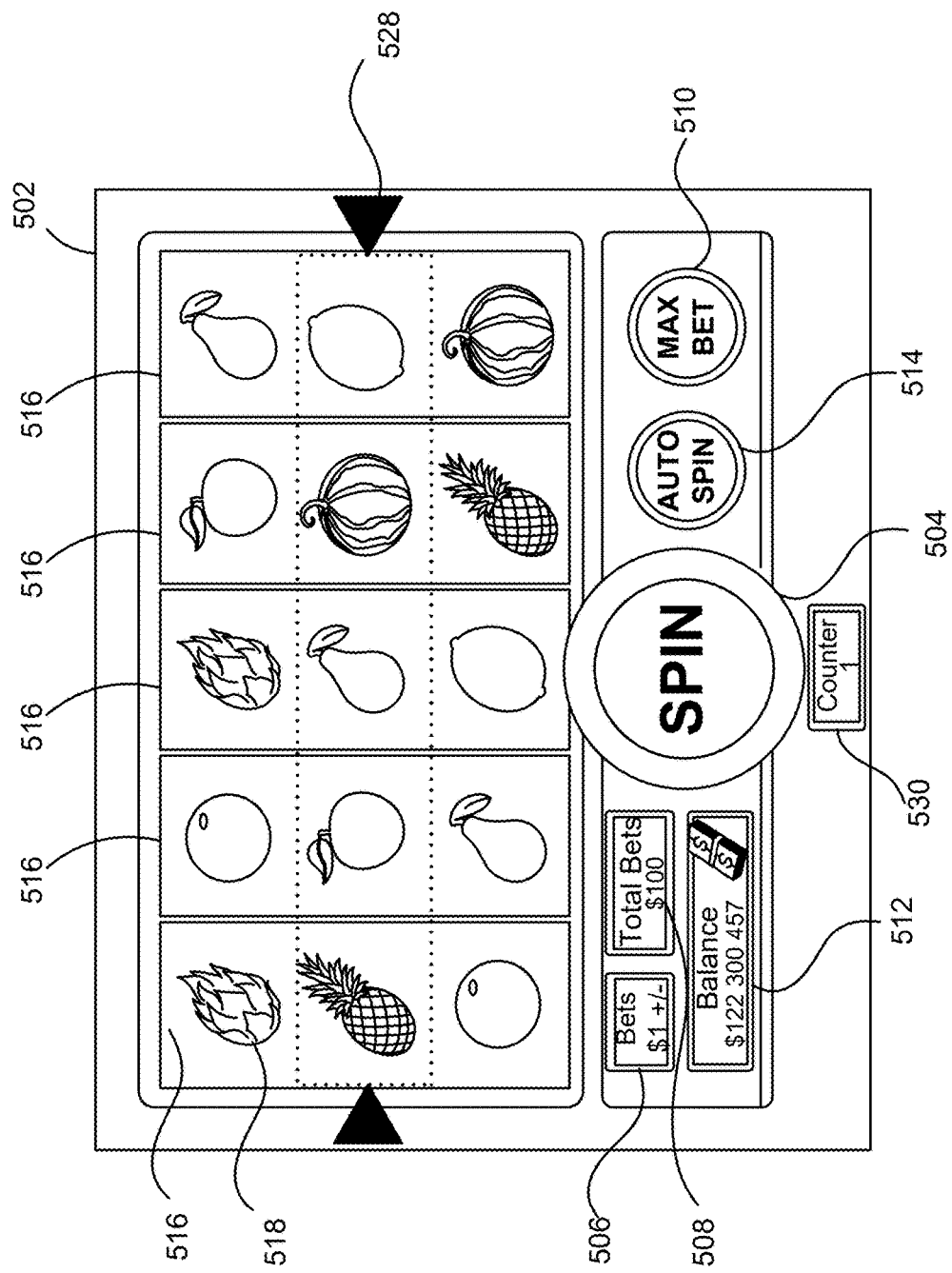

Referring now to FIG. 5C in the context of the components described in connection with FIG. 2, a graphical user interface 502 is presented on a client device 220 depicting a loss condition. The gameplay may include several game conditions, including, but not limited to, a loss condition, a win condition, and a bonus condition. The game conditions may be defined by the game instructions 280, which can vary from game to game. The data processing system 205 can determine which game condition(s) are satisfied based on the combination of symbols 518 appearing on the reels 516 or the paylines 528. A combination of symbols 518 can be a group of symbols appearing on the reels 516 in a specific order (e.g., intersecting with one or more paylines 528, etc.). Paylines 528 indicate positions on the reels 516 that form groups of symbols. Groups of symbols formed via any number of paylines 528 may be evaluated to determine one or more outcomes of the game, or whether any game conditions are satisfied. The data processing system 205 can determine whether a respective game condition is satisfied based on the symbols 518 that appear on a given payline 528. Various types and combinations of paylines 528 may be implemented, including straight paylines, diagonal paylines, and scatter paylines, each connecting symbols 518 in different patterns. In some implementations, some of the game conditions, such as a loss condition and a bonus condition, may be satisfied based on the absence or presence of bonus symbols 518, respectively.

A loss condition may be satisfied when a group of symbols 518 formed via one or more paylines 528 does not match any of the winning combinations that are defined by the game instructions 280. For example, when a player spins the reels 516, if the symbols 518 displayed do not match any of the predefined winning combinations, the loss condition is satisfied. In some implementations, the loss condition can be satisfied based on the absence of any bonus symbols 518 on the paylines 528. Bonus symbols 518 are specific symbols or combinations of symbols 518 defined by the game instructions 280 that, when appearing on one or more paylines 528, cause a bonus condition to be satisfied. In the example shown in FIG. 5B, there are no bonus symbols 518 present on the graphical user interface 502. If a loss condition is satisfied, the data processing system 205 can update the graphical user interface 502 to provide feedback to the player, indicating that a loss condition has been satisfied. The feedback can include various sensory elements, such as visual, auditory, or tactile (e.g., haptic) feedback. The data processing system 205 can update the player profile 270 in response to the satisfaction of the loss condition.

To determine whether the loss condition is satisfied, the data processing system 205 can compare the symbols 518 displayed on the graphical user interface 502 to the predefined winning combinations and bonus symbols 518. If the displayed symbols 518 match any of the winning combinations, the data processing system 205 can identify the win condition as satisfied. In some implementations, if the symbols 518 do not match any winning combination but include a bonus symbol 518, the data processing system 205 can identify the bonus condition as satisfied. In some implementations, if the displayed symbols 518 do not match any winning combination and do not include a bonus symbol 518, then the data processing system 205 determines that a loss condition for the play of the game is satisfied.

The data processing system 205 can increment a counter 530 whenever the loss condition is satisfied. The data processing system 205 can maintain a counter 530 that tracks a number of times the player has lost the slot machine game in a given gaming session, or in some implementations, across multiple sessions. The counter 530 may be displayed on the graphical user interface 502. The counter 530 can be presented as a numeric value or as a graphical representation of the number of losses. For example, the counter 530 can be presented as a number in a text box or as a series of red X's that appear on the graphical user interface 502. The graphical user interface 502 is updated to indicate the updated value of the counter 530 after each play of the game. In some implementations, the counter 530 may be initialized to 0 at the start of a game session. In some implementations, the counter value may be stored as part of the player profile 570 between game sessions, and reinitialized to the stored value when a new game session is initiated with the data processing system 205, thereby enabling the counter 530 to be stored in the player profile 570 and utilized across different client devices 220 at different periods of time.

If the data processing system 205 determines that a play of the game (e.g., a spin of the slot machine) satisfies a loss condition, the data processing system 205 can increment the counter 530 by 2. The counter 530 can be used to track the player's number of losses in the gaming session. For example, if the player has lost 20 times, the counter 530 will be 20. In some implementations, the data processing system 205 can use the counter 530 to determine the number of additional plays when a player is eligible for a bonus (as described in connection with FIG. 5D). In some implementations, if the counter 530 reaches a certain value, the player may be awarded a free spin or additional credits, as determined by the game instructions 280. For example, the counter 530 can be incremented by 2 for each loss, and the player can be awarded an additional play when the counter 530 reaches a value of 5. In some implementations, the counter value may be incremented after a predetermined number of losses (e.g., every two losses).

Figure 5D:
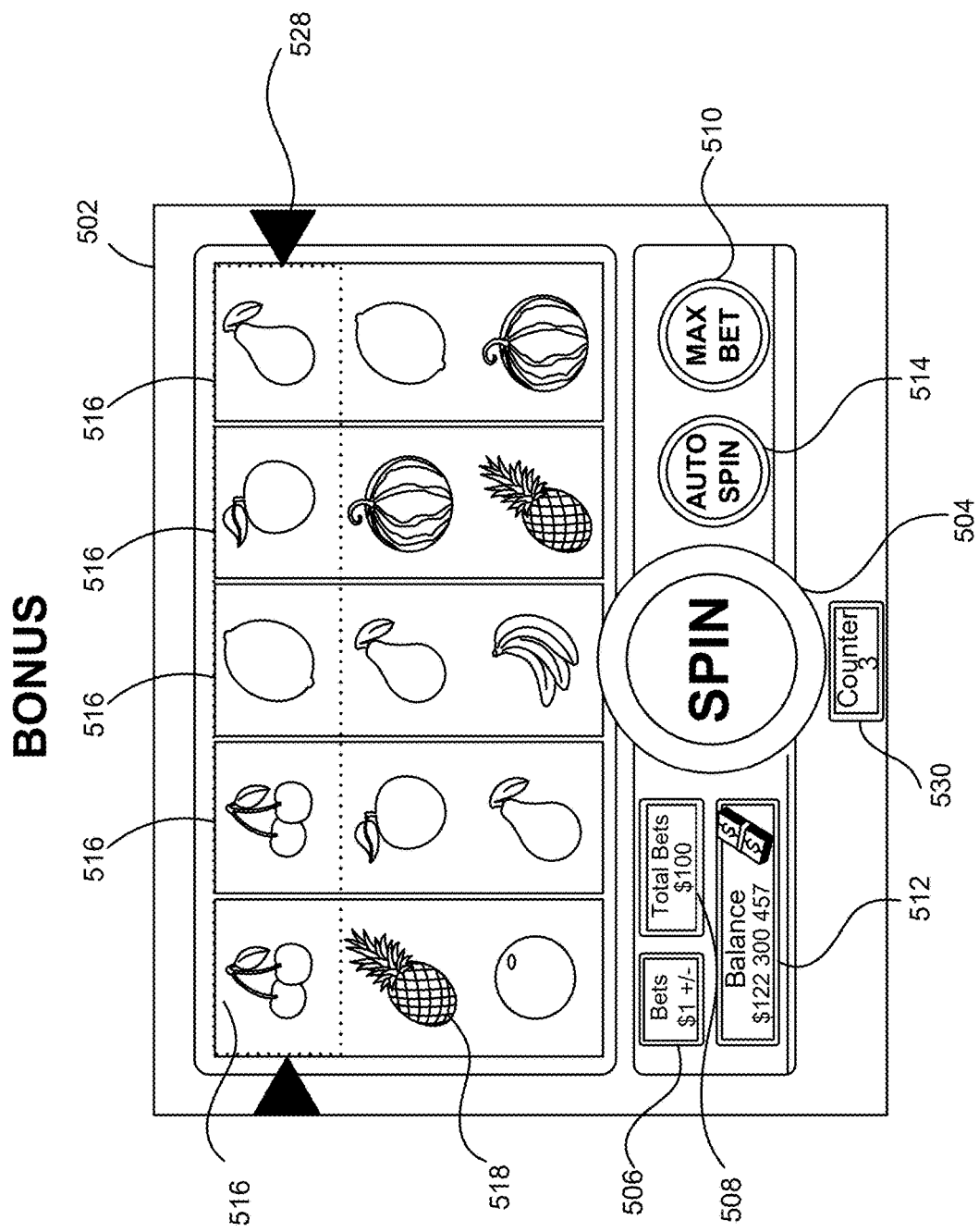

Referring now to FIG. 5D in the context of the components described in connection with FIG. 2, a graphical user interface 502 is presented on a client device 220 depicting a bonus condition. The data processing system 205 can determine whether a bonus condition has been satisfied by comparing the symbols 518 that appear on the payline 528 to the combination configuration for the bonus condition. The combination configuration for the bonus condition can be defined by the game instructions 280. For example, if the combination configuration for the bonus condition is three cherries in a row, the data processing system 205 can determine via the graphical user interface 502 if three cherries appear in a row on the payline 528. If they do, the bonus condition is satisfied. In some implementations, the data processing system 205 can determine whether a bonus condition has been satisfied by counting the number of bonus symbols 518 that appear on the payline 528. For example, if two or more bonus symbols 518 are displayed on the graphical user interface 502, the bonus condition may be considered satisfied. In some implementations, the bonus condition may be satisfied if one or more bonus symbols 518 appear anywhere on the reels 516, regardless of whether they fall on a payline 528. In some implementations, a single bonus symbol appearing on the payline 528 or appearing anywhere on the reels 516 is sufficient to satisfy the bonus condition.

In some implementations, a combination of symbols 518 that satisfy the bonus condition may include both a winning combination of symbols 518 and a separate combination of bonus symbols 518. For example, the winning combination may be three apples in a row, and the bonus combination may be two cherries in a row, or two bananas in a row, or any other combination of bonus symbols 518. In this case, the combination configuration for the bonus condition would be three apples in a row and the bonus combination. Moreover, the combination configuration for the bonus condition may include the winning combination of symbols 518 and the presence of one or more bonus symbols 518. For example, the winning combination may still be three apples in a row, and the bonus symbols 518 may be cherries, bananas, oranges, or any other bonus symbols. In some implementations, if the symbols 518 do not match any predefined winning combinations, but only include a bonus symbol 518, the data processing system 205 may also determine that the bonus condition has been satisfied. In some implementations, the bonus symbol 518 may also be a symbol that satisfies a win condition for the game, such as a jackpot symbol.

In some implementations, the data processing system 205 may determine award amounts associated with win conditions, which may include bonus award amounts associated with specific bonus conditions. For example, an award amount resulting from a combination of winning symbols 518 and bonus symbols 518 may be different than an award amount resulting from a combination of winning symbols 518 and the presence of one or more bonus symbols 518. The specific award amount for each symbol 518 or combination symbols 518 is determined based on the game instructions 280, which may specify a paytable storing association between combinations of symbols 518 and award amounts.

In some implementations, the data processing system 205 can identify a multiplier value associated with one or more symbols 518 (or combinations of symbols 518) appearing on one or more of the reels 516. The multiplier value may be associated with a jackpot symbol, for example, and may be applied when both a jackpot symbol and a bonus symbol 518 appear on the reels 516. For example, the data processing system 205 first determines that a jackpot symbol is present on the reels 516, and then the data processing system 205 identifies the multiplier value for the jackpot symbol from the game instructions 280 (e.g., a paytable). For example, the game instructions 280 may provide a paytable that specifies the jackpot symbol is to award ten times the player's bet if the jackpot symbol appears on the payline 528 by itself, twenty times the player's bet if the jackpot symbol appears on the payline 528 with one other bonus symbol 518, thirty times the player's bet if the jackpot symbol appears on the payline 528 with two other bonus symbols 518, and so on. In some implementations, the multiplier value can be applied to the outcome of any additional gameplay generated in response to the bonus condition being satisfied.

In the provided illustration, as shown in FIG. 5D, a combination of two bonus symbols 518 (e.g., two cherries in a row) is displayed on the graphical user interface 502. In response to the bonus condition being satisfied, the graphical user interface 502 is updated to initiate additional, free plays of the slot machine game. A number of the additional plays is determined based on the counter value prior to the bonus condition being satisfied. Each additional play may be, for example, a spin of the slot machine game that does not deduct credits from the player's credit balance. The data processing system 205 can provide additional gameplays (e.g., additional spins), decrementing the counter value for each play, until the value of the counter 530 reaches zero.

The counter 530 may be equal to the number of losses that the player has incurred. For example, if a player has incurred ten losses, the data processing system 205 can generate ten additional gameplays. In some implementations, each of the additional plays can result in a win condition being satisfied (e.g., a guarantee that a winning combination of symbols 518 will appear on the reels 516). The counter 530 may be decremented by a predetermined value (e.g., one, two, etc.) for each additional play that is initiated. Once the counter 530 reaches zero, the graphical user interface 502 is updated to terminate the game. In some implementations, the data processing system 205 can count the number of wins and provide additional gameplays until the number of wins equals the value of the counter 530, after which the counter value can be reset to zero.

As the data processing system 205 determines the outcome of a play (including any additional plays), the data processing system 205 updates a credit balance of the player profile 270 to reflect the award amounts corresponding to the outcomes. The balance region 512 can be dynamically updated to include the updated credit balance based on any award amount or bonus amount provided based on an outcome of a play of the slot machine game. The player profile 270 of the player may also be updated to include metadata corresponding to the plays of the game, including any indication of games won, the date and time of any reward or bonus, the game in which the reward or bonus was provided, and any conditions that were met during the play of the game. As described herein, the award amounts of the counter-based slot machine game can be determined as a function of the odds of winning a particular selected outcome and may be provided as part of the game instructions 280.

Figure 6:
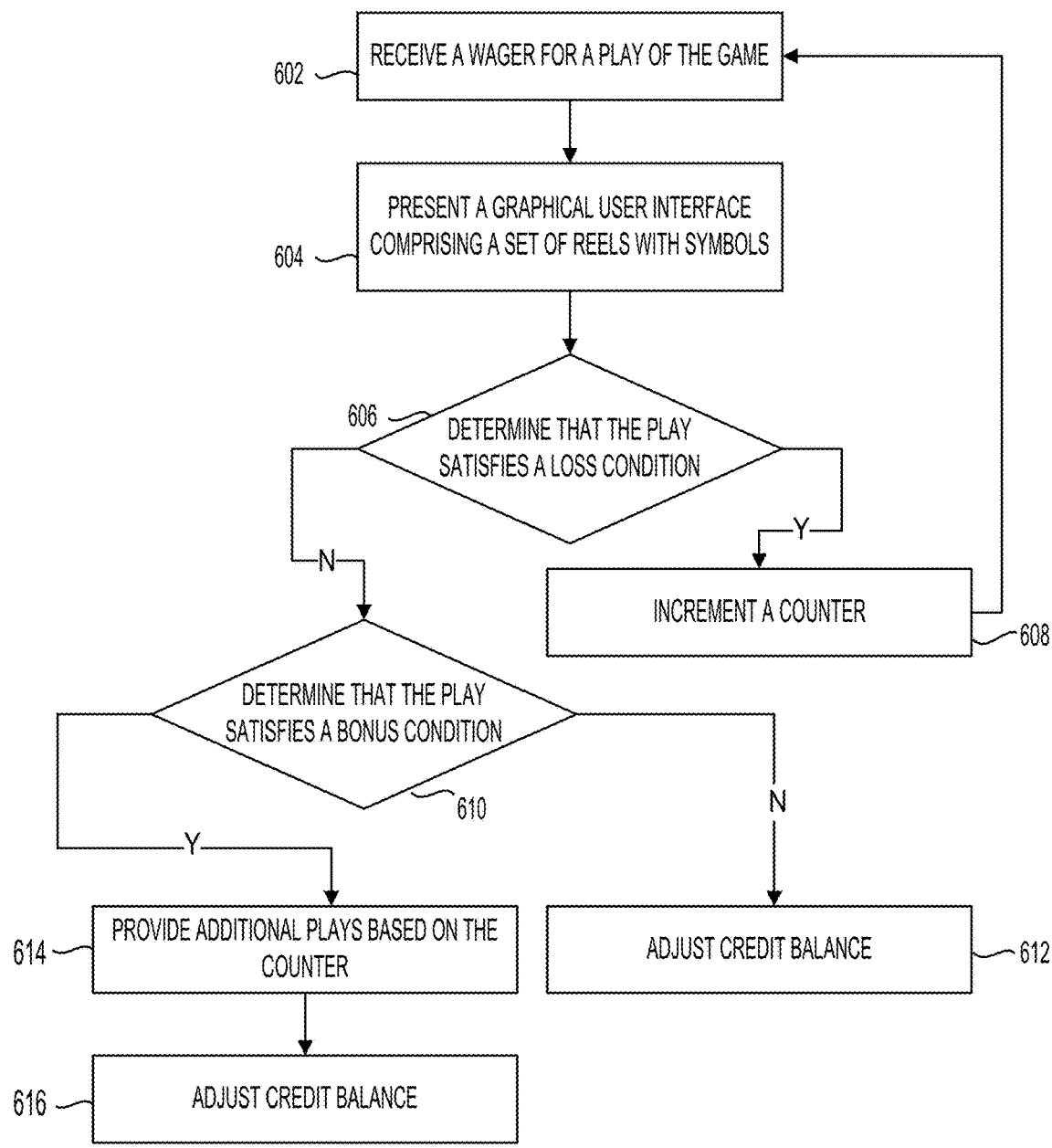
FIG. 6 depicts an example flow diagram of an example network application that may be accessed via network communication sessions established according to the techniques described herein, in accordance with one or more implementations.

Referring now to FIG. 6 in the context of the components described in connection with FIGS. 2 and 6A-6D, depicted is an illustrative flow diagram of a method 600 for providing a counter-based slot machine game. The method 600 can be executed, performed, or otherwise carried out by a data processing system. A data processing system (e.g., the data processing system 205) can be remote to one to one or more client devices and communicate with the one or more client devices via a computer network. In some implementations, the operations of method 600 can be performed by a standalone gaming device (e.g., without communicating with a gaming server to perform the method steps). In a brief overview of method 600, the gaming server can receive a wager for a play of the game (STEP 602), present a graphical user interface comprising a set of reels with symbols (STEP 604), determine whether the play satisfies a loss condition (STEP 606), increment a counter if the loss condition is satisfied (STEP 608), determine whether the play satisfies a bonus condition (STEP 610), adjust the credit balance if the bonus condition is satisfied (STEP 612), provide additional plays based on the counter (STEP 614), and adjust the credit balance in accordance with the outcome (STEP 616).

In further detail of method 600, the data processing system can receive a wager for a play of the game (STEP 602). The wager can be received in one or more messages received from a client device. The message, or request, can indicate that a player intends to play a game provided by the data processing system. The message can include an indication of a player profile with which to access functionalities related to the game (e.g., placing wagers using earned credits, purchasing additional credits, etc.). The wager can be provided via a graphical user interface (e.g., the graphical user interface 202 of FIG. 2A). The wager amounts provided can be a specified amount of credits, such as 1, 5, 25, 200, 500, or 1000 credits. In some implementations, the player can specify a custom number or fractional number of credits used in the game. Once the wager has been selected, the client device can transmit a request to place the wagers for the play of the game.

Upon receiving the wager, the data processing system can generate a graphical user interface having a set of reels with symbols (STEP 604). The graphical user interface can display a slot machine with vertical columns (hereinafter referred to as "reels") of symbols. The number of reels 216 displayed in a graphical user interface for a play of the slot machine game can be any positive integer. The symbols displayed on the reels can correspond to a diverse range, such as fruits, numbers, letters, or any thematic elements suitable for the game's context. In some implementations, the data processing system can assign a number to each reel and determine which symbol appears on that reel. For example, the data processing system can assign the number 1 to the first reel, the number 2 to the second reel, and so on. The data processing system can then randomly select a symbol, or in some implementations a set of symbols for each reel. In some implementations, the data processing system 205 can randomly select symbols to display on the reels using one or more random numbers and a lookup table. The lookup table would contain a list of all the possible symbols, and each symbol would be associated with a number. The data processing system can then randomly select a number from the lookup table, and the symbol associated with that number can appear on the reel In some implementations, the graphical user interface may enable a player to select an autospin mode.

The gameplay can include a variety of game conditions, including, but not limited to, a loss condition, a win condition, and a bonus condition. The game conditions may be defined by the game instructions, which can vary from game to game. The data processing system can determine whether the gameplay satisfies a loss condition (STEP 606). The data processing system can determine the loss condition based on the combination of symbols appearing on the reels. A loss condition may be satisfied when a group of symbols formed via one or more paylines does not match any of the winning combinations that are defined by the game instructions. For example, when a player spins the reels, if the symbols displayed do not match any of the predefined winning combinations, the loss condition is satisfied. In some implementations, the loss condition can be satisfied based on the absence of any bonus symbols on the payline. Bonus symbols are specific symbols or combinations of symbols defined by the game instructions that, when appearing on one or more paylines, cause a bonus condition to be satisfied. The data processing system can update the player profile in response to the satisfaction of the loss condition.

The data processing system can increment a counter whenever the loss condition is satisfied (STEP 608). The data processing system can maintain a counter that tracks the number of times the player has lost the slot machine game in a given gaming session, or in some implementations, across multiple sessions. In some implementations, the counter can be displayed on the graphical user interface. The counter can be presented as a numeric value or as a graphical representation of the number of losses. In some implementations, the counter may be initialized to 0 at the start of a game session. In some implementations, the counter value may be stored as part of the player profile between game sessions, and reinitialized to the stored value when a new game session is initiated with the data processing system, thereby enabling the counter to be stored in the player profile and utilized across different client devices at different periods of time. If the data processing system determines that a play of the game (e.g., a spin of the slot machine) satisfies a loss condition, the data processing system can increment the counter by 2. The counter can be used to track the player's number of losses in the gaming. In some implementations, the data processing system can use the counter to determine the number of additional plays when a player is eligible for a bonus (as described in connection with FIG. 2D). In some implementations, if the counter reaches a certain value, the player may be awarded a free spin or additional credits, as determined by the game instructions. In some implementations, the counter value may be incremented after a predetermined number of losses (e.g., every two losses).

The win condition may be satisfied when a winning combination of symbols appears on the reels. The bonus condition may be satisfied either by the combination or presence of bonus symbols, as detailed herein. The specific game condition is determined based on the symbols that appear on the reels (or one or more paylines) when the spin button is interacted with.

The data processing system can determine whether the gameplay satisfies a bonus condition (STEP 610). The data processing system can determine whether a bonus condition has been satisfied by comparing the symbols that appear on the payline to the combination configuration for the bonus condition. The combination configuration for the bonus condition can be defined by the game instructions. For example, if the combination configuration for a bonus condition is three cherries in a row, the data processing system can determine via the graphical user interface if three cherries appear in a row on the payline. If they do, the bonus condition is satisfied. In some implementations, the data processing system can determine whether a bonus condition has been satisfied by counting the number of bonus symbols that appear on the payline. For example, if two or more bonus symbols are displayed on the graphical user interface, the bonus condition may be considered satisfied. In some implementations, the bonus condition may be satisfied if one or more bonus symbols appear anywhere on the reels, regardless of whether they fall on a payline.

In some implementations, a combination of symbols that satisfy the bonus condition may include both a winning combination of symbols and a separate combination of bonus symbols. In some implementations, the combination configuration for the bonus condition may include the winning combination of symbols and the presence of one or more bonus symbols. Furthermore, in some implementations, if the symbols do not match any predefined winning combinations, but only include a bonus symbol, such as a jackpot symbol, the data processing system can also determine that the bonus condition has been satisfied. In some implementations, the bonus symbol may also be a symbol that satisfies a win condition for the game, such as a jackpot symbol.

Once the bonus condition is satisfied, the data processing system can update the credit balance of the player profile to reflect the bonus amount (STEP 612). The data processing system can then initiate additional gameplays based on the counter value prior to the bonus condition being satisfied (STEP 614). Each additional play may be, for example, a spin of the slot machine game that does not deduct credits from the player's credit balance. The data processing system can provide additional gameplays (e.g., additional spins), decrementing the counter value for each play, until the value of the counter reaches zero.

The counter may be equal to the number of losses that the player has incurred. For example, if a player has incurred ten losses, the data processing system can generate ten additional gameplays. In some implementations, each of the additional plays can result in a win condition being satisfied (e.g., a guarantee that a winning combination of symbols will appear on the reels). The counter may be decremented by a predetermined value (e.g., one, two, etc.) for each additional play that is initiated. Once the counter reaches zero, the graphical user interface is updated to terminate the game. In some implementations, the data processing system can count the number of wins and provide additional gameplays until the number of wins equals the value of the counter value, after which the counter value can be reset to zero.

In some implementations, the data processing system 205 may determine award amounts associated with win conditions, which may include bonus award amounts associated with specific bonus conditions. For example, an award amount resulting from a combination of winning symbols and bonus symbols may be different than an award amount resulting from a combination of winning symbols and the presence of one or more bonus symbols. The specific award amount for each symbol or combination symbols is determined based on the game instructions 280, which may specify a payable storing association between combinations of symbols and award amounts. In some implementations, the data processing system can identify a multiplier value associated with one or more symbols (or combinations of symbols) appearing on one or more of the reels. The multiplier value may be associated with a jackpot symbol, for example, and may be applied when both a jackpot symbol and a bonus symbol appear on the reels. In some implementations, the multiplier value can be applied to the outcome of any additional gameplay generated in response to the bonus condition being satisfied.

As the data processing system determines the outcome of a play (including any additional plays), the data processing system can update a credit balance of the player profile to reflect the award amounts corresponding to the outcomes (STEP 316). The adjustment in the credit balance is made based on the computed bonus amount and the individual award amounts calculated for each outcome. In some implementations, the data processing system can increase the credit balance in the player profile of the player by the sum of the bonus amount and the award amount for each successful outcome. However, if the bonus award condition is not satisfied, resulting in a zero bonus amount, the data processing system can increase the credit balance only by the reward amounts for the winning outcomes. In cases where the bonus award is credited to the player before the completion of the game, the data processing system can update the credit balance of the player profile by adding the reward amounts for the winning outcomes to the credit balance. The data processing system can store additional metadata relating to the plays of the game, including but not limited to the award amount(s) won, along with corresponding timestamps indicating the time the award amount(s) were won, in the player profile.

At least one aspect of the present disclosure is directed to a system. The system can include one or more processors coupled to memory. The one or more processors may receive a wager corresponding to a first play of a slot machine game. The one or more processors may cause presentation of a first graphical user interface having a set of reels showing a first set of symbols for the first play of the slot machine game. The one or more processors may increment a counter corresponding to a number of losses of the slot machine game in response to determining, based on the first set of symbols, that the first play of the slot machine game satisfies a loss condition. The one or more processors may provide a number of additional plays of the slot machine game determined based on the counter in response to determining that a second play of the slot machine game satisfies a bonus condition.

In some implementations, the number of additional plays is equal to the counter. In some implementations, the additional plays of the slot machine game are provided until a count of wins following the second play is equal to the counter. In some implementations, each of the number of additional plays results in a win condition. In some implementations, the one or more processors may determine that the second play of the slot machine game satisfies the bonus condition based on a second set of symbols generated for the second play comprising at least one bonus symbol. In some implementations, the one or more processors may determine that the second play of the slot machine game satisfies the bonus condition based on the second set of symbols including a combination of two or more bonus symbols. In some implementations, the one or more processors may increment the counter responsive to the counter being less than a predetermined threshold. In some implementations, the one or more processors may multiply an award amount corresponding to at least one outcome of the number of additional plays by a multiplier value. In some implementations, the one or more processors may adjust a credit balance by a bonus amount determined based on the number of additional plays responsive to an interaction with an interactive element of the first graphical user interface. In some implementations, the one or more processors may cause presentation of the counter in the first graphical user interface.

At least one aspect of the present disclosure is directed to a method. The method can include receiving a wager corresponding to a first play of a slot machine game. Upon receiving the wager, the method can include causing the presentation of a first graphical user interface having a set of reels showing a first set of symbols for the first play of the slot machine game. The method can further include incrementing a counter corresponding to a number of losses of the slot machine game in response to determining, based on the first set of symbols, that the first play of the slot machine game satisfies a loss condition. The method can include providing a number of additional plays of the slot machine game determined based on the counter in response to determining that a second play of the slot machine game satisfies a bonus condition. Further, the number of additional plays is equal to the counter, where each of the number of additional plays results in a win condition. Moreover, the additional plays of the slot machine game are provided until a count of wins following the second play is equal to the counter.

The method can include determining that the second play of the slot machine game satisfies the bonus condition based on a second set of symbols generated for the second play comprising at least one bonus symbol. The method can include determining that the second play of the slot machine game satisfies the bonus condition based on the second set of symbols including a combination of two or more bonus symbols. The method can include incrementing the counter responsive to the counter being less than a predetermined threshold. The method can include multiplying an award amount corresponding to at least one outcome of the number of additional plays by a multiplier value. The method can include adjusting a credit balance by a bonus amount determined based on the number of additional plays responsive to an interaction with an interactive element of the first graphical user interface. The method can include causing presentation of the counter in the first graphical user interface.

Referring now to example implementation of a card game with indicators, the data processing system 205 can receive a wager and generate a graphical user interface including one or more graphical elements representing a set of cards for a player hand of the play of the card game. Each card of the set of cards may include a respective face value indicator that indicates a face value and a suit of the card and a respective second indicator that indicates a bonus value of the card. The respective second indicator can be a bonus indicator or a non-bonus indicator. The respective second indicator can also be different from the respective face value indicator. The data processing system 205 can determine that a termination condition for the play of the card game is satisfied in response to determining that a player hand includes a bonus indicator card and non-bonus indicator card. The data processing system 205 can generate a notification for display indicating that the play of the card game has been terminated. The data processing system 205 can update and display updated information on the graphical user interface, such as the player's credit balance, the award amount, and the bonus values (or multiplier values) associated with the bonus indicator cards. Example graphical user interfaces showing an example implementation of a card game with indicators are shown in FIGS. 7A-7E.

Figure 7A:
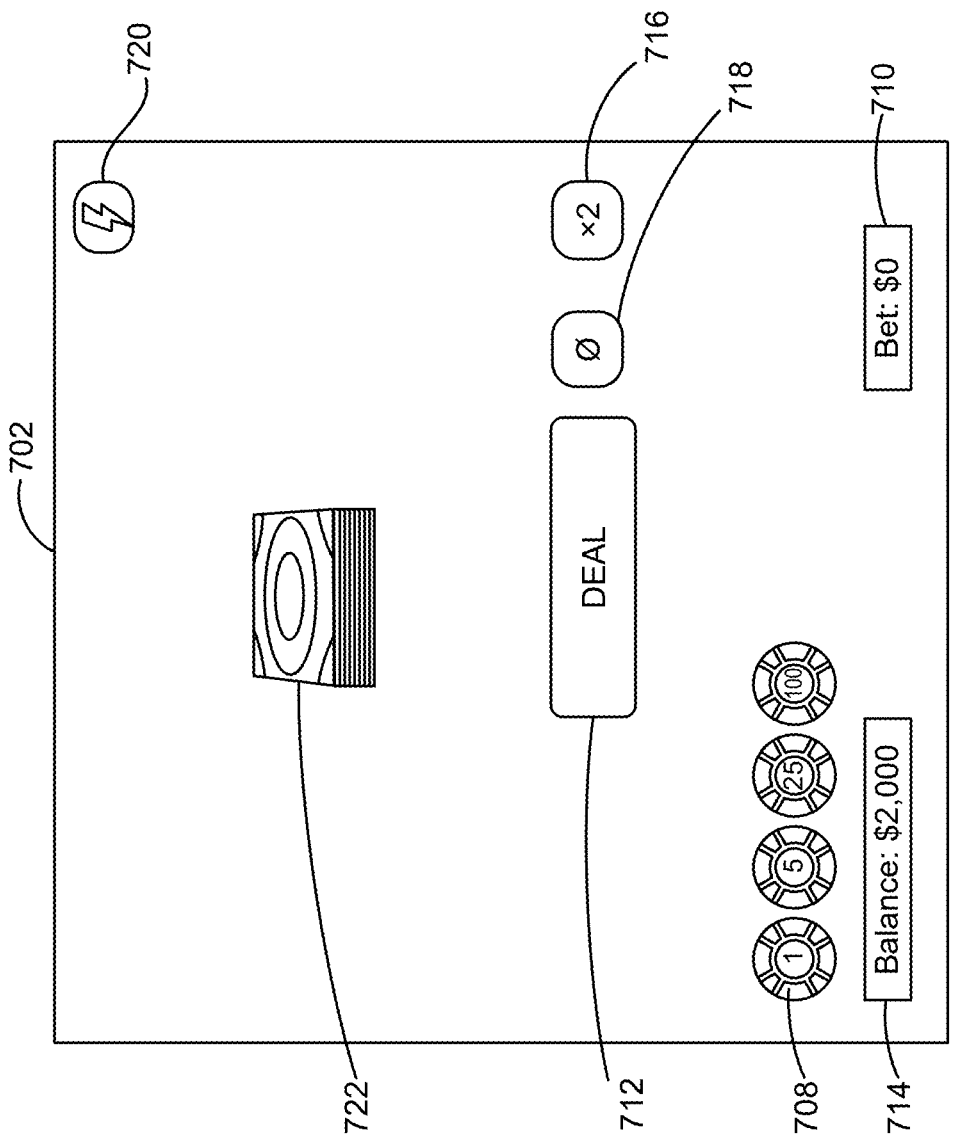
FIGS. 7A, 7B, 7C, 7D, and 7E depict further diagrams of example graphical user interfaces that may be displayed in connection with network communication sessions established according to the techniques described herein, in accordance with one or more implementations.

Referring now to FIG. 7A in the context of the components described in connection with FIGS. 2A and 2B, a graphical user interface 702 is presented on a client device 220 for initiating a play of a card game, such as a Baccarat card game with indicators. As discussed above, the device communicator 230 facilitates communication between the client device 220 and the data processing system 205, allowing players to interact with a graphical user interface 702 and transmit their actions to the data processing system 205. As players engage with the graphical user interface 702, their actions, such as placing bets or initiating the game, may be captured and stored in their player profile 270.

As depicted in FIG. 7A, the graphical user interface 702 presents several interactive wager elements 708, which enable a player to specify a wager for a play of the card game. In the example graphical user interface 702, the wager is shown as separate chips with denominations of 2, 5, 75, and 200. However, any type of wagering interface may be used to place a wager for the game, including, for example, via the wager receiver 265. In response to an interaction with one or more wager elements 708, the data processing system 205 updates a bet indicator 710 to reflect the bet amount. A player can interact with a deal button 712 to place a wager for the play of the game. The wager information is then transmitted from the client device 220 to the data processing system 205. The data processing system 205 receives and processes the wagers, incorporating them into the game logic. The player profile 270 is also updated with the wager information.

A balance region 714 on the graphical user interface 702 displays an amount of credits available for the player to wager on the game, which may be retrieved from the player profile 270 of the player. A multiplier button 716 is also present that, when interacted with, can cause the bet amount to be updated to double the value of the player's wager. The graphical user interface 702 can display a clear button 718 that, when interacted with, may cause the wager to be reset (e.g., removed or erased). In some implementations, the graphical user interface 702 can be updated via the clear button 718 to reset the wager amount to a default value. In some implementations, the graphical user interface 702 may display a lightning bolt button 720 that can cause the data processing system 205 to alter the animation speeds in response to an interaction with the lightning bolt button 720. The lightning bolt button 720 can be toggled on or off by the player during the gameplay. The animation speeds may be modified to increase or decrease the amount of time taken to update the game state. In an implementation where the card game is a Baccarat game, the player may interact with one or more interactive elements to specify that the wager is placed on the dealer, the player, or on a tie.

Figure 7B:
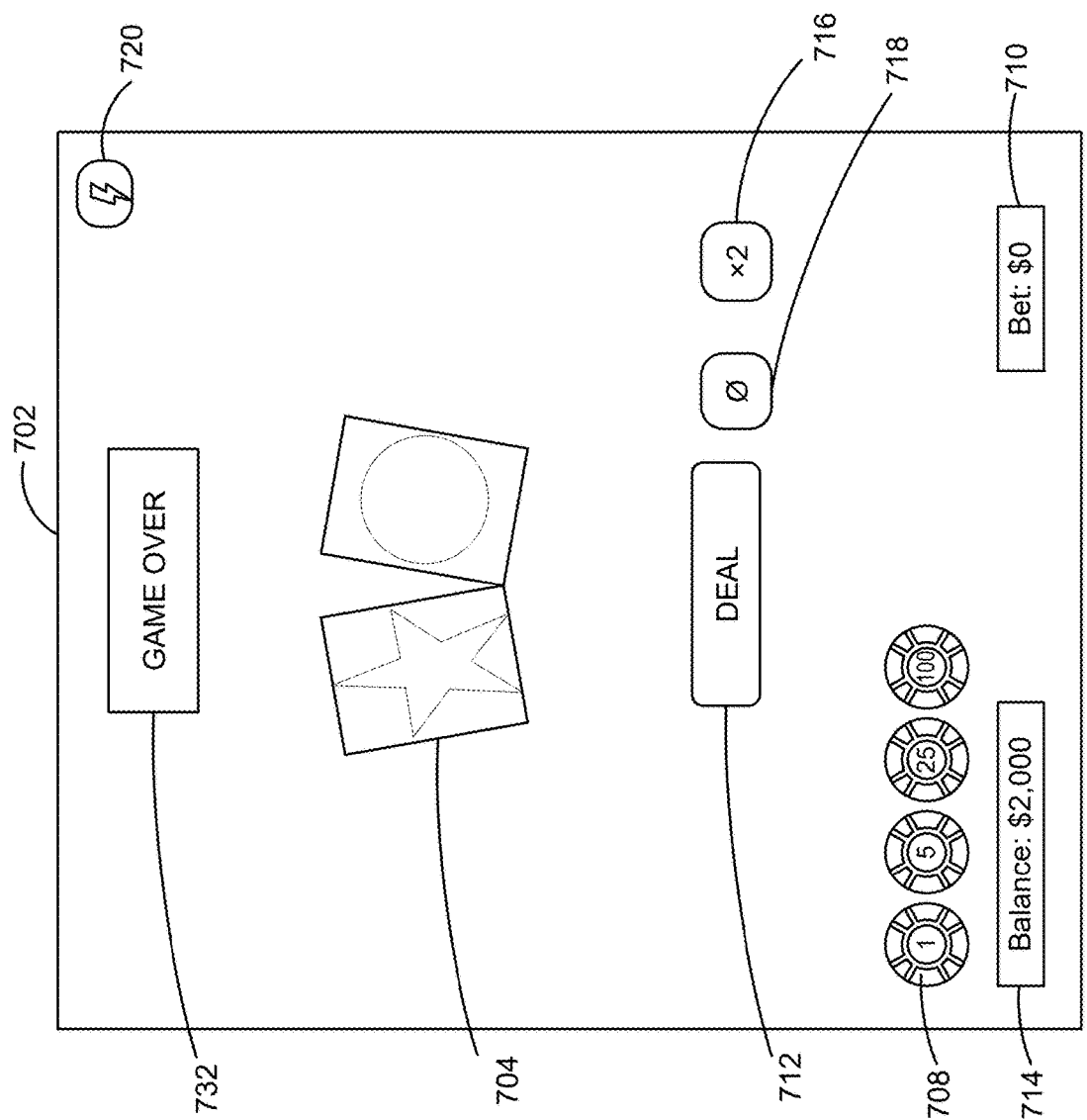

Once a wager has been placed, players can initiate a play of the game by interacting with the deal button 712. This interaction can cause the data processing system 205 to randomly present selected cards for a player hand. In some implementations, the selection may be graphically represented as cards being "dealt" from a virtual deck of cards (shown here as the deck of cards 722), as shown in FIG. 7B. The cards may be randomly selected according to the odds information in the game instructions 280. In some implementations, each card that may be selected for the player hand may include bonus or non-bonus indicator. The bonus or non-bonus indicator may be predetermined for each card, such that the indicator for each card is predetermined prior to selection as part of the player hand. In some implementations, the indicators for a card in the player hand may be selected separately (e.g., subsequent to selection for inclusion in the player hand) from any face value (e.g., suit, number, etc.) indicators of the card. An example of a player hand shown in the graphical user interface 702 is described in connection with FIG. 7B.

Referring now to FIG. 7B in the context of the components described in connection with FIGS. 2A and 2B, an updated graphical user interface 702 is presented on the client device in response to an interaction with the deal button 712 shown in FIG. 7A. Upon interacting with the deal button 712, the data processing system 205 generates a player hand 704 and displays the player hand 704 on the graphical user interface 702. In this example, the data processing system 205 selects a predetermined number of cards (e.g., 7 cards, any positive integer, etc.) for the player hand 704. The graphical user interface 702 is dynamically updated to reflect the updated player hand 704 and any changes in the game state information 275.

A standard deck of cards (graphically represented as the deck of cards 722) can have a predetermined number of cards (e.g., 52 cards or any positive integer). The data processing system 205 may use indicators to track the attributes of each card. Each card can have a face value indicator that indicates the card's face value and suit. The face values can be Ace, 7, 3, 4, 5, 6, 7, 8, 9, 20, Jack, Queen, or King. The suits can be Hearts, Diamonds, Clubs, or Spades. The data processing system 205 can determine a hand rank for player hand 704 based on the face value indicators of the cards in the player hand 704. To do this, the data processing system 205 may identify the face value indicators for each card in the player hand 704.

In some implementations, to generate the player hand, the data processing system 205 may utilize a random number generator that generates random numbers and use the random numbers as index values for one or more lookup tables that store card values (e.g., standard cards) for the card game. The card values may represent cards having different face value and/or bonus indicators. In some implementations, a first lookup table with a first random number may be utilized to select a face value indicator for a card, and a second lookup table with a second random number may be utilized to select a second indicator (e.g., a bonus indicator or a non-bonus indicator) for the card. In some implementations, a single lookup table and a single random number may be utilized to determine the face value indicator and the bonus indicator for each card. The data processing system 205 may sort the cards in player hand 704 by their face value indicators and determine the hand rank based on the sorted cards. The specific hand rank determined will depend on the game instructions 280 or standard Baccarat rules.

In the example implementations, the data processing system 205 may also assign a bonus indicator to a card, which indicates a bonus value of the card, or a non-bonus indicator to a card, which indicates that the card does not have a bonus value. A non-bonus indicator may be a particular indicator different from the bonus indicator. In some implementations, the non-bonus indicator may be an absence of the bonus indicator. The data processing system 205 may graphically represent the bonus indicator on the back of the card on the graphical user interface 702. As described herein, the cards in the player hand may be represented as graphical user interface elements on the graphical user interface 702. The face value indicator of the card may be displayed on the virtual "face" of the card, while the bonus indicator or non-bonus indicator may be represented on the virtual "back" of the card. In some implementations, the bonus indicator or non-bonus indicator may each be represented by different colors. The colors may be predetermined colors, or colors dynamically determined based on one or more conditions of the game, the wager, or the player profile, among other factors.

For example, the bonus indicator can be assigned an orange color, and the non-bonus indicator can be assigned a green color. In some implementations, the data processing system 205 can assign predetermined sizes to the bonus and non-bonus indicators. For example, the bonus indicator can be assigned a larger size than the non-bonus indicator. The specific colors and sizes that are assigned to the bonus and non-bonus indicators can vary based on the game instructions 280, and the data processing system 205 can also implement other methods to identify bonus indicators and non-bonus indicators, such as using different symbols, shapes, or locations, among others. In some implementations, the data processing system 205 may use a lookup table to store a mapping between the face value indicators and the second indicators. When the data processing system 205 selects a face value indicator for a card, the data processing system 205 can use the face value indicator of the card as an index value for the lookup table to determine the second indicator for the card (e.g., a bonus indicator or a non-bonus indicator).

The gameplay may include several game conditions, including, but not limited to, a termination condition, a normal hand condition, and a bonus condition. The game conditions may be defined by the game instructions 280, which can vary from game to game. The data processing system 205 can determine which game condition(s) are satisfied based on whether the cards in the player hand 704 correspond to bonus and non-bonus indicators.

Once the play of the game has been initiated (e.g., in response to an interaction with the deal button 712), the data processing system 205 can randomly select cards for the player hand 704. In some implementations, prior to selecting the face value indicators for the cards in the player hand 704, the data processing system 205 can select the second indicators (e.g., the bonus or non-bonus indicators) for each card in the player hand 704 and evaluate any bonus or termination conditions resulting therefrom. In some implementations, both the face value indicators and the second indicators may be determined by the data processing system 205 prior to evaluating whether a termination condition or bonus condition is satisfied. As shown, the cards in the player hand 704 are initially represented face down, as shown in FIG. 7B.

In some implementations, game conditions (e.g., termination, bonus, normal, etc.) can be evaluated based on the second indicators displayed on the back of the cards in the player hand 704. In the example shown in FIG. 7B, a card with a "star" icon on the back may correspond to the bonus indicator, while a card with a "circle" icon on the back may correspond to the non-bonus indicator. As described herein, a termination condition (may also include a loss condition is some implementations) can be satisfied if the second indicator of a first card in a player hand 704 corresponds to bonus indicator and the second indicator of a second card in the player hand 704 corresponds to a non-bonus indicator. In this example, one card is shown as having a circle icon on the back and the other card is shown as having a star icon on the back, thereby causing the data processing system 205 to identify that the termination condition has been satisfied.

Upon determining that the termination condition is satisfied, the data processing system 205 can update the graphical user interface 702 to display a notification 732 indicating that the gameplay has been terminated. The notification 732 can be implemented in a variety of ways, including, but not limited to, a simple message ("GAME OVER" in this example) that pops up on the player device (e.g., client device 220), a more complex animation, or a visual effect, among others. In some implementations, the data processing system 205 may determine and/or display the face value indicators of the cards upon displaying the notification. Upon determining that the termination condition is satisfied, the data processing system 205 can update the credit balance of the player profile 270. The play of the game may also terminate in instances resulting from normal gameplay, for example, where a dealer hand 706 or a player hand 704 satisfies a win condition. In this case, the hand with the hand rank that is closer to a predetermined threshold wins the game, leading to the termination of the gameplay.

Figure 7C:
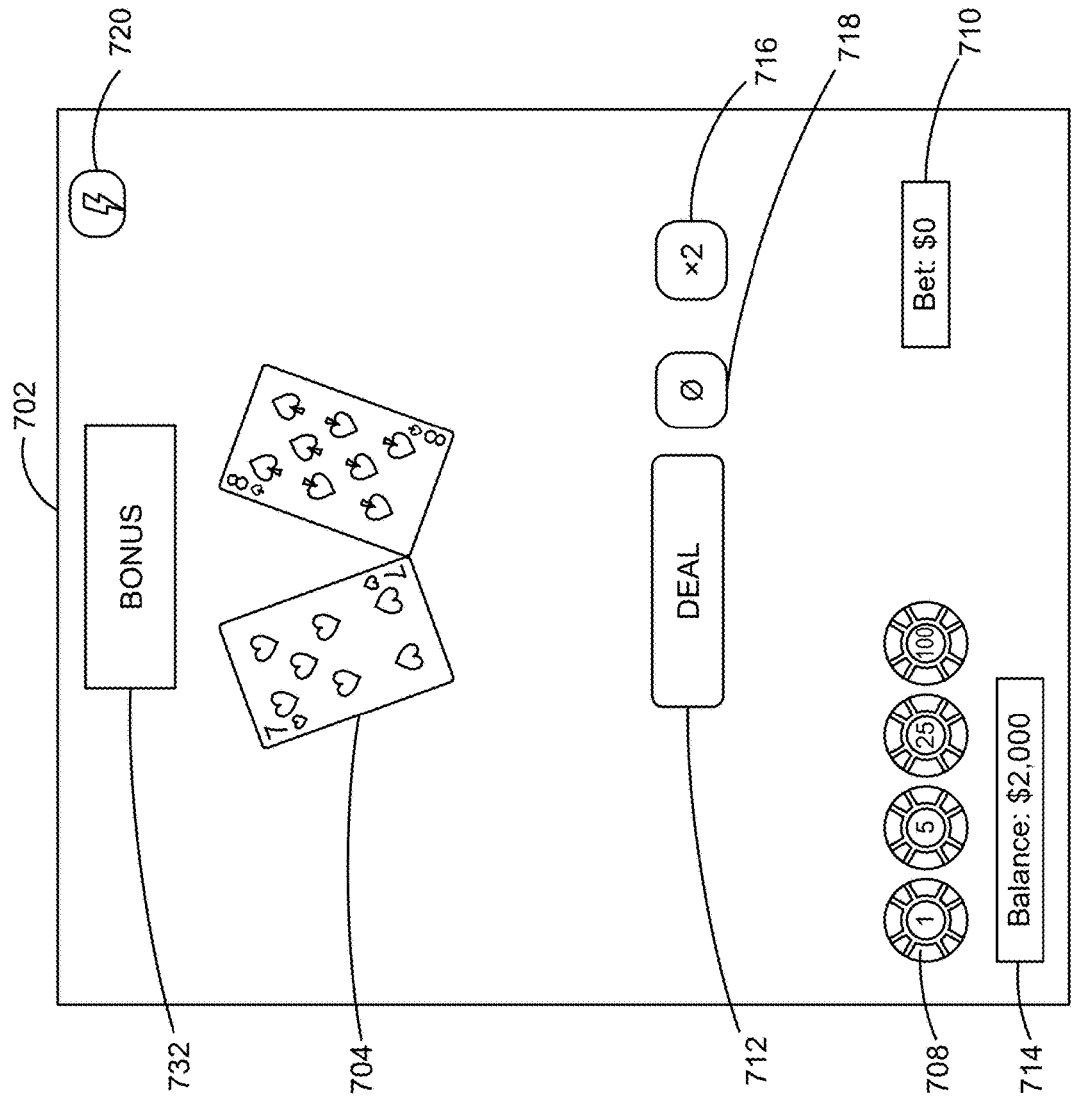

If the second indicators of the cards in the player hand 704 do not satisfy the termination condition, the data processing system 205 can update the graphical user interface to display the face value indicators of each card. In some implementations, the data processing system 205 may determine the face value indicators of the cards in the player hand upon determining that the termination condition was not satisfied. The data processing system 205 may cause the graphical user interface 702 to display an animation in which the cards are shown as turning to a face up position, as shown in connection with FIG. 7C. The data processing system 205 then evaluates the face value indicators according to the rules of the card game being played. In some implementations, before causing presentation of the face value indicators of the cards in the player hand 704, the data processing system 205 can determine whether both cards in the player hand 704 satisfy a bonus condition. In one example, the bonus condition is satisfied if both cards in the player hand have a bonus indicator, such as both cards having a "star" icon, or having a particular color pattern, on the back of the cards, among other indicators specified in the game instructions 280. If so, the data processing system 205 automatically updates the credit balance of the player profile 270. The graphical user interface 702 can also be updated to indicate that the bonus condition has been satisfied, as shown in FIG. 7C. In some implementations, after determining the face value indicators of each card in the player hand, the face value indicator of each card can be used as an index value for a lookup table to determine the second indicator for the cards in the player hand 704 (e.g., a bonus indicator or a non-bonus indicator).

Referring now to FIG. 7C in the context of the components described in connection with FIGS. 2A and 2B, a graphical user interface 702 is presented on a client device 220 depicting that a bonus condition has been satisfied. As described in FIG. 7B, after determining that the termination condition is not satisfied, the data processing system 205 causes the face value indicators of the cards in the player hand 704 to be displayed on the graphical user interface 702 in a face up position (e.g., a 7 of hearts and an 8 of spades in this example). The data processing system 205 can then evaluate the face value indicator of each card in the player hand 704 according to the game instructions 280 to update the game state information 275.

In some implementations, to determine whether the player hand 704 satisfies the bonus condition, the data processing system 205 identifies the bonus and non-bonus indicators for each card in the player hand 704 by using the lookup table that stores the mapping between the face value indicators and the second indicators. In this example, since the data processing system 205 identifies that each card in the player hand 704 includes a bonus indicator, the data processing system 205 can update the graphical user interface 702 to indicate that the second indicators have satisfied the bonus condition. For example, the graphical user interface 702 can be updated to display the notification 732 (e.g., "BONUS" in this example) indicating that the bonus condition has been satisfied.

In some implementations, the data processing system 205 can count the number of cards in the player hand 704 having bonus indicators via a counter. For example, the data processing system 205 can maintain a counter that is initialized to zero when the hand 704 is displayed to the player. When the data processing system 205 identifies a card having a bonus indicator, the counter can be incremented. In some implementations, if the number of cards having bonus indicators in the player hand 704 corresponds to a predetermined threshold (e.g., two or more), the data processing system 205 can update the graphical user interface 702 to provide feedback to the player, indicating that the bonus condition has been satisfied. The feedback can include various sensory elements, such as visual, auditory, or tactile (e.g., haptic) feedback.

In response to the bonus condition being satisfied, the data processing system 205 may provide one or more additional awards, including but not limited to an additional game play or a bonus award amount. The specific bonus award may be predetermined based on the game instructions 280. Upon satisfying the bonus condition, the data processing system 205 can update a credit balance of the player profile 270 and the game state information 275 accordingly. Once the data processing system 205 determines that a player hand 704 has satisfied (or not satisfied) the bonus condition, the graphical user interface 702 can be updated to advance the play of the card game, as shown in connection with FIG. 7D.

Figure 7D:
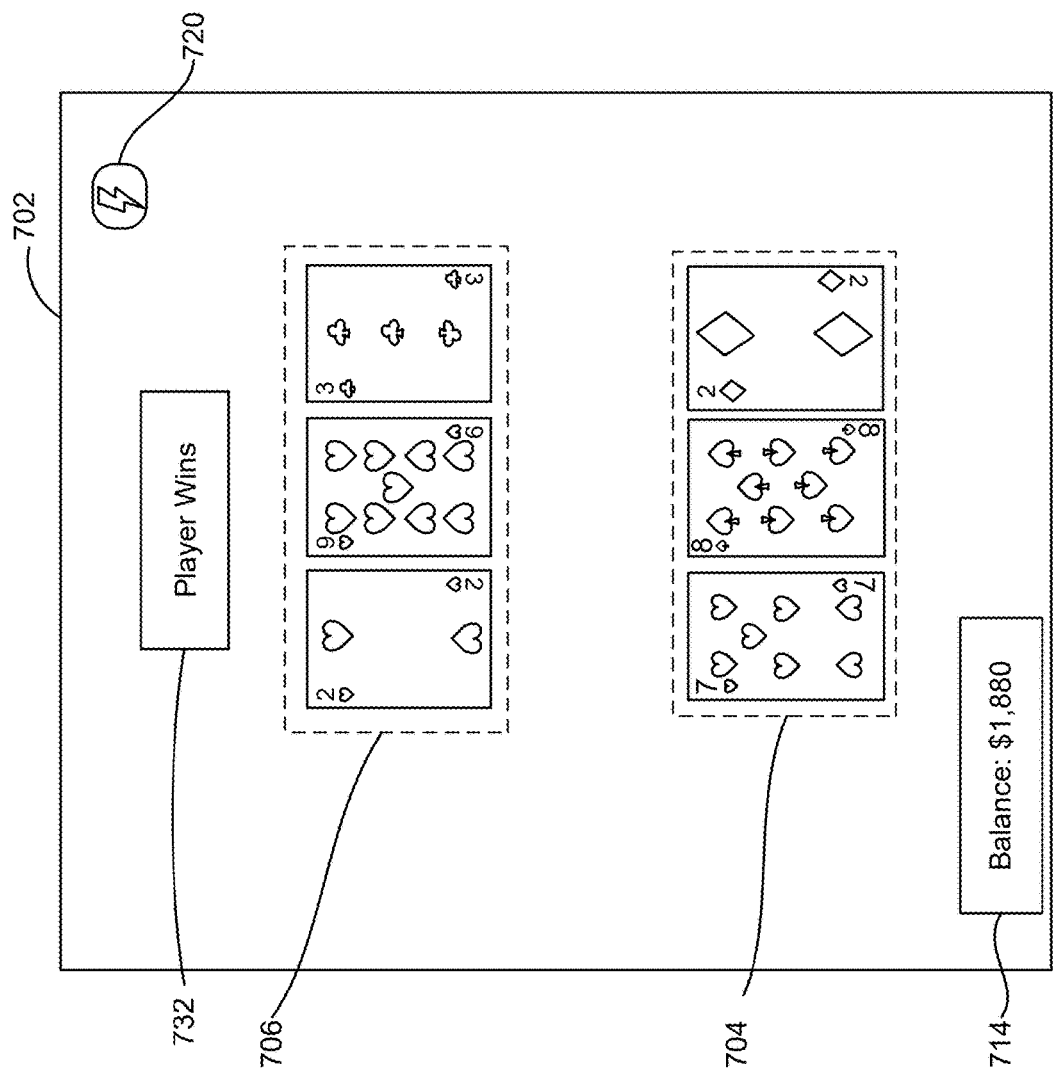

Referring now to FIG. 7D in the context of the components described in connection with FIGS. 2A and 2B, an updated graphical user interface 702 is presented on a client device 220 after evaluating the second indicators of the cards in the player hand 704. As described herein, the hand rank can be determined based on the face value indicators of the cards in the player hand 704, in accordance with the game instructions 280, which in this example include standard Baccarat rules. Each card in the player hand 704 can have a represented point value, and the hand rank can be determined by adding the point values of the cards. In Baccarat, a player wins if the player hand rank is equal to or closer to a predetermined threshold (e.g., "9" or any positive integer) than the dealer hand rank.

As shown, the graphical user interface 702 displays both the player hand 704 and the dealer hand 706, each of which has a predetermined number of cards. In this example, the data processing system 205 selects two initial cards (a 7 of hearts and an 8 of spades) for presentation in the graphical user interface as part of the player hand 704. The sum of cards in the player hand 704 is "15", but in Baccarat only the last digit is considered, giving the player a hand rank of "5". For example, the data processing system 205 may sum the total value of each card, and perform a modulo ten operation (e.g., to return the "ones" place unit digit of the total hand value). The data processing system 205 can select two cards (e.g., a 7 of hearts and a 9 of hearts) for the dealer hand 706, using the card selection techniques described herein, and perform similar operations to determine the hand value of the dealer hand 706. In this example, total value of the cards in the dealer hand 706 sum to 21, which results in a hand rank of "1" for the dealer hand 706.

In some implementations, whether a third card is to be selected for either or both hands can be determined by the game instructions 280 or standard Baccarat rules based on the initial two-card totals. For example, if either the player hand rank or the dealer hand rank is "8" or "9" (or any predetermined positive integer), no additional cards are drawn, and the game is won by the player or the dealer, or a tie results according to the rules of Baccarat. In some implementations, if the rank of the player hand 704 is "5" or less (or less than any predetermined positive integer), the data processing system 205 may select a third card for the player hand 704. In this example, the player hand rank is 5, causing the data processing system 205 to select a third card (e.g., a 7 of diamonds).

Furthering this example, the player new hand rank becomes "7" (7+8+7=27, and the last digit is 7). Meanwhile, the dealer hand rank is 2, causing the data processing system 205 to also select a third card (e.g., a 3 of clubs). The dealer new hand rank becomes "4" (9+7+3=24, and the last digit is 4). Since the player hand rank is closer to the predetermined threshold, the data processing system 205 updates the game state information 275 and identifies the player hand 704 as the winner of the gameplay. The graphical user interface 702 can be updated to display a notification 732 (e.g., "Player Wins" in this example) indicating that the win condition has been satisfied. The data processing system 205 updates the credit balance of the player profile 270 according to the paytable specified by the game instructions 280 or standard Baccarat rules.

In some implementations, the techniques involving the second indicators, and the termination conditions and/or bonus conditions associated therewith, may be implemented in connection with Blackjack-related card games, as described in connection with FIG. 7E. As depicted, the graphical user interface 702 displays several interactive buttons. For example, when a player interacts with a hit button 724, the graphical user interface 702 is further updated, causing the data processing system 205 to select and display additional cards as part of the player hand 704. The data processing system 205 can continue to receive interactions with the hit button 724 until the player hand 704 satisfies a predetermined threshold (e.g., "hard 71" or busts), which may cause the data processing system 205 to automatically stand the player hand 704 or forfeit the wagers placed on the player hand 704. When a player interacts with a double-down button 726, a new card is selected for the player hand 704, and the graphical user interface 702 is updated to reflect the updated player hand 704. The game state information 275 may also be updated to double the initial wager.

When a player interacts with a stand button 728, no new cards are selected for the player hand 704, and the graphical user interface 702 is updated to reflect the player's decision to stand. When a player interacts with a split button 730, the graphical user interface 702 is updated to show the player hand 704 separated into two hands, and the data processing system 205 updates the bet indicator 710 to reflect an additional wager equal to the initial wager. The data processing system 205 determines a best-rank hand for the player hand 704 and the dealer hand 706. If the player hand 704 outranks the dealer hand 706 (e.g., according to poker ranking rules, other ranking rules defined in the game instructions 280, etc.), the data processing system updates the game state information 275 to indicate the player has won the hand. The data processing system 205 can update the credit balance of the player profile 270 accordingly. The specific payout may vary depending on the game instructions (e.g., a paytable).

Figure 7E:
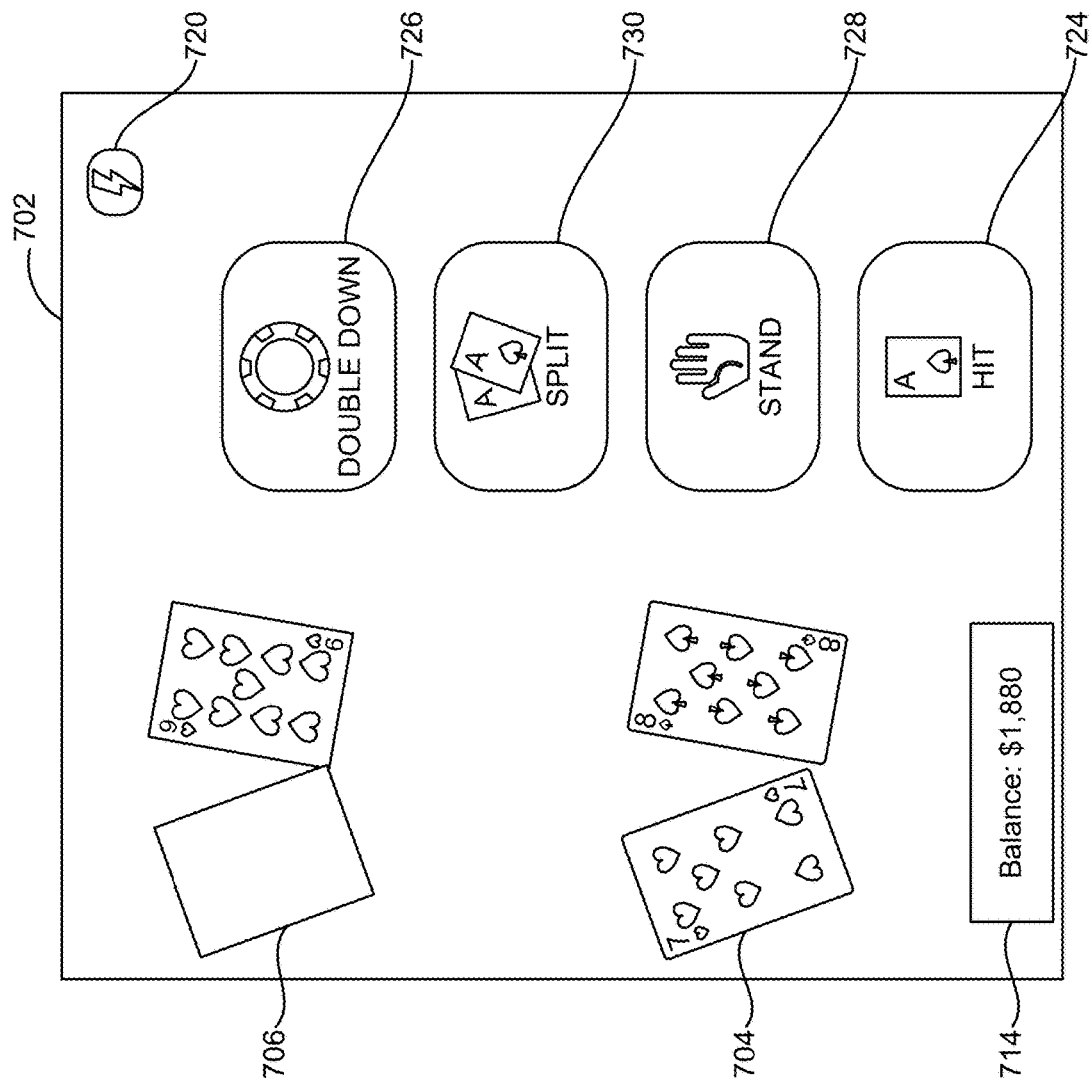

The above example implementations shown in FIGS. 7D-7E can also be understood to be applicable if the player hand 704 only satisfies a normal hand condition without satisfying the bonus condition. A normal hand condition may be satisfied if the data processing system 205 identifies that none of the cards in the player hand 704 have bonus indicators. In some implementations, a hand for the play of the card games described herein may be satisfy the normal hand condition if a predetermined number of cards do not include a bonus indicator. In some implementations, a normal hand condition can be satisfied if the data processing system 205 identifies a predetermined number (e.g., two or more) of cards in the player hand 704 having non-bonus indicators. Upon satisfying the normal hand condition, the data processing system 205 may proceed to advance the play of the card game and determine the hand rank of the player hand 704 in accordance with the game instructions 280 or the example implementations depicted in FIGS. 7D-7E.

The adjustment in the credit balance can be made based on the computed bonus award and the individual award amounts calculated for each outcome. In some implementations, the data processing system 205 can increase the credit balance in the player's player profile 270 by the sum of the bonus award amount and the award amount for each successful outcome. However, if the bonus award condition is not satisfied, resulting in a zero bonus award amount, the data processing system 205 can increase the credit balance only by the award amounts for the winning outcomes. In cases where the bonus award is credited to the player before the completion of the game, the data processing system 205 can update the credit balance of the player profile 270 by adding the award amounts for the winning outcomes to the credit balance.

Figure 8:
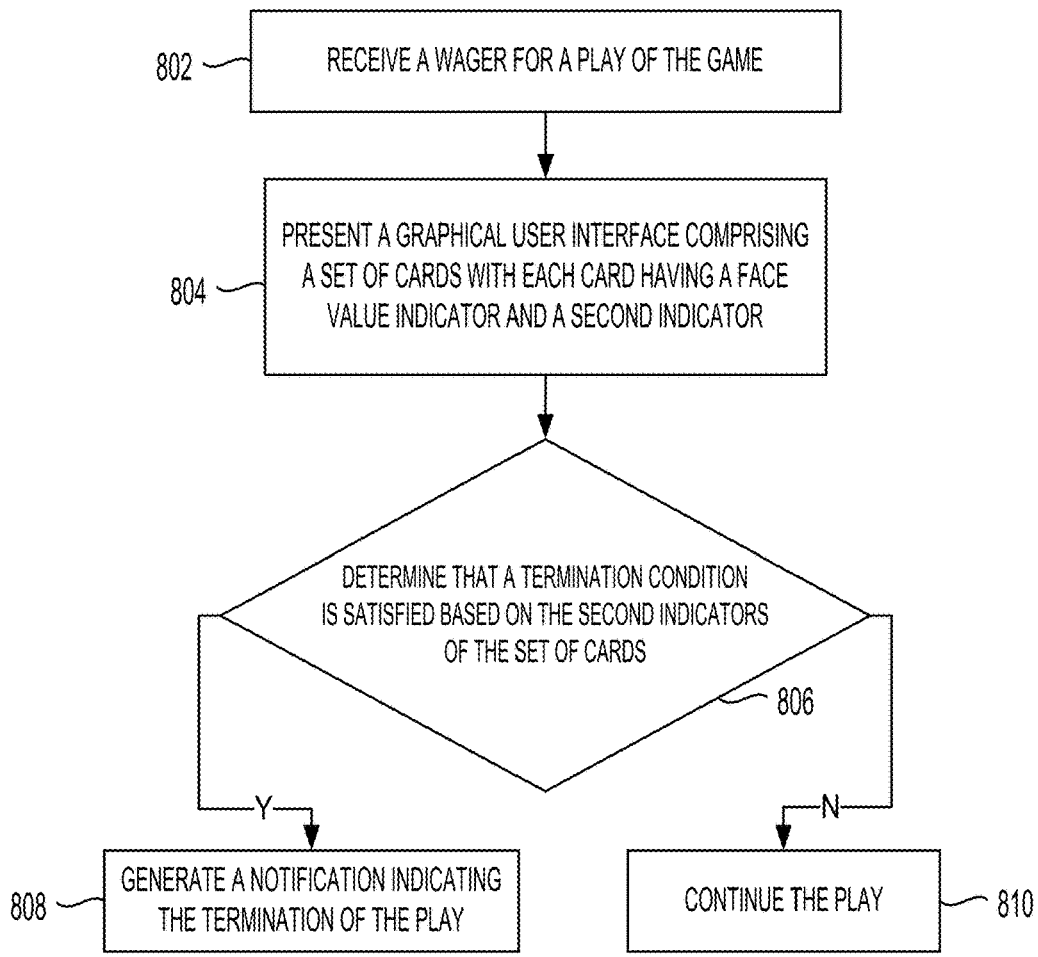
FIG. 8 depicts an example flow diagram of an example network application that may be accessed via network communication sessions established according to the techniques described herein, in accordance with one or more implementations.

Referring now to FIG. 8, depicted is an illustrative flow diagram of a method 800 for providing card games with additional indicators. The method 800 can be executed, performed, or otherwise carried out by a data processing system. A data processing system (e.g., the data processing system 205) can be remote to one to one or more client devices and communicate with the one or more client devices via a computer network. In some implementations, the operations of method 800 can be performed by a standalone gaming device (e.g., without communicating with a gaming server to perform the method steps). In a brief overview of method 800, the gaming server can receive a wager for a play of the game (STEP 802), present a graphical user interface including a set of cards, with each card having a face value indicator and a second indicator (STEP 804), determine that a termination condition is satisfied based on the second indicators of the set of cards (STEP 806), and either generate a notification if the termination condition is satisfied (STEP 808) or proceed with the gameplay if the termination condition is not satisfied (STEP 810).

In further detail of method 800, the data processing system can receive a wager for a play of the game (STEP 802). The wager can be received in one or more messages received from a client device. The message, or request, can indicate that a player intends to play a game provided by the data processing system. The message can include an indication of a player profile with which to access functionalities related to the game (e.g., placing wagers using earned credits, purchasing additional credits, etc.). The wager can be provided via a graphical user interface (e.g., the graphical user interface 702 of FIG. 7A). The wager amounts provided can be a specified amount of credits, such as 2, 5, 75, 200, 500, or 2000 credits. In some implementations, the player can specify a custom number or fractional number of credits used in the game. Once the wager has been selected, the client device can transmit a request to place the wagers for the play of the game.

Upon receiving the wager, the data processing system can generate a graphical user interface including a set of cards, with each card having a face value indicator and a second indicator (STEP 804). The data processing system can also generate a player hand and display the player hand on the graphical user interface. In this example, the data processing system selects a predetermined number of cards (e.g., 7 cards, any positive integer, etc.) for the player hand. The graphical user interface is dynamically updated to reflect the updated player hand and any changes in the game state information.

The data processing system may use indicators to track the attributes of each card. Each card can have a face value indicator that indicates the card's face value and suit. The face values can be Ace, 2, 3, 4, 5, 6, 7, 8, 9, 20, Jack, Queen, or King. The suits can be Hearts, Diamonds, Clubs, or Spades. The data processing system can determine a hand rank for player hand based on the face value indicators of the cards in the player hand. To do this, the data processing system may identify the face value indicators for each card in the player hand.

In some implementations, to generate the player hand, the data processing system may utilize a random number generator that generates random numbers and use the random numbers as index values for one or more lookup tables that store card values (e.g., standard cards) for the card game. The card values may represent cards having different face value and/or bonus indicators. In some implementations, a first lookup table with a first random number may be utilized to select a face value indicator for a card, and a second lookup table with a second random number may be utilized to select a second indicator (e.g., a bonus indicator or a non-bonus indicator) for the card. In some implementations, a single lookup table and a single random number may be utilized to determine the face value indicator and the bonus indicator for each card. The data processing system may sort the cards in player hand by their face value indicators and determine the hand rank based on the sorted cards. The specific hand rank determined will depend on the game instructions or standard Baccarat rules.

In the example implementations, the data processing system may also assign a bonus indicator to a card, which indicates a bonus value of the card, or a non-bonus indicator to a card, which indicates that the card does not have a bonus value. A non-bonus indicator may be a particular indicator different from the bonus indicator. In some implementations, the non-bonus indicator may be an absence of the bonus indicator. The data processing system may graphically represent the bonus indicator on the back of the card on the graphical user interface. As described herein, the cards in the player hand may be represented as graphical user interface elements on the graphical user interface. The face value indicator of the card may be displayed on the virtual "face" of the card, while the bonus indicator or non-bonus indicator may be represented on the virtual "back" of the card. In some implementations, the bonus indicator or non-bonus indicator may each be represented by different colors. The colors may be predetermined colors, or colors dynamically determined based on one or more conditions of the game, the wager, or the player profile, among other factors.

For example, the bonus indicator can be assigned an orange color, and the non-bonus indicator can be assigned a green color. In some implementations, the data processing system can assign predetermined sizes to the bonus and non-bonus indicators. For example, the bonus indicator can be assigned a larger size than the non-bonus indicator. The specific colors and sizes that are assigned to the bonus and non-bonus indicators can vary based on the game instructions, and the data processing system can also implement other methods to identify bonus indicators and non-bonus indicators, such as using different symbols, shapes, or locations, among others. In some implementations, the data processing system may use a lookup table to store a mapping between the face value indicators and the second indicators. When the data processing system selects a face value indicator for a card, the data processing system can use the face value indicator of the card as an index value for the lookup table to determine the second indicator for the card (e.g., a bonus indicator or a non-bonus indicator).

The gameplay may include several game conditions, including, but not limited to, a termination condition, a normal hand condition, and a bonus condition. The game conditions may be defined by the game instructions, which can vary from game to game. The data processing system can determine which game condition(s) are satisfied based on whether the cards in the player hand correspond to bonus and non-bonus indicators.

In some implementations, game conditions (e.g., termination, bonus, normal, etc.) can be evaluated based on the second indicators displayed on the back of the cards in the player hand. In the example shown in FIG. 7B, a card with a "star" icon on the back may correspond to the bonus indicator, while a card with a "circle" icon on the back may correspond to the non-bonus indicator. As described herein, a termination condition (may also include a loss condition is some implementations) can be satisfied if the second indicator of a first card in a player hand corresponds to bonus indicator and the second indicator of a second card in the player hand corresponds to a non-bonus indicator (STEP 806).

Upon determining that the termination condition is satisfied, the data processing system can update the graphical user interface to display a notification indicating that the gameplay has been terminated (STEP 808). The notification can be implemented in a variety of ways, including, but not limited to, a simple message ("GAME OVER" in this example) that pops up on the player device (e.g., client device), a more complex animation, or a visual effect, among others. In some implementations, the data processing system may determine and/or display the face value indicators of the cards upon displaying the notification. Upon determining that the termination condition is satisfied, the data processing system can update the credit balance of the player profile. The play of the game may also terminate in instances resulting from normal gameplay, for example, where a dealer hand or a player hand satisfies a win condition. In this case, the hand with the hand rank that is closer to a predetermined threshold wins the game, leading to the termination of the gameplay.

If the second indicators of the cards in the player hand do not satisfy the termination condition, the data processing system can update the graphical user interface to advance the play of the card game and display the face value indicators of each card (STEP 810). In some implementations, the data processing system may determine the face value indicators of the cards in the player hand upon determining that the termination condition was not satisfied. The data processing system may cause the graphical user interface to display an animation in which the cards are shown as turning to a face up position, as shown in connection with FIG. 7C. The data processing system then evaluates the face value indicators according to the rules of the card game being played. In some implementations, before causing presentation of the face value indicators of the cards in the player hand, the data processing system can determine whether both cards in the player hand satisfy a bonus condition. In one example, the bonus condition is satisfied if both cards in the player hand have a bonus indicator, such as both cards having a "star" icon, or having a particular color pattern, on the back of the cards, among other indicators specified in the game instructions. If so, the data processing system automatically updates the credit balance of the player profile. The graphical user interface can also be updated to indicate that the bonus condition has been satisfied. In some implementations, after determining the face value indicators of each card in the player hand, the face value indicator of each card can be used as an index value for a lookup table to determine the second indicator for the cards in the player hand (e.g., a bonus indicator or a non-bonus indicator).

In response to the bonus condition being satisfied, the data processing system may provide one or more additional awards, including but not limited to an additional game play or a bonus award amount. The specific bonus award may be predetermined based on the game instructions. Upon satisfying the bonus condition, the data processing system can update a credit balance of the player profile and the game state information accordingly. Once the data processing system determines that a player hand has satisfied (or not satisfied) the bonus condition, the graphical user interface can be updated to advance the play of the card game (e.g., as shown in connection with FIG. 7D) and determine hand rank in accordance with the game instructions 280, which in this example include standard Baccarat rules.

In some implementations, a normal hand condition may be satisfied if the data processing system identifies that none of the cards in the player hand have bonus indicators. In some implementations, a hand for the play of the card games described herein may be satisfy the normal hand condition if a predetermined number of cards do not include a bonus indicator. In some implementations, a normal hand condition can be satisfied if the data processing system identifies a predetermined number (e.g., two or more) of cards in the player hand having non-bonus indicators. Upon satisfying the normal hand condition, the data processing system may proceed to advance the play of the card game and determine the hand rank of the player hand in accordance with the game instructions.

As the data processing system determines the outcome of a play, the data processing system can update a credit balance of the player profile. The adjustment in the credit balance can be made based on the computed bonus award and the individual award amounts calculated for each outcome. In some implementations, the data processing system can increase the credit balance of the player profile by the sum of the bonus award amount and the award amount for each successful outcome. However, if the bonus award condition is not satisfied, resulting in a zero bonus award amount, the data processing system can increase the credit balance only by the award amounts for the winning outcomes. In cases where the bonus award is credited to the player before the completion of the game, the data processing system can update the credit balance of the player profile by adding the award amounts for the winning outcomes to the credit balance.

At least one aspect of the present disclosure is directed to a system. The system can include one or more processors coupled to memory. The one or more processors may receive a wager for a play of a card game. Upon receiving the wager, the one or more processors may cause presentation of a graphical user interface including one or more graphical elements representing a set of cards for a player hand of the play of the card game. Each card of the set of cards may include a respective face value indicator that indicates a face value and a suit of the card and a respective second indicator that indicates a bonus value of the card. The respective second indicator can be a bonus indicator or a non-bonus indicator. The respective second indicator can also be different from the respective face value indicator. The one or more processors may determine that a termination condition for the play of the card game is satisfied responsive to the respective second indicator of a first card of the set of cards having the bonus indicator and the respective second indicator of a second card of the set of cards having the non-bonus indicator. Further, responsive to determining that the termination condition has been satisfied, the one or more processors may generate a notification for display indicating that the play of the card game has been terminated. The bonus indicator may correspond to a first color, and the non-bonus indicator may correspond to a second color.

In some implementations, the one or more processors may cause the graphical user interface to generate an interactive element that, when interacted with, causes the one or more processors to initiate the play of the card game. In some implementations, the one or more processors may cause generation of a second graphical user interface including a second set of cards for the player hand of a second play of the card game. The one or more processors may determine that a bonus condition for the second play of the card game is satisfied responsive to determining that the respective second indicator of a third card of the second set of cards includes the bonus indicator and the respective second indicator of a fourth card of the second set of cards includes the bonus indicator. The one or more processors may adjust a credit balance responsive to determining that the bonus condition for the second play of the card game has been satisfied. In some implementations, the one or more processors may present an interactive element that, when interacted with, causes the one or more processors to initiate a second play of the card game. In some implementations, the one or more processors may determine that each card of a second set of cards for a second player hand of a second play of the card game includes the non-bonus indicator. Responsive to determining that each card of the second set of cards includes the non-bonus indicator, the one or more processors may determine a hand rank for the second player hand based on the respective face value indicator of each card of the second set of cards.

In some implementations, the one or more processors may adjust a credit balance based on whether the hand rank satisfies a win condition. In some implementations, the one or more processors may determine that the win condition is satisfied responsive to the hand rank of the second player hand being closer to a predetermined value than a dealer hand rank of a dealer hand. In some implementations, the one or more processors may determine that the win condition is satisfied responsive to the hand rank of the second player hand being equal to a predetermined value. In some implementations, the one or more processors may determine that an additional card condition is satisfied based on the hand rank of the second player hand being less than a predetermined value. Responsive to determining that the additional card condition is satisfied, the one or more processors may update the hand rank of second player hand based on the respective face value indicator of an additional card and adjust a credit balance responsive to the updated hand rank of the second player hand satisfying a win condition.

At least one aspect of the present disclosure is directed to a method. Upon receiving a wager for a play of a card game, the method can include causing presentation of a graphical user interface including one or more graphical elements representing a set of cards for a player hand of the play of the card game. Each card of the set of cards may include a respective face value indicator that indicates a face value and a suit of the card and a respective second indicator that indicates a bonus value of the card. The respective second indicator can be a bonus indicator or a non-bonus indicator. The respective second indicator can also be different from the respective face value indicator. The method can include determining that a termination condition for the play of the card game is satisfied responsive to the respective second indicator of a first card of the set of cards having the bonus indicator and the respective second indicator of a second card of the set of cards having the non-bonus indicator. Further, responsive to determining that the termination condition has been satisfied, the method can include generating a notification for display indicating that the play of the card game has been terminated. The bonus indicator may correspond to a first color, and the non-bonus indicator may correspond to a second color.

The method can include causing the graphical user interface to generate an interactive element that, when interacted with, causes the one or more processors to initiate the play of the card game. The method can include causing generation of a second graphical user interface including a second set of cards for the player hand of a second play of the card game. The method can include determining that a bonus condition for the second play of the card game is satisfied responsive to determining that the respective second indicator of a third card of the second set of cards includes the bonus indicator and the respective second indicator of a fourth card of the second set of cards includes the bonus indicator. The method can include adjusting a credit balance responsive to determining that the bonus condition for the second play of the card game has been satisfied. The method can include presenting an interactive element that, when interacted with, causes the one or more processors to initiate a second play of the card game. The method can include determining that each card of a second set of cards for a second player hand of a second play of the card game includes the non-bonus indicator. Responsive to determining that each card of the second set of cards includes the non-bonus indicator, the method can include determining a hand rank for the second player hand based on the respective face value indicator of each card of the second set of cards.

The method can include adjusting a credit balance based on whether the hand rank satisfies a win condition. The method can include determining that the win condition is satisfied responsive to the hand rank of the second player hand being closer to a predetermined value than a dealer hand rank of a dealer hand. The method can include determining that the win condition is satisfied responsive to the hand rank of the second player hand being equal to a predetermined value. The method can include determining that an additional card condition is satisfied based on the hand rank of the second player hand being less than a predetermined value. Responsive to determining that the additional card condition is satisfied, the method can include updating the hand rank of second player hand based on the respective face value indicator of an additional card and adjust a credit balance responsive to the updated hand rank of the second player hand satisfying a win condition.

Referring now to one example implementation of a multiplayer ascending bet game, the data processing system 205 receives a plurality of wagers from a plurality of client devices and generates a graphical user interface at each client device for a first play of the game. The graphical user interface presents a plurality of graphical indicators (e.g., rockets), each of which is associated with a client device. The data processing system 205 can identify a first set of graphical indicators that satisfy elimination criteria during the first play.

The data processing system 205 can determine a respective score for each surviving graphical indicator based on the start time of the first play of the game and the time of a respective input corresponding to bailing out of the graphical indicator of a particular client device. The first set of graphical indicators may be identified based on a random selection process during the first play. In some implementations, the random selection process may be a function of the respective score associated with the graphical indicator or may be a function on the amount of time that the corresponding player has allowed their score to increase during the first play. Once the first play is completed, the data processing system 205 can select, based on the score of each graphical indicator, a subset of the plurality of graphical indicators that were not eliminated during the first play for a subsequent play of the game, and execute the subsequent play via by providing a second graphical user interface to corresponding client devices 220. The data processing system 205 can update and display information (e.g., the number of rounds, the number of active players in each round, the elimination of players, etc.) on the graphical user interface. Example graphical user interfaces showing an example implementation of a multiplayer ascending bet game are shown in FIGS. 9A-9D.

Figure 9A:
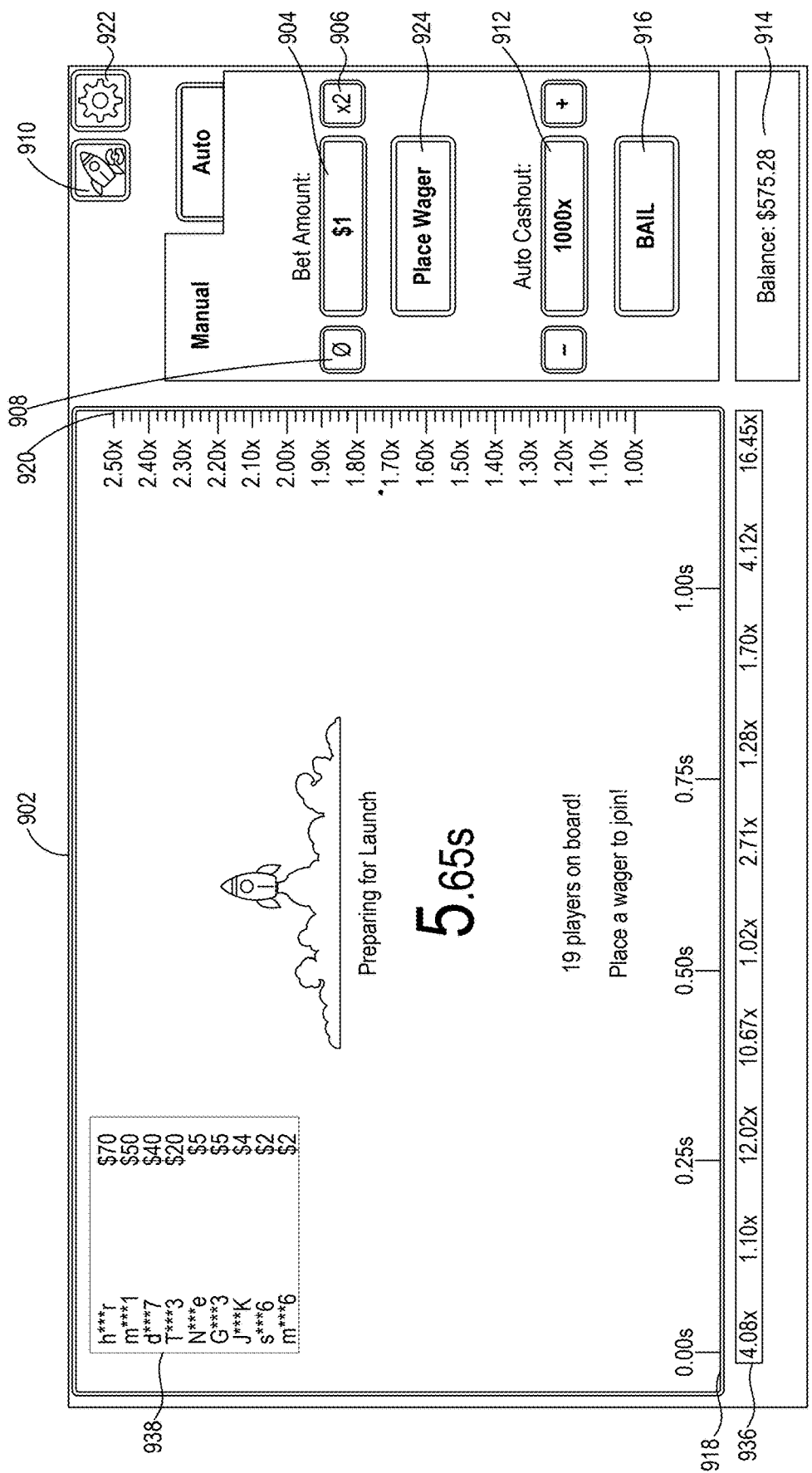
FIGS. 9A, 9B, 9C, and 9D depict further diagrams of example graphical user interfaces that may be displayed in connection with network communication sessions established according to the techniques described herein, in accordance with one or more implementations.

Referring now to FIG. 9A in the context of the components described in connection with FIG. 2, a graphical user interface 902 is presented on a client device 220 for initiating a play of the multiplayer game described herein. As discussed above, the device communicator 230 facilitates communication between each client device 220 participating in the multiplayer game and the data processing system 205, allowing players to interact with a graphical user interface 902 and transmit their actions to the data processing system 205. As players engage with the graphical user interface 902, their actions, such as placing bets or initiating the game, may be captured and stored in their player profile 270.

The graphical user interface 902 shown in FIG. 9A displays manual mode or auto mode to select a wager for a play of the multiplayer game. In manual mode, a player can interact with a bet amount button 904 that enables players to specify the amount of their wagers. A multiplier button 906 is presented that, when interacted with, can cause the bet amount to be updated to double the value of the player's wager. The graphical user interface 902 can display a clear button 908 that, when interacted with, may cause the wager to be reset (e.g., removed or erased). In some implementations, the graphical user interface 902 can be updated via the clear button 908 to reset the wager amount to a default value.

In some implementations, the graphical user interface 902 may display a lightning bolt button 910 that can cause the data processing system 205 to alter the animation speeds in response to an interaction with the lightning bolt button 910. The lightning bolt button 910 can be toggled on or off by the player during the gameplay. The animation speeds may be modified to increase or decrease the amount of time taken to update the game state. Players can also select a multiplier for auto-cashout by interacting with an auto-cashout button 912. Once the selected multiplier value (e.g., which may be used to calculate or update the player's respective score) is reached during the round of the game, the data processing system 205 will automatically "bail out" the player and cause their respective multiplier value to stop increasing for that round. In some implementations, a player can increase or decrease the threshold multiplier value by interacting with the plus or minus signs indicated on the auto-cashout button 912.

In some implementations, a player can manually enter the multiplier value. However, if no value is entered, the data processing system 205 can default the multiplier value to a predetermined maximum value (e.g., 1000×), as shown. A balance region 914 displays the amount of credits available for the player to wager on the game. The amount shown in the balance region 914 may be determined from the credit balance specified in the player profile 270 of the player. The balance region 914 may be updated in response to interactions with the bet amount button 904.

A bail button 916 is presented on the graphical user interface 902 that, when interacted with, causes the data processing system 205 to stop the player's respective score from incrementing over time during the round (e.g., "bailing out" of their respective rocket). As shown on the graphical user interface 902, the horizontal axis 918 may display and/or be updated to show an amount of time that has passed during the round (e.g., in seconds). The vertical axis 920 can display and/or be updated to display the current multiplier and past multiplier for each graphical indicator 934. In some implementations, below the flight time along the horizontal axis 918, the graphical user interface 902 can display multiplier values 936 in different colors indicator to show the progress of each graphical indicator 934 during gameplay.

For example, the red color multiplier values 936 can be assigned to one or more graphical indicators 934 that burst or explode before bailing out. In certain implementations, yellow color or any other color of the multiple values may indicate one or more graphical indicators 934 that bailed out before bursting. Similarly, the green multiplier values 936 can indicate the multipliers achieved by one or more active graphical indicators 934 during the play of the game. In the exemplary implementations, the graphical indicator 934 is displayed as a rocket for the purpose of illustration, but in some implementations, a player can select different graphical indicator designs or shapes using a settings button 922, which updates the graphical user interface 902 to a second graphical user interface that presents the selectable graphical indicators 934.

The graphical user interface 902 can indicate the number of players on board during a round and the amount of bets placed by each player by displaying a list 938 of the players on the left-hand corner, opposite the manual and auto modes. The data processing system 205 maintains a list of all participants (or the players in general) who are currently connected to the game, and can receive requests to join and may automatically generate groups of players according to the parameters of the game. For example, different plays of the game may include different groups of players, and the data processing system 205 may execute multiple game sessions concurrently. When a new player joins the game (e.g., in response to a request transmitted via a client device 220), the data processing system 205 adds the player to the list 938. In some implementations, the data processing system 205 sends a message to the other participants in the game session informing them of that the new player has joined. In some implementations, upon receiving a request to play the game from a client device 220, the data processing system 205 can assign the client device 220 to an existing game session from a set of existing game sessions based on network latency between the data processing system 205 and the client device 220, the number of players in each session, and the amount of time left until the game of the game session is to be initiated, among others. Each participant's graphical user interface 902 can receive the message from the data processing system 205 and can update the list 938 accordingly.

A "round" in the multiplayer game can be a single play, including the initiation and end conditions. The round begins (or initiates) when all players have joined the game (e.g., the number of players has reached a threshold number of players for the game session) and are ready to play. The round ends when all players have bailed out or all the rocket explodes. A round can be initiated in a number of ways, depending on the implementation of the game. In some implementations, the data processing system 205 can wait until a predetermined number of players have joined the game before initiating the round. Once the predetermined number of players have joined, the data processing system 205 will send a message to all participants in the game to start the round. In some implementations, the data processing system 205 can show a countdown timer on all participants' graphical user interfaces 902 after a predetermined number of players have joined the game. In some implementations, the data processing system 205 can start new rounds at predetermined time periods regardless of whether a certain number of players have joined the game. The data processing system 205 may adjust its logic to accommodate certain players, such as by starting a new round even if a certain number of players have not joined the game.

Player can interact with a wager button 924 to place a wager for the play of the game. The wager information is then transmitted from the client device 220 to the data processing system 205. The data processing system 205 receives and processes the wagers, incorporating them into the game logic. The player profile 270 is also updated with the wager information. Until the wager is placed, the graphical user interface 902 can display the time that has elapsed since the launch of the game on the player's device (e.g., client device 220). Players can also initiate the game by interacting with the wager button 924. This interaction causes the data processing system 205 to update the graphical user interface 902 and present multiple rockets 934, each of which corresponds to a player playing the game, as shown in connection with FIG. 9C.

Figure 9B:
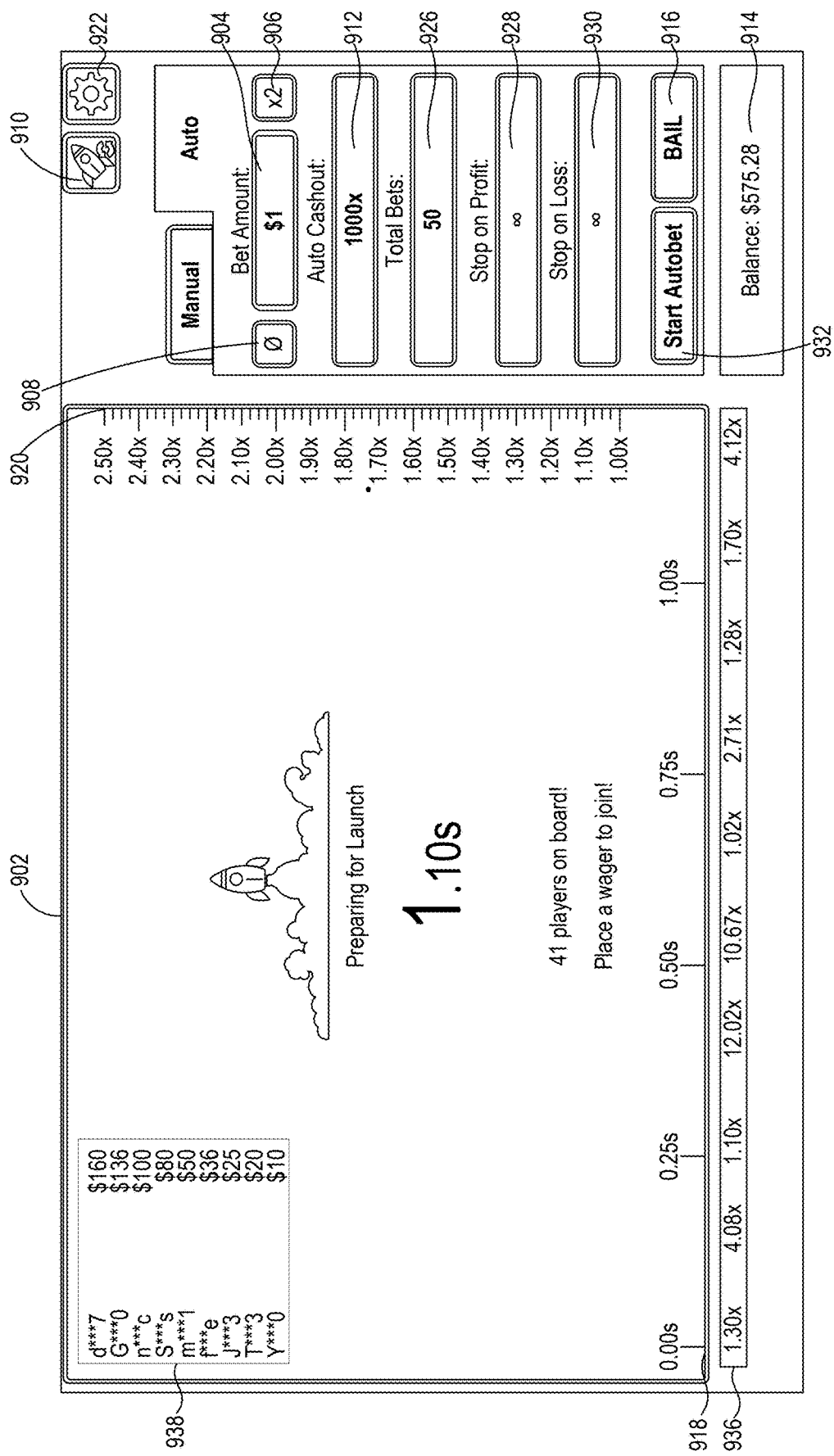

However, in certain implementations, as shown in connection with FIG. 9B, the data processing system 205 can enable players to set certain parameters to automatically place wagers and execute subsequent rounds of the game (e.g., an "autoplay" mode or an "auto mode"). For example, players can specify a profit limit using a stop on profit button 928, which, when specified, causes the data processing system 205 to enter the corresponding player as a participant in subsequent plays of the multiplayer game until a certain profit threshold is reached. In some implementations, players can define the total number of bets to place for the auto mode using a total bets button 926. In some implementations, the total bets may start at a specified amount and increment by a fixed value (e.g., 3 or any positive integer) each time the total bets button 926 is interacted with. In some implementations, players can set a loss limit using a stop on loss button 930. A loss limit, when implemented, causes the data processing system 205 to stop entering the player into subsequent plays of the multiplayer game if the accumulated losses exceed the loss limit. In auto mode, players can also initiate the game by interacting with the start autobet button 932. This interaction causes the data processing system 205 to update the graphical user interface 902 and present multiple rockets, each of which corresponds to a player playing the game, as shown in connection with FIG. 9C. In some implementations, the data processing system 205 can update a counter for player number on the graphical user interface 902 for auto mode. When a player starts auto mode, the data processing system 205 assigns a unique number to each participant. This number identifies the player's rocket on the graphical user interface 902 and tracks the player's progress in the game.

Figure 9C:
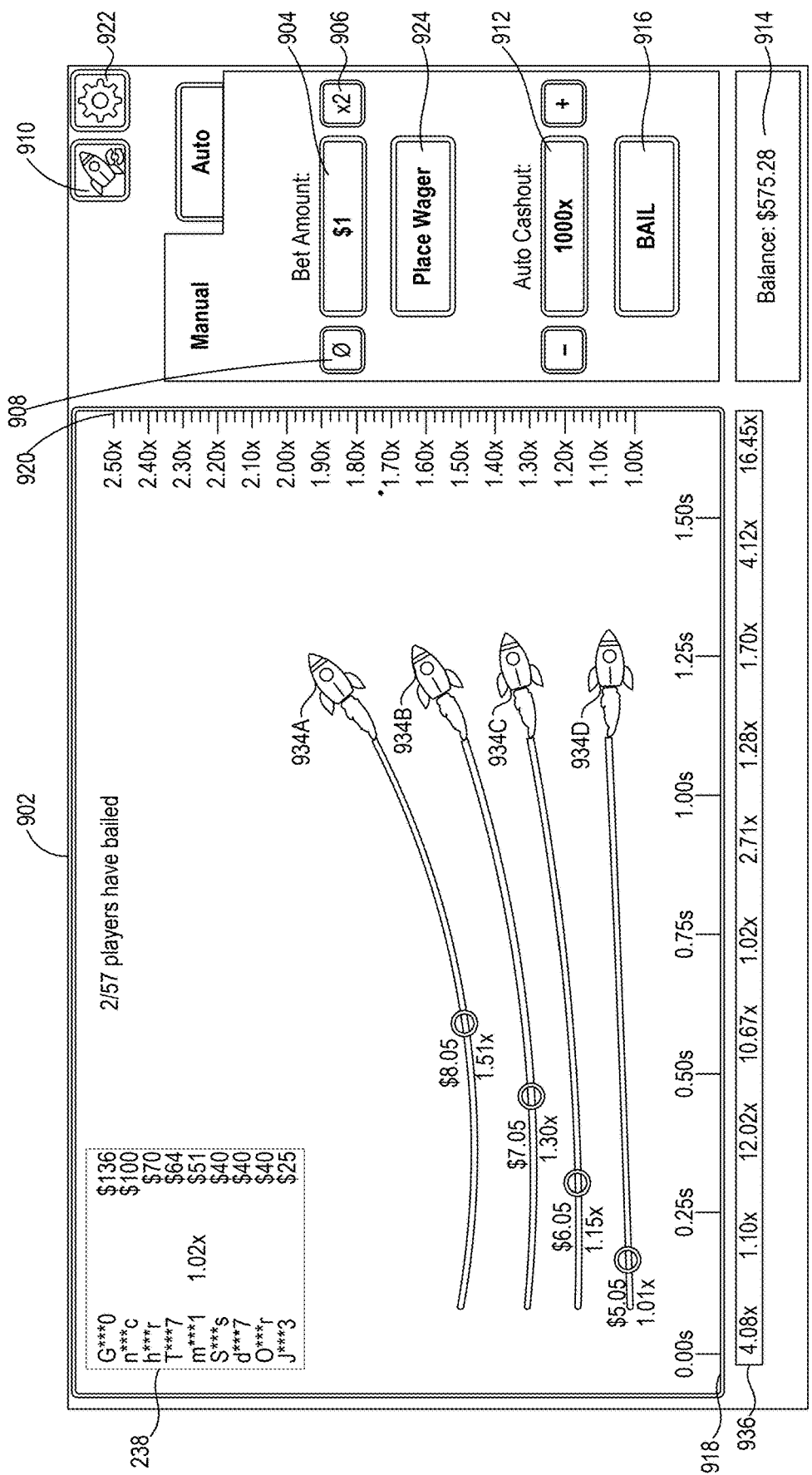

Referring now to FIG. 9C, in the context of the components described in connection with FIG. 2, an updated graphical user interface 902 is presented on the client device 220 in response to initiating the play of the multiplayer game. In this example, the player has interacted with the wager button 924 or the autobet button 932 shown in FIGS. 9A and 9B to join the multiplayer game as a participant. In this example, multiple graphical indicators (shown here as the rockets 934A-934D) are displayed on the graphical user interface 902, as moving horizontally across the x-axis and ascending vertically along the y-axis on the graphical user interface 902. As shown, the data processing system 205 can display a rocket 934 for each participant in the multiplayer game on the graphical user interface 902. The rockets 934 can be displayed in a variety of ways, such as in a row, column, or grid. The rockets 934 can also be displayed in different colors or sizes to represent different aspects of the game, such as the player's current score, multiplier value, or status. In some implementations, the term "score" may sometimes be referred to herein as a "multiplier value" for a player. In some implementations, the movement of the graphical indicators 934 (rocket 934) can correspond to automatic increases in the respective score multiplier value for each participant. The data processing system 205 updates the position of each rocket 934 on the graphical user interface 902 whenever a player's score multiplier value changes or whenever the player makes progress in the game or loses the game.

In some implementations, the data processing system 205 may use a timekeeping mechanism to determine the respective multiplier value of each player, which can then be used to determine where each rocket 934 is horizontally on the client device 220 as the data processing system 205 updates the position of each of the rockets 934 on the graphical user interface 902. The positions of each of the rockets 934 are dynamically updated according to the multiplier values determined for each participant of the multiplayer game, such that the graphical user interface 902 to dynamically shows the movement of the rockets 934 during each round.

In some implementations, the multiplier value 920 (displayed along the y-axis on the graphical user interface 902) associated with each player (and used to determine the vertical position of each corresponding rocket 934 on the graphical user interface 902) can be determined via a linear or exponential algorithm. The data processing system 205 can determine the rate at which the multiplier value increases as over time during the round of the multiplayer game. The computed multiplier value can then be applied to the initial wager placed by each player to calculate the current score for each player. In some implementations, the score can be calculated by multiplying the initial wager by the multiplier value 920 associated with each rocket's vertical position at any given timestamp indicated along the x-axis 918. If the round is not the first round (e.g., a second, third round, etc.), the score may be updated by multiplying the score itself by the multiplier value.

In some implementations, the data processing system 205 can determine the score for each player according to a non-linear function of elapsed time since the initiation of gameplay, thereby causing the score multiplier value to increase at an accelerated rate as time in the round increases. The score multiplier value can be initialized at the start time of the round and can be incremented until an interaction is received by the data processing system 205, which causes the score multiplier value to stop increasing (e.g., represented by stopping the ascent of the corresponding rocket 934 on the graphical user interface 902). A player can manually "bail out" their rocket 934 (stop their score from incrementing) by interacting with the bail button 916. In some implementations, the player may bail out automatically under certain circumstances, as described herein. The data processing system 205 then can determine the final score of the player for the round based on the multiplier value 920 corresponding to the specific timestamp at which the rocket 934 bailed out.

Figure 9D:
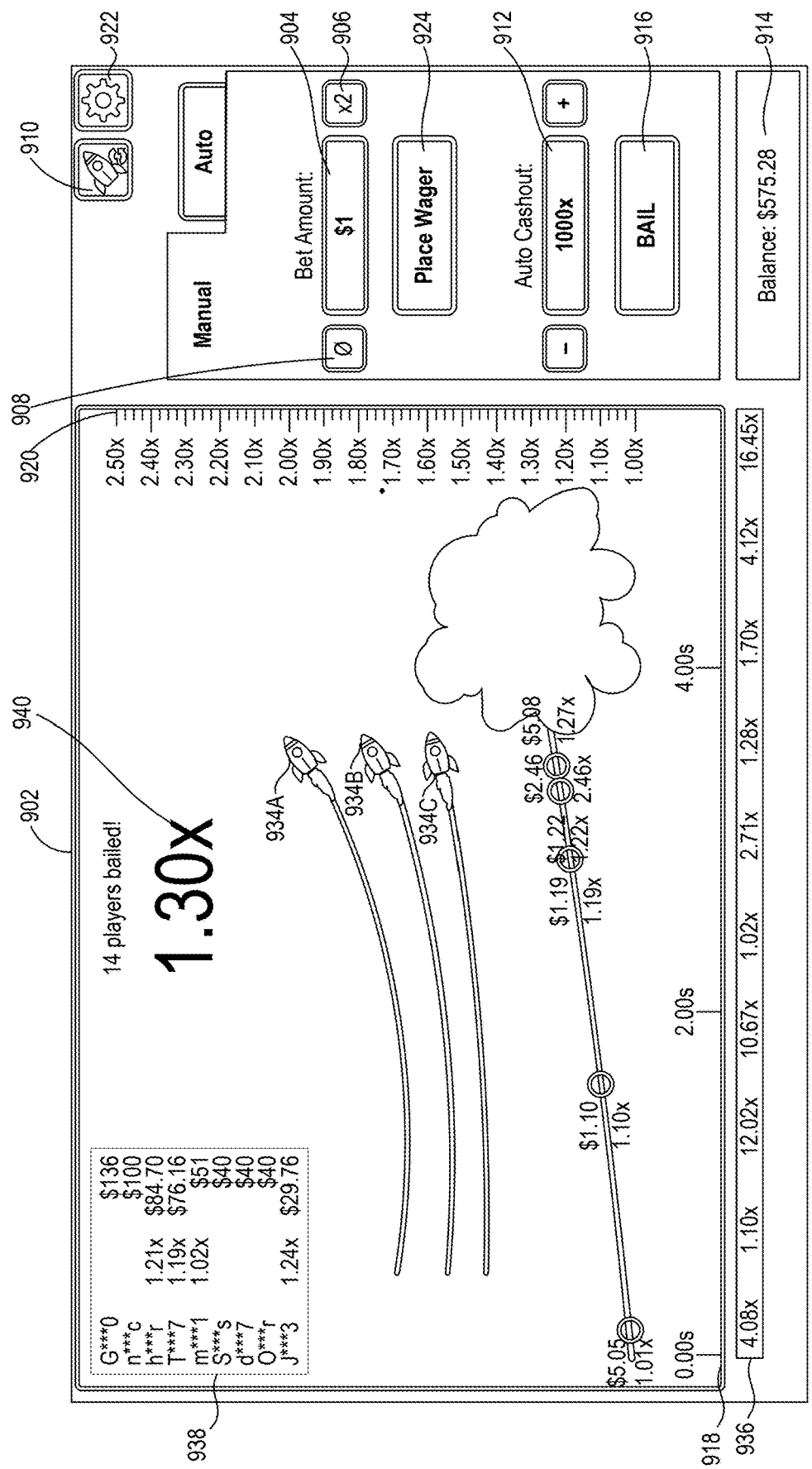

Referring now to FIG. 9D, in the context of the components described in connection with FIG. 2, an updated graphical user interface 902 is presented on the client device 220 depicting a rocket 934 satisfying the elimination criteria for a play of the multiplayer ascending bet game. The elimination criteria (or the termination condition in some implementations) may cause the data processing system 205 to terminate the round (or automatically disqualify the player), without providing the player with an award (e.g., forfeiting the score for that round). Upon the data processing system 205 detecting that the player has been disqualified during the round, the data processing system 205 can update the graphical user interface 902 to graphically represent the player losing the round. In this example, the data processing system 205 has updated the graphical user interface 902 to show the rocket 934 exploding or bursting. In implementations where the player has won the play of the game (e.g., the bail button 916 was interacted with), the data processing system 205 can update the player profile 270 with an indication that the player won the round.

In some implementations, the data processing system 205 can generate a random score threshold for each player, which may be used to determine whether the player has lost the round (or automatically disqualified from the gameplay). In some implementations, the random score threshold for each player may be predetermined prior to the generation of the rocket(s) 934. If, during the play of the game, the score is equal to or greater than the random score threshold, the data processing system 205 can determine that the player has lost the round of the game and update the graphical user interface 902 accordingly. In some implementations, the data processing system 205 can determine the random score threshold value based on a variety of factors, such as the game mode, the player's level, or the current score, among others. For example, the data processing system 205 can generate a random score threshold for each player that is equal to a multiple of the player's current score. In some implementations, the data processing system 205 can generate a random score threshold for each player that is based on the amount of time that the player has allowed their score to increase during the round. If the score of the user exceeds the threshold, the data processing system 205 updates the game state information 275. The graphical user interface 902 is also updated to display a pre-rendered animation of a rocket 934 exploding, as seen in FIG. 9D, which restricts the ability of the player whose rocket 934 exploded to further interact with the graphical user interface 902. The data processing system 205 updates the credit balance of the player profile 270 accordingly.

Referring back to FIG. 9C, in some implementations, the data processing system 205 can maintain a list 938 of participating players during gameplay. The data processing system 205 can update the list 938 to indicate the status of each player participating in the multiplayer game. As the game progresses, certain predetermined events (e.g., based on the game instructions 280) may cause the data processing system 205 to modify the list 938. For example, if a player bails out and ends their rocket's ascent or if a player is automatically disqualified/eliminated during the round, the data processing system 205 can update the game state information 275 accordingly and update the list 938 to reflect that the corresponding player has been eliminated from the game. In some implementations, the update to the list 938 of players may involve marking the player's status as inactive, ranking the players based on their scores, removing the players from the list 938, updating the graphical user interface 902 to remove the rockets 934 from the graphical user interface 902, or displaying the number of players that have bailed out on the graphical user interface 902. In some implementations, updating the list 938 may involve displaying the player's score based on the multiplier value at that specific timestamp.

In some implementations, the data processing system 205 can use indicators on the graphical user interface 902 to show the multiplier value 936. These indicators can be used to show which multiplier values are applied to the player's initial wager on each client device 220. The data processing system 205 can use a color scheme to visually represent the indicators associated with the multiplier values 936. For example, "Red" color may indicate that the player failed to bail out, "Green" color may indicate that the player successfully had the multiplier value 936 applied, and "Yellow" color may indicate that the multiplier value 936 is in progress, among others. In some implementations, the data processing system 205 may also update the graphical user interface 902 to display a corresponding multiplier value 940 at the center top of the graphical user interface 902 of the player device (e.g., client device 220) when the rocket 934 explodes or is bailed out. The data processing system 205 can also associate the multiplier value 940 with the same coloring scheme, as described herein.

In some implementations, the data processing system 205 can transmit updates to each graphical user interface 902 (identified via the player's device identifier) to display the current status of each player participating in the game. The data processing system 205 may use a messaging system, implemented in various ways, such as web sockets, TCP sockets, or UDP sockets, to send messages to each graphical user interface 902 whenever the status of a player changes. For example, the data processing system 205 can send a message to the graphical user interface 902 whenever the player bails out, the rocket explodes, or the multiplier value changes. The graphical user interface 902 can then process the message and update its display accordingly. For example, if the graphical user interface 902 receives a message that the player has bailed out, the graphical user interface 902 can change the player's status to "Bailed out" and display the corresponding multiplier value. In some implementations, the list 938 on the graphical user interface 902 can also indicate the status of the players during gameplay using a pattern/shape-based indicator scheme. For example, active players may be displayed with a circle indicator, inactive players may be displayed with a square indicator, and players who have bailed out may be displayed with a triangle indicator.

Each play of the multiplayer game can have a predetermined number of rounds (in some implementations, the rounds and plays can be used interchangeably). To win a play of the game, the data processing system 205 may determine the score of each player for the predetermined number of rounds and identify the player with the highest score as the winner. After each round, which can be determined by when the last active rocket 934 either bails out or is exploded, the data processing system 205 updates the game state information 275 and determines the score of each player from the list 938 by looking up the names of the players and retrieving the corresponding score. The data processing system 205 then identifies players whose scores fall below a threshold and can advance to the subsequent round. In some implementations, the threshold may be a predetermined threshold. In some implementations, the threshold may be determined based on one or more factors, such as the number of players in the game, the number of players that have "bailed out" (e.g., were not eliminated) during the last round, or the number of players that were automatically eliminated in the last round. Once the players whose scores are below the threshold are identified, the data processing system 205 updates the graphical user interface 902 to restrict to ability of the players to interact further and advance the remaining players for subsequent rounds. In some implementations, rather than using a threshold, the data processing system 205 can eliminate a percentage of the players having the lowest scores relative to other participants in the game. For example, the data processing system 205 may eliminate the bottom-scoring 95% of the players each round. The data processing system 205 can update the graphical user interface 902 to reflect the players who have been selected for subsequent rounds in the list of players 938.

The data processing system 205 can keep track of the scores of all the players over a predetermined number of rounds until a termination condition for the game is satisfied. In one example, once all the players except one have been eliminated, the data processing system 205 can determine that the termination condition has been satisfied and identify the winner of the multiplayer game as the player who was not eliminated. The data processing system 205 can then update the game state information 275 to reflect the winner of game. The data processing system 205 can also update the graphical user interface 902 to provide feedback to the players, indicating that a termination condition has been satisfied. The feedback can include various sensory elements, such as visual, auditory, or tactile (e.g., haptic) feedback. The data processing system 205 can update the credit balance of the player profile 270 in response to the satisfaction of the termination condition.

In some implementations, the data processing system 205 can identify that a bonus condition has been satisfied based on the score of the winning player exceeding a predetermined threshold. Upon the bonus condition being satisfied, the data processing system 205 may provide one or more additional awards, including but not limited to an additional game play or a bonus award amount. The data processing system 205 can update the player profile 270 accordingly. The adjustment in the credit balance can be made based on the computed bonus award and the individual award amounts calculated for each outcome. In some implementations, the data processing system 205 can increase the credit balance in the player profile 270 by the sum of the bonus award amount and the award amount for each successful outcome. However, if the bonus award condition is not satisfied, resulting in a zero bonus award amount, the data processing system 205 can increase the credit balance only by the award amounts for the winning outcomes. In cases where the bonus award is credited to the player before the completion of the game, the data processing system 205 can update the credit balance of the player profile 270 by adding the award amounts for the winning outcomes to the credit balance.

Figure 10:
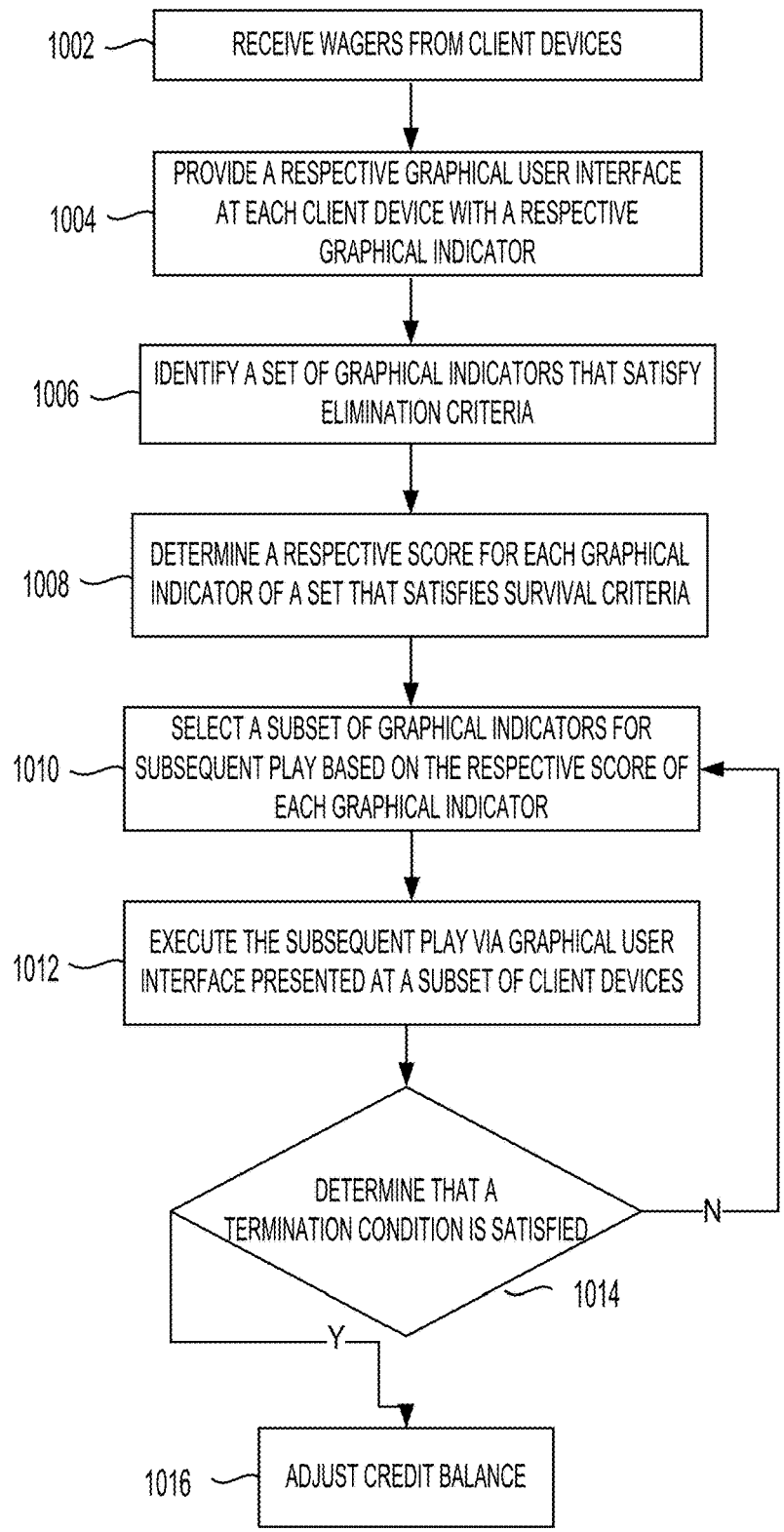
FIG. 10 depicts an example flow diagram of an example network application that may be accessed via network communication sessions established according to the techniques described herein, in accordance with one or more implementations.

Referring now to FIG. 10, depicted is an illustrative flow diagram of a method 1000 for providing a multiplayer ascending bet game. The method 1000 can be executed, performed, or otherwise carried out by a data processing system. A data processing system (e.g., the data processing system 205) can be remote to one to one or more client devices and communicate with the one or more client devices via a computer network. In a brief overview of method 1000, the gaming server can receive wagers from client devices (STEP 1002), present a respective graphical user interface at each client device with a respective graphical indicator (STEP 1004), identify a set of graphical indicators that satisfy elimination criteria (STEP 1006), determine a score for each graphical indicator of a set that satisfies survival criteria (STEP 1008), select a subset of graphical indicators for subsequent play based on the score of each graphical indicator (STEP 1010), execute the subsequent play via graphical user interface presented at a subset of client devices (STEP 1012), determine whether a termination condition has been satisfied (STEP 1014), and adjust the credit balance based on determining that the termination condition has been satisfied (STEP 1016).

In further detail of method 1000, the data processing system can receive wagers from client devices (STEP 1002). The wager can be received in one or more messages received from a client device. The message, or request, can indicate that a player intends to play a game provided by the data processing system. The message can include an indication of a player profile with which to access functionalities related to the game (e.g., placing wagers using earned credits, purchasing additional credits, etc.). The wager can be provided via a graphical user interface (e.g., the graphical user interface of FIG. 9A). The wager amounts provided can be a specified amount of credits, such as 2, 5, 95, 100, 500, or 1000 credits. In some implementations, the player can specify a custom number or fractional number of credits used in the game. Once the wager has been selected, the client device can transmit a request to place the wagers for the play of the game.

Upon receiving the wager, the data processing system can generate a respective graphical user interface at each client device with a respective graphical indicator (STEP 1004). In this example, multiple graphical indicators (shown here as the rockets) are displayed on the graphical user interface, as moving horizontally across the x-axis and ascending vertically along the y-axis on the graphical user interface. The data processing system can display a rocket for each participant in the multiplayer game on the graphical user interface. The rockets can be displayed in a variety of ways, such as in a row, column, or grid. The rockets can also be displayed in different colors or sizes to represent different aspects of the game, such as the player's current score, multiplier value, or status. In some implementations, the term "score" may sometimes be referred to herein as a "multiplier value" for a player. In some implementations, the movement of the graphical indicators (rockets) can correspond to automatic increases in the respective score multiplier value for each participant. The data processing system updates the position of each rocket on the graphical user interface whenever a player's score multiplier value changes or whenever the player makes progress in the game or loses the game.

In some implementations, the data processing system may use a timekeeping mechanism to determine the respective multiplier value of each player, which can then be used to determine where each rocket is horizontally on the client device as the data processing system updates the position of each of the rockets on the graphical user interface. The positions of each of the rockets are dynamically updated according to the multiplier values determined for each participant of the multiplayer game, such that the graphical user interface to dynamically shows the movement of the rockets during each round.

In some implementations, the data processing system can identify a set of graphical indicators that satisfy the elimination criteria for a play of the multiplayer ascending bet game (STEP 1006). The elimination criteria (or the termination condition in some implementations) may cause the data processing system to terminate the round (or automatically disqualify the player), without providing the player with an award (e.g., forfeiting the score for that round). Upon the data processing system detecting that the player has been disqualified during the round, the data processing system can update the graphical user interface to graphically represent the player losing the round. In this example (as shown in FIG. 9D), the data processing system has updated the graphical user interface to show the rocket exploding or bursting. In implementations where the player has won the play of the game (e.g., the bail button was interacted with), the data processing system can update the player profile with an indication that the player won the round.

In some implementations, the data processing system can generate a random score threshold for each player, which may be used to determine whether the player has lost the round (or automatically disqualified from the gameplay). In some implementations, the random score threshold for each player may be predetermined prior to the generation of the rocket(s). If, during the play of the game, the score is equal to or greater than the random score threshold, the data processing system can determine that the player has lost the round of the game and update the graphical user interface accordingly. In some implementations, the data processing system can determine the random score threshold value based on a variety of factors, such as the game mode, the player's level, or the current score, among others. For example, the data processing system can generate a random score threshold for each player that is equal to a multiple of the player's current score. In some implementations, the data processing system can generate a random score threshold for each player that is based on the amount of time that the player has allowed their score to increase during the round. If the score of the user exceeds the threshold, the data processing system updates the game state information. The graphical user interface is also updated to display a pre-rendered animation of a rocket exploding, as seen in FIG. 9D, which restricts the ability of the player whose rocket exploded to further interact with the graphical user interface. The data processing system updates the credit balance of the player profile accordingly.

In some implementations, the data processing system can determine the score for each player (e.g., satisfying the survival criteria) according to a non-linear function of elapsed time since the initiation of gameplay, thereby causing the score multiplier value to increase at an accelerated rate as time in the round increases (STEP 1008). The score multiplier value can be initialized at the start time of the round and can be incremented until an interaction is received by the data processing system, which causes the score multiplier value to stop increasing (e.g., represented by stopping the ascent of the corresponding rocket on the graphical user interface). A player can manually "bail out" their rocket (stop their score from incrementing) by interacting with the bail button. In some implementations, the player may bail out automatically under certain circumstances, as described herein. The data processing system can then determine the final score of the player for the round based on the multiplier value corresponding to the specific timestamp at which the rocket bailed out.

In some implementations, the data processing system can maintain a list of participating players during gameplay. The data processing system can update the list to indicate the status of each player participating in the multiplayer game. As the game progresses, certain predetermined events (e.g., based on the game instructions) may cause the data processing system to modify the list. For example, if a player bails out and ends their rocket's ascent or if a player is automatically disqualified/eliminated during the round, the data processing system can update the game state information accordingly and update the list to reflect that the corresponding player has been eliminated from the game. In some implementations, the update to the list of players may involve marking the player's status as inactive, ranking the players based on their scores, removing the players from the list, updating the graphical user interface to remove the rockets from the graphical user interface, or displaying the number of players that have bailed out on the graphical user interface. In some implementations, updating the list may involve displaying the player's score based on the multiplier value at that specific timestamp.

Each play of the multiplayer game can have a predetermined number of rounds (in some implementations, the rounds and plays can be used interchangeably). To win a play of the game, the data processing system may determine the score of each player for the predetermined number of rounds and identify the player with the highest score as the winner. After each round, which can be determined by when the last active rocket either bails out or is exploded, the data processing system updates the game state information and determines the score of each player from the list by looking up the names of the players and retrieving the corresponding score. The data processing system then identifies players whose scores fall below a threshold and can advance to the subsequent round (STEP 1010). In some implementations, the threshold may be a predetermined threshold. In some implementations, the threshold may be determined based on one or more factors, such as the number of players in the game, the number of players that have "bailed out" (e.g., were not eliminated) during the last round, or the number of players that were automatically eliminated in the last round. Once the players whose scores are below the threshold are identified, the data processing system updates the graphical user interface to restrict to ability of the players to interact further and advance the remaining players for subsequent rounds (STEP 1012). In some implementations, rather than using a threshold, the data processing system can eliminate a percentage of the players having the lowest scores relative to other participants in the game. For example, the data processing system may eliminate the bottom-scoring 95% of the players each round. The data processing system can update the graphical user interface to reflect the players who have been selected for subsequent rounds in the list of players.

The data processing system can keep track of the scores of all the players over a predetermined number of rounds until a termination condition for the game is satisfied (STEP 1014). In one example, once all the players except one have been eliminated, the data processing system can determine that the termination condition has been satisfied and identify the winner of the multiplayer game as the player who was not eliminated. The data processing system can then update the game state information to reflect the winner of game. The data processing system can also update the graphical user interface to provide feedback to the players, indicating that a termination condition has been satisfied. The feedback can include various sensory elements, such as visual, auditory, or tactile (e.g., haptic) feedback. The data processing system can update the credit balance of the player profile in response to the satisfaction of the termination condition (STEP 1016).

In some implementations, the data processing system can identify that a bonus condition has been satisfied based on the score of the winning player exceeding a predetermined threshold. Upon the bonus condition being satisfied, the data processing system may provide one or more additional awards, including but not limited to an additional game play or a bonus award amount. The data processing system can update the player profile accordingly. The adjustment in the credit balance can be made based on the computed bonus award and the individual award amounts calculated for each outcome. In some implementations, the data processing system can increase the credit balance in the player profile by the sum of the bonus award amount and the award amount for each successful outcome. However, if the bonus award condition is not satisfied, resulting in a zero bonus award amount, the data processing system can increase the credit balance only by the award amounts for the winning outcomes. In cases where the bonus award is credited to the player before the completion of the game, the data processing system can update the credit balance of the player profile by adding the award amounts for the winning outcomes to the credit balance.

At least one aspect of the present disclosure is directed to a system. The system can include one or more processors coupled to memory. The one or more processors may receive a plurality of wagers from a respective plurality of client devices to initiate a multiplayer game. The one or more processors may provide a respective graphical user interface having a graphical indicator for each client device associated with the respective plurality of client devices in response to initiating a first play of the multiplayer game. The one or more processors may identify a first set of graphical indicators that satisfy the elimination criteria from the respective plurality of graphical indicators based on a respective random value generated for each of the respective graphical indicators. The one or more processors may determine a respective score for each graphical indicator of a second set from the respective plurality of graphical indicators that satisfy survival criteria. The respective score is determined based on the start time of the first play of the multiplayer game and the time of a respective input at the respective client device of the respective plurality of client devices. The one or more processors may select a subset of the second set from the respective plurality of graphical indicators for a subsequent play of the multiplayer game. The selection is based on the respective score of each graphical indicator of the second set from the respective plurality of graphical indicators. The one or more processors may execute the subsequent play of the multiplayer game through a second respective graphical user interface, which is provided for presentation at a subset of the respective plurality of client devices corresponding to the subset of the second set of the respective plurality of graphical indicators.

In some implementations, the one or more processors may determine an outcome of the multiplayer game responsive to elimination of all but a winning graphical indicator of the respective plurality of graphical indicators. In some implementations, the one or more processors may determine a payout based on the outcome. In some implementations, the one or more processors may determine the respective score for each respective graphical indicator of the second set of the respective plurality of graphical indicators according to a non-linear function of time. In some implementations, the one or more processors may identify a second subset of the second set of the respective plurality of graphical indicators separate from the first subset of the second set of the respective plurality of graphical indicators based on the respective score of the second subset of graphical indicators being less than a threshold. In some implementations, the one or more processors may select the subset of the second set of the respective plurality of graphical indicators based on the respective scores of the subset of graphical indicators being greater than a threshold.

In some implementations, the one or more processors may determine a respective second score for each respective graphical indicator of the subset of the second set of the respective plurality of graphical indicators for the subsequent play. In some implementations, the one or more processors may cause the respective graphical user interface to present a rank for each respective graphical indicator of the subset of the second set of the respective plurality of graphical indicators determined based on the respective score and the respective second score. In some implementations, the one or more processors may adjust a credit balance based on an outcome of the subsequent play of the multiplayer game upon detecting a termination condition of the multiplayer game. In some implementations, the one or more processors may generate, for presentation at the respective plurality of client devices, in the respective graphical user interface, a list of profile identifiers corresponding to the second set of the respective plurality of graphical indicators. The one or more processors may also update the list of profile identifiers in the respective graphical user interface provided for presentation at the plurality of client devices based on the respective score of each respective graphical indicator of the second set of the respective plurality of graphical indicators.

At least one aspect of the present disclosure is directed to a method. The method can include receiving a plurality of wagers from a respective plurality of client devices to initiate a multiplayer game. The method can include providing a respective graphical user interface having a graphical indicator for each client device associated with the respective plurality of client devices in response to initiating a first play of the multiplayer game. The method can include identifying a first set of graphical indicators that satisfy the elimination criteria from the respective plurality of graphical indicators based on a respective random value generated for each of the respective graphical indicators. The method can include determining a respective score for each graphical indicator of a second set from the respective plurality of graphical indicators that satisfy survival criteria. The respective score is determined based on the start time of the first play of the multiplayer game and the time of a respective input at the respective client device of the respective plurality of client devices. The method can include selecting a subset of the second set from the respective plurality of graphical indicators for a subsequent play of the multiplayer game. The selection is based on the respective score of each graphical indicator of the second set from the respective plurality of graphical indicators. The method can include executing the subsequent play of the multiplayer game through a second respective graphical user interface, which is provided for presentation at a subset of the respective plurality of client devices corresponding to the subset of the second set of the respective plurality of graphical indicators.

The method can include determining an outcome of the multiplayer game responsive to elimination of all but a winning graphical indicator of the respective plurality of graphical indicators. The method can include determining a payout based on the outcome. The method can include determining the respective score for each respective graphical indicator of the second set of the respective plurality of graphical indicators according to a non-linear function of time. The method can include identifying a second subset of the second set of the respective plurality of graphical indicators separate from the first subset of the second set of the respective plurality of graphical indicators based on the respective score of the second subset of graphical indicators being less than a threshold. The method can include selecting the subset of the second set of the respective plurality of graphical indicators based on the respective scores of the subset of graphical indicators being greater than a threshold.

The method can include determining a respective second score for each respective graphical indicator of the subset of the second set of the respective plurality of graphical indicators for the subsequent play. The method can include causing the respective graphical user interface to present a rank for each respective graphical indicator of the subset of the second set of the respective plurality of graphical indicators determined based on the respective score and the respective second score. The method can include adjusting a credit balance based on an outcome of the subsequent play of the multiplayer game upon detecting a termination condition of the multiplayer game. The method can include generating for presentation at the respective plurality of client devices, in the respective graphical user interface, a list of profile identifiers corresponding to the second set of the respective plurality of graphical indicators. The method can also include updating the list of profile identifiers in the respective graphical user interface provided for presentation at the plurality of client devices based on the respective score of each respective graphical indicator of the second set of the respective plurality of graphical indicators.

Referring now to one example implementation of a timed inflation game, the data processing system 205 receives a wager and generates a graphical user interface. The graphical user interface presents a graphical indicator (e.g., a balloon) and a first interactive element, which updates the state of the graphical indicator to increase the score for the play. The data processing system 205 can determine when the interaction with the first element has ceased and initiate a timer to count the passage of time to an expiration threshold. During the timer's runtime, the graphical user interface is updated to present a second interactive element. In response to interaction with the second interactive element, the data processing system 205 can terminate the play of the game and adjust a credit balance based on the wager and the score for the play of the game. The data processing system 205 can update and display updated information (e.g., the number of inflations, the score increased on each inflation, the timer initiations, etc.) on the graphical user interface. Example graphical user interfaces showing an example implementation of a timed inflation game are shown in FIGS. 11A-11F.

Figure 11A:
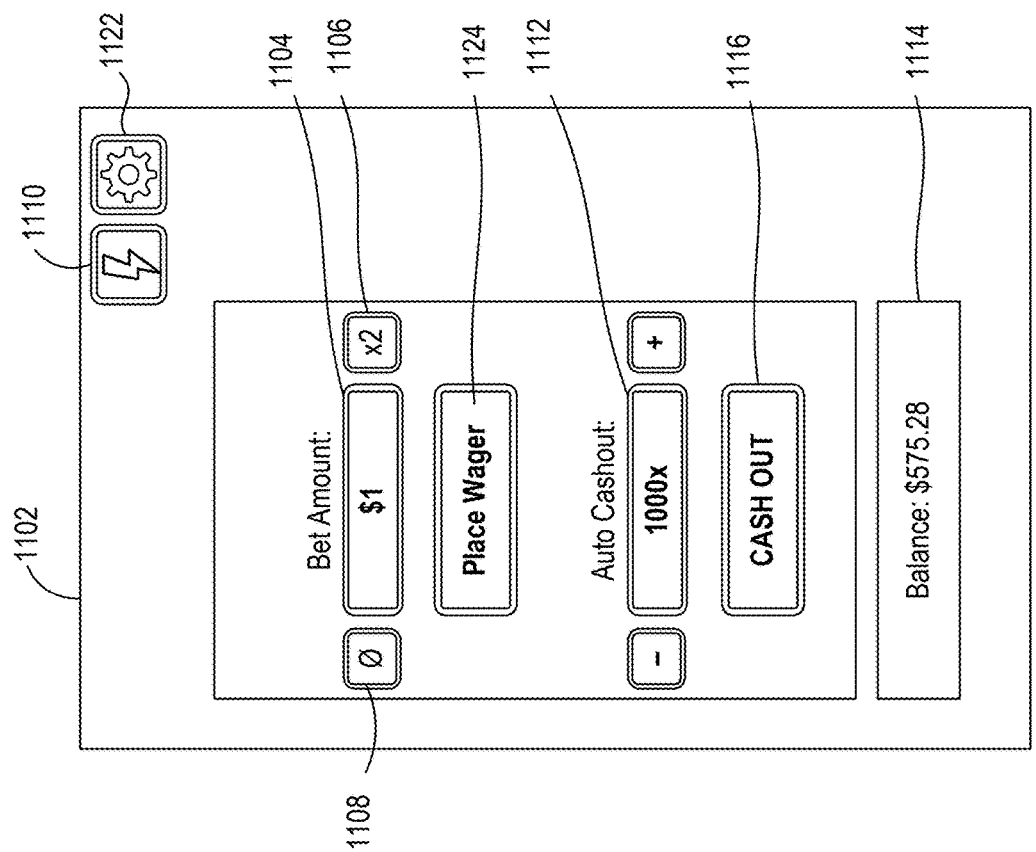

Referring now to FIG. 11A in the context of the components described in connection with FIG. 2, a graphical user interface 1102 is presented on a client device 220 for initiating a play of the timed inflation game. As discussed above, the device communicator 230 facilitates communication between the client device 220 and the data processing system 205, allowing players to interact with a graphical user interface 1102 and transmit their actions to the data processing system 205. As players engage with the graphical user interface 1102, their actions, such as placing bets or initiating the game, may be captured and stored in their player profile 270.

As shown on the graphical user interface 1102, a player can interact with a bet amount button 1104 that enables the player to specify the amount of the wager. A multiplier button 1106 is present that, when interacted with, can cause the bet amount to be updated to double the value of the player's wager. The graphical user interface 1102 can display a clear button 1108 that, when interacted with, may cause the wager to be reset (e.g., removed or erased). In some implementations, the graphical user interface 1102 can be updated via the clear button 1108 to reset the wager amount to a default value. In some implementations, the graphical user interface 1102 may display a lightning bolt button 1110 (or the graphical user interface 1102 may include other indicators in some implementations) that can cause the data processing system 205 to alter the animation speeds in response to an interaction with the lightning bolt button 1110. The lightning bolt button 1110 can be toggled on or off by the player during the gameplay. The animation speeds may be modified to increase or decrease the amount of time taken to update the game state. In some implementations, the graphical user interface 1102 can display a separate slider/interactive element that enables the player to select the rate at which their score increases (e.g., the rate at which the balloon is shown inflating). In some implementations, the lightning bolt button 1110 can be a part of the manual bet interface to allow manual control of the speed of the game.

Players can also select a multiplier for auto-cashout by interacting with an auto-cashout button 1112. Once the selected multiplier value is reached, the data processing system 205 will automatically cash out the player, as described herein. In some implementations, a player can increase or decrease the multiplier value by interacting with the plus or minus signs indicated on the auto-cashout button 1112. In some implementations, a player can manually enter the multiplier value. However, if no value is entered, the data processing system 205 can default the multiplier value to a predetermined maximum value (e.g., 1000×), as shown. A balance region 1114 displays the amount of credits available for the player to wager on the game. The amount shown in the balance region 1114 may be determined from the credit balance specified in the player profile 270 of the player. The balance region 1114 may be updated in response to interactions with the bet amount button 1104. A cash out button 1116 is present that, when interacted with, causes the data processing system 205 to update the player profile 270 and cash out the player.

Player can interact with a wager button 1124 to place a wager for the play of the game. The wager information is then transmitted from the client device 220 to the data processing system 205. The data processing system 205 receives and processes the wagers, incorporating them into the game logic. The player profile 270 is also updated with the wager information. Players can also initiate the game by interacting with the wager button 1124. This interaction causes the data processing system 205 to update the graphical user interface 1102 and present a graphical indicator 1134 (one or more graphical indicators 1134 in some implementations), as shown in connection with FIG. 11B.

Figure 11B:
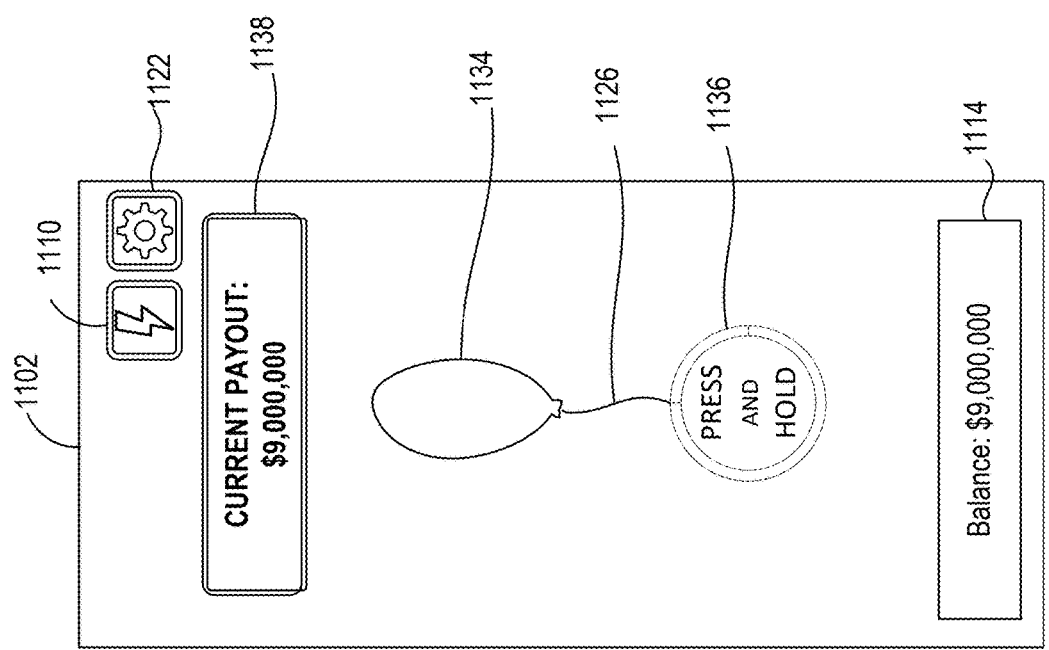

Referring now to FIG. 11B, in the context of the components described in connection with FIG. 2, an updated graphical user interface 1102 is presented on the client device 220 in response to an interaction with the wager button 1124 shown in FIG. 11A. A graphical representation of a balloon 1134 is displayed with an interactive press-and-hold button 1136 on the graphical user interface 1102. The balloon 1134 is shown as connected to the interactive press-and-hold button 1136 on the graphical user interface 1102 via a virtual string 1126. In this example, the graphical indicator 1134 is shown as a balloon for illustrative purposes. However, in some implementations, the player can select different graphical indicator designs or shapes using a settings button 1122, which updates the graphical user interface 1102 to a second graphical user interface that presents the selectable graphical indicators 1134.

In response to receiving an interaction with the press-and-hold button 1136, the data processing system updates the game state information 275 and starts inflating the graphical representation of the balloon 1134. The data processing system 205 inflates the graphical representation of the balloon 1134 by increasing the size (or state) of the graphical representation of the balloon 1134 according to the increase in score. Inflation levels are a measure of how much the graphical representation of the balloon 1134 has been inflated. They can be represented by a number ranging from 0 to 1, where 0 (or any predefined endpoint) represents a completely deflated balloon and 1 (or any predefined endpoint) represents a fully inflated balloon. In some implementations, the inflation levels can be calculated based on the player's score. The data processing system 205 continues to inflate the graphical representation of the balloon 1134 until the player releases the press-and-hold button 1136.

A score for the balloon 1134 can be determined based on the wager selected and the multiplier values associated with different inflation levels. In some implementations, the score can be based on the start time of the play and the multiplier value associated with the inflation level at the time of cashing out, as described herein. In some implementations, the data processing system 205 can associate a predetermined multiplier value (e.g., based on the game instructions 280) with the inflation of the balloon 1134, and the multiplier value (or the computed score in general) can be used to determine how much the size of the graphical representation of the balloon 1134 increases each time the press-and-hold button 1136 is interacted with. Different multiplier values can be associated with different inflation levels. For example, a higher multiplier value can be associated with a higher inflation rate. The data processing system 205 can dynamically adjust the multiplier value based on the player's performance or other factors. The graphical user interface 1102 and the corresponding game state information 275 are updated every time the data processing system 205 receives an interaction with the press-and-hold button 1136. The graphical user interface 1102 is updated to display the current payout 1138, corresponding to the current inflation level of the balloon 1134. The current payout 1138 can be calculated based on the current inflation level of the balloon 1134 and the predetermined multiplier value associated with the inflation level. When the data processing system 205 identifies that the player has stopped interacting with the press-and-hold button 1136, the graphical user interface 1102 is dynamically updated to transform the press-and-hold button 1136 into a timer 1140, as shown in connection with FIG. 11C.

Figure 11C:
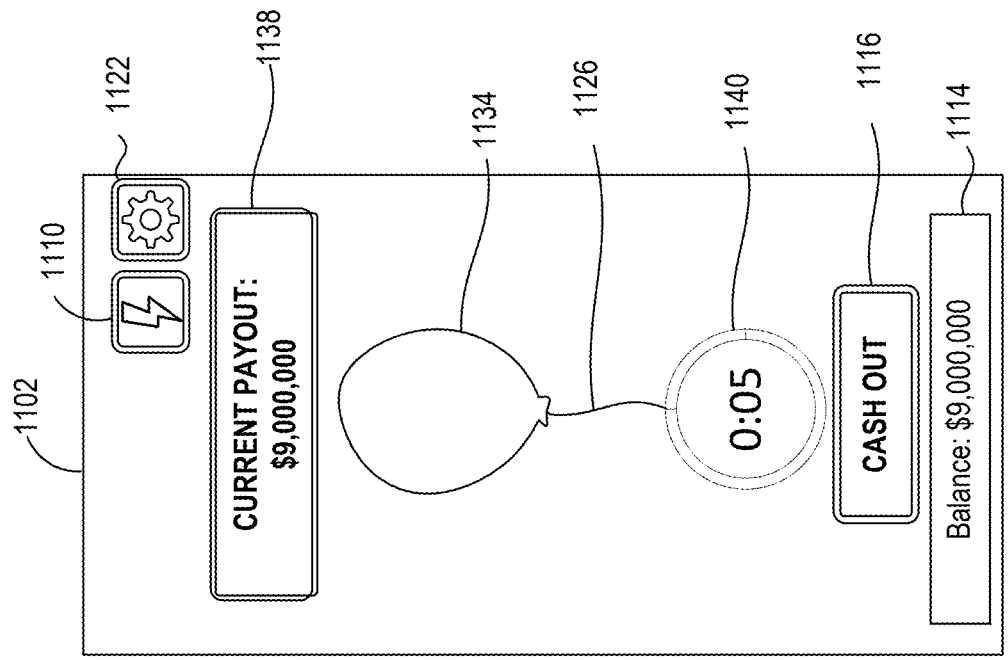

Referring now to FIG. 11C, in the context of the components described in connection with FIG. 2, an updated graphical user interface 1102 is presented on the client device 220 in response to the cessation of inflation of the balloon 1134. Upon identifying that the player has ceased interacting with the press-and-hold button 1136, the data processing system 205 initiates a transformation of the press-and-hold button 1136 into a timer 1140. The timer 1140 begins to decrement from a predetermined expiration threshold (based on the game instructions 280 or user preferences), effectively starting a countdown. The graphical user interface 1102 is also updated to present the cash out button 1116, with which the player can interact to manually cash out the current payout 1138, or the data processing system 205 will automatically cash out the player if no interaction is received from the player (e.g., when the timer 1140 expires). The player profile 270 is updated accordingly. In some implementations, the data processing system 205 can update the graphical user interface 1102 and initiate inflating the balloon 1134 again (or updating the state of the balloon 1134) if the data processing system 205 receives an interaction with the timer 1140 before its expiration. Upon detecting such interaction, the graphical user interface 1102 is updated to transform the timer 1140 into the press-and-hold button 1136. The graphical user interface 1102 can then be updated to remove the cash-out button 1116 in response to the interaction with the timer 1140.

The data processing system 205 can increment the score as described herein as the player interacts with the press-and-hold button 1136, which may be graphical represented by showing the balloon 1134 inflate on the graphical user interface 1102. The score can continue to increment until a player manually cashes out, the data processing system 205 automatically initiates a cash-out based on predetermined criteria, the timer 1140 expires, or the data processing system 205 generates a random score threshold in accordance with the game instructions 280 and causes the balloon 1134 to pop upon its score exceeding the random score threshold, as shown in connection with FIG. 11D.

Figure 11D:
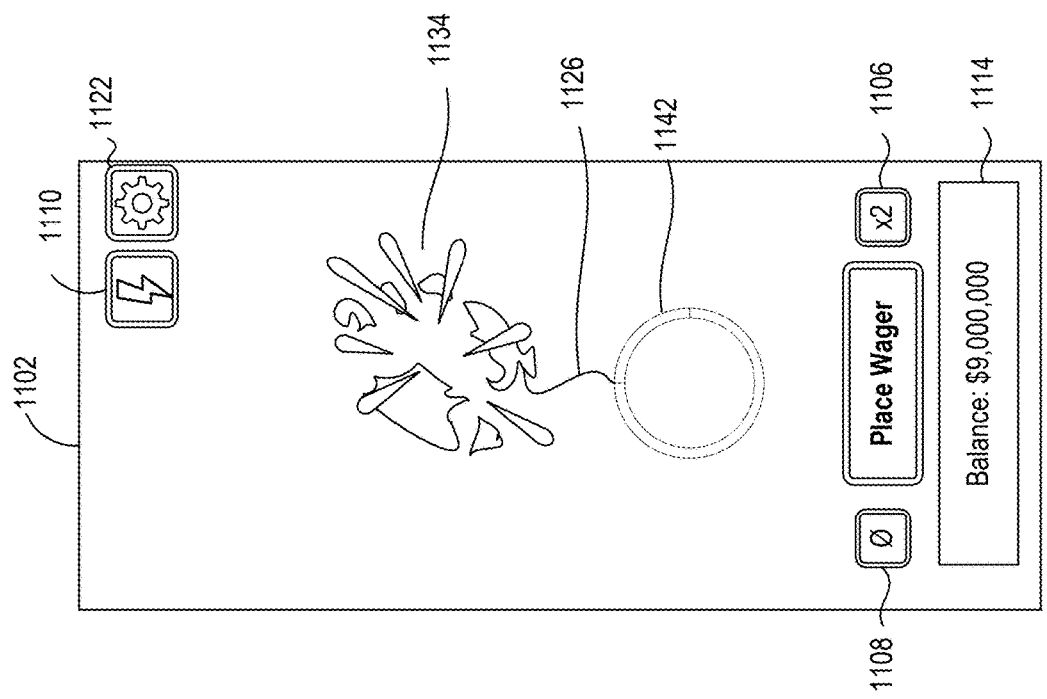

Referring now to FIG. 11D, in the context of the components described in connection with FIG. 2, an updated graphical user interface 1102 is presented on the client device 220 depicting a termination condition. The termination condition may cause the data processing system 205 to terminate the play of the game, without providing the player with an award (e.g., the player loses the game). Upon the data processing system 205 detecting that the player has lost the game, the data processing system 205 can update the graphical user interface 1102 to graphically represent the player losing the game. In this example, the data processing system 205 has updated the graphical user interface 1102 to show the balloon 1134 popping. In implementations where the player has won the game (e.g., the cash out button 1116 was interacted with, the timer 1140 expired, etc.), the data processing system 205 can update the player profile 270 with an indication that the player won the game.

In some implementations, the data processing system 205 can generate a random score threshold, which may be used to determine whether the player has lost the play of the game. In some implementations, the random score threshold can be predetermined prior to presenting the balloon 1134 on the graphical user interface 1102. If, during the play of the game, the score is equal to or greater than the random score threshold, the data processing system 205 can determine that the player has lost the play of the game and update the graphical user interface 1102 accordingly. In some implementations, the data processing system 205 can determine the random score threshold based on a variety of factors, such as the game mode, the player's level, or the current score, among others. Once the balloon 1134 pops, the data processing system 205 updates the game state information 275. The graphical user interface 1102 is also updated to display a pre-rendered animation of the balloon 1134 popping, which causes the data processing system 205 to update the credit balance of the player profile 270. The graphical user interface 1102 is updated to transform the press-and-hold button 1136 into a non-interactive button 1142, which restricts the ability of the player to further interact with the press-and-hold button 1136. The data processing system 205 updates the credit balance of the player profile 2701 accordingly.

Figure 11E:
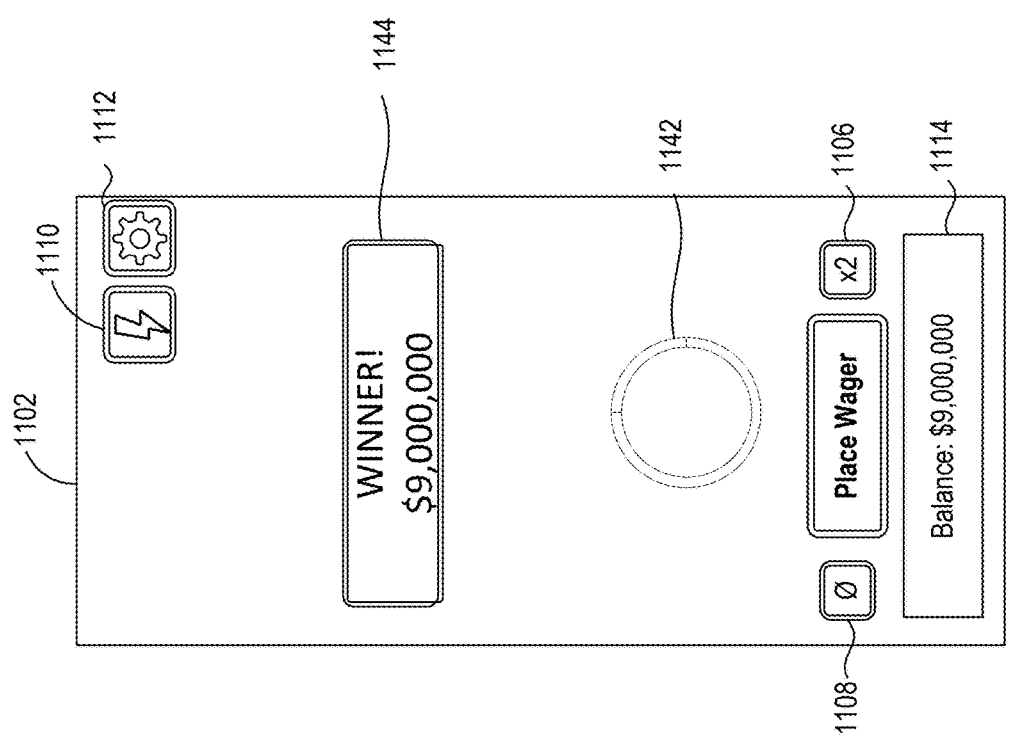

Referring now to FIG. 11E, in the context of the components described in connection with FIG. 2, an updated graphical user interface 1102 is presented on the client device 220 depicting a win condition. In some implementations, the termination condition (or the game condition in general) may correspond to a win condition that is satisfied when the score of the balloon 1134, determined based on the initial wager and multiplier value associated with the inflation levels of the balloon 1134, reaches a predetermined score threshold, as shown in connection with FIG. 11F. The predetermined score threshold can be based on a variety of factors, such as the difficulty level of the game or the multiplier value associated with the balloon 1134, among others. When the win condition is satisfied (e.g., the player has won the game by interacting with the cash out button 1116 or by waiting for the time 1140 to expire), the data processing system 205 can update graphical user interface 1102 to transform the press-and-hold button 1136 to a non-interactive button 1142 and remove the balloon 1134. The data processing system 205 can also update the graphical user interface 1102 to provide a notification 1144 (or feedback in general) to the players, indicating that the win condition has been satisfied. The notification 1144, which also includes the award amount, is displayed in the center of the graphical user interface 1102. The general feedback can include various sensory elements, such as visual, auditory, or tactile (e.g., haptic) feedback. The data processing system 205 can update the credit balance of the player profile 270 in response to the satisfaction of the win condition.

Referring now to FIG. 11F, in the context of the components described in connection with FIG. 2, an updated graphical user interface 1102 is presented on the client device 220 depicting multiple graphical indicators 1134. In some implementations, the inflation game may involve interactions with multiple graphical indicators 1134, shown here as balloons 1134. This game mode can be provided as an alternative to the single balloon game. In this game mode, each of the graphical indicators 1134 (e.g., a balloon in this example) can correspond to a respective wager. The number of balloons 1134 can be predetermined based on the game instructions 280 or user preferences. In some implementations, the player can inflate each balloon 1134 individually by pressing the corresponding press-and-hold button 1136, as shown on the graphical user interface 1102. The score for each balloon 1134 may increase at the same rate, and the player can cash out for each balloon 1134 individually or for all balloons 1134 at once. In some implementations, the player can inflate all balloons 1134 at the same time by pressing the single press-and-hold button 1136. The score for all balloons 1134 may increase at the same rate, and the player can cash out for all balloons at once.

The score for each balloon 1134 can increase as the player interacts with the corresponding press-and-hold button 1136 or the single press-and-hold button 1136. The specific formula used to calculate the score increase may vary based on the game instructions 280, but it can generally be based on a linear or logarithmic relationship between the player's interaction with the button 1136 and the score increase. For example, the score for each balloon 1134 may be increased by a predetermined value (e.g., 1 point) each time the player interacts with the corresponding press-and-hold button 1136 or the single press-and-hold button 1136. In this example, the score would increase by the same amount for each balloon 1134, regardless of which balloon 1134 is being inflated. The player can cash out at any time to receive a payout based on the current score of each balloon 1134. The payout can be proportional to the score of the balloon 1134, so the higher the score, the greater the payout.

In some implementations, the rate at which the score for each balloon increases may be specific to the respective balloon 1134. For example, the score for one balloon 1134 may increase slower than the score for another balloon 1134. In such implementations, each balloon 1134 can be assigned a different predetermined rate at the start of the game. For example, one balloon 1134 might have a score increase rate of 1 point per second, while another balloon might have a score increase rate of 11 points per second. In some implementations, the data processing system 205 can generate a score threshold for each of the balloons 1134 (e.g., using a random number generator that generates numbers within a predetermined threshold range, randomly selecting from a table of thresholds, etc.). If the score of one or more of the balloons 1134 exceeds the respective random score threshold, the data processing system 205 pops the respective balloon(s) 1134. The data processing system 205 then updates the game state information 275 and the graphical user interface 1102 to reflect the popped balloon(s). Each of the balloons 1134 can have its own timer 1140 that starts decrementing in response to the cessation of interaction with the press-and-hold button 1136. In some implementations, there can be a single timer 1140 for all the balloons 1134.

In some implementations, the gameplay can include a multiplayer version where the graphical user interface 1102 displays multiple balloons 1134, each corresponding to a specific client device 220. The gameplay can include a predetermined number of rounds based on the game instructions 280. After each round, the data processing system 205 compares the score of each player to a predetermined score threshold. The data processing system 205 then updates the graphical user interface 1102 to remove the balloons whose scores fall below the predetermined score threshold. The remaining players progress to the next round. This process continues until all balloons except one are left on the graphical user interface 1102 (satisfying the termination condition in some implementations), upon which the graphical user interface 1102 can be updated to display the winning player. The data processing system updates the credit balance of the player profile 270 accordingly.

In some implementations, the data processing system 205 can identify that a bonus condition has been satisfied based on the score of balloon 1134 exceeding a predetermined threshold. Upon the bonus condition being satisfied, the data processing system 205 may provide one or more additional awards, including but not limited to an additional game play or a bonus award amount. In some implementations, the bonus threshold can be displayed to the player on the graphical user interface 1102. The data processing system 205 can update the player profile 270 accordingly. The adjustment in the credit balance can be made based on the computed bonus award and the individual award amounts calculated for each outcome. In some implementations, the data processing system 205 can increase the credit balance in the player profile 270 by the sum of the bonus award amount and the award amount for each successful outcome. However, if the bonus award condition is not satisfied, resulting in a zero bonus award amount, the data processing system 205 can increase the credit balance only by the award amounts for the winning outcomes. In cases where the bonus award is credited to the player before the completion of the game, the data processing system 205 can update the credit balance of the player profile 270 by adding the award amounts for the winning outcomes to the credit balance.

Figure 12:
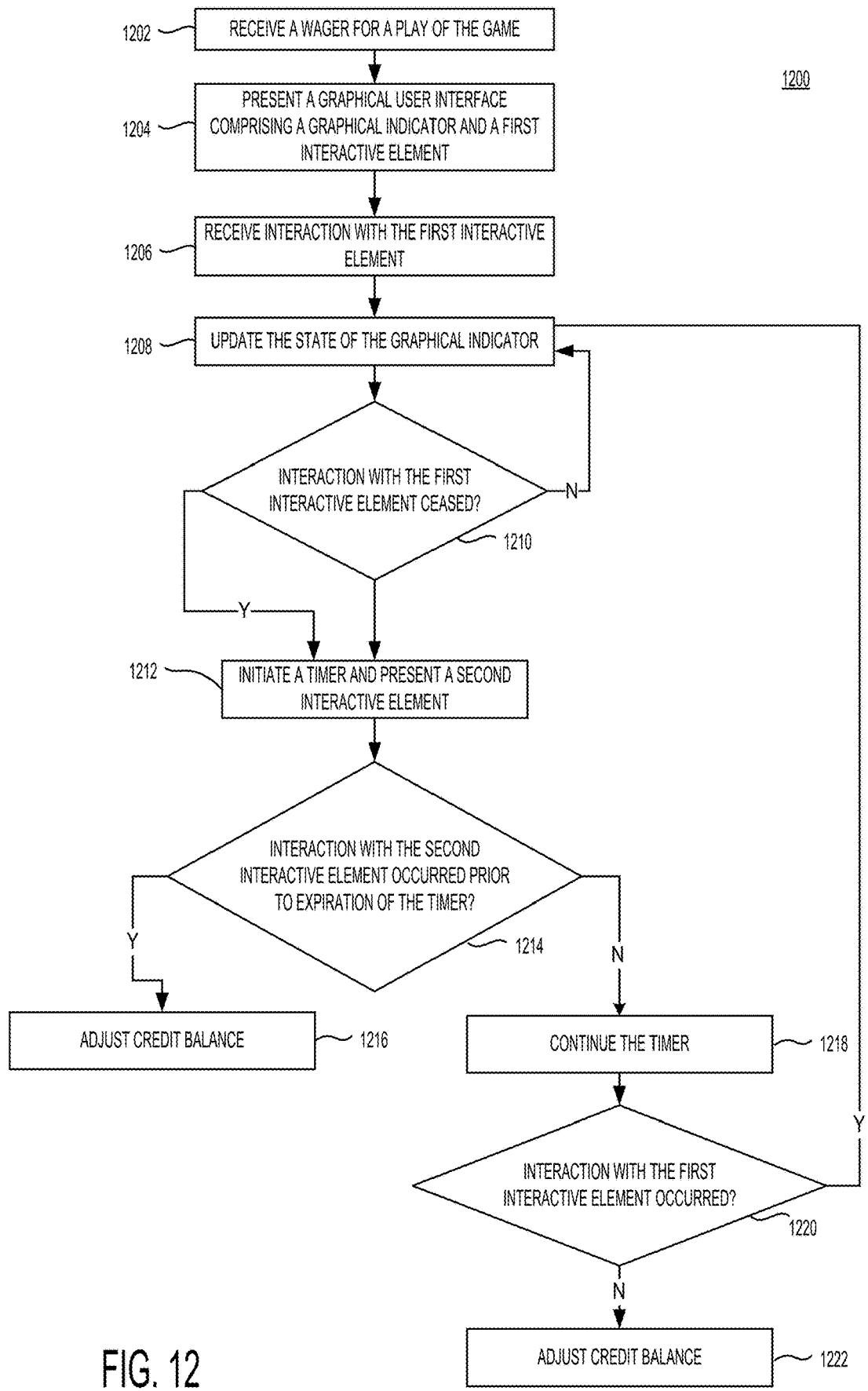
FIG. 12 depicts an example flow diagram of an example network application that may be accessed via network communication sessions established according to the techniques described herein, in accordance with one or more implementations.

Referring now to FIG. 12, depicted is an illustrative flow diagram of a method 1200 for providing a timed inflation game. The method 1200 can be executed, performed, or otherwise carried out by a data processing system. A data processing system (e.g., the data processing system 205) can be remote to one to one or more client devices and communicate with the one or more client devices via a computer network. In some implementations, the operations of method 1200 can be performed by a standalone gaming device (e.g., without communicating with a gaming server to perform the method steps). In a brief overview of method 1200, the gaming server can receive a wager (STEP 1202), generate a graphical user interface having a graphical indicator and a first interactive element (STEP 1204), receive interaction with the first interactive elements (STEP 1206), update the state of the graphical indicator (STEP 1208), determine whether the interaction with the first interactive element has ceased (STEP 1210), initiate a timer and present a second interactive element if the interaction with the first interactive element has ceased (STEP 1212), determine whether the interaction with the second interactive element has occurred prior to the expiration of the timer (STEP 1214), adjust the credit balance if the interaction with the second interactive element has occurred (STEP 1216), otherwise, continue the timer (STEP 1218), determine whether the interaction with the first interactive element has occurred (STEP 1220), and adjust the credit balance if the interaction with the first interactive element has occurred (STEP 1222).

In further detail of method 1200, the data processing system can receive a wager for a play of the game (STEP 1202). The wager can be received in one or more messages received from a client device. The message, or request, can indicate that a player intends to play a game provided by the data processing system. The message can include an indication of a player profile with which to access functionalities related to the game (e.g., placing wagers using earned credits, purchasing additional credits, etc.). The wager can be provided via a graphical user interface (e.g., the graphical user interface of FIG. 11A). The wager amounts provided can be a specified amount of credits, such as 1, 5, 115, 100, 500, or 1000 credits. In some implementations, the player can specify a custom number or fractional number of credits used in the game. Once the wager has been selected, the client device can transmit a request to place the wagers for the play of the game.

Upon receiving the wager, the data processing system can generate a graphical user interface having a graphical indicator and a first interactive element (STEP 1204). As shown in FIG. 11B, a graphical representation of a balloon is displayed with an interactive press-and-hold button on the graphical user interface. The balloon is shown as connected to the interactive press-and-hold button on the graphical user interface via a virtual string. In this example, the graphical indicator is shown as a balloon for illustrative purposes. However, in some implementations, the player can select different graphical indicator designs or shapes using a settings button, which updates the graphical user interface to a second graphical user interface that presents the selectable graphical indicators.

In some implementations, in response to receiving an interaction with the press-and-hold button (STEP 1206), the data processing system updates the game state information and starts inflating the graphical representation of the balloon. The data processing system inflates the graphical representation of the balloon by increasing the size (or state) of the graphical representation of the balloon according to the increase in score (STEP 1208). Inflation levels are a measure of how much the graphical representation of the balloon has been inflated. They can be represented by a number ranging from 0 to 1, where 0 (or any predefined endpoint) represents a completely deflated balloon and 1 (or any predefined endpoint) represents a fully inflated balloon. In some implementations, the inflation levels can be calculated based on the player's score. The data processing system continues to inflate the graphical representation of the balloon until the player releases the press-and-hold button.

A score for the balloon can be determined based on the wager selected and the multiplier values associated with different inflation levels. In some implementations, the score can be based on the start time of the play and the multiplier value associated with the inflation level at the time of cashing out, as described herein. In some implementations, the data processing system can associate a predetermined multiplier value (e.g., based on the game instructions) with the inflation of the balloon, and the multiplier value (or the computed score in general) can be used to determine how much the size of the graphical representation of the balloon increases each time the press-and-hold button is interacted with. Different multiplier values can be associated with different inflation levels. For example, a higher multiplier value can be associated with a higher inflation rate. The data processing system can dynamically adjust the multiplier value based on the player's performance or other factors. The graphical user interface and the corresponding game state information are updated every time the data processing system receives an interaction with the press-and-hold button. The graphical user interface is updated to display the current payout, corresponding to the current inflation level of the balloon. The current payout can be calculated based on the current inflation level of the balloon and the predetermined multiplier value associated with the inflation level.

When the data processing system identifies that the player has stopped interacting with the press-and-hold button (STEP 1210), the graphical user interface is dynamically updated to present a cash out button and transform the press-and-hold button into a timer, as shown in connection with FIG. 11C (STEP 1212). The timer begins to decrement from a predetermined expiration threshold (based on the game instructions or user preferences), effectively starting a countdown. As described herein, the graphical user interface is also updated to present the cash out button, with which the player can interact to manually cash out the current payout (STEP 1216). In some implementations, the data processing system can continue the timer if the player has not interacted with the cash out button (STEP 1218). If no interaction is received from the player (e.g., when the timer expires), the data processing system will automatically cash out the player (STEP 1220). The player profile is updated accordingly (STEP 1222).

In some implementations, the data processing system can update the graphical user interface and initiate inflating the balloon again (or updating the state of the balloon) if the data processing system receives an interaction with the timer before its expiration. Upon detecting such interaction, the graphical user interface is updated to transform the timer into the press-and-hold button. The graphical user interface can then be updated to remove the cash-out button in response to the interaction with the timer.

In some implementations, the data processing system can generate a random score threshold, which may be used to determine whether the player has lost the play of the game. In some implementations, the random score threshold can be predetermined prior to presenting the balloon on the graphical user interface. If, during the play of the game, the score is equal to or greater than the random score threshold, the data processing system can determine that the player has lost the play of the game and update the graphical user interface accordingly. In some implementations, the data processing system can determine the random score threshold based on a variety of factors, such as the game mode, the player's level, or the current score, among others. Once the balloon pops, the data processing system updates the game state information. The graphical user interface is also updated to display a pre-rendered animation of the balloon popping, which causes the data processing system to update the credit balance of the player profile. The graphical user interface is updated to transform the press-and-hold button into a non-interactive button, which restricts the ability of the player to further interact with the press-and-hold button. The data processing system updates the credit balance of the player profile accordingly. In some implementations, the termination condition (or the game condition in general) may correspond to a win condition that is satisfied when the score of the balloon, determined based on the initial wager and multiplier value associated with the inflation levels of the balloon, reaches a predetermined score threshold, as shown in connection with FIG. 11F.

In some implementations, the inflation game may involve interactions with multiple graphical indicators, shown here as balloons. This game mode can be provided as an alternative to the single balloon game. In this game mode, each of the graphical indicators (e.g., a balloon in this example) can correspond to a respective wager. The number of balloons can be predetermined based on the game instructions or user preferences. In some implementations, the player can inflate each balloon individually by pressing the corresponding press-and-hold button. The score for each balloon may increase at the same rate, and the player can cash out for each balloon individually or for all balloons at once. In some implementations, the player can inflate all balloons at the same time by pressing the single press-and-hold button. The score for all balloons may increase at the same rate, and the player can cash out for all balloons at once. The score for each balloon can increase as the player interacts with the corresponding press-and-hold button or the single press-and-hold button. The specific formula used to calculate the score increase may vary based on the game instructions, but it can generally be based on a linear or logarithmic relationship between the player's interaction with the button and the score increase.

In some implementations, the gameplay can include a multiplayer version where the graphical user interface displays multiple balloons, each corresponding to a specific client device. The gameplay can include a predetermined number of rounds based on the game instructions. After each round, the data processing system compares the score of each player to a predetermined score threshold. The data processing system then updates the graphical user interface to remove the balloons whose scores fall below the predetermined score threshold. The remaining players progress to the next round. This process continues until all balloons except one are left on the graphical user interface (satisfying the termination condition in some implementations), upon which the graphical user interface can be updated to display the winning player. The data processing system updates the credit balance of the player profile accordingly.

In some implementations, the data processing system can identify that a bonus condition has been satisfied based on the score of balloon exceeding a predetermined threshold. Upon the bonus condition being satisfied, the data processing system may provide one or more additional awards, including but not limited to an additional game play or a bonus award amount. In some implementations, the bonus threshold can be displayed to the player on the graphical user interface. The data processing system can update the player profile accordingly. The adjustment in the credit balance can be made based on the computed bonus award and the individual award amounts calculated for each outcome. In some implementations, the data processing system can increase the credit balance in the player profile by the sum of the bonus award amount and the award amount for each successful outcome. However, if the bonus award condition is not satisfied, resulting in a zero bonus award amount, the data processing system can increase the credit balance only by the award amounts for the winning outcomes. In cases where the bonus award is credited to the player before the completion of the game, the data processing system can update the credit balance of the player profile by adding the award amounts for the winning outcomes to the credit balance.

At least one aspect of the present disclosure is directed to a system. The system can include one or more processors coupled to memory. The one or more processors may receive a wager for a play of a game. Upon receiving the wager, the one or more processors cause presentation of a graphical user interface, including a graphical indicator representing a score for the play of the game and a first interactive element that, when interacted with, may cause the score for the play of the game to be updated. In response to a first interaction with the first interactive element, the one or more processors may update a state of the graphical indicator to increase the score for the play of the game. In response to determining that the first interaction with the first interactive element has ceased, the one or more processors may initiate a timer to count the passage of time to an expiration threshold and cause the graphical user interface to present a second interactive element that, when interacted with, may cause the play of the game to terminate. In response to a second interaction with the second interactive element prior to the expiration of the timer, the one or more processors may adjust a credit balance based on the wager and the score of the play of the game.

In some implementations, the one or more processors may cause the graphical user interface to reset the timer responsive to a third interaction with the first interactive element. In some implementations, the one or more processors may cause the graphical user interface to present a plurality of graphical indicators, with each graphical indicator of the plurality of graphical indicators corresponding to a respective wager. Each graphical indicator of the plurality of graphical indicators can be associated with a respective indicator score. In some implementations, the one or more processors may generate a respective random score threshold for each graphical indicator of the plurality of graphical indicators. The one or more processors may identify a first subset of the plurality of graphical indicators having the respective indicator score greater than the respective random score threshold. The one or more processors may update the graphical user interface based on the respective indicator score of each graphical indicator of the first subset of the plurality of graphical indicators. In some implementations, the one or more processors may select a second subset of the plurality of graphical indicators having the respective indicator score less than the respective random score threshold. The second subset may include the graphical indicator. The one or more processors may adjust the credit balance based on the respective wager and the respective indicator score of each graphical indicator of the second subset of the plurality of graphical indicators in response to the termination of the play of the game.

In some implementations, the one or more processors may cause the graphical user interface to generate a respective interactive element for each graphical indicator of the plurality of graphical indicators in response to determining that the first interaction with the first interactive element has ceased. The respective interactive element, when interacted with, may cause the one or more processors to adjust the credit balance based on the respective indicator score of the graphical indicator of the plurality of graphical indicators to which the respective interactive element corresponds. In some implementations, the one or more processors may increase a size of the graphical indicator based on the score of the play of the game. In some implementations, the one or more processors may determine that a bonus condition has been satisfied in response to the score for the play of the game exceeding a threshold and adjust the credit balance in response to determining that the bonus condition has been satisfied.

In some implementations, the one or more processors may receive a second wager for a second play of the game. Upon receiving the second wager, the one or more processors may cause presentation of a second graphical user interface for the second play of the game. The second graphical user interface may include a second graphical indicator, with the second graphical indicator corresponding to a second indicator score. The one or more processors update the second indicator score in response to the first interaction with the first interactive element. Upon determining that the second indicator score exceeds a random score threshold, the one or more processors generate a notification for display, with the notification indicating the second wager for the second play of the game has been lost. In some implementations, the one or more processors may adjust the expiration threshold of the timer based on a user selection.

At least one aspect of the present disclosure is directed to a method. The method can include receiving a wager for a play of a game. Upon receiving the wager, the method can include causing presentation of a graphical user interface, including a graphical indicator representing a score for the play of the game and a first interactive element that, when interacted with, may cause the score for the play of the game to be updated. In response to a first interaction with the first interactive element, the method can include updating a state of the graphical indicator to increase the score for the play of the game. In response to determining that the first interaction with the first interactive element has ceased, the method can include initiating a timer to count the passage of time to an expiration threshold and causing the graphical user interface to present a second interactive element that, when interacted with, may cause the play of the game to terminate. In response to a second interaction with the second interactive element prior to the expiration of the timer, the method can include adjusting a credit balance based on the wager and the score of the play of the game.

The method can include causing the graphical user interface to reset the timer responsive to a third interaction with the first interactive element. The method can include causing the graphical user interface to present a plurality of graphical indicators, with each graphical indicator of the plurality of graphical indicators corresponding to a respective wager. Each graphical indicator of the plurality of graphical indicators can be associated with a respective indicator score. The method can include generating a respective random score threshold for each graphical indicator of the plurality of graphical indicators. The method can include identifying a first subset of the plurality of graphical indicators having the respective indicator score greater than the respective random score threshold. The method can include updating the graphical user interface based on the respective indicator score of each graphical indicator of the first subset of the plurality of graphical indicators.

The method can include selecting a second subset of the plurality of graphical indicators having the respective indicator score less than the respective random score threshold. The second subset may include the graphical indicator. The method can include adjusting the credit balance based on the respective wager and the respective indicator score of each graphical indicator of the second subset of the plurality of graphical indicators in response to the termination of the play of the game. The method can include causing the graphical user interface to generate a respective interactive element for each graphical indicator of the plurality of graphical indicators in response to determining that the first interaction with the first interactive element has ceased. The method can include the respective interactive element being interacted with, which causes the one or more processors to adjust the credit balance based on the respective indicator score of the graphical indicator of the plurality of graphical indicators to which the respective interactive element corresponds. The method can include increasing a size of the graphical indicator based on the score of the play of the game.

The method can include determining that a bonus condition has been satisfied in response to the score for the play of the game exceeding a threshold and adjusting the credit balance in response to determining that the bonus condition has been satisfied. The method can include receiving a second wager for a second play of the game. Upon receiving the second wager, the method can include causing presentation of a second graphical user interface for the second play of the game. The second graphical user interface may include a second graphical indicator, with the second graphical indicator corresponding to a second indicator score. The method can include updating the second indicator score in response to the first interaction with the first interactive element. Upon determining that the second indicator score exceeds a random score threshold, the method can include generating a notification for display, with the notification indicating the second wager for the second play of the game has been lost. The method can include adjusting the expiration threshold of the timer based on a user selection.

Referring now to an example implementation of an interactive game with automated device-based score threshold, the data processing system 205 may receive a number of interactive spaces having a termination condition and generate a graphical user interface with a grid having a set of interactive spaces for a play of the game. Each interactive space can correspond to a respective game condition. For example, the data processing system 205 can select whether a space is to be associated with a terminal condition using a random number generator, until the selected number of spaces having the termination condition have been placed. In the example representations described herein, the termination condition is represented by a space concealing a virtual mine from the player. Furthering this example, the data processing system 205 can randomly select spaces as concealing virtual mines (which are revealed in response to a player interaction with said space) using a random selection policy. The data processing system can perform similar techniques to select other conditions for other spaces in the grid, which may include survival conditions and/or bonus conditions.

Once the conditions for each space have been selected, the player is presented with the grid of interactive spaces, each of which are associated with a respective game condition. For each interaction with an interactive space of the set of interactive spaces in the grid, the data processing system 205 may increase a score upon determining that the respective game condition of the interactive space satisfies a survival condition. The data processing system 205 may also determine whether the score for the play of the game satisfies a score threshold. The data processing system may automatically adjust a credit balance in response to determining that the score for the play of the game satisfies the score threshold. The data processing system 205 can update and display updated information on the graphical user interface, including outcomes derived from the game conditions, the location data of a client device 220, player's credit balance, automatic or manual cash out, and any applicable award amounts, among others. Example graphical user interfaces showing an example implementation of an interactive game with automated device-based score threshold is shown in FIGS. 13A-13F.

Figure 13A:
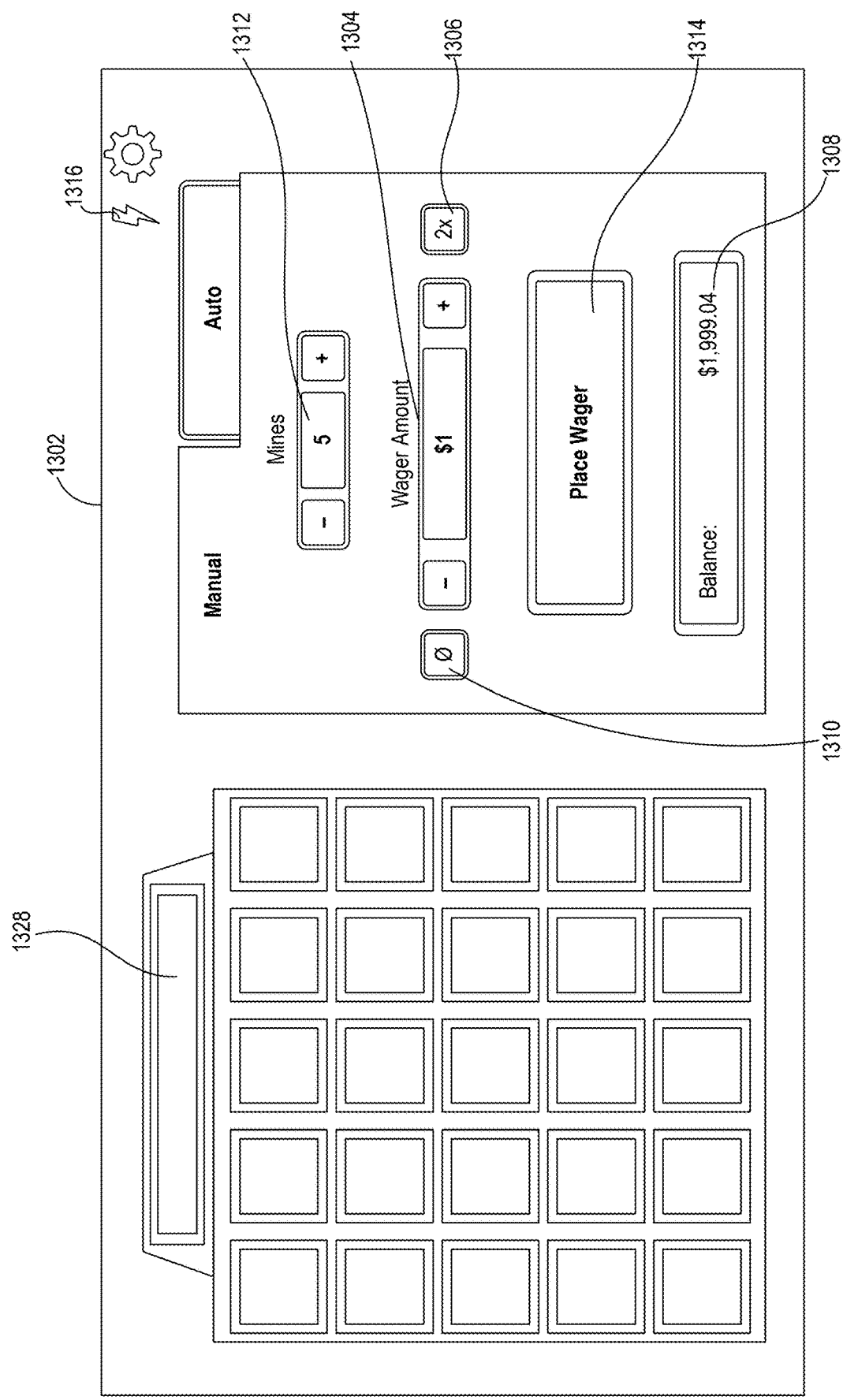
FIGS. 13A, 13B, 13C, 13D, 13E, and 13F depict further diagrams of example graphical user interfaces that may be displayed in connection with network communication sessions established according to the techniques described herein, in accordance with one or more implementations.

Referring now to FIG. 13A in the context of the components described in connection with FIG. 2, a graphical user interface 1302 is presented on a client device 220 for INITIATING A PLAY OF an interactive game with automated device-based score threshold. As discussed above, the device communicator 130 facilitates communication between the client device 220 and the data processing system 205, allowing players to interact with a graphical user interface 1302 and transmit their actions to the data processing system 205. As players engage with the graphical user interface 1302, their actions, such as placing wagers or initiating the game, may be captured and stored in their player profile 270 and used to update the game state information 275.

The graphical user interface 1302 shown in FIG. 13A displays a manual mode to select a wager for a play of the game. In some implementations, the graphical user interface 1302 can include a grid of spaces in a non-interactive state, which is made interactive upon interacting with a wager button 1314. A region 1328 can be displayed above the grid to show an amount a player can win if they successfully interact with the next space associated with a survival condition (e.g., without hitting a mine space). This amount may be referred to herein as a potential score. A player can interact with a wager amount button 1304 to specify the amount of the wager. In some implementations, the player can increase or decrease the wager amount by interacting with the plus or minus signs indicated on the wager amount button 1304. A multiplier button 1306 is present that, when interacted with, can cause the wager amount to be updated to double the value of the player's wager. A balance region 1308 displays the amount of credits available for the player to wager on the game. The amount in the balance region 1308 may be determined from the credit balance specified in the player profile 270 of the player. The balance region 1308 may be updated in response to interactions with the wager amount button 1304. The graphical user interface 1302 also displays a clear button 1310 that, when interacted with, may cause the wager to be reset (e.g., removed or erased). In some implementations, the graphical user interface 1302 can be updated via the clear button 1310 to reset the wager amount to a default value (e.g., reset the wager amount to $1.00 or any positive integer). As shown, the graphical user interface 1302 displays a mines button 1312, which allows the player to specify the number of mines that will be placed in the grid of interactive spaces generated for the play of the game. The mines button 1312 also indicate plus and minus signs on it, which can be used to increase or decrease the number of mines.

In some implementations, the graphical user interface 1302 may display a lightning bolt button 1316 (or the graphical user interface 1302 may include other indicators in some implementations) that can cause the data processing system 205 to alter the animation speeds in response to an interaction with the lightning bolt button 1316. The lightning bolt button 1316 can be toggled on or off by the player during the gameplay. The animation speeds may be modified to increase or decrease the amount of time taken to update the game state. In some implementations, the graphical user interface 1302 can display a separate slider/interactive element that enables the player to select the rate at which their score increases. In some implementations, the lightning bolt button 1316 can be a part of the manual bet interface to allow manual control of the speed of the game.

A player can interact with the wager button 1314 to place a wager for the play of the game. The wager information is then transmitted from the client device 220 to the data processing system 205. The data processing system 205 receives and processes the wagers, incorporating them into the game logic. The player profile 270 and the game state information 275 are also updated with the wager information. Players can also initiate the game by interacting with the wager button 1314. This interaction causes the data processing system 205 to update the graphical user interface 1302 and present the grid of interactive spaces, as shown in connection with FIG. 13C.

Figure 13B:
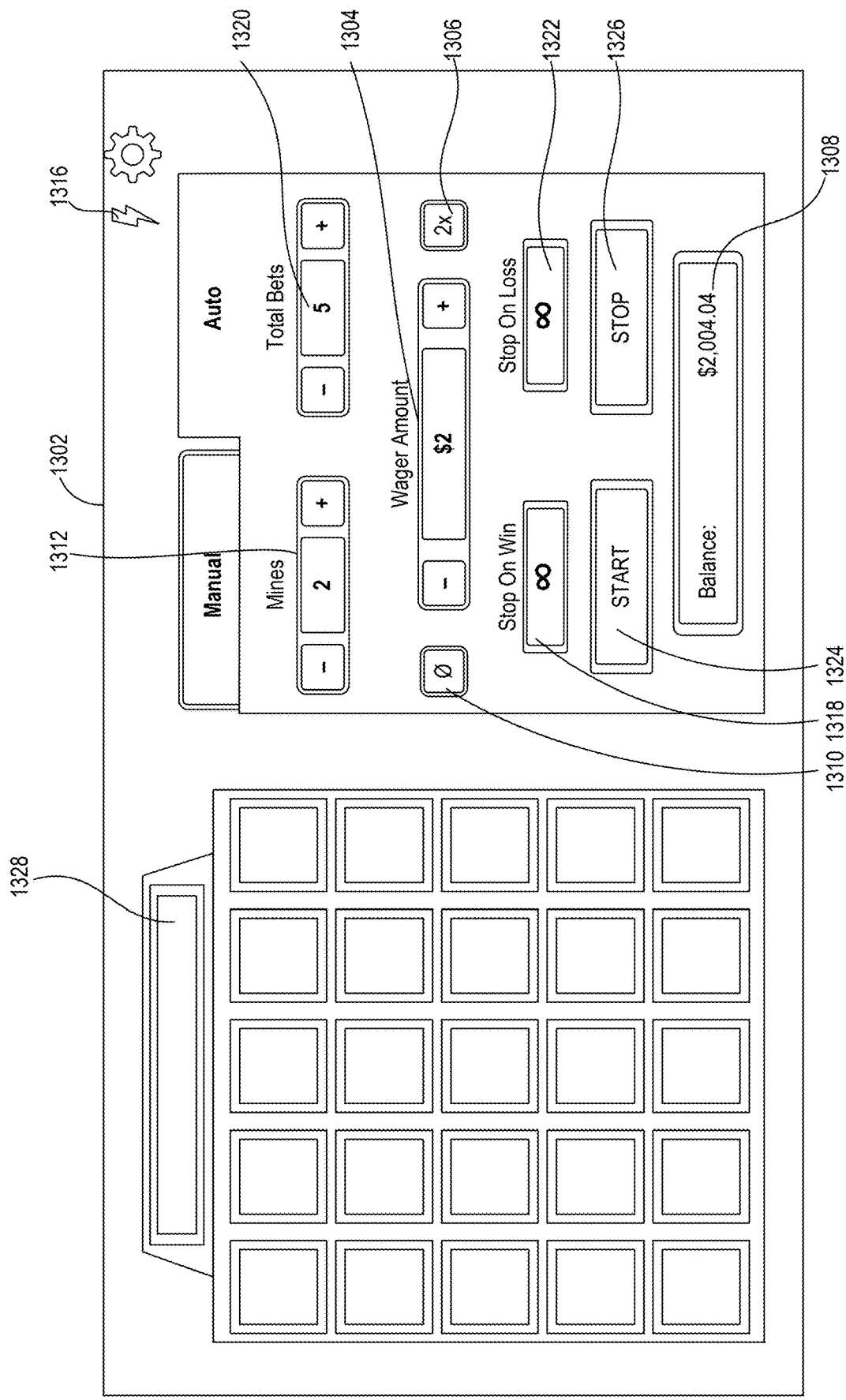

Referring now to FIG. 13B in the context of the components described in connection with FIG. 2, a graphical user interface 1302 is presented on a client device 220 for an auto mode. In this mode, the data processing system 205 can enable players to set certain parameters to automatically place wagers and execute subsequent rounds of the game (e.g., an "autoplay" mode or an "auto mode"). For example, players can specify a stop limit using a stop on win button 1318, which, when specified, causes the data processing system 205 to execute subsequent autobet rounds of the game and increase the score of the player in each autobet round until a certain score threshold is reached. A "round" can be referred to as a single gameplay or attempt to clear the entire board of mines without hitting a mine. It is to be understood that the score for the play of the game cannot exceed the score threshold based on the location data of the client device 220, as described herein. In some implementations, players can define the total number of autobet rounds to place for the auto mode using a total bets button 1320. In some implementations, the total bets may start at a specified amount and increment by a fixed value (e.g., 1 or any positive integer) each time the total bets button 1320 is interacted with. In some implementations, the player can increase or decrease the total number of autobet rounds by interacting with the plus or minus signs indicated on the total bets button 1320.

In some implementations, players can set a loss limit using a stop on loss button 1322. A loss limit, when implemented, causes the data processing system 205 to stop entering the player into subsequent autobet rounds of the game if the accumulated losses exceed the loss limit. In auto mode, players can also initiate the game by interacting with a start button 1324. This interaction causes the data processing system 205 to update the graphical user interface and present the grid of interactive spaces, as shown in connection with FIG. 13C. A player can also manually end auto mode by interacting with a stop button 1326, which causes the data processing system 205 to end (or terminate) the auto mode before the next autobet round begins and adjust the credit balance of the player profile 270. In auto mode, the graphical user interface 1302 may display a grid of spaces in an interactive state. A player can manually select one or more spaces to be played for each round of auto mode by interacting with them. Payouts are determined for each autobet round based on whether the randomly selected mines are located under the selected spaces. New mines are randomly selected for each autobet round until the stop conditions are satisfied. In some implementations, the outcome of each autobet round is displayed to the player.

Figure 13C:
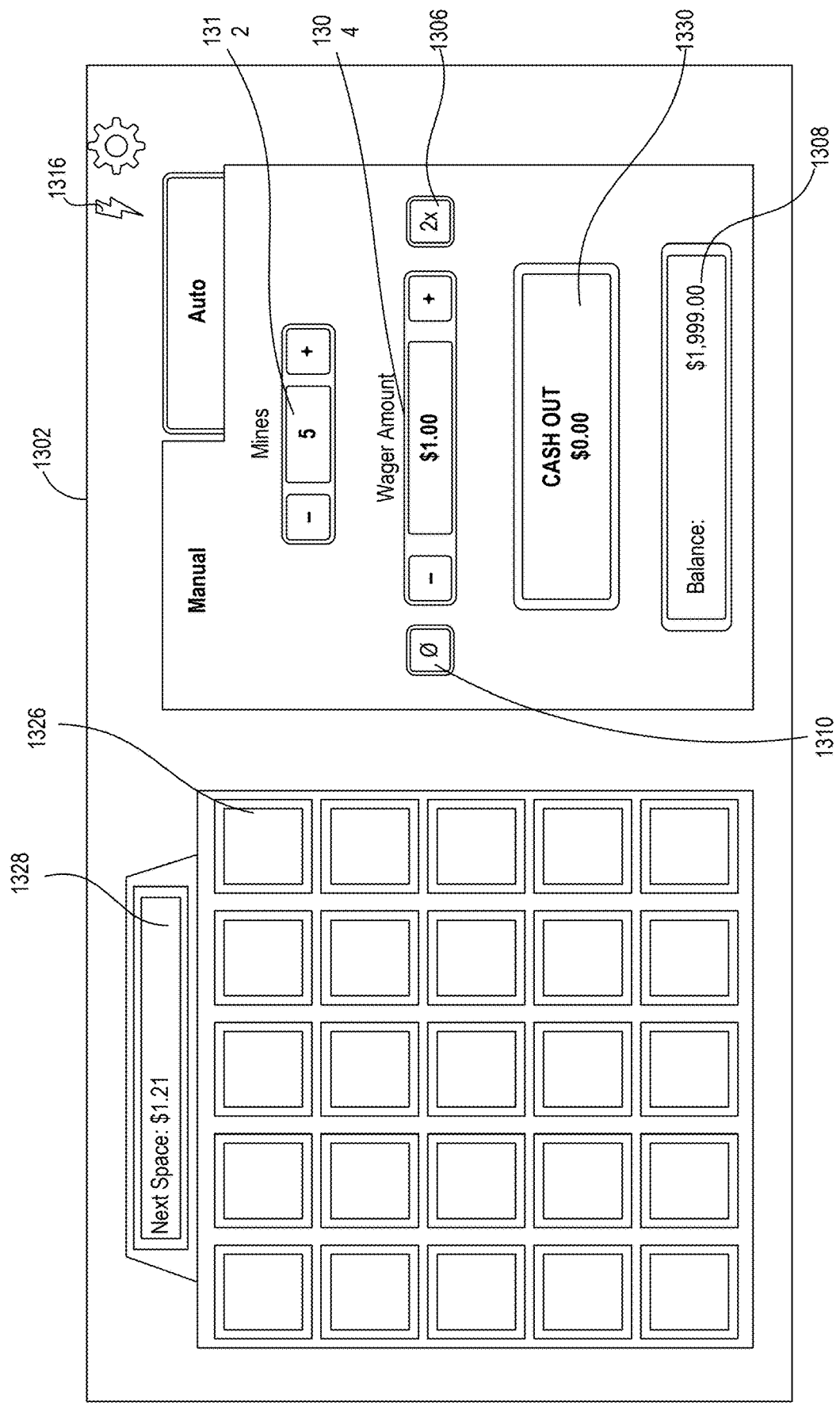

Referring now to FIG. 13C, in the context of the components described in connection with FIG. 2, an updated graphical user interface 1302 is presented on the client device 220 in response to an interaction with the wager button 1314 in manual mode or the start button 1324 in auto mode, as shown in FIGS. 13A and 13B. As shown on the graphical user interface 1302, the data processing system 205 generates a grid of interactive spaces 1326 that the player can interact with.

The size/dimensions of the grid may vary depending on the implementation. In some implementations, the data processing system 205 may generate the grid of a predetermined number of interactive spaces 1326, such as 2×2, 3×3, 4×4, 5×5, and so on. In some implementations, as described herein, the data processing system 205 may determine the size of the grid based on the number of mines selected by the player. For example, the data processing system 205 may determine the number of mines that can be placed on the grid of a given size. Once the data processing system 205 determines how many mines can be placed on the grid, the data processing system 205 can determine the size of the grid accordingly. In some implementations, the data processing system 205 may receive a selection of the size of the grid from the player. Although shown here as a square grid, it should be understood that other dimensions are possible, such as a rectangular grid (e.g., 10×5). In some implementations, the data processing system 205 may also take other factors into account when determining the size of the grid, such as the difficulty level of the game.

In some implementations, the data processing system 205 may also use a random number generator to determine the size of the grid. For example, the data processing system 205 can generate a random number between the minimum and maximum grid sizes. The minimum grid size is the smallest grid that can accommodate the desired number of mines. The maximum grid size is the largest grid that can fit on the client device 220. Once the data processing system 205 has generated a random number, the data processing system 205 uses that number to determine the size of the grid. For example, if the minimum grid size is 10 and the maximum grid size is 130, and the random number is 15, the data processing system 205 would generate a 15×15 grid.

Each interactive space 1326 in the grid can have a specific game condition associated with it. In some implementations, the data processing system 205 may use a random number to determine the respective game condition of each interactive space 1326. For example, if the random number is less than a predetermined threshold, the interactive space 1326 may correspond to a mine interactive space 1326, or vice versa. Similarly, if the random number is greater than or equal to the predetermined threshold, the interactive space 1326 may correspond to a non-mine interactive space 1326, or vice versa. In some implementations, the data processing system can iterate through each space 1326 in the grid and perform the random selection process until the number of virtual mines selected by the player have been placed. The conditions of each space 1326 may be determined prior to enabling interactivity with each space 1326. In some implementations, the determination of whether a space 1326 is associated with a particular game condition (e.g., termination, survival, bonus, etc.) may be performed upon receiving an interaction with the space 1326. The data processing system 205 may perform a random selection process according to the odds determined from the number of selected mines and the size of the grid, in one example.

Figure 13D:
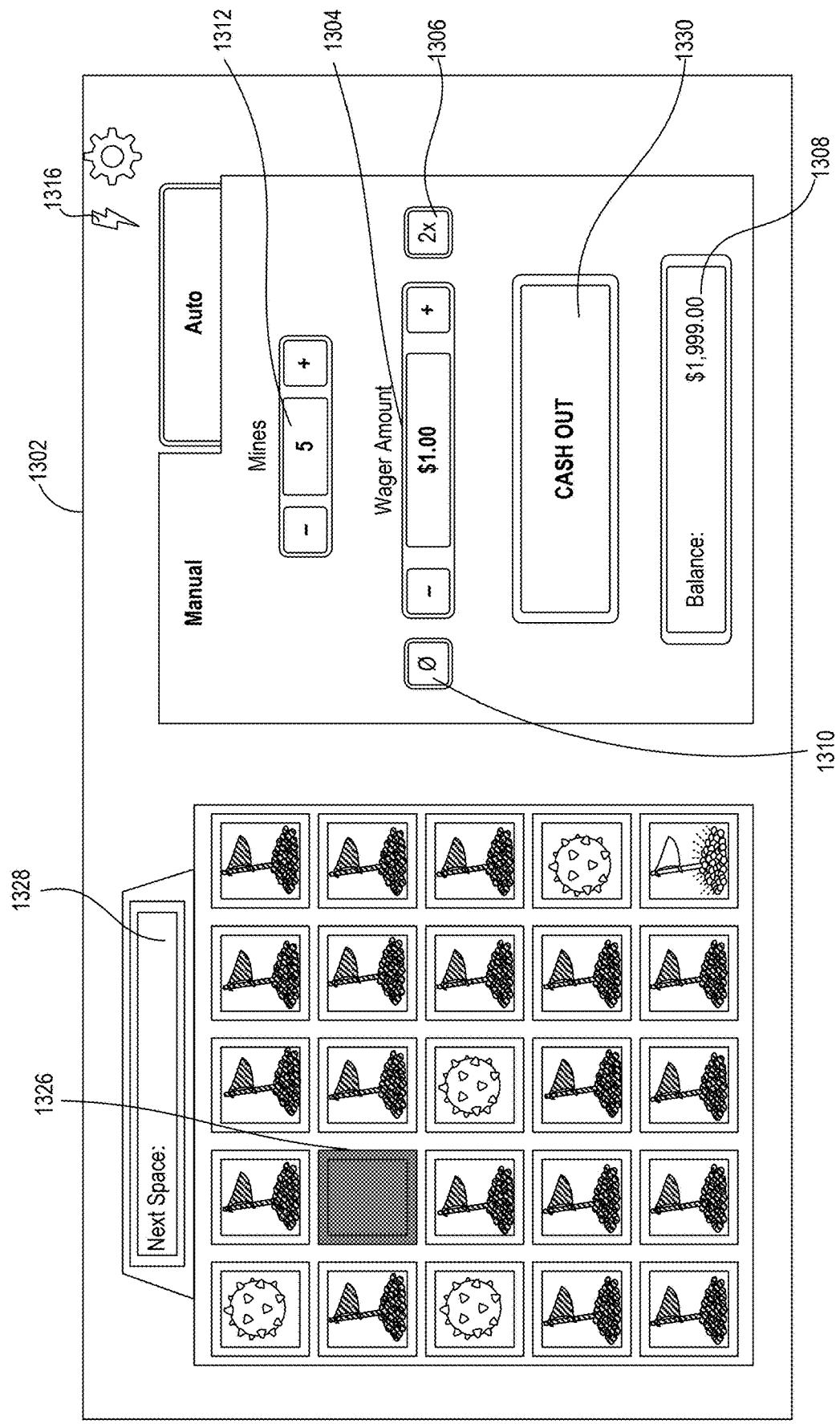

In some implementations, the data processing system 205 can calculate the score based on the game instructions 280 and update the graphical user interface 1302 to display the score in the region 1328 (positioned above the grid in some implementations) by setting the text of a label. Upon receiving an interaction with the non-mine interactive space 1326, the data processing system 205 updates the game state information 275 to reflect that the score has been changed by updating the amount (e.g., the score) in the region 1328 for the next interaction. In some implementations, the data processing system 205 may update the game state information 275 by activating a cash out button 1330 on the graphical user interface 1302 that displays the score. When the player interacts with the cash out button 1330, the data processing system 205 updates the credit balance of the player profile 270 with the displayed amount (e.g., the score), as described herein. Referring now to FIG. 13D, in the context of the components described in connection with FIG. 2, an updated graphical user interface 1302 is presented on the client device 220, depicting that a termination condition has been satisfied. As described herein, one or more interactive spaces 1326 in the grid may correspond to the mine interactive space 1326, which can cause the play of the game to terminate, with the player losing the play of the game (e.g., satisfying a termination condition). In response to satisfying the termination condition (with the game being a loss for the player), the data processing system 205 terminates the play of the game (or autobet round in some implementations) and updates the player profile 270 accordingly. In some implementations, the data processing system 205 may update the graphical user interface 1302 to reveal the game condition of all the interactive spaces 1326 corresponding to the mine interactive spaces 1326 as well as the non-mine interactive spaces 1326. Additionally, as described herein, one or more interactive spaces 1326 may correspond to the non-mine interactive space 1326, which can cause a survival condition of a play of the game to be satisfied, as shown in connection with FIG. 13E.

Figure 13E:
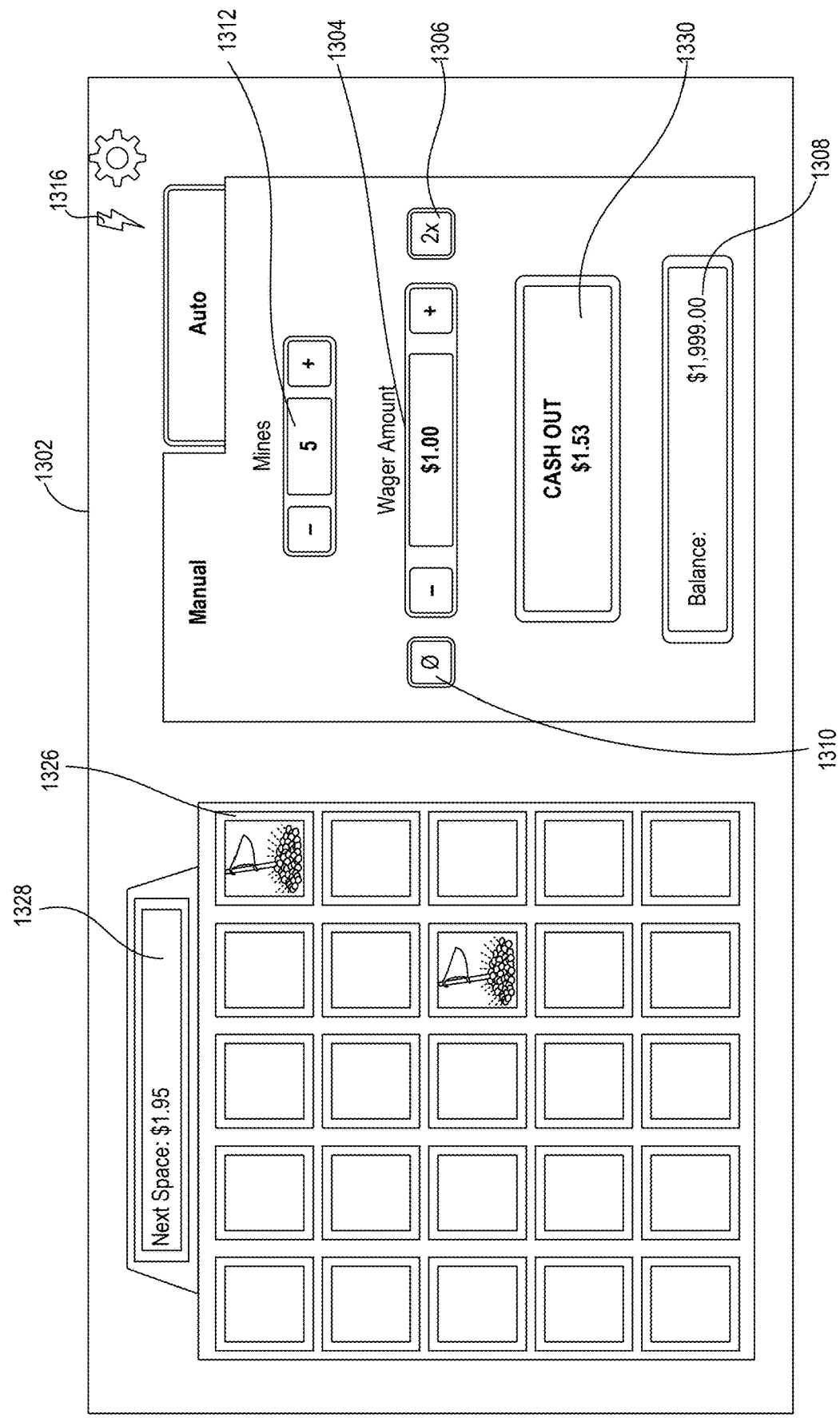

Referring now to FIG. 13E, in the context of the components described in connection with FIG. 2, an updated graphical user interface 1302 is presented on the client device 220, depicting that a survival condition has been satisfied. In response to satisfying the survival condition, the potential payout for the play of the game is increased, and the player is prompted to continue interacting with the interactive spaces 1326, or to terminate the play of the game via the cash out button 1326. In some implementations, as shown in FIG. 13E, when the player interacts with the non-mine interactive space 1326, the data processing system 205 may update the graphical user interface 1302 to reveal the game condition (e.g., survival condition in this example) of the interactive space 1326 that the player interacts with. In some implementations, upon interacting with the non-mine interactive space 1326, the data processing system 205 may update the graphical user interface 1302 to reveal a predetermined number of adjacent (e.g., horizontally, vertically, or diagonally) non-mine interactive spaces 1326. The graphical user interface can also be updated to display the adjacent non-mine interactive spaces 1326 with a symbol or mark based on the game instructions 280. Similarly, in some implementations, upon interacting with the non-mine interactive space 1326, the data processing system 205 may update the graphical user interface 1302 to flag (or reveal, in some implementations) a predetermined number of adjacent mine interactive spaces 1326. The graphical user interface 1302 may be updated to change the color of the mine interactive spaces 1326, add a flag symbol to the mine interactive spaces 1326, or strike through the mine interactive spaces 1326, among others.

Upon satisfying the survival condition, the data processing system 205 may update the game state information 275 and increase the score for the play of the game. In some implementations, the score can be determined by counting the number of non-mine interactive spaces 1326 in the grid that the player successfully interacts with (or the number of non-mine interactive spaces 1326 that are identified in some implementations). In some implementations, the data processing system 205 may use a counter to track the number of non-mine interactive spaces 1326 in the grid. The score can be incremented each time the player interacts with the non-mine interactive space 1326 (or when the non-mine interactive space 1326 is identified, as described herein). For example, if the player successfully interacts with the non-mine interactive space 1326 in the grid, the score may be incremented by a predetermined value. In some implementations, the amount by which the score is incremented can be a function of the number of non-mine interactive spaces 1326 that the player has interacted with.

In some implementations, one or more interactive spaces 1324 may correspond to bonus interactive spaces 1324, which can cause a bonus condition of the play of the game to be satisfied. In response to the bonus condition being satisfied, the data processing system 205 may provide one or more additional awards, including but not limited to an additional game play or a bonus award amount. The specific bonus award may be predetermined based on the game instructions 280. Upon satisfying the bonus condition, the data processing system 205 can update a credit balance of the player profile 270 and the game state information 275 accordingly.

As described herein, upon receiving an interaction with a non-mine interactive space 1326, the data processing system 205 may update the graphical user interface 1302 to present the cash out button 1330 (or the graphical user interface 1302 can be updated to replace the wager button 1314 with the cash out button 1330 in response to the request to initiate the play of the game) that, when interacted with, adjusts the credit balance of the player profile 270. The amount by which the credit balance is adjusted may be referred to as the "payout" for the play of the game. The data processing system 205 may determine the payout based on the current score, which may increase each time the player interacts with a non-mine interactive space 1326. For example, when the player interacts with the non-mine interactive space 1326, the score may be determined by multiplying the previous score by a multiplier value. In some implementations, the score may increase exponentially as the player interacts with additional non-mine interactive spaces 1324. In some implementations, the wager selected by the player prior to the initiation of the gameplay may be used to determine the initial score. In some implementations, data processing system 205 may determine the payout based on the number of mine interactive spaces 1326 selected by the player. In some implementations, the data processing system 205 may determine whether the score for the play of the game satisfies a predetermined score threshold, as shown in connection with FIG. 13F.

Figure 13F:
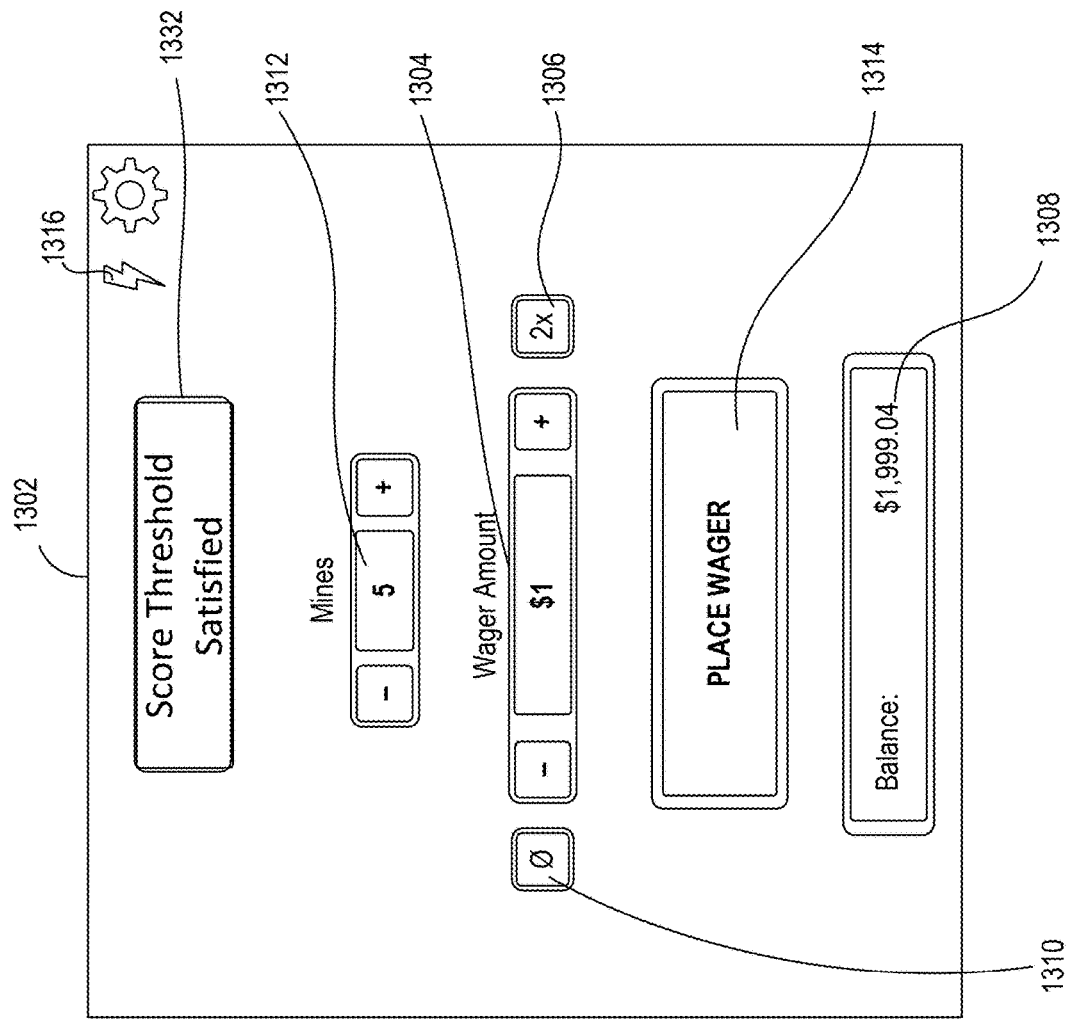

Referring now to FIG. 13F in the context of the components described in connection with FIG. 2, an updated graphical user interface 1302 is presented on the client device 220, depicting that a predetermined score threshold has been satisfied. The predetermined score threshold can be automatically determined by the data processing system 205 based on the location data of the client device 220 via which the graphical user interface 1302 is displayed. As described herein, the data processing system 205 can collect the location data of the client device 220 through the Wi-Fi or cellular network that the client device 220 is connected to. In some implementations, the data processing system 205 can collect the location data of the client device 220 from the IP address of the client device 220. Once the data processing system 205 has collected the location data of the client device 220, the data processing system 205 may use the collected data to determine the player's location and the corresponding score threshold for that geographic region. This is because different geographic regions may have different score thresholds that limit the potential payout for players within those geographic regions.

Upon determining that the score for the play of the game satisfies the score threshold, the data processing system 205 may update the graphical user interface 1302 to provide a notification 1332 (which may include additional feedback as described herein) to the player, indicating that the score threshold has been satisfied. The notification 1332 can be implemented in a variety of ways, including, but not limited to, a simple message ("Score Threshold Satisfied" in this example) that is displayed on the player device (e.g., client device 220), a more complex animation, or a visual effect, among others. As shown, the notification 1332 is displayed in the center of the graphical user interface 1302. In some implementations, the feedback can include various sensory elements, such as visual, auditory, or tactile (e.g., haptic) feedback. The data processing system 205 automatically terminates the play of the game and updates the credit balance of the player profile 270 in response to satisfaction of the predetermined score threshold. For example, the credit balance may be increased by the player's score. In some implementations, the graphical user interface 1302 can be updated to replace the cash out button 1330 with the wager button 1314 that, when interacted with, causes the data processing system to update the graphical user interface 1302 and initiate a new play of the game.

The adjustment in the credit balance can be made based on the computed bonus award (e.g., if a bonus award amount is to be awarded) and the award amount, as long as the total award amount does not exceed the predetermined score threshold determined by the location data of the client device 220. If the total award amount exceeds the predetermined score threshold, the data processing system 205 may provide the player with additional in-game credits in their player profile 270 to be used for other games or may use the extra credits for subsequent plays of the game. In some implementations, the data processing system 205 can increase the credit balance of the player profile 270 by the sum of the bonus award amount and the award amount for each successful outcome. However, if the bonus award condition is not satisfied, resulting in a zero bonus award amount, the data processing system 205 can increase the credit balance only by the award amounts for the winning outcomes. In cases where the bonus award is credited to the player before the completion of the game, the data processing system 205 can update the credit balance of the player profile 270 by adding the award amounts for the winning outcomes to the credit balance.

Figure 14:
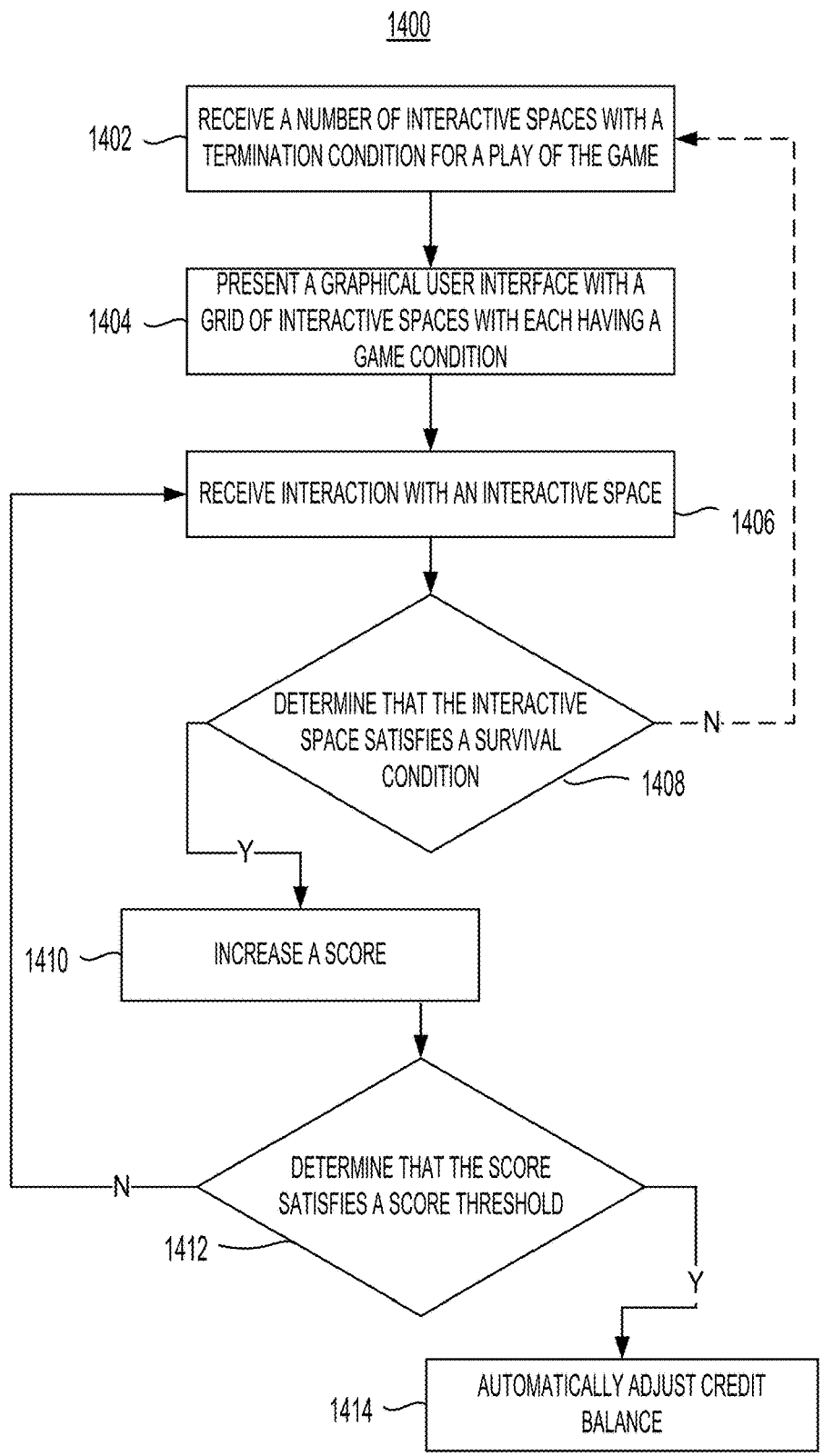
FIG. 14 depicts an example flow diagram of an example network application that may be accessed via network communication sessions established according to the techniques described herein, in accordance with one or more implementations.

Referring now to FIG. 14, depicted is an illustrative flow diagram of a method 1400 for providing interactive games with automated device-based score threshold. The method 1400 can be executed, performed, or otherwise carried out by a data processing system. A data processing system (e.g., the data processing system 205) can be remote to one to one or more client devices and communicate with the one or more client devices via a computer network. In some implementations, the operations of method 1400 can be performed by a stand-alone gaming device (e.g., without communicating with a gaming server to perform the method steps). In a brief overview of method 1400, the gaming server can receive a number of interactive spaces with a termination condition for a play of the game (STEP 1402), present a graphical user interface with a grid of interactive spaces with each having a game condition (STEP 1404), receive interaction with an interactive space (STEP 1406), determine whether the interactive space satisfies a survival condition (STEP 1408), increase the score if the interactive space satisfies the survival condition (STEP 1410), determine whether the score satisfies a score threshold (STEP 1412), and automatically adjust the credit balance if the score satisfies the score threshold (STEP 1414).

In further detail of method 1400, the data processing system can receive a number of interactive spaces with a termination condition for a play of the game (STEP 1402). After indicating the number of spaces corresponding to the termination condition (e.g., mine spaces), a player can interact with a wager button to place a wager for the play of the game. The wager can be received in one or more messages received from a client device. The message, or request, can indicate that a player intends to play a game provided by the data processing system. The message can include an indication of a player profile with which to access functionalities related to the game (e.g., placing wagers using earned credits, purchasing additional credits, etc.). The wager can be provided via a graphical user interface (e.g., the graphical user interface of FIG. 13A). The wager amounts provided can be a specified amount of credits, such as 1, 5, 135, 100, 500, or 1000 credits. In some implementations, the player can specify a custom number or fractional number of credits used in the game. Once the wager has been selected, the client device can transmit a request to place the wagers for the play of the game.

Upon receiving the wager, the data processing system can generate a grid of interactive spaces that the player can interact with (STEP 1404), as shown in FIG. 13C. The size/dimensions of the grid may vary depending on the implementation. In some implementations, the data processing system may generate the grid of a predetermined number of interactive spaces, such as 2×2, 3×3, 4×4, 5×5, and so on. In some implementations, as described herein, the data processing system may determine the size of the grid based on the number of mines selected by the player. For example, the data processing system may determine the number of mines that can be placed on the grid of a given size. Once the data processing system determines how many mines can be placed on the grid, the data processing system can determine the size of the grid accordingly. In some implementations, the data processing system may receive a selection of the size of the grid from the player. Although shown here as a square grid, it should be understood that other dimensions are possible, such as a rectangular grid (e.g., 10×5). In some implementations, the data processing system may also take other factors into account when determining the size of the grid, such as the difficulty level of the game.

In some implementations, the data processing system may also use a random number generator to determine the size of the grid. For example, the data processing system can generate a random number between the minimum and maximum grid sizes. The minimum grid size is the smallest grid that can accommodate the desired number of mines. The maximum grid size is the largest grid that can fit on the client device. Once the data processing system has generated a random number, the data processing system uses that number to determine the size of the grid. For example, if the minimum grid size is 10 and the maximum grid size is 130, and the random number is 15, the data processing system 205 would generate a 15×15 grid.

Each interactive space in the grid can have a specific game condition associated with it. In some implementations, the data processing system may use a random number to determine the respective game condition of each interactive space. For example, if the random number is less than a predetermined threshold, the interactive space may correspond to a mine interactive space, or vice versa. Similarly, if the random number is greater than or equal to the predetermined threshold, the interactive space may correspond to a non-mine interactive space, or vice versa. In some implementations, the data processing system can iterate through each space in the grid and perform the random selection process until the number of virtual mines selected by the player have been placed. The conditions of each space may be determined prior to enabling interactivity with each space. In some implementations, the determination of whether a space is associated with a particular game condition (e.g., termination, survival, bonus, etc.) may be performed upon receiving an interaction with the space (STEP 1406). The data processing system may perform a random selection process according to the odds determined from the number of selected mines and the size of the grid, in one example.

In some implementations, the data processing system can calculate the score based on the game instructions and update the graphical user interface to display the score in a region (positioned above the grid in some implementations) by setting the text of a label. Upon receiving an interaction with the non-mine interactive space, the data processing system updates the game state information to reflect that the score has been changed by updating the amount (e.g., the score) in the region for the next interaction. In some implementations, the data processing system may update the game state information by activating a cash out button on the graphical user interface that displays the score. When the player interacts with the cash out button, the data processing system updates the credit balance of the player profile with the displayed amount (e.g., the score), as described herein.

As described herein, one or more interactive spaces in the grid may correspond to the mine interactive space, which can cause the play of the game to terminate, with the player losing the play of the game (e.g., satisfying a termination condition), as shown in FIG. 13D. In response to satisfying the termination condition (with the game being a loss for the player), the data processing system terminates the play of the game (or autobet round, as described herein) and updates the player profile accordingly. In some implementations, the data processing system may update the graphical user interface to reveal the game condition of all the interactive spaces corresponding to the mine interactive spaces as well as the non-mine interactive spaces.

Additionally, as shown in FIG. 13E, one or more interactive spaces may correspond to the non-mine interactive space, which can cause a survival condition of a play of the game to be satisfied (STEP 1408). In response to satisfying the survival condition, the potential payout for the play of the game is increased, and the player is prompted to continue interacting with the interactive spaces, or to terminate the play of the game via the cash out button. Upon satisfying the survival condition, the data processing system may update the game state information and increase the score for the play of the game (STEP 1410). In some implementations, the score can be determined by counting the number of non-mine interactive spaces in the grid that the player successfully interacts with (or the number of non-mine interactive spaces that are identified in some implementations). In some implementations, the data processing system may use a counter to track the number of non-mine interactive spaces in the grid. The score can be incremented each time the player interacts with the non-mine interactive space (or when the non-mine interactive space is identified, as described herein). For example, if the player successfully interacts with the non-mine interactive space in the grid, the score may be incremented by a predetermined value. In some implementations, the amount by which the score is incremented can be a function of the number of non-mine interactive spaces that the player has interacted with.

As described herein, upon receiving an interaction with a non-mine interactive space, the data processing system may update the graphical user interface to present the cash out button (or the graphical user interface can be updated to replace the wager button with the cash out button in response to the request to initiate the play of the game) that, when interacted with, adjusts the credit balance of the player profile. The amount by which the credit balance is adjusted may be referred to as the "payout" for the play of the game. The data processing system may determine the payout based on the current score, which may increase each time the player interacts with a non-mine interactive space.

In some implementations, the data processing system may determine whether the score for the play of the game satisfies a predetermined score threshold (STEP 1412). The predetermined score threshold can be automatically determined by the data processing system based on the location data of the client device via which the graphical user interface is displayed. As described herein, the data processing system can collect the location data of the client device through the Wi-Fi or cellular network that the client device is connected to. In some implementations, the data processing system can collect the location data of the client device from the IP address of the client device. Once the data processing system has collected the location data of the client device, the data processing system may use the collected data to determine the player's location and the corresponding score threshold for that geographic region. This is because different geographic regions may have different score thresholds that limit the potential payout for players within those geographic regions.

Upon determining that the score for the play of the game satisfies the score threshold, the data processing system may update the graphical user interface to provide a notification (which may include additional feedback as described herein) to the player, indicating that the score threshold has been satisfied. The notification can be implemented in a variety of ways, including, but not limited to, a simple message ("Score Threshold Satisfied" in this example) that is displayed on the player device (e.g., client device), a more complex animation, or a visual effect, among others. As shown, the notification is displayed in the center of the graphical user interface. In some implementations, the feedback can include various sensory elements, such as visual, auditory, or tactile (e.g., haptic) feedback. The data processing system automatically terminates the play of the game and updates the credit balance of the player profile in response to satisfaction of the predetermined score threshold (STEP 1414). For example, the credit balance may be increased by the player's score. In some implementations, the graphical user interface can be updated to replace the cash out button with the wager button that, when interacted with, causes the data processing system to update the graphical user interface and initiate a new play of the game.

The adjustment in the credit balance can be made based on the computed bonus award (e.g., if a bonus award amount is to be awarded) and the award amount, as long as the total award amount does not exceed the predetermined score threshold determined by the location data of the client device. If the total award amount exceeds the predetermined score threshold, the data processing system may provide the player with additional in-game credits in their player profile to be used for other games or may use the extra credits for subsequent plays of the game. In some implementations, the data processing system can increase the credit balance of the player profile by the sum of the bonus award amount and the award amount for each successful outcome. However, if the bonus award condition is not satisfied, resulting in a zero bonus award amount, the data processing system can increase the credit balance only by the award amounts for the winning outcomes. In cases where the bonus award is credited to the player before the completion of the game, the data processing system can update the credit balance of the player profile by adding the award amounts for the winning outcomes to the credit balance.

At least one aspect of the present disclosure is directed to a system. The system can include one or more processors coupled to memory. The one or more processors may receive a number of interactive spaces with a termination condition for a play of the game. In response to receiving the number of interactive spaces having the termination condition for the play of the game, the one or more processors may cause generation of a graphical user interface having a grid with a set of interactive spaces. Each interactive space of the set of interactive spaces may correspond to a respective game condition. For each interaction with an interactive space of the set of interactive spaces, the one or more processors may increase a score for the play of the game upon determining that the respective game condition of the interactive space satisfies a survival condition, and the one or more processors may determine whether the score for the play of the game satisfies a score threshold. In response to determining that the score for the play of the game satisfies the score threshold, the one or more processors may automatically adjust a credit balance based on the score.

In some implementations, the one or more processors may receive a second wager for a second play of the game. In response to receiving the second wager, the one or more processors may cause presentation of a second graphical user interface for the second play of the game, with the second graphical user interface having a second grid with a second set of interactive spaces. In response to a second interaction with at least one interactive space of the second set of interactive spaces and determining that at least one interactive space of the second set of interactive spaces corresponds to the termination condition, the one or more processors may generate a notification for display. The notification may indicate that the second wager for the second play of the game has been lost. In some implementations, the one or more processors may determine a number of spaces in the set of interactive spaces of the grid based on the number of interactive spaces with the termination condition.

In some implementations, the one or more processors may automatically determine the score threshold based on the location data of a client device via which the graphical user interface is displayed. A first geographic region may correspond to a first threshold, and a second geographic region may correspond to a second threshold. The one or more processors may further select the first threshold as the score threshold based on the location data indicating the client device is located within the first geographic region. In some implementations, the one or more processors may generate the grid such that the respective game condition of at least one interactive space of the set of interactive spaces includes a bonus condition, and the one or more processors may adjust the credit balance based on a bonus amount for the play of the game in response to receiving a second interaction with the at least one interactive space.

In some implementations, the one or more processors may present, in response to determining that the score for the play of the game satisfies the score threshold, an interactive element that, when interacted with, causes the one or more processors to initiate a third play of the game. In some implementations, the one or more processors may generate a notification in response to determining that the score for the play satisfies the score threshold. The notification may indicate that the credit balance has been adjusted according to the score. In some implementations, the one or more processors may generate a random number to determine the respective game condition of each of the set of interactive spaces of the grid for the play of the game. In some implementations, the one or more processors may cause, in response to determining that the play of the game has not satisfied the termination condition, the graphical user interface to display an interactive element that, when interacted with, causes the one or more processors to adjust the credit balance based on the score.

At least one aspect of the present disclosure is directed to a method. The method can include receiving a number of interactive spaces with a termination condition for a play of the game. In response to receiving the number of interactive spaces having the termination condition for the play of the game, the method can include causing generation of a graphical user interface having a grid with a set of interactive spaces. Each interactive space of the set of interactive spaces may correspond to a respective game condition. For each interaction with an interactive space of the set of interactive spaces, the method can include increasing a score for the play of the game upon determining that the respective game condition of the interactive space satisfies a survival condition, and the method can include determining whether the score for the play of the game satisfies a score threshold. In response to determining that the score for the play of the game satisfies the score threshold, the method can include automatically adjusting a credit balance based on the score.

The method can include receiving a second wager for a second play of the game. In response to receiving the second wager, the method can include causing presentation of a second graphical user interface for the second play of the game, with the second graphical user interface having a second grid with a second set of interactive spaces. In response to a second interaction with at least one interactive space of the second set of interactive spaces and determining that at least one interactive space of the second set of interactive spaces corresponds to the termination condition, the method can include generating a notification for display. The notification may indicate that the second wager for the second play of the game has been lost. The method can include determining a number of spaces in the set of interactive spaces of the grid based on the number of interactive spaces with the termination condition.

The method can include automatically determining the score threshold based on the location data of a client device via which the graphical user interface is displayed. A first geographic region may correspond to a first threshold, and a second geographic region may correspond to a second threshold. The method can further include selecting the first threshold as the score threshold based on the location data indicating the client device is located within the first geographic region. The method can include generating the grid such that the respective game condition of at least one interactive space of the set of interactive spaces includes a bonus condition, and the method can include adjusting the credit balance based on a bonus amount for the play of the game in response to receiving a second interaction with the at least one interactive space.

The method can include presenting, in response to determining that the score for the play of the game satisfies the score threshold, an interactive element that, when interacted with, initiates a third play of the game. The method can include generating a notification in response to determining that the score for the play satisfies the score threshold. The notification may indicate that the credit balance has been adjusted according to the score. The method can include generating a random number to determine the respective game condition of each of the set of interactive spaces of the grid for the play of the game. The method can include causing, in response to determining that the play of the game has not satisfied the termination condition, the graphical user interface to display an interactive element that, when interacted with, adjusts the credit balance based on the score.

Referring now to an example implementation of a slot machine game with hold symbols, the data processing system 205 can generate a first graphical user interface, which includes a set of reels displaying a set of first symbols for a first play of the game. If one or more symbols of the set of first symbols satisfy a hold condition, the one or more symbols are virtually transitioned (or transformed) by the data processing system 205 into a randomly selected symbol (e.g., first selected symbol) at their respective virtual positions. Symbols that satisfy a hold condition may be symbols having a particular appearance (e.g., a closed door, etc.), which transforms by revealing another symbol (e.g., an animation showing the door open to reveal/display a randomly selected symbol, etc.). An outcome of the first play is determined based on the combination of symbols presented on the reels following the transformation of any hold symbols.

Upon requesting an additional spin of the slot machine game, the data processing system 205 transitions the hold symbols back to their original appearance on the graphical user interface, and the data processing system 205 updates the game state information 275 and generates a second graphical user interface presenting updated reels with a set of second symbols while maintaining the respective virtual positions of the hold symbols from the previous spin (or play). If one or more symbols from the set of second symbols satisfy the hold condition, all the symbols satisfying the hold condition are virtually transformed by the data processing system 205 into a randomly selected symbol (e.g., second selected symbol) at their respective virtual positions. In some implementations, a single symbol may be randomly selected and displayed at all locations of the virtually transformed hold symbols. The data processing system 205 can adjust the credit balance based on the combination of symbols (including the randomly selected symbol) appearing on the reels according to a paytable or the game instructions 280. The data processing system 205 can update and display updated information (e.g., player interaction, spins, corresponding outcomes, etc.) on the graphical user interface. Example graphical user interfaces showing an example implementation of a slot machine game with hold symbols are shown in FIGS. 15A-15H.

Figure 15A:
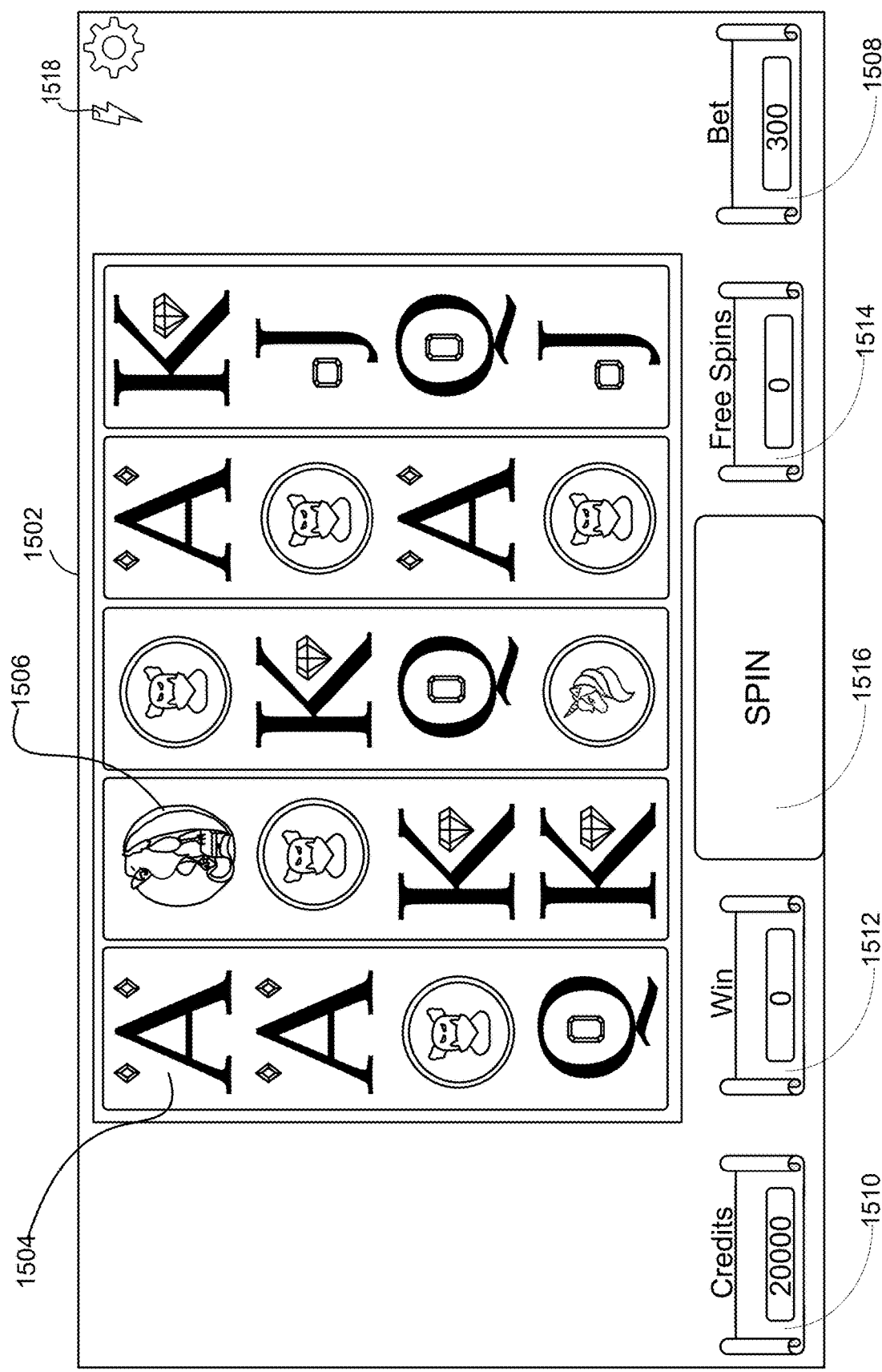
FIGS. 15A, 15B, 15C, 15D, 15E, 15F, 15G, and 15H depict further diagrams of example graphical user interfaces that may be displayed in connection with network communication sessions established according to the techniques described herein, in accordance with one or more implementations.

Referring now to FIG. 15A in the context of the components described in connection with FIG. 2, a graphical user interface 1502 is presented on a client device 220, for example, for initiating a play of a slot machine game with hold symbols. In some implementations, the slot machine game may terminate (e.g., satisfies a termination condition) when, following an initial spin, the reels no longer include any symbols satisfying a hold condition in the next (or subsequent) spin. As discussed above, the device communicator 230 facilitates communication between the client device 220 and the data processing system 205, allowing players to interact with the graphical user interface 1502 and transmit their actions to the data processing system 205. As players engage with the graphical user interface 1502, their actions, such as placing bets or initiating the game, may be captured and stored in their player profile 270.

As shown in FIG. 15A, the graphical user interface 1502 displays a slot machine with vertical columns (hereinafter referred to as "reels" 1504) of symbols 1506. The number of reels 1504 displayed in the graphical user interface 1502 for a play of the slot machine game with hold symbols can be any positive integer. In the provided illustration, five reels 1504 are displayed on the graphical user interface 1502. The symbols 1506 displayed on the reels 1504 can correspond to a diverse range, such as numbers, letters, or any thematic elements suitable for the game's context. However, in the provided illustration, the symbols 1506 displayed on the reels 1504 are a combination of letters, numbers, and/or various other visual shapes/patterns.

The graphical user interface 1502 displays several interactive elements. For example, a player can interact with the graphical user interface 1502 to place a wager. Any type of wagering interface may be utilized to place a wager for the game. In the example graphical user interface 1502 shown in FIG. 15A, a player can interact with a bet button 1508 to specify a wager amount for the play of the game. In some implementations, a player can interact with the bet button 1508 to place a wager for the play of the game. The wager information is then transmitted from the client device 220 to the data processing system 205. The data processing system 205 receives and processes the wagers, incorporating them into the game logic. The player profile 270 is also updated with the wager information. A credit balance region 1510 shown on the graphical user interface 1502 displays an amount of credits available for the player to wager on the game, which may be retrieved from the player profile 270 of the player.

A win region 1512 on the graphical user interface 1502 displays the payout for a spin based on whether the combination of symbols 1506 appearing on the reels 1504 satisfies a win condition and/or a bonus condition according to a paytable (or game instructions 280), as described herein. A free spins region 1514 is also displayed on the graphical user interface 1502, which indicates the number of free spins awarded to a player based on whether the combination of symbols 1506 appearing on the reels 1504 satisfies a bonus condition (or some other triggering condition(s)) based on the game instructions 280. Upon satisfying the bonus condition, the data processing system 205 updates the game state information 275 and presents the number of free spins in the free spins region 1514. Once the wager has been placed, the player can initiate the game by interacting with a spin button 1516. This interaction causes the data processing system 205 to update the graphical user interface 1502 and present a set of reels 1504 with symbols 1506, as shown in connection with FIG. 15B. In some implementations (not shown in the example implementations), the data processing system 205 can update the graphical user interface 1502 to enable a player to initiate an autospin mode by selecting a profit limit, a loss limit, and/or a total number of spins to be played.

In some implementations, the graphical user interface 1502 may display a lightning bolt button 1518 (or the graphical user interface 1502 may include other indicators in some implementations) that can cause the data processing system 205 to alter the animation speeds in response to an interaction with the lightning bolt button 1518. The lightning bolt button 1518 can be toggled on or off by the player during the gameplay. The animation speeds may be modified to increase or decrease the amount of time taken to update the game state. In some implementations, the lightning bolt button 1518 can be a part of the manual bet interface to allow manual control of the speed of the game.

Figure 15B:
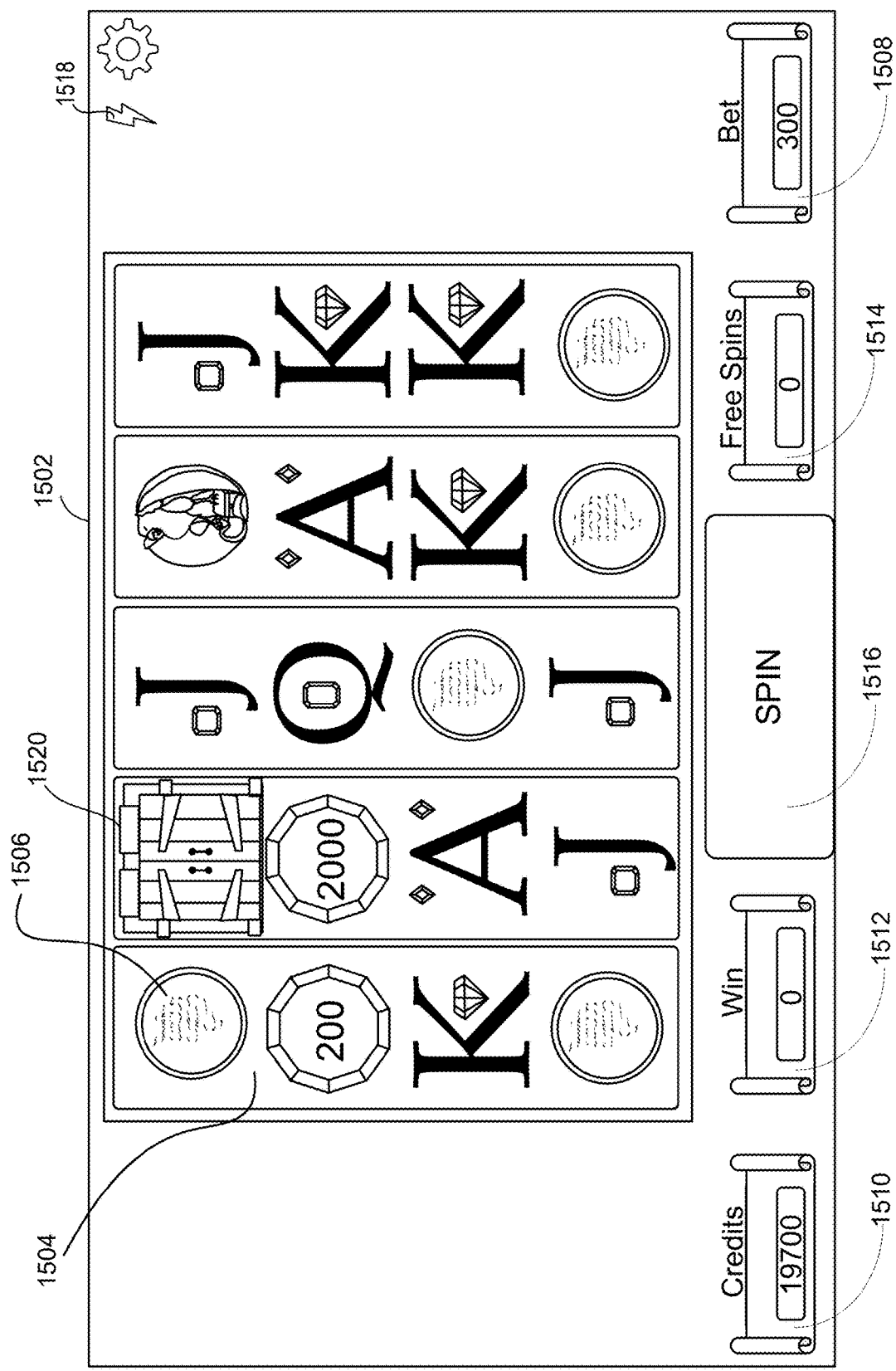

Referring now to FIG. 15B, in the context of the components described in connection with FIG. 2, an updated graphical user interface 1502 is presented on the client device 220 in response to an interaction with the spin button 1516 shown in FIG. 15A. In response to the interaction with the spin button 1516, the data processing system 205 causes the graphical user interface 1502 to be updated to present a set of randomly selected symbols 1506 on the reels 1504. In some implementations, the data processing system 205 can generate the set of randomly selected symbols 1506 to display on the reels 1504 in a grid.

In some implementations, the data processing system 205 can assign a number to each reel 1504 and determine which symbol 1506 appears on the reel 1504. For example, the data processing system 205 can assign the number 1 (or any positive integer) to the first reel 1504, the number 15 (or any positive integer) to the second reel 1504, and so on. The data processing system 205 can then randomly select a symbol 1506, or in some implementations a set of symbols 1506 (shown here as four vertically positioned symbols 1506 on each reel 1504) for each reel 1504. In some implementations, the data processing system 205 can randomly select symbols 1506 for display on the reels 1504 using one or more random numbers and a lookup table. The lookup table would contain a list of all the possible symbols 1506, and each symbol 1506 would be associated with a number. The data processing system 205 can then randomly select a number from the lookup table, and the symbol 1506 associated with that number can appear on the reel 1504.

In some implementations, one or more symbols 1506 appearing on the reels 1504 can satisfy a hold condition. As shown in the example, one of the symbols 1506 on the second reel 1504 following the first reel 1504 from the left of the graphical user interface 1502 satisfies the hold condition. In some implementations, the graphical user interface 1502 initially displays the symbols 1506 satisfying the hold condition as a "closed door". A hold symbol 1520 can be a still image or may be a more animated graphic. At the end of the spin, the graphical user interface 1502 is updated to virtually transition (e.g., transform) the hold symbol 1520 into a randomly selected symbol 1506, as shown in connection with FIG. 15C.

Figure 15C:
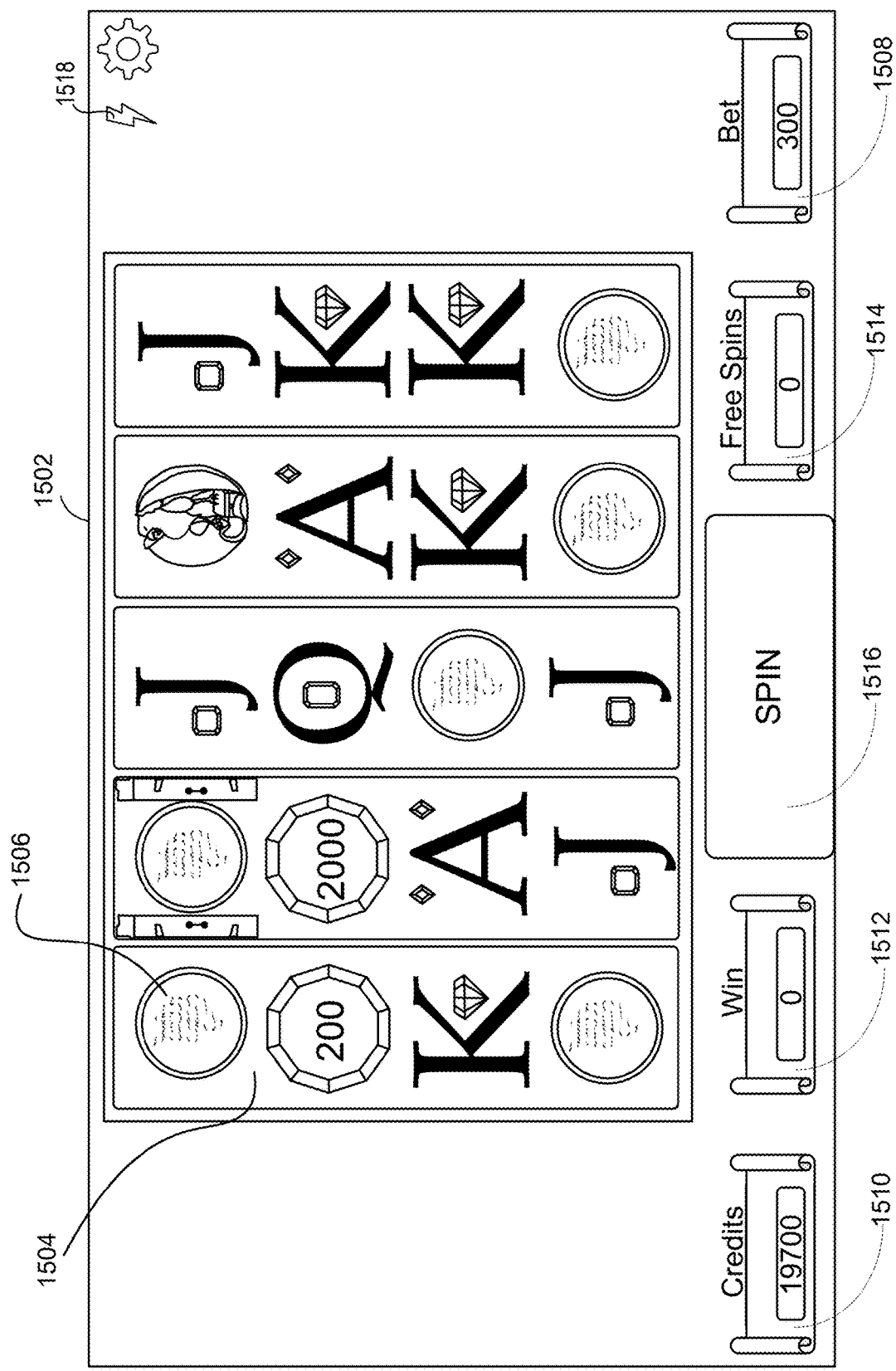

Referring now to FIG. 15C, in the context of the components described in connection with FIG. 2, an updated graphical user interface 1502 is presented on the client device 220 depicting the transformation of the hold symbol 1520 into a randomly selected symbol (e.g., a randomly selected first symbol in this example). As described herein, at the end of the spin, the hold symbol 1520 represented as the closed door can be transitioned from a closed state to an open state (e.g., using a corresponding animation) by the data processing system 205, revealing the randomly selected first symbol (e.g., a unicorn coin in this example). In some implementations, the data processing system 205 can use a pre-recorded sound library to generate audio feedback for each symbol 1506 satisfying the hold condition. For example, when the door opens, the data processing system 205 may retrieve the appropriate sound effect from the library and play it. After each spin, the data processing system 205 determines a corresponding payout based on the combination of symbols 1506. In some implementations, upon initiation of a subsequent (or next) spin, the randomly selected symbols initially satisfying the hold condition are transitioned back from the opened-door state to the closed-door state, as shown in connection with FIG. 15D.

Figure 15D:
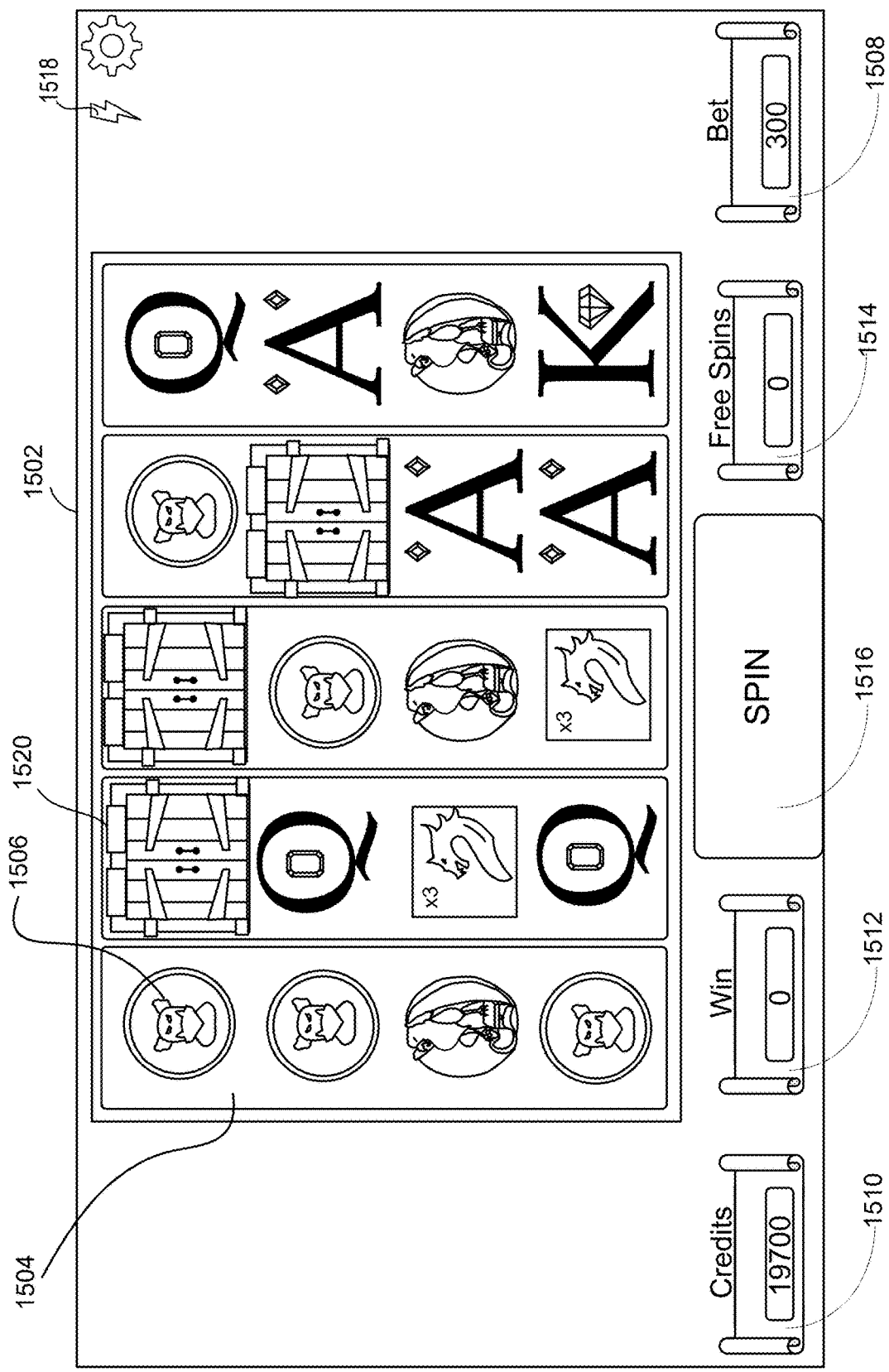

Referring now to FIG. 15D, in the context of the components described in connection with FIG. 2, an updated graphical user interface 1502 is presented on the client device 220, depicting the transformation of the randomly selected symbol shown in FIG. 15C back to the hold symbol 1520. In some implementations, when a symbol 1506 satisfies the hold condition, the data processing system 205 updates the game state information 275 and maintains the virtual position of the hold symbol 1520 on the reel 1504 for a subsequent spin.

In some implementations, the data processing system 205 can use a hold table to store the positions of all the symbols 1506 satisfying the hold condition. When a player interacts with the spin button 1516 for the subsequent spin, the graphical user interface 1502 is updated to transform the randomly selected symbol initially satisfying the hold condition back to its original state (e.g., prior to revealing the symbol 1506). In addition to the hold symbol 1520 from the previous spin, the data processing system 205 can also select additional hold symbols 1520 for the subsequent spin, as shown in FIG. 15D, which depicts the hold symbols 1520 on the third and fourth reels following the first reel from the left of the graphical user interface 1502. At the end of the spin, the data processing system 205 checks the hold table to see which symbols 1506 satisfy the hold condition and maintain their respective virtual positions on the reels 1504, as shown in connection with FIG. 15E. The data processing system 205 also selects additional symbols 1506 for each location in the grid that does not have the hold symbol 1520.

Figure 15E:
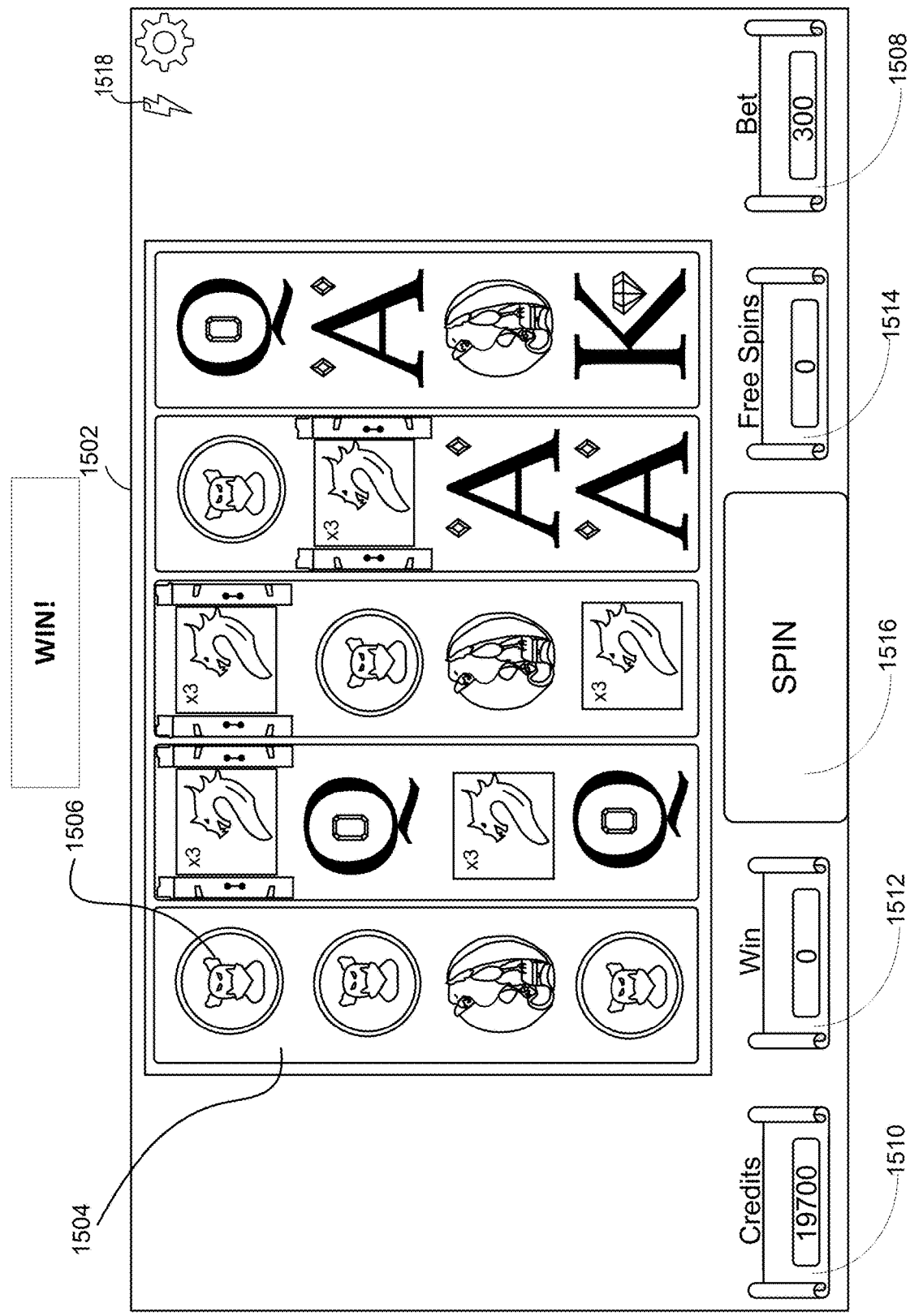

Referring now to FIG. 15E, in the context of the components described in connection with FIG. 2, an updated graphical user interface 1502 is presented on the client device 220 in response to a second interaction with the spin button 1516. The data processing system 205 updates the game state information 275 and generates an additional set of reels 1504. As described herein, the virtual position of the hold symbol 1520 appearing on the second reel 1504 from the previous spin (e.g., first spin) is maintained and carried over to the next spin (e.g., second spin). Furthermore, one or more symbols 1506 can be seen satisfying the hold condition. In addition to being able to hold multiple hold symbols, the data processing system 205 may also use a random number generator to determine, prior to spinning the reels 1504, which reel 1504 will display symbols 1506 satisfying the hold condition and the number of hold symbols 1520 appearing on the reel 1504.

When the data processing system 205 identifies each hold symbol 1520, the graphical user interface 1502 is updated to virtually transform all of the hold symbols 1520 into the same randomly selected symbol (e.g., a randomly selected second symbol in this example). In some implementations, the randomly selected second symbol revealed in the subsequent spin may be visually identical to the randomly selected first symbol revealed in the previous spin. In other implementations, the randomly selected second symbol may be visually distinguished from the randomly selected first symbol shown in the previous spin (e.g., FIG. 15C). In this example, all the hold symbols 1520 are transformed on the graphical user interface 1502 to display a dragon. However, it is to be noted that there may be other symbols 1506 on the reels 1504 that correspond to the same random symbol 1506 (e.g., dragon in this example) that are selected separately by the data processing system 205 when generating the symbols 1506 on the reels 1504 for the play of the game. As a result, there may be multiple matching symbols 1506 on the reels 1504, even though all of those matching symbols 1506 may not be hold symbols 1520. In other words, the data processing system 205 can select the randomly selected symbol to which the hold symbols 1520 are to transform from the same set of symbols 1506 that are selected for each other position on the grid formed by the reels 1504. The data processing system 205 can determine an outcome of the play (or spin) based on the combination of symbols 1506 appearing on the reels 1504, including the symbols 1506 satisfying the hold condition and the symbols 1506 not satisfying the hold condition. In some implementations, the data processing system 205 can identify a multiplier value associated with one or more symbols 1506 (or combinations of symbols 1506) appearing on one or more of the reels 1504.

In some implementations, the data processing system 205 can determine whether the symbols 1506 satisfy a win condition by comparing the symbols 1506 that appear on the reels 1504 to a combination configuration for the win condition. The combination configuration for the win condition can be defined by the game instructions 280 or paytable. In some implementations, the combination configuration can be compared to a set of paylines maintained by the paytable. The paylines can define specific combinations, orders, or patterns of symbols 1506 that result in a win, such as straight, diagonal, and/or scatter combinations. Based on the symbol combinations appearing on the reels 1504, the data processing system 205 can determine a payout according to the paytable.

Upon determining the corresponding payout, the data processing system 205 can update the credit balance of the player profile 270. The graphical user interface 1502 is also updated to display the award amount, corresponding to the win condition, in the win region 1512. In some implementations, the winning combination of symbols 1506 may also satisfy a bonus condition. Throughout the gameplay, the data processing system 205 updates the game state information 275 and maintains a track of the hold symbols 1520 and their respective virtual positions on the reels 1504 until a subsequent spin (e.g., next spin) results in no additional hold symbols 1520, except for the hold symbols 1520 from the previous spin, as shown in connection with FIG. 15F.

Figure 15F:
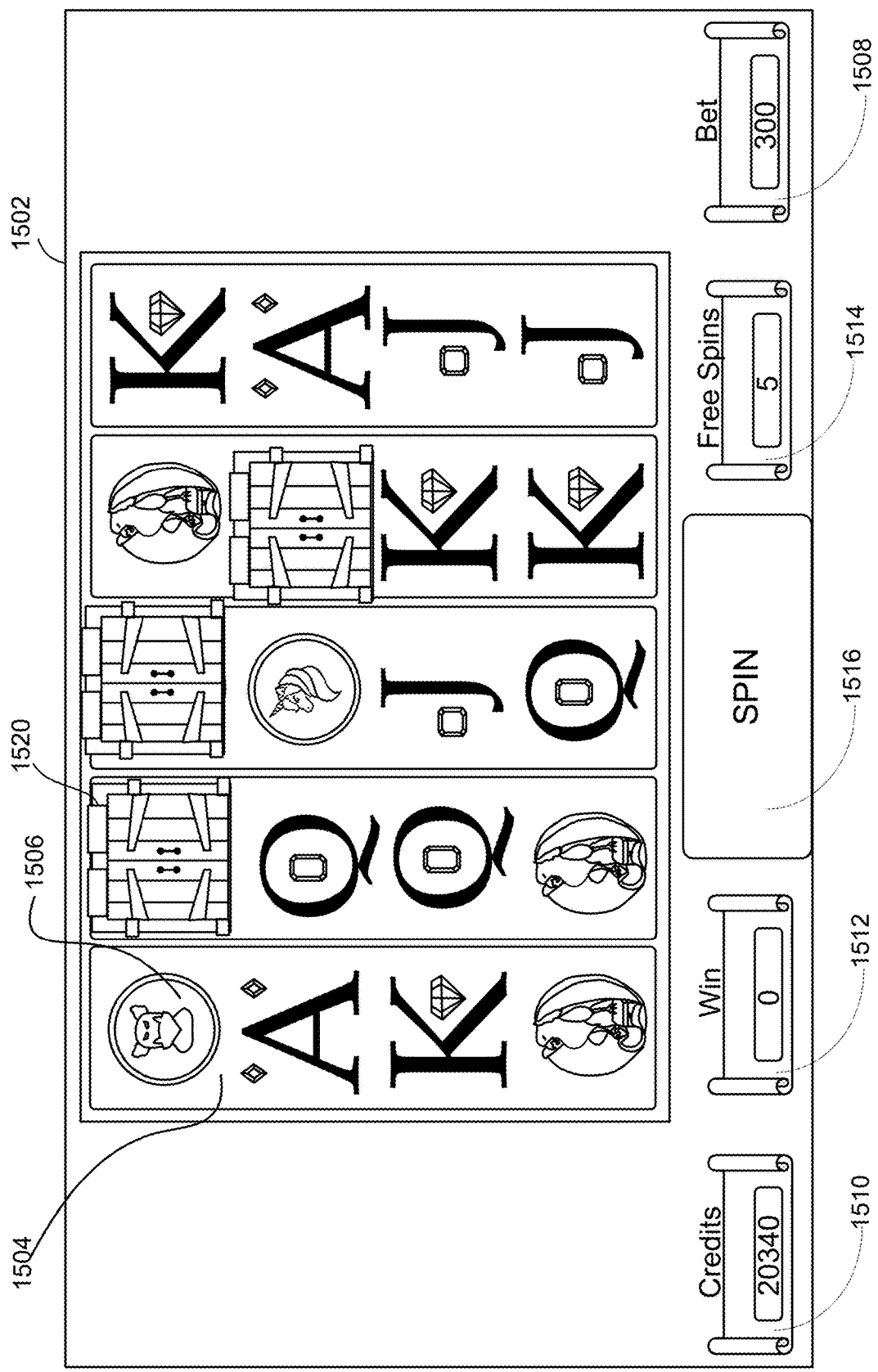

Referring now to FIG. 15F, in the context of the components described in connection with FIG. 2, an updated graphical user interface 1502 is presented on the client device 220, depicting that no additional hold symbols 1520 have been selected to be presented on the reels 1504 for the subsequent spin, thereby indicating that the hold symbols 1520 are not to be retained in a subsequent spin. As described herein, the data processing system 205 may use a hold table to keep track of all the symbols 1506 satisfying the hold condition and their respective virtual positions on the reels 1504. The data processing system 205 may use this information to determine whether a subsequent spin results in any additional hold symbols 1520. If the subsequent spin does not result in any additional hold symbols 1520, except for the hold symbols 1520 from the previous spin, the data processing system 205 updates the game state information 275 to indicate that no additional hold symbols 1520 are present on the reels 1504.

In some implementations, the loss condition may be satisfied if the combination of symbols 1506 does not result in an award amount according to the paytable or the game instructions 280. In some implementations, the subsequent spin may be free or paid. If the subsequent spin is free, a user will continue to receive free spins until no additional hold symbols 1520 appear on the reels 1504. If a user is charged for each spin, the hold symbols 1520 will be retained between spins until a spin results in no additional hold symbols 1520. Then, for the subsequent spin, the hold symbols 1520 will be reset, as shown in connection with FIG. 15G.

Figure 15G:
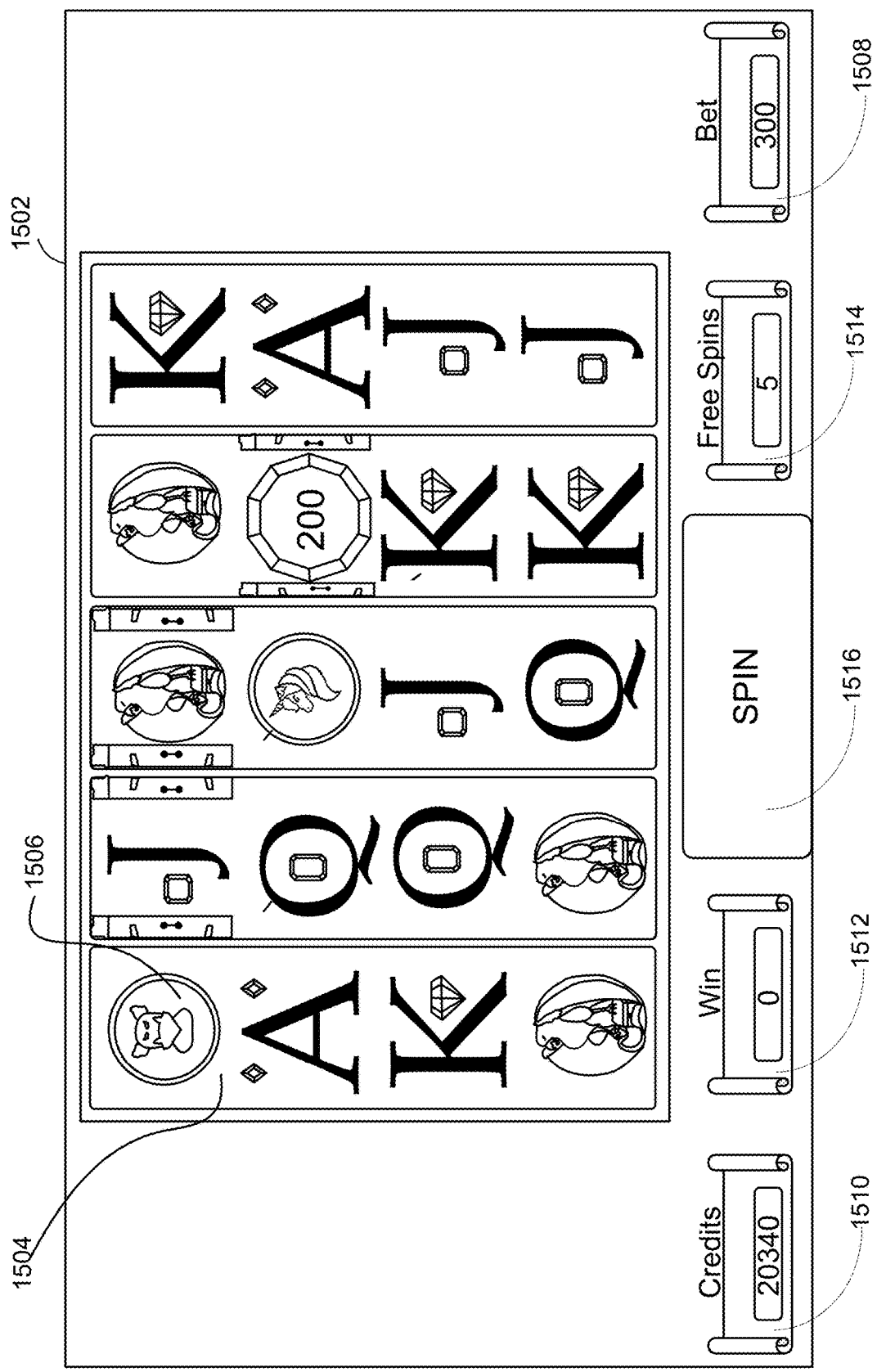

Referring now to FIG. 15G, in the context of the components described in connection with FIG. 2, an updated graphical user interface 1502 is presented on the client device 220, depicting reels 1504 with updated symbols 1506 following an additional spin after determining that no additional hold symbols 1520 have been selected for display relative to those selected for the previous spin (e.g., described in connection with FIGS. 15D and 15E). As described herein, once the data processing system 205 identifies that no additional hold symbols 1520 have been selected, the data processing system 205 updates the game state information 275 and the graphical user interface 1502 to replace each previously held hold symbol 1520 with a randomly selected symbol at the respective virtual position of the hold symbol 1520. For example, as shown in FIG. 15G, three hold symbols 1520 were previously presented on the reels 1504 in FIG. 15F. The data processing system 205 selects a randomly selected symbol to replace each hold symbol 1520 and can transform each hold symbol 1520 from the closed-door state to the open-door state, revealing each corresponding selected symbol as the replacement. As shown on the graphical user interface 1502, the hold symbol 1520 on the second reel has been replaced with the letter "J", the hold symbol 1520 on the third reel has been replaced with a "parrot" symbol, and so on. Upon the transformation of the hold symbols 1520, the data processing system 205 can determine the outcome based on the revealed symbols and other symbols on the reels 1504, as described herein. Upon receiving a request for another subsequent spin, the data processing system 205 updates the graphical user interface 1502 to present another set of symbols on the reels 1504, and determines a corresponding outcome based on the set of symbols, as described in connection with FIG. 15H.

Figure 15H:
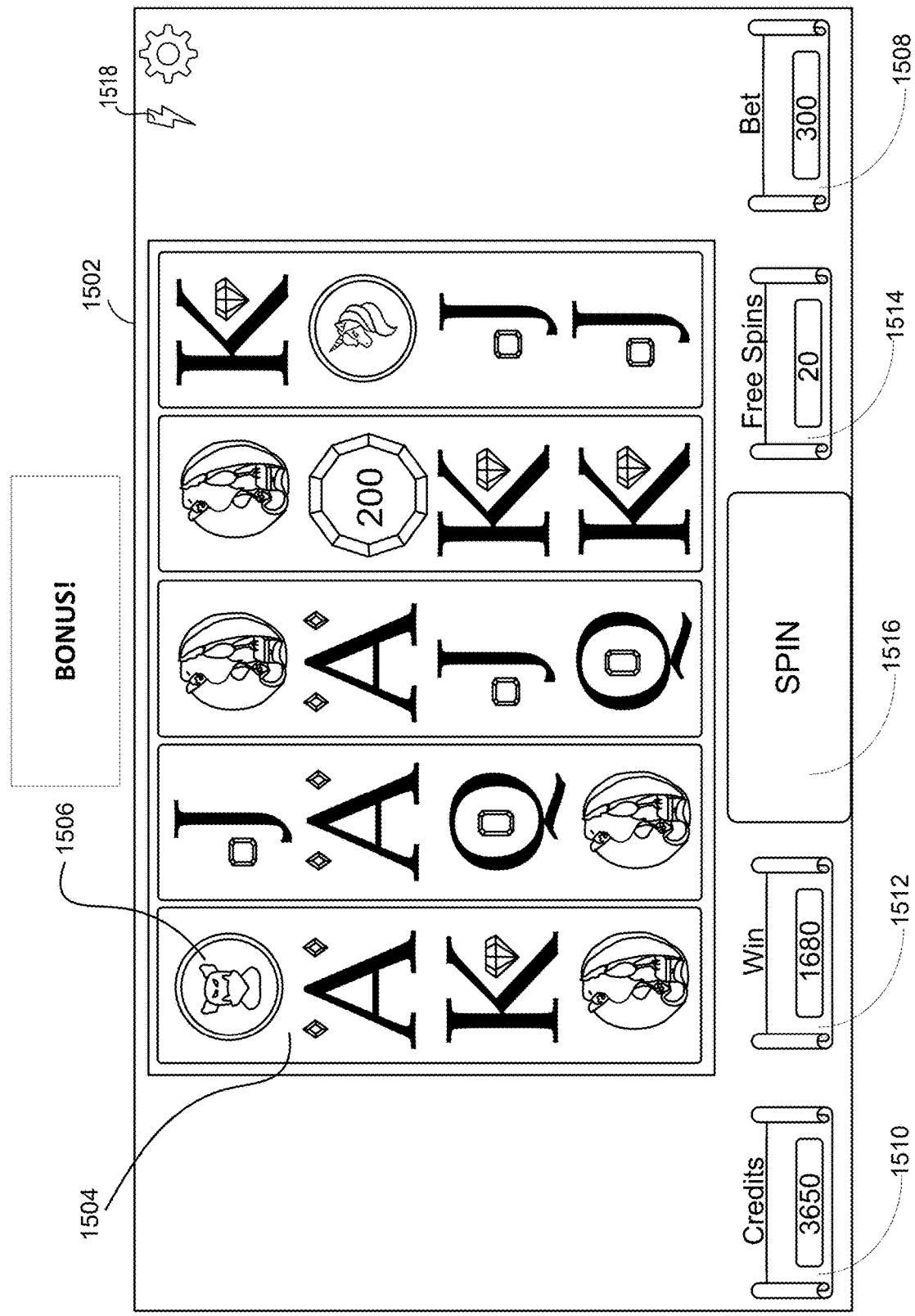

Referring now to FIG. 15H, in the context of the components described in connection with FIG. 2, an updated graphical user interface 1502 is presented on the client device 220 in response to an additional spin following the interface displayed in FIG. 15G, depicting that a bonus condition has been satisfied. As shown, because no additional hold symbols 1520 were added in the spin described in connection with FIGS. 15F and 15G, all hold symbols 1520 previously maintained in their corresponding positions have been replaced with randomly selected symbols (which in some implementations, may include randomly selected hold symbols positioned in the same or in different positions on the reels 1504). As described herein, the data processing system 205 can identify the positions of each symbol 1506 to determine an outcome for the spin.

In some implementations, and as shown in FIG. 15H, the data processing system 205 can determine whether a bonus condition has been satisfied by comparing the symbols 1506 that appear on the reels 1504 to the combination configuration for the bonus condition. The combination configuration for the bonus condition can be defined by the game instructions 280 or paylines maintained by the paytable, as described herein. For example, if the combination configuration for the bonus condition is three (or any positive integer) matching letters in a row, the data processing system 205 can determine via the graphical user interface 1502 if three matching letters appear in a row on any of the reels 1504. If they do, then the bonus condition is satisfied.

In some implementations, a combination of symbols 1506 that satisfies the bonus condition may include both a winning combination of symbols 1506 and a separate bonus combination of symbols 1506. For example, the winning combination may be a predetermined number of symbols 1506 appearing on the reels 1504, and the bonus combination may be a combination of a predetermined number of animations or letters, different from the winning combination of symbols 1506. In this example, the combination configuration for the bonus condition would be three matching letters (e.g., "A") in a row. In some implementations, the bonus combination of symbols 1506 may also include a symbol that satisfies a win condition for the game, such as a jackpot symbol.

In some implementations, the data processing system 205 may determine award amounts associated with win conditions, which may include bonus award amounts associated with specific bonus conditions. For example, an award amount resulting from a winning combination of symbols 1506 and a bonus combination of symbols 1506 may be different than an award amount resulting from a winning combination of symbols 1506 and the presence of one or more symbols 1506 satisfying the bonus condition. The specific award amount for each symbol 1506 or combination of symbols 1506 can be determined based on the game instructions 280, which may specify the payable storing association between combinations of symbols 1506 and award amounts, as described herein.

As described herein, the data processing system 205 can identify a multiplier value associated with one or more symbols 1506 (or combinations of symbols 1506). In some implementations, the multiplier value may be associated with a jackpot symbol, for example, or a predetermined combination of symbols 1506, satisfying the hold condition or not satisfying the hold conditions, appearing on the reels 1504. In some implementations, the multiplier value may be applied when both a jackpot symbol and a bonus combination of symbols 1506 appear on the reels 1504. For example, the data processing system 205 first determines whether a jackpot symbol is present on the reels 1504. If so, the data processing system 205 then identifies the multiplier value for the jackpot symbol and adjusts the credit balance according to the bonus combination of symbols 1506. In some implementations, the multiplier value can be applied to the outcome of any additional gameplay generated in response to the bonus condition being satisfied.

As shown in FIG. 15H, a bonus combination of three symbols 1506 (e.g., A) in a row is displayed on the graphical user interface 1502. In response to the bonus condition being satisfied, the data processing system 205 may provide one or more additional awards, including but not limited to an additional game play or a bonus award amount. The specific bonus award may be determined based on the game instructions 280. In some implementations, the graphical user interface 1502 is updated to indicate additional gameplays (e.g., additional spins) in the free spins region 1514.

As the data processing system 205 determines the outcome of a play (including any additional plays), the data processing system 205 updates a credit balance of the player profile 270 to reflect the award amounts corresponding to the outcomes. The credit balance region 1510 can be dynamically updated to include the updated credit balance based on any award amount or bonus amount provided based on an outcome of a play of the slot machine game with hold symbols 1520. The player profile 270 of the player may also be updated to include metadata corresponding to the plays of the game, including any indication of games won, the date and time of any reward or bonus, the game in which the reward or bonus was provided, and any conditions that were met during the play of the game. As described herein, the award amounts of the slot machine game with hold symbols 1520 can be determined as a function of the odds of winning a particular selected outcome and may be provided as part of the game instructions 280.

Figure 16:
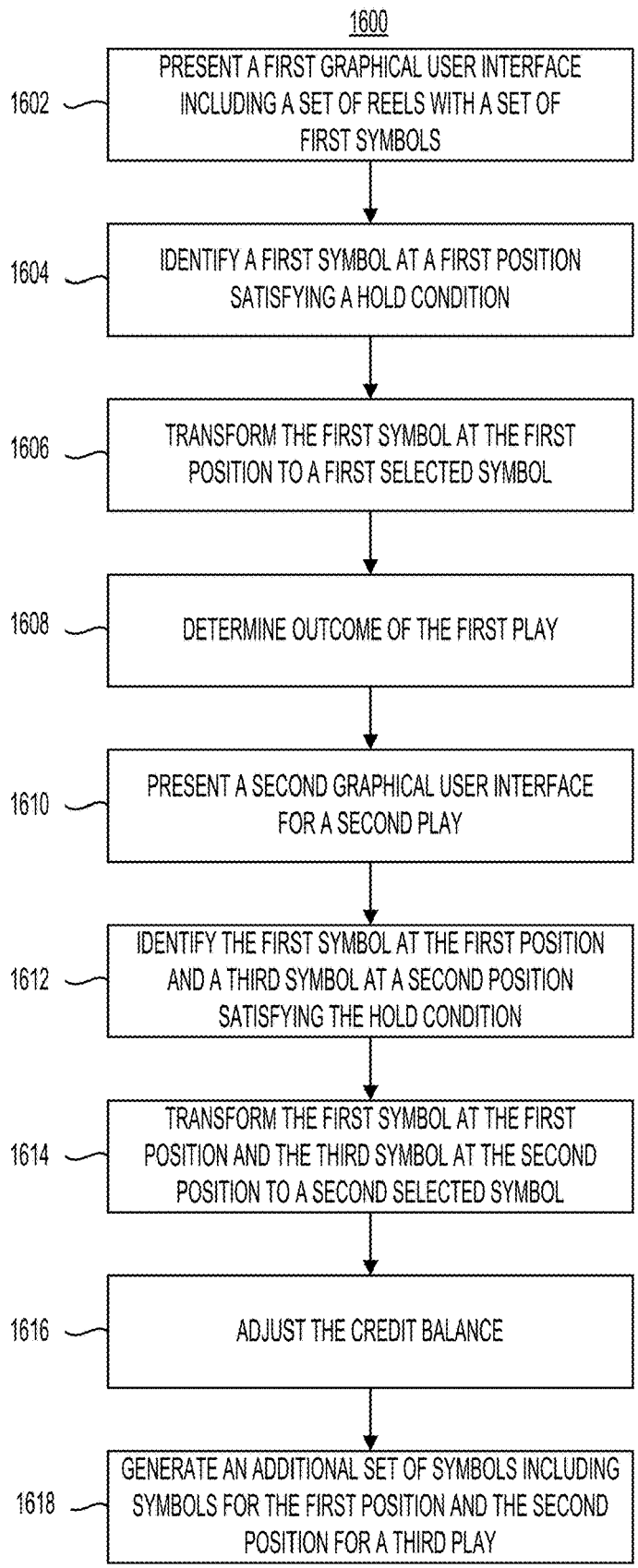
FIG. 16 depicts an example flow diagram of an example network application that may be accessed via network communication sessions established according to the techniques described herein, in accordance with one or more implementations.

Referring now to FIG. 16, depicted is an illustrative flow diagram of a method 1600 for providing a slot machine game with hold symbols. The method 1600 can be executed, performed, or otherwise carried out by a system. A data processing system (e.g., the data processing system 205) can be remote to one to one or more client devices and communicate with the one or more client devices via a computer network. In some implementations, the operations of method 1600 can be performed by a standalone gaming device (e.g., without communicating with a gaming server to perform the method steps). In a brief overview of method 1600, the gaming server can present a first graphical user interface including a set of reels with a set of first symbols (STEP 1602), identify a first symbol at a first position satisfying a hold condition (STEP 1604), transform the first symbol at the first position to a first selected symbol (STEP 1606), determine outcome of the first play (STEP 1608), present a second graphical user interface for a second play (STEP 1610), identify the first symbol at the first position and a third symbol at a second position satisfying the hold condition (STEP 1612), transform the first symbol at the first position and the third symbol at the second position to a second selected symbol (STEP 1614), adjust the credit balance (STEP 1616), and generate an additional set of symbols including symbols for the first position and the second position for a third play (STEP 1618).

In further detail of method 1600, the data processing system can receive a wager. The wager can be received in one or more messages received from a client device. The message, or request, can indicate that a player intends to play a game provided by the data processing system. The message can include an indication of a player profile with which to access functionalities related to the game (e.g., placing wagers using earned credits, purchasing additional credits, etc.). The wager can be provided via a graphical user interface (e.g., the graphical user interface 1502 of FIG. 15A). The wager amounts provided can be a specified amount of credits, such as 1, 5, 155, 100, 500, or 1000 credits. In some implementations, the player can specify a custom number or fractional number of credits used in the game. Once the wager has been selected, the client device can transmit a request to place the wagers for the play of the game.

Upon receiving the wager, the data processing system can generate a first graphical user interface, including a set of randomly selected symbols on the reels (STEP 1602). In some implementations, the data processing system can generate the set of randomly selected symbols to display on the reels in a grid. In some implementations, one or more symbols (e.g., first symbols) appearing on the reels can satisfy a hold condition (STEP 1604). In some implementations, the graphical user interface can display the symbols satisfying the hold condition as a "closed door". A hold symbol can be a still image or may be a more animated graphic.

At the end of the spin, the graphical user interface is updated to transform the hold symbol into a randomly selected symbol (e.g., a randomly selected first symbol) (STEP 1606). The hold symbol represented as the closed door can be transitioned from a closed state to an open state (e.g., using a corresponding animation) by the data processing system. After each spin, the data processing system determines a corresponding payout (or outcome) based on the combination of symbols (STEP 1608).

In some implementations, the data processing system can present a second graphical user interface in response to receiving a request for a second play (STEP 1610). Upon receiving the request, the graphical user interface is updated to transform the randomly selected first symbol initially satisfying the hold condition back to its original state (e.g., prior to revealing the symbol).

In some implementations, when a symbol satisfies the hold condition, the data processing system updates the game state information and maintains the virtual position of the hold symbol on the reel for a subsequent spin. In addition to the hold symbol from the previous spin, the data processing system can also identify additional hold symbols (e.g., third symbols) for the subsequent spin (STEP 1612). At the end of the spin, the data processing system can determine which, and how many, symbols satisfy the hold condition and maintain their respective virtual positions on the reels. In some implementations, the data processing system may use a random number generator to determine, prior to or upon receiving input to generate symbols for the reels, which reel will display symbols satisfying the hold condition and the number of hold symbols appearing on the reel.

When the data processing system identifies each hold symbol, the graphical user interface is updated to virtually transform all the hold symbols into the same randomly selected symbol (e.g., a randomly selected second symbol in this example) (STEP 1614). In some implementations, the randomly selected second symbol revealed in the subsequent spin may be visually identical to the randomly selected first symbol revealed in the previous spin. In other implementations, the randomly selected second symbol may be visually distinguished from the randomly selected first symbol shown in the previous spin. However, it is to be noted that there may be other symbols on the reels that correspond to the same random symbol that are selected separately by the data processing system when generating the symbols on the reels for the play of the game. As a result, there may be multiple matching symbols on the reels, even though all of those matching symbols may not be the hold symbols.

The data processing system can determine the outcome based on the combination of symbols appearing on the reels, including the symbols satisfying the hold condition and the symbols not satisfying the hold condition. In some implementations, the data processing system can identify a multiplier value associated with one or more symbols (or combinations of symbols appearing on one or more of the reels. In some implementations, the data processing system can determine whether the symbols satisfy a win condition by comparing the symbols that appear on the reels to a combination configuration for the win condition. The combination configuration for the win condition can be defined by the game instructions or paytable. In some implementations, the combination configuration can be compared to a set of paylines maintained by the paytable. The paylines can define specific combinations, orders, or patterns of symbols that result in a win, such as straight, diagonal, and/or scatter combinations. Based on the symbol combinations appearing on the reels, the data processing system can determine a payout according to the paytable. Upon determining the corresponding payout, the data processing system can update the credit balance of the player profile (STEP 1616).

Throughout the gameplay, the data processing system updates the game state information and maintains a track of the hold symbols and their respective virtual positions on the reels until a subsequent spin (e.g., next spin) results in no additional hold symbols. Once the data processing system identifies that no additional hold symbols have been selected, the data processing system updates the game state information and the graphical user interface to generate an additional set of symbols, replacing hold symbols with randomly selected symbols for a third play (STEP 1618). For example, the hold symbols previously maintained in their corresponding positions (e.g., first and second positions) can be replaced with randomly selected symbols. The data processing system can then identify the positions of each symbol on the reels to determine the outcome of the spin.

In some implementations, the data processing system can determine whether a game condition (win, bonus, and/or loss condition(s)) has been satisfied by comparing the symbols that appear on the reels to the combination configuration. The combination configuration for the game condition can be defined by the game instructions or paylines maintained by the paytable, as described herein. Once the play of the game is completed, the data processing system can terminate the gameplay and adjust the credit balance. The adjustment can be made based on the computed bonus award and the individual award amounts calculated for each outcome. In some implementations, the data processing system can increase the credit balance in the player's player profile by the sum of the bonus award amount and the award amount for each successful outcome. However, if the bonus award condition is not satisfied, resulting in a zero bonus award amount, the data processing system can increase the credit balance only by the award amounts for the winning outcomes. In cases where the bonus award is credited to the player before the completion of the game, the data processing system can update the credit balance of the player profile by adding the award amounts for the winning outcomes to the credit balance. The data processing system can store additional metadata relating to the plays of the game, including but not limited to the award amount(s) won, along with corresponding timestamps indicating the time the award amount(s) were won, in the player profile.

At least one aspect of the present disclosure is directed to a system. The system can include one or more processors coupled to memory. The one or more processors may cause presentation of a first graphical user interface, including a set of reels showing a set of first symbols for a first play of a game. The set of first symbols may include a first symbol that satisfies a hold condition. The first symbol may be located at a first position on the set of reels. The one or more processors may transform the first symbol at the first position to a first selected symbol to generate an updated set of first symbols for the first play of the game. The outcome of the first play may be determined based on the updated set of first symbols. The one or more processors may cause presentation of a second graphical user interface for a second play of the game. The second graphical user interface may include the set of reels showing a set of second symbols, including the first symbol at the first position and a third symbol at a second position. The first symbol and the third symbol may satisfy the hold condition. The one or more processors may transform each of the first symbol at the first position and the third symbol at the second position to a second selected symbol to generate an updated set of second symbols for the second play of the game. The one or more processors may adjust a credit balance based on the updated set of second symbols for the second play of the game.

In some implementations, the one or more processors may cause presentation of a third graphical user interface for a third play of the game. The third graphical user interface may include the set of reels showing a set of third symbols, including the first symbol at the first position and the third symbol at the second position. All other symbols in the set of third symbols may not satisfy the hold condition. The one or more processors may transform each of the first symbol at the first position and the third symbol at the second position to a third selected symbol to generate an updated set of third symbols for the third play of the game. In some implementations, responsive to determining that each other symbol of the set of third symbols does not satisfy the hold condition, the one or more processors may cause presentation of a fourth graphical user interface for a fourth play of the game, including a set of reels showing a set of fourth symbols, and generate a first random symbol for the first position and a second random symbol for the second position.

In some implementations, the one or more processors may determine that a bonus condition for the play of the game is satisfied based on identifying a bonus symbol on the set of reels. In some implementations, responsive to determining that bonus condition for the play of the game has been satisfied, the one or more processors may adjust the credit balance with a bonus value or generate an additional play of the game. In some implementations, the one or more processors may generate random numbers to select symbols satisfying the hold condition. In some implementations, the one or more processors may generate audio feedback for each selection of the symbol satisfying the hold condition. In some implementations, the one or more processors may receive a user input and cause the graphical user interface to initiate a number of plays of the game in response to receiving the user input. In some implementations, the one or more processors may cause the graphical user interface to display an animation of the transformation of the first symbol at the first position to the first selected symbol and each of the first symbol at the first position and the third symbol at the second position to the second selected symbol. In some implementations, the one or more processors may cause the graphical user interface to visually distinguish the first selected symbol and the second selected symbol.

At least one aspect of the present disclosure is directed to a method. The method can include causing presentation of a first graphical user interface, including a set of reels showing a set of first symbols for a first play of a game. The set of first symbols may include a first symbol that satisfies a hold condition. The first symbol may be located at a first position on the set of reels. The method can include transforming the first symbol at the first position to a first selected symbol to generate an updated set of first symbols for the first play of the game. The outcome of the first play may be determined based on the updated set of first symbols. The method can include causing presentation of a second graphical user interface for a second play of the game. The second graphical user interface may include the set of reels showing a set of second symbols, including the first symbol at the first position and a third symbol at a second position. The first symbol and the third symbol may satisfy the hold condition. The method can include transforming each of the first symbol at the first position and the third symbol at the second position to a second selected symbol to generate an updated set of second symbols for the second play of the game. The method can include adjusting a credit balance based on the updated set of second symbols for the second play of the game.

The method can include causing presentation of a third graphical user interface for a third play of the game. The third graphical user interface may include the set of reels showing a set of third symbols, including the first symbol at the first position and the third symbol at the second position. All other symbols in the set of third symbols may not satisfy the hold condition. The method can include transforming each of the first symbol at the first position and the third symbol at the second position to a third selected symbol to generate an updated set of third symbols for the third play of the game. The method can include, responsive to determining that each other symbol of the set of third symbols does not satisfy the hold condition, causing presentation of a fourth graphical user interface for a fourth play of the game, including a set of reels showing a set of fourth symbols, and generating a first random symbol for the first position and a second random symbol for the second position. The method can include determining that a bonus condition for the play of the game is satisfied based on identifying a bonus symbol on the set of reels.

The method can include, responsive to determining that bonus condition for the play of the game has been satisfied, adjusting the credit balance with a bonus value, or generating an additional play of the game. The method can include generating random numbers to select symbols satisfying the hold condition. The method can include generating audio feedback for each selection of the symbol satisfying the hold condition. The method can include receiving a user input and causing the graphical user interface to initiate a number of plays of the game in response to receiving the user input. The method can include causing the graphical user interface to display an animation of the transformation of the first symbol at the first position to the first selected symbol and each of the first symbol at the first position and the third symbol at the second position to the second selected symbol. The method can include causing the graphical user interface to visually distinguish the first selected symbol and the second selected symbol.

Referring now to an example implementation of an electronic card game with selectable cards, the data processing system 205 can receive a request, including a first wager (e.g., main wager) and a side wager, and generate a graphical user interface having a first card for a player hand and a second card for a dealer hand. The graphical user interface can be updated to include a third card and a fourth card displayed in a selection region between the player hand and the dealer hand on the graphical user interface, forming a diamond formation. The third and fourth cards may be presented via the graphical user interface upon determining that the request indicated an additional wager (e.g., a side wager). A player can select either of the third or fourth cards to improve their hand. For example, if a player selects the third card, the data processing system 205 can update the game state information 275 based on the player's interaction. The data processing system 205 can further update the player hand with the first card and the selected card (e.g., the third card) and the dealer hand with the second card and the unselected card (e.g., the fourth card).

The data processing system 205 can determine the hand rank of each of the player and the dealer according to standard Blackjack rules or another type of ranking. For example, a player wins a hand (sometimes referred to herein as a "round" or a "play" of the card game) if their hand rank does not exceed a predetermined threshold (e.g., "twenty-one" points), resulting in a bust for the player, while outranking the hand of the dealer. A player can also win a hand if the hand rank of the dealer exceeds a predetermined value, resulting in a bust for the dealer. As described herein, the predetermined value may be twenty-one, or in some implementations, can be a different value (e.g., "twenty-two" points). Similarly, a player loses a hand if their hand is outranked by the hand of the dealer or if hand rank of the player exceeds the predetermined threshold (e.g., resulting in a bust for the player). A player can also lose a hand if the hand rank of the player is equal to the hand rank of the dealer. In some implementations, a tie can occur if the hand rank of the dealer satisfies the predetermined value (e.g., twenty-two points in this example). A bonus condition can be satisfied if the hand rank of the player is equal to the predetermined threshold (e.g., twenty-one points in this example).

The gameplay can be terminated (e.g., satisfying a termination condition) if any of the outcomes, including a win, loss, tie, and/or bonus conditions, are satisfied. Upon satisfying the termination condition, the data processing system 205 can adjust the credit balance of the player profile 270 according to a standard paytable or hand rank determination. Example graphical user interfaces showing an example implementation of an electronic card game with selectable cards are shown in FIGS. 17A-17F.

Figure 17A:
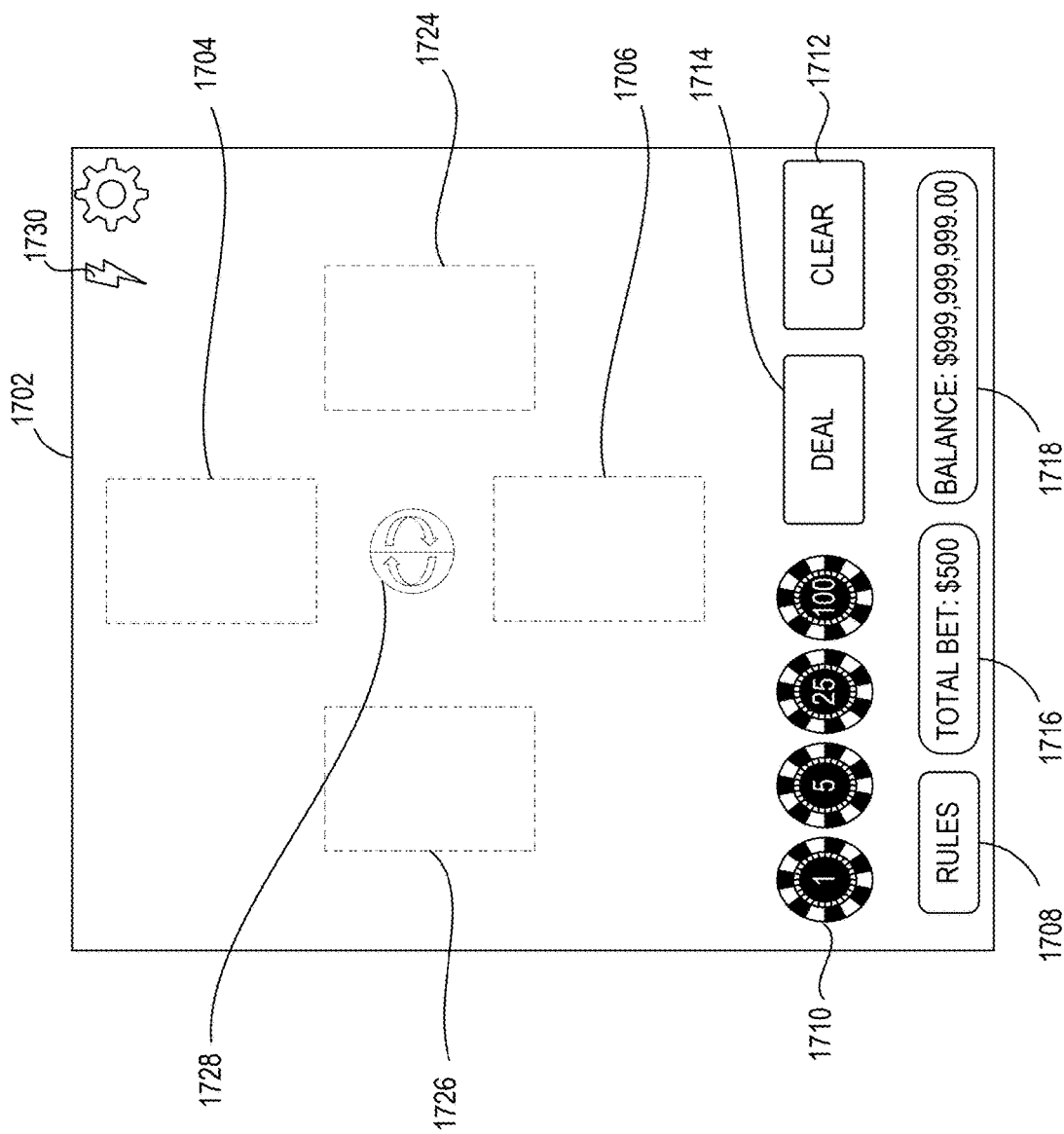
FIGS. 17A, 17B, 17C, 17D, 17E, and 17F depict further diagrams of example graphical user interfaces that may be displayed in connection with network communication sessions established according to the techniques described herein, in accordance with one or more implementations.

Referring now to FIG. 17A in the context of the components described in connection with FIG. 2, a graphical user interface 1702 is presented on a client device 220, for example, for initiating a play of an electronic card game with selectable cards. As discussed above, the device communicator 230 facilitates communication between the client device 220 and the data processing system 205, allowing players to interact with a graphical user interface 1702 and transmit their actions to the data processing system 205. As players engage with the graphical user interface 1702, their actions, such as placing bets or initiating the game, may be captured and stored in their player profile 270.

As shown in FIG. 17A, the graphical user interface 1702 displays a dealer hand card region 1704 and a player hand card region 1706. The graphical user interface 1702 is also shown as including a right selection region 1724 opposite a left selection region 1726. In some implementations, the selection regions 1724, 1726 can be presented upon the data processing system 205 determining that a request to initiate the play of the game includes a side wager in addition to a main wager. In some implementations, the graphical user interface 1702 may present more than two selection regions 1724, 1726 for a player to select from. The two selection regions 1724, 1726, are displayed centrally between the player hand card region 1706 and the dealer hand card region 1704, forming a virtual diamond shape (or any other shape depending on the implementation). Each selection region can be used to display a predetermined number of cards (e.g., one or any positive integer) to improve a player hand, as described herein. In some implementations, the graphical user interface 1702 may include an interactive element 1728 virtually positioned between the right selection region 1724 and the left selection region 1726. Upon interacting with the interactive element 1728, the data processing system 205 updates the graphical user interface 1702 to virtually exchange the positions of the central cards displayed in the selection regions 1724, 1726 on the graphical user interface 1702. In some implementations, the selection regions 1724, 1726 can be selectable, interactive graphical user interface elements (sometimes referred to herein as "actionable objects" or "selectable objects"), enabling a player to select one or more virtual cards displayed in the selection regions 1724, 1726 by interacting (e.g., clicking, tapping, etc.) with the selection regions 1724, 1726. In some implementations, the cards displayed in the selection regions 1724, 1726 can be interactive, enabling the player to select one or more of them via corresponding interaction(s).

In some implementations, the graphical user interface 1702 may display a lightning bolt button 1730 (or the graphical user interface 1702 may include other indicators in some implementations) that can cause the data processing system 205 to alter the animation speeds in response to an interaction with the lightning bolt button 1730. The lightning bolt button 1730 can be toggled on or off by the player during the gameplay. The animation speeds may be modified to increase or decrease the amount of time taken to update the game state. In some implementations, the lightning bolt button 1730 can be a part of the manual bet interface to allow manual control of the speed of the game.

A rules button 1708 displayed on the graphical user interface 1702 is a button that, when interacted with, causes the graphical user interface 1702 to transition to a second interface showing a player how to play the electronic card game with selectable cards (e.g., listing gameplay instructions 280). The graphical user interface 1702 shows interactive wager elements 1710, which enable a player to specify a wager for a play of the game. In this example implementation, the wager is shown as separate chips with denominations of 1, 5, 75, and 100. However, it should be understood that any type of wagering interface may be utilized to place a wager for the game.

Furthermore, the graphical user interface 1702 displays a clear button 1712 that the player can interact with. In response to an interaction with the clear button 1712, the data processing system 205 removes or erases the wager that the player has entered. In some implementations, the graphical user interface 1702 can be updated via the clear button 1712 to reset all the selections made by a player to their default state. In this example, a player can interact with the interactive wager elements 1710 of the graphical user interface 1702 to place a wager prior to initiating a play of the game. Subsequently, the wager information is transmitted from the client device 220 to the data processing system 205. The player profile 270 is also updated with the wager information, for example, by subtracting the wager amount from a credit balance indicated in the player profile 270.

As shown, a total bet region 1716 displays the wager amount for the play of the game specified by the player. A balance region 1718 displays an amount of credits available for the player to wager on the game. The amount shown in the balance region 1718 may be determined from a credit balance specified in the player profile 270 of the player. The total bet region 1716 may be updated in response to interactions with the interactive wager elements 1710. Wagers made on the play of the game can be subtracted from the credit balance of the player. Any changes to the credit balance can be reflected via dynamic updates to the balance region 1718. Once a wager has been placed, the player can initiate the game by interacting with a deal button 1714, as shown in connection with FIG. 17B. In some implementations, the data processing system 205 can update the graphical user interface 1702 to provide a dedicated side wager interface, enabling a player to view different side wagers that are available and place their bets. To place a side wager, the player can interact with the dedicated side wager interface. In some implementations, the graphical user interface 1702 can be updated to present a side wager button that, when interacted with, causes the data processing system 205 to update the graphical user interface 1702 to display a list of different side wagers that are available. Once the player selects the side wager, the data processing system 205 updates the total balance region 1716 for the play of the game.

Figure 17B:
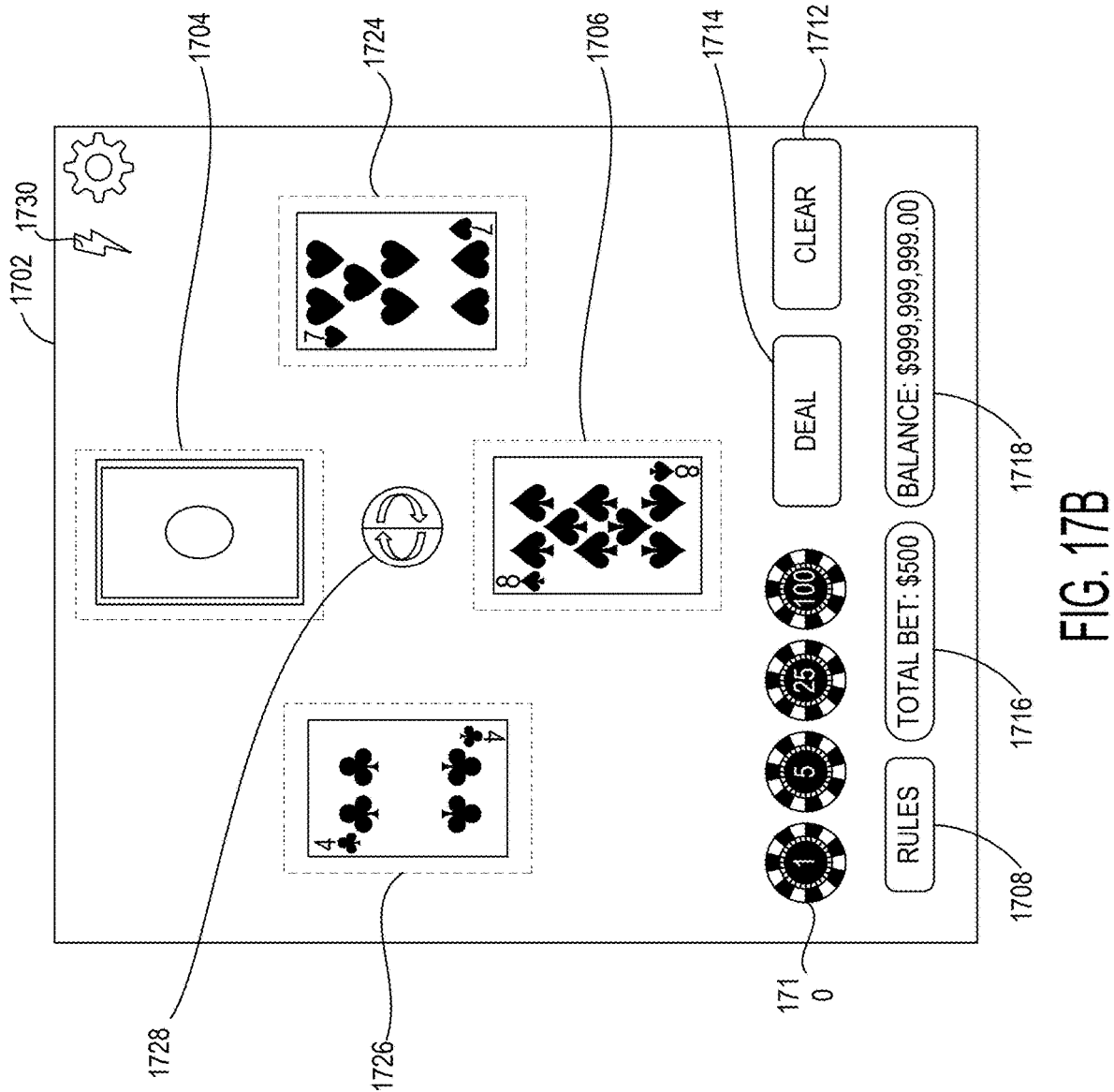

Referring now to FIG. 17B, in the context of the components described in connection with FIG. 2, an updated graphical user interface 1702 is presented on the client device 220 in response to an interaction with the deal button 1714 shown in FIG. 17A. The interaction with the deal button 1714 causes the data processing system 205 to randomly select a predetermined number of cards (e.g., two cards in this example) from a virtual deck of cards and update the dealer hand card region 1704 and the player hand card region 1706 accordingly. The graphical user interface 1702 may be dynamically updated to reflect any changes in the game state information 275. The dealer hand card region 1704 is updated to include a virtual card shown "facing down" (e.g., having its suit and face value concealed to the player). To display the dealer's card facing down, the data processing system 205 renders the card with its back side facing the graphical user interface 1702. The player hand card region 1706 is also updated to include a card "facing up," displaying its face value and suit. The graphical user interface 1702 is updated to present a predetermined number of additional cards, from which the player may select, in the selection regions 1724, 1726. The dealer hand card region 1704, the player hand card region 1706, and the selection regions 1724, 1726 may be presented on the graphical user interface 1702 in a predetermined arrangement. In this example, said regions are displayed as forming a diamond shape. However, it should be understood that the aforementioned regions may be presented on the graphical user interface 1702 in any other shape, pattern, or arrangement. The cards provided for display in the player hand card region 1706 and the selection regions 1724, 1726 are displayed facing up, thereby presenting the suit and rank of each card to the player. In this example, as shown on the graphical user interface 1702, the player hand card region 1706 is provided with an eight of spades card, and the selection regions 1724, 176 display a four of clubs and a seven of hearts. As described herein, the cards displayed in the selection regions 1724, 1726 can be interactive, allowing the player to select one or more of them, as shown and described in connection with FIG. 17C.

Figure 17C:
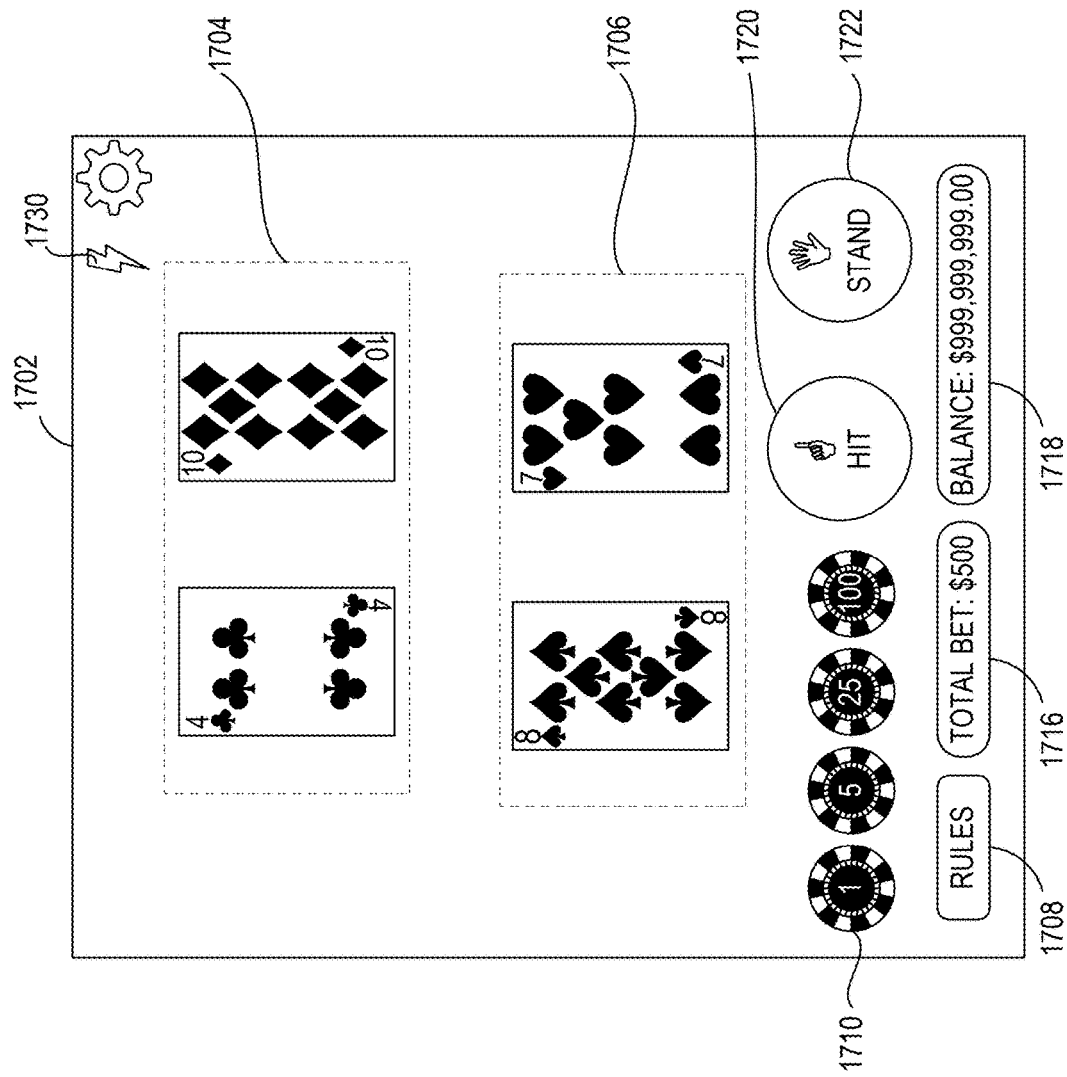

Referring now to FIG. 17C, in the context of the components described in connection with FIG. 2, an updated graphical user interface 1702 is presented on the client device 220 in response to an interaction with one of the additional cards displayed in the selection regions 1724, 1726, as shown in FIG. 17B. Upon interacting with one of the additional cards in the selection regions 1724, 1726, the graphical user interface 1702 is dynamically updated to reflect any changes in the game state information 275. In this example, upon interacting with a seven of hearts card, the graphical user interface 1702 is updated to show an updated player hand card region 1706, including an eight of spades and a seven of hearts. Simultaneously, the selection regions 1724, 1726 are removed from the graphical user interface 1702, indicating that the player can no longer select additional cards. Subsequently, the data processing system 205 automatically updates the dealer hand card region 1704 to include the unselected card and the initial facing-down card.

After updating the dealer hand card region 1704 and the player hand card region 1706, the data processing system 205 determines the total value of each hand and identifies the best-ranking hand (e.g., according to the standard Blackjack rules, game instructions 280, etc.) for the player and the dealer. Based on the initial two-card hand, the total value of the player hand is "fifteen" (an eight of spades+a seven of hearts) and the total value of the dealer hand is "fourteen" (a four of clubs+a ten of diamonds). As shown on the graphical user interface 1702, a "hit" button 1720 is presented that, when interacted with, causes the data processing system 205 to randomly select an additional card from the virtual deck of cards and update the player hand accordingly. The player can repeatedly interact with the hit button 1720 to cause the data processing system 205 to randomly select additional cards from the virtual deck of cards, thereby increasing the value of the player hand (e.g., increasing the hand rank).

A "stand" button 1722 is also shown on the graphical user interface 1702. When a player interacts with the stand button 1722, no new cards are generated, and instead the dealer hand is updated. In response to interacting with the stand button 1722, the graphical user interface 1702 is updated to transition the initially face-down card in the dealer hand card region 1704 from facing down to facing up, showing its face value and suit (e.g., a ten of diamonds in this example), as shown in this example. Upon updating the dealer hand, the player hand and the dealer hand are compared, and the hand with the highest rank (e.g., the point total of the face value of the cards) wins the hand. The data processing system 205 may use a paytable to determine the rank of a hand by comparing the hand to the hands listed on the paytable. It is to be noted that some implementations of the game may not allow splitting hands or doubling wagers. As described herein, the gameplay proceeds based on player interactions until a termination condition for the play of the game is satisfied.

A termination condition can be satisfied when any of the outcomes (e.g., win, loss, tie, and/or bonus conditions) of the gameplay are satisfied. For example, a termination condition can be satisfied when the hand rank of the player exceeds a predetermined threshold (e.g., exceeding a predetermined "bust" threshold). In some implementations, the predetermined bust threshold may be specified in the game rules and may be equal to twenty-one. In some implementations, the game instructions 280 may specify different predetermined bust thresholds for the player and the dealer. For example, the dealer hand may "bust" by exceeding the bust threshold specific to the dealer. In some implementations, the bust threshold for the dealer can be greater than the bust threshold for the player. In one example, the bust threshold for the player may be twenty-one, and the bust threshold for the dealer may be twenty-two. In some implementations, a termination condition for the game can be satisfied when the data processing system 205 determines that the player hand is a winning hand (e.g., satisfies a win condition), as shown in connection with FIG. 17D.

Figure 17D:
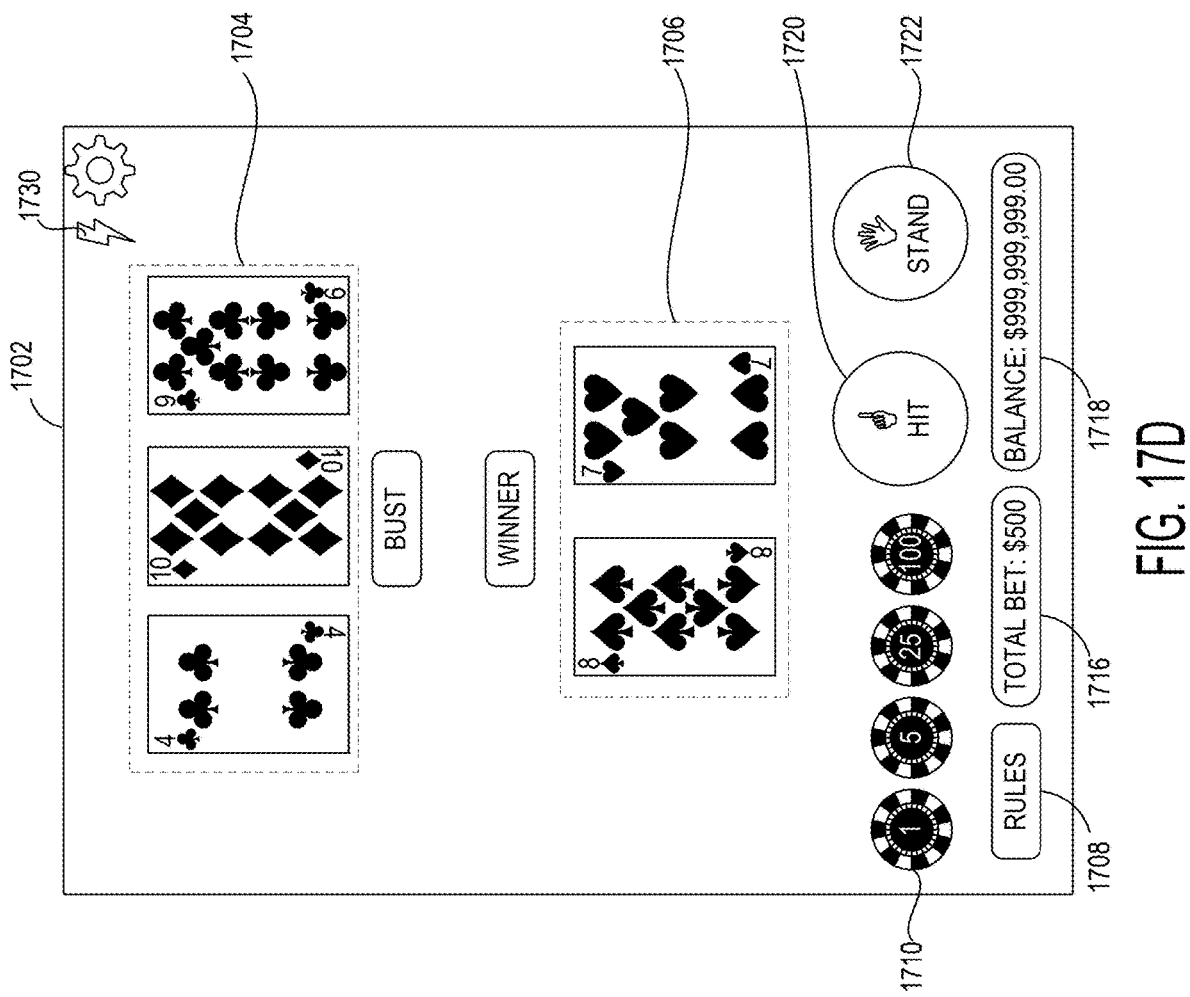

Referring now to FIG. 17D, in the context of the components described in connection with FIG. 2, an updated graphical user interface 1702 is presented on the client device 220, depicting that the play of the game has been won, thereby satisfying a termination condition. In some implementations, a player hand satisfies a winning hand if its hand rank is less than or equal to the predetermined threshold, as described herein, and its hand rank exceeds the hand rank of the dealer (e.g., the player hand outranks the dealer hand), or vice versa.

In this example, as shown on the graphical user interface 1702, the dealer hand has been updated to include an additional card (e.g., in response to a dealer hit command generated by the data processing system 205 according to the game instructions 280). The additional card is a nine of clubs, which causes the hand rank (e.g., twenty-three in this example) of the dealer to exceed twenty-two points (the bust threshold for the dealer). Because the total value of the dealer hand exceeds the bust threshold for the dealer, and the player hand is less than the bust threshold for the player, the data processing system 205 determines that the player has won the play of the game. The data processing system 205 updates the graphical user interface 1702 to provide feedback to the player, indicating that a win condition for the game has been satisfied. The feedback can include various sensory elements, such as visual, auditory, or tactile (e.g., haptic) feedback. The data processing system 205 can also update the player profile 270 accordingly.

Upon satisfying the win condition, the payout may include both the main wager and any side wagers initially placed. In some implementations, award amount for the player may be determined based on the main wager and a paytable. In some implementations, the side wager may be a sacrificial wager that is lost as a "fee" to enable the player to select between two or more cards, as described in connection with FIG. 17B. In some implementations, a separate award amount may be determined based on the side wager and one or more paytables. In one example, an award amount may be calculated for the side wager to result in a 1:1 payout for the side wager. In some implementations, a termination condition for the game can be satisfied when the data processing system 205 determines that the player hand is a losing hand (e.g., satisfies a losing condition), as shown in connection with FIG. 17E.

Figure 17E:
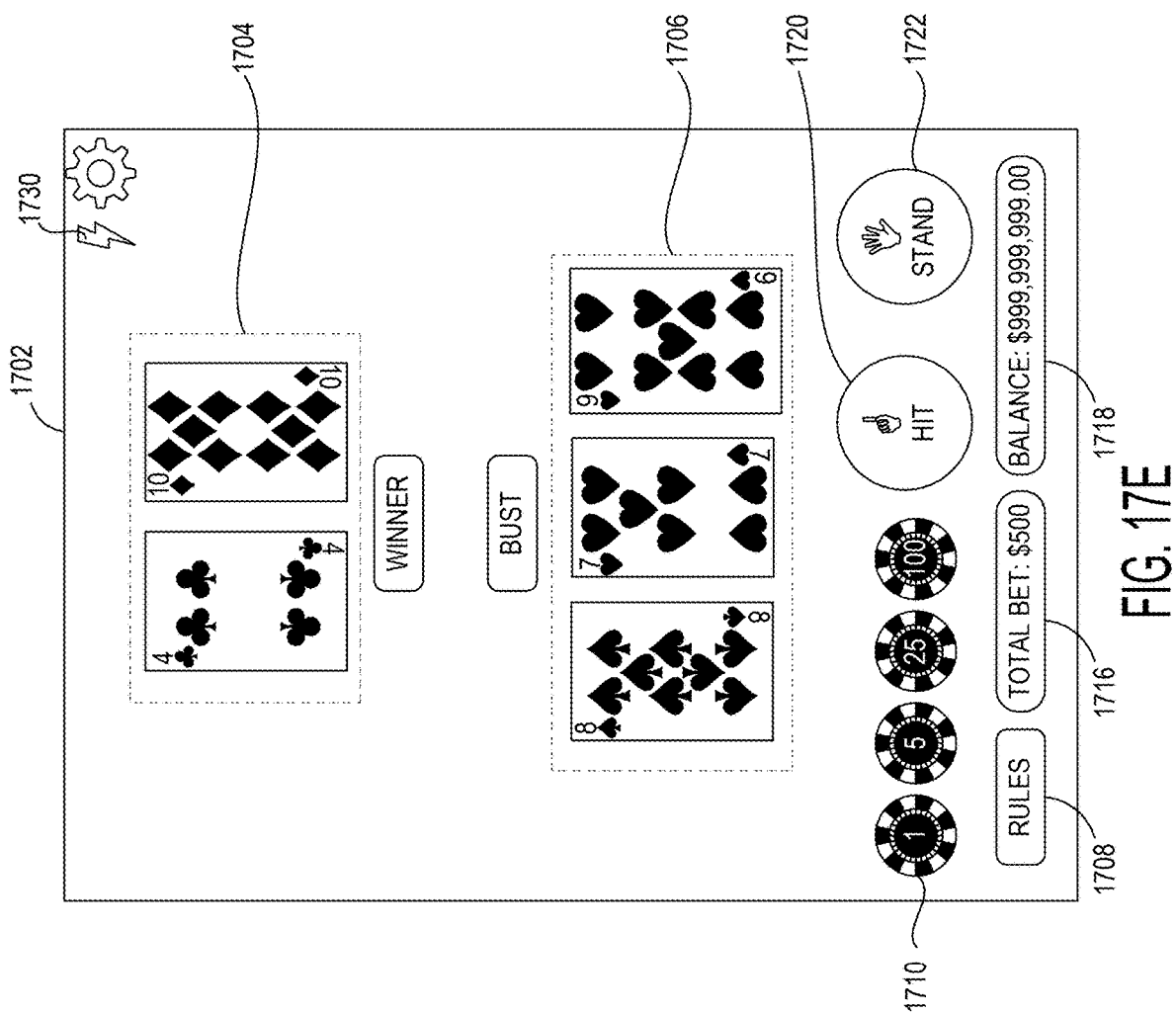

Referring now to FIG. 17E, in the context of the components described in connection with FIG. 2, an updated graphical user interface 1702 is presented on the client device 220, depicting that the play of the game has been lost, thereby satisfying a termination condition. The data processing system 205 can determine that the player hand is a losing hand (e.g., satisfies a losing condition) if the player hand is outranked by the hand of the dealer or if the hand rank of the player exceeds the predetermined bust threshold for the player (which would result in a bust for the player). In some implementations, the player hand can satisfy a losing condition if the hand rank of the player is equal to the hand rank of the dealer.

In this example, as shown on the graphical user interface 1702, the player hand has been updated to include an additional card (e.g., in response to a hit command). The additional card selected for the player hand is a nine of hearts, which causes the hand rank (e.g., twenty-four in this example) of the player to exceed twenty-one (the bust threshold for the player). Because the total point value of the player hand exceeds the bust threshold for the player, the data processing system 205 determines that the player has lost the play of the game. In some implementations, the game may terminate when the data processing system 205 determines that a tie has occurred, as shown in connection with FIG. 17F.

Figure 17F:
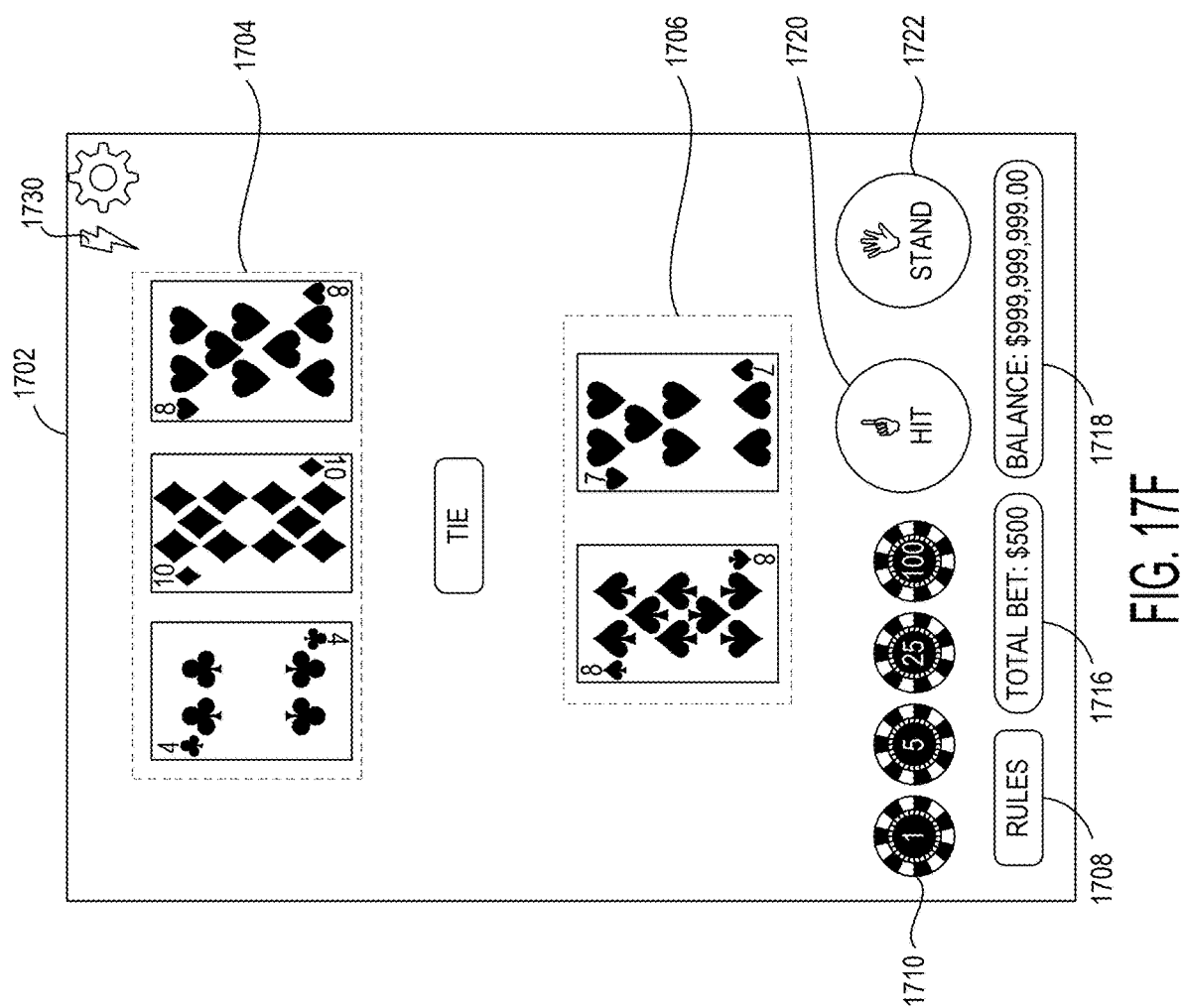

Referring now to FIG. 17F, in the context of the components described in connection with FIG. 2, an updated graphical user interface 1702 is presented on the client device 220, depicting that the play of the game results in a tie. In some implementations, a tie condition can be satisfied (e.g., a "push" occurs) when the hand rank of the dealer is equal to the predetermined bust threshold for the dealer. For example, if the total value of the dealer hand is equal to twenty-two, the game can result in a tie or a push. In this example, as shown on the graphical user interface 1702, the dealer hand has been updated to include an additional card (e.g., in response to a dealer hit command generated by the data processing system 205 based on the player opting to stay or according to the game instructions 280). The additional card is an eight of hearts, which causes the hand rank (twenty-two in this example) of the dealer to satisfy the bust threshold for the dealer. Because the total point value of the dealer hand satisfies the bust threshold for the dealer and the player hand cannot reach that point value without busting, the data processing system 205 determines that the tie condition has been satisfied. The data processing system 205 updates the credit balance of the player profile 270 by returning the wager initially placed by the player for the play of the game.

In some implementations, the game conditions can include, but are not limited to, automatic win and/or bonus conditions. For example (not shown in the example implementation), if the initial two-card hand of the player totals twenty-one points (or is equal to a predetermined threshold), it is considered a "Blackjack" and, in the absence of the dealer having a hand equal to twenty-one or twenty-two (e.g., a tying hand or a hand rank equaling the bust threshold for the dealer), results in an automatic win, thereby satisfying the bonus condition. In some implementations, the data processing system 205 can determine whether the player hand satisfies one or more bonus conditions. The bonus conditions can include, but are not limited to, Blackjack or Six-Card Charlie. Each bonus condition may correspond to a respective a bonus award amount or multiplier.

For example, in some implementations, the bonus award payout for a Blackjack may be 3 to 17, meaning that the player can receive 3 units of their wager for every 17 units that they wagered. The bonus award payout amounts or multipliers may vary depending on the game rules (e.g., the game instructions 280). For example, in some implementations, the bonus award payout for a Blackjack may be 1 to 1. In some implementations, the data processing system 205 can use a paytable to determine bonus award amounts or multipliers for different types of bonuses based on the cards included in each hand. In an example where bonus awards or multipliers are applied in response to a hand including cards satisfying different poker ranks, the paytable may specify that a player can receive a bonus payout if they have a pair of aces, a pair of kings, or a straight flush.

The data processing system 205 updates the player profile 270 to update the credit balance of the player with any award amounts or bonus award amounts. Additionally, the player profile 270 may be updated to include various metadata about the results of the game. For example, the updated player profile 270 can be updated to include any award amounts, bonus awards, the date and time of any game outcomes, identifiers of games played by the player, and any specific conditions that were satisfied or actions performed during the play of the game(s), among others. In some implementations, partial payouts can be provided during the play of the game. For example, if a player places an insurance wager on one or more hands or for the play of the game, the credit balance of the player may be updated to award a partial payout if the dealer hand results in a Blackjack. In some implementations, the player may be given the opportunity to place a side wager on specific outcomes for the play of the game, such as the dealer having a Blackjack or the player obtaining a certain number of cards of a specific value. If the player wins a side bet, they are awarded a partial payout corresponding to a respective paytable that includes payouts for various side wager conditions. The provided examples are not exhaustive, and additional features and variations can be incorporated into the game design.

Figure 18:
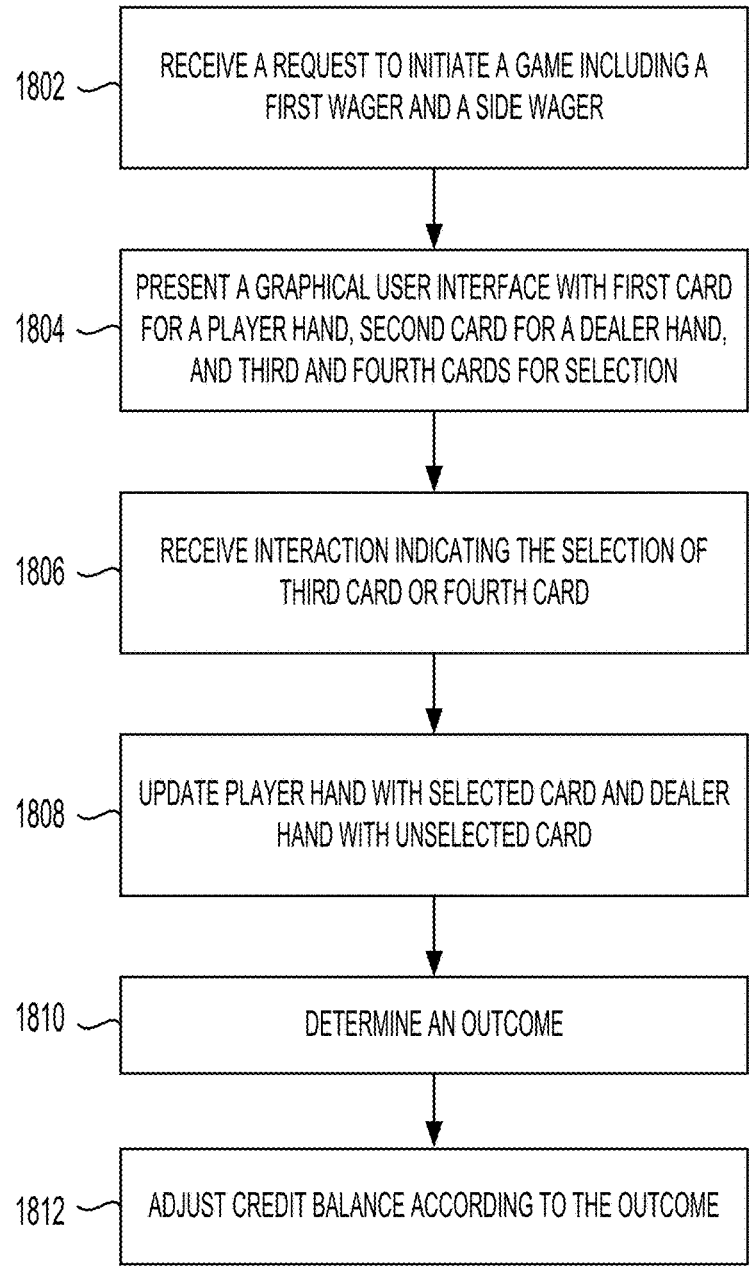
FIG. 18 depicts an example flow diagram of an example network application that may be accessed via network communication sessions established according to the techniques described herein, in accordance with one or more implementations.

Referring now to FIG. 18, depicted is an illustrative flow diagram of a method 1800 for providing an electronic card game with selectable cards. The method 1800 can be executed, performed, or otherwise carried out by a data processing system. A data processing system (e.g., the data processing system 205) can be remote to one to one or more client devices and communicate with the one or more client devices via a computer network. In some implementations, the operations of method 1800 can be performed by a standalone gaming device (e.g., without communicating with a gaming server to perform the method steps). In a brief overview of method 1800, the gaming server can receive a request to initiate a game, including a first wager and a side wager (STEP 1802), present a graphical user interface with a first card for a player hand, a second card for a dealer hand, and third and fourth cards for selection (STEP 1804), receive interaction indicating the selection of the third card or the fourth card (STEP 1806), update the player hand with the selected card and the dealer hand with the unselected card (STEP 1808), determine an outcome (STEP 1810), and adjust the credit balance according to the outcome (STEP 1812).

In further detail of method 1800, the data processing system can receive a request, including a first wager and a side wager, to initiate a play of the card game (STEP 1802). The wager can be received in one or more messages received from a client device. The message, or request, can indicate that a player intends to play a game provided by the data processing system. The message can include an indication of a player profile with which to access functionalities related to the game (e.g., placing wagers using earned credits, purchasing additional credits, etc.). The wager can be provided via a graphical user interface (e.g., the graphical user interface 1702 of FIG. 17A). The wager amounts provided can be a specified amount of credits, such as 1, 5, 25, 100, 500, or 1000 credits. In some implementations, the player can specify a custom number or fractional number of credits used in the game. Once the wager has been selected, the client device can transmit a request to place the wagers for the play of the game.

Upon receiving the wager, the data processing system can present a graphical user interface with a first card for a player hand, a second card for a dealer hand, and third and fourth cards for selection (STEP 1804). The graphical user interface can present a dealer hand card region, a player hand card region, and a right selection region opposite a left selection region. In some implementations, the graphical user interface may present more than two selection regions for a player to select from. The two selection regions are displayed centrally between the player hand card region and the dealer hand card region, forming a virtual diamond shape (or any other shape depending on the implementation). Each selection region can be used to display a predetermined number of cards (e.g., one or any positive integer) to improve a player hand. In some implementations, the selection regions can be presented upon the data processing system determining that a request to initiate the play of the game includes a side wager in addition to a main wager.

In some implementations, the data processing system can randomly select a predetermined number of cards (e.g., two cards in this example) from a virtual deck of cards and update the dealer hand card region and the player hand card region accordingly. The graphical user interface may be dynamically updated to reflect any changes in the game state information. The dealer hand card region is updated to include a virtual card shown "facing down" (e.g., having its suit and face value concealed to the player). The player hand card region is also updated to include a card "facing up," displaying its face value and suit. The graphical user interface is updated to present a predetermined number of additional cards, from which the player may select, in the selection regions.

In some implementations, the selection regions can be selectable, interactive graphical user interface elements (sometimes referred to herein as "actionable objects" or "selectable objects"), enabling a player to select one or more virtual cards displayed in the selection regions by interacting (e.g., clicking, tapping, etc.) with the selection regions (STEP 1806). In some implementations, the cards displayed in the selection regions can be interactive, enabling the player to select one or more of them via corresponding interaction(s).

Upon receiving an interaction indicating the selection of the third card or the fourth card, the graphical user interface is updated to show an updated player hand card region with a selected card and an updated dealer hand card region with an unselected card (STEP 1808). After updating the dealer hand card region and the player hand card region, the data processing system determines the outcome by identifying the best-ranking hand (e.g., according to the standard Blackjack rules, game instructions, etc.) for the player and the dealer (STEP 1810). In some implementations, a player can interact with a "hit" button that, when interacted with, causes the data processing system to randomly select an additional card from the virtual deck of cards and update the player hand accordingly. The player can repeatedly interact with the hit button to cause the data processing system to randomly select additional cards from the virtual deck of cards, thereby increasing the value of the player hand (e.g., increasing the hand rank).

A "stand" button is also present, and when a player interacts with the stand button, no new cards are generated, and instead the dealer hand is updated. In response to interacting with the stand button, the graphical user interface is updated to transition the initially face-down card in the dealer hand card region from facing down to facing up, showing its face value and suit. Upon updating the dealer hand, the player hand and the dealer hand are compared, and the hand with the highest rank (e.g., the point total of the face value of the cards) wins the hand. The data processing system may use a paytable to determine the rank of a hand by comparing the hand to the hands listed on the paytable. The gameplay proceeds until a termination condition for the play of the game is satisfied.

A termination condition can be satisfied when any of the outcomes (e.g., win, loss, tie, and/or bonus conditions) of the gameplay are satisfied. For example, a termination condition can be satisfied when the hand rank of the player exceeds a predetermined threshold (e.g., exceeding a predetermined "bust" threshold). In some implementations, the predetermined bust threshold may be specified in the game rules and may be equal to twenty-one. In some implementations, the game instructions may specify different predetermined bust thresholds for the player and the dealer. For example, the dealer hand may "bust" by exceeding the bust threshold specific to the dealer. In some implementations, the bust threshold for the dealer can be greater than the bust threshold for the player. In one example, the bust threshold for the player may be twenty-one, and the bust threshold for the dealer may be twenty-two.

In some implementations, a player hand satisfies a winning hand if its hand rank is less than or equal to the predetermined threshold, as described herein, and its hand rank exceeds the hand rank of the dealer (e.g., the player hand outranks the dealer hand), or vice versa. In some implementations, the data processing system can determine that the player hand is a losing hand (e.g., satisfies a losing condition) if the player hand is outranked by the hand of the dealer or if the hand rank of the player exceeds the predetermined bust threshold for the player (which would result in a bust for the player). In some implementations, the player hand can satisfy a losing condition if the hand rank of the player is equal to the hand rank of the dealer. In some implementations, a tie condition can be satisfied (e.g., a "push" occurs) when the hand rank of the dealer is equal to the predetermined bust threshold for the dealer. In some implementations, if the initial two-card hand of the player totals twenty-one points (or is equal to a predetermined threshold), it is considered a "Blackjack" and, in the absence of the dealer having a hand equal to twenty-one or twenty-two (e.g., a tying hand or a hand rank equaling the bust threshold for the dealer), results in an automatic win, thereby satisfying the bonus condition.

Once the play of the game is completed, the data processing system can terminate the gameplay and adjust the credit balance based on the outcome of the game (STEP 1812). The adjustment is made based on the computed bonus award and the individual award amounts calculated for each outcome. In some implementations, the data processing system can increase the credit balance in the player's player profile by the sum of the bonus award amount and the award amount for each successful outcome. However, if the bonus award condition is not satisfied, resulting in a zero bonus award amount, the data processing system can increase the credit balance only by the award amounts for the winning outcomes. In cases where the bonus award is credited to the player before the completion of the game, the data processing system can update the credit balance of the player profile by adding the award amounts for the winning outcomes to the credit balance. The data processing system can store additional metadata relating to the plays of the game, including but not limited to the award amount(s) won, along with corresponding timestamps indicating the time the award amount(s) were won, in the player profile.

At least one aspect of the present disclosure is directed to a system. The system can include one or more processors coupled to memory. The one or more processors may receive a request, including a first wager and a side wager, to initiate a play of a card game. Upon determining that the request includes both the first wager and the side wager, the one or more processors may generate a graphical user interface including a first card for a player hand and a second card for a dealer hand. The graphical user interface may also include a third card and a fourth card for selection. In response to receiving an interaction indicating selection of the third card via the graphical user interface, the one or more processors may update the player hand to include the third card and the dealer hand to include the fourth card. The one or more processors may determine a respective hand rank for each of the player hand and the dealer hand. The one or more processors may adjust a credit balance according to the respective hand rank of each of the player hand and the dealer hand.

In some implementations, the one or more processors may cause the graphical user interface to display the first card, the third card, and the fourth card as face-up cards, and the second card as a face-down card. In some implementations, the one or more processors may, responsive to determining that the request includes both the main wager and the side wager, cause the graphical user interface to display the first card in a player hand region, the second card in a dealer hand region, and each of the third card and the fourth card in a selection region. In some implementations, the one or more processors may cause presentation of the first card, the second card, the third card, and the fourth card on the graphical user interface in a diamond formation. In some implementations, the one or more processors may determine that the play of the game satisfies a win condition based on a hand rank of the dealer hand exceeding a predetermined value.

In some implementations, the one or more processors may determine that the play of the game satisfies a win condition based on a hand rank of the player hand exceeding a hand rank of the dealer hand. In some implementations, the one or more processors may determine that a second play of the game satisfies a losing condition based on a second hand rank of a second player hand exceeding a predetermined threshold. In some implementations, the one or more processors may determine that a second play of the game satisfies a losing condition based on a second hand rank of a second player hand being equal to a second hand rank of a second dealer hand. In some implementations, the one or more processors may determine that the play of the game results in a tie based on a hand rank of the dealer hand being equal to a predetermined value. In some implementations, the one or more processors may cause the graphical user interface to present an interactive element that, when interacted with, causes the data processing system to exchange positions of the third card and the fourth card on the graphical user interface.

At least one aspect of the present disclosure is directed to a method. Upon receiving a request, including a first wager and a side wager, the method can include causing the presentation of a graphical user interface, including a first card for a player hand and a second card for a dealer hand. The method can also include causing the presentation of a third card and a fourth card for selection via the graphical user interface. In response to receiving an interaction indicating selection of the third card via the graphical user interface, the method can include updating the player hand to include the third card and the dealer hand to include the fourth card. The method can include determining a respective hand rank for each of the player hand and the dealer hand. The method can include adjusting a credit balance according to the respective hand rank of each of the player hand and the dealer hand.

The method can include causing the graphical user interface to display the first card, the third card, and the fourth card as face-up cards, and the second card as a face-down card. The method can include, responsive to determining that the request includes both the main wager and the side wager, causing the graphical user interface to display the first card in a player hand region, the second card in a dealer hand region, and each of the third card and the fourth card in a selection region. The method can include causing presentation of the first card, the second card, the third card, and the fourth card on the graphical user interface in a diamond formation. The method can include determining that the play of the game satisfies a win condition based on a hand rank of the dealer hand exceeding a predetermined value. The method can include determining that the play of the game satisfies a win condition based on a hand rank of the player hand exceeding a hand rank of the dealer hand.

The method can include determining that a second play of the game satisfies a losing condition based on a second hand rank of a second player hand exceeding a predetermined threshold. The method can include determining that a second play of the game satisfies a losing condition based on a second hand rank of a second player hand being equal to a second hand rank of a second dealer hand. The method can include determining that the play of the game results in a tie based on a hand rank of the dealer hand being equal to a predetermined value. The method can include causing the graphical user interface to present an interactive element that, when interacted with, causes the data processing system to exchange positions of the third card and the fourth card on the graphical user interface.

Referring now to an example implementation of a card game having additional outcomes from bonus wagers, the data processing system 205 can receive a request and generate a graphical user interface presenting a number of hole cards and community cards for a play of the card game. The graphical use interface can display a first wager (e.g., a main wager) placed as a bet on the game and a second wager (e.g., a bonus wager) as a bonus to compensate for potential losses following an initial loss. A player loses or wins a hand (sometimes referred to herein as a "round" or a "play" of the card game) based on the rank (e.g., poker rank) of their hand, which can be determined based on a paytable. In some implementations, the paytable can be structured in accordance with the standard poker ranks, or any other suitable criteria. The overall rank of the player hand can be determined, for example, as the highest ranking five-card hand formed from a combination of the hole cards in the player hand and any community cards.

A player loses a hand (e.g., by satisfying a losing condition) if their hand rank does not result in an award amount according to the paytable. In some implementations, if playing against a virtual dealer, the player hand may be a losing hand if the player hand is outranked by that of a virtual dealer hand, which may be generated according to the techniques described herein. In response to satisfying the losing condition, the game state information 275 is updated to indicate that the main wager has been lost, and the graphical user interface is updated to present an additional card upon determining that the request includes the bonus wager. If a player wins a hand according to the paytable, the credit balance is updated, and the payout for the bonus wager may differ from the standard payout based on the outcome of the standard poker rules, one or more paytables, or any other gaming rules in effect. The data processing system 205 can update and display updated information (e.g., the player hand, the wager, the player interactions, etc.) on the graphical user interface. Example graphical user interfaces showing an example implementation of a card game having additional outcomes from bonus wagers are shown in FIGS. 19A-19E.

Figure 19A:
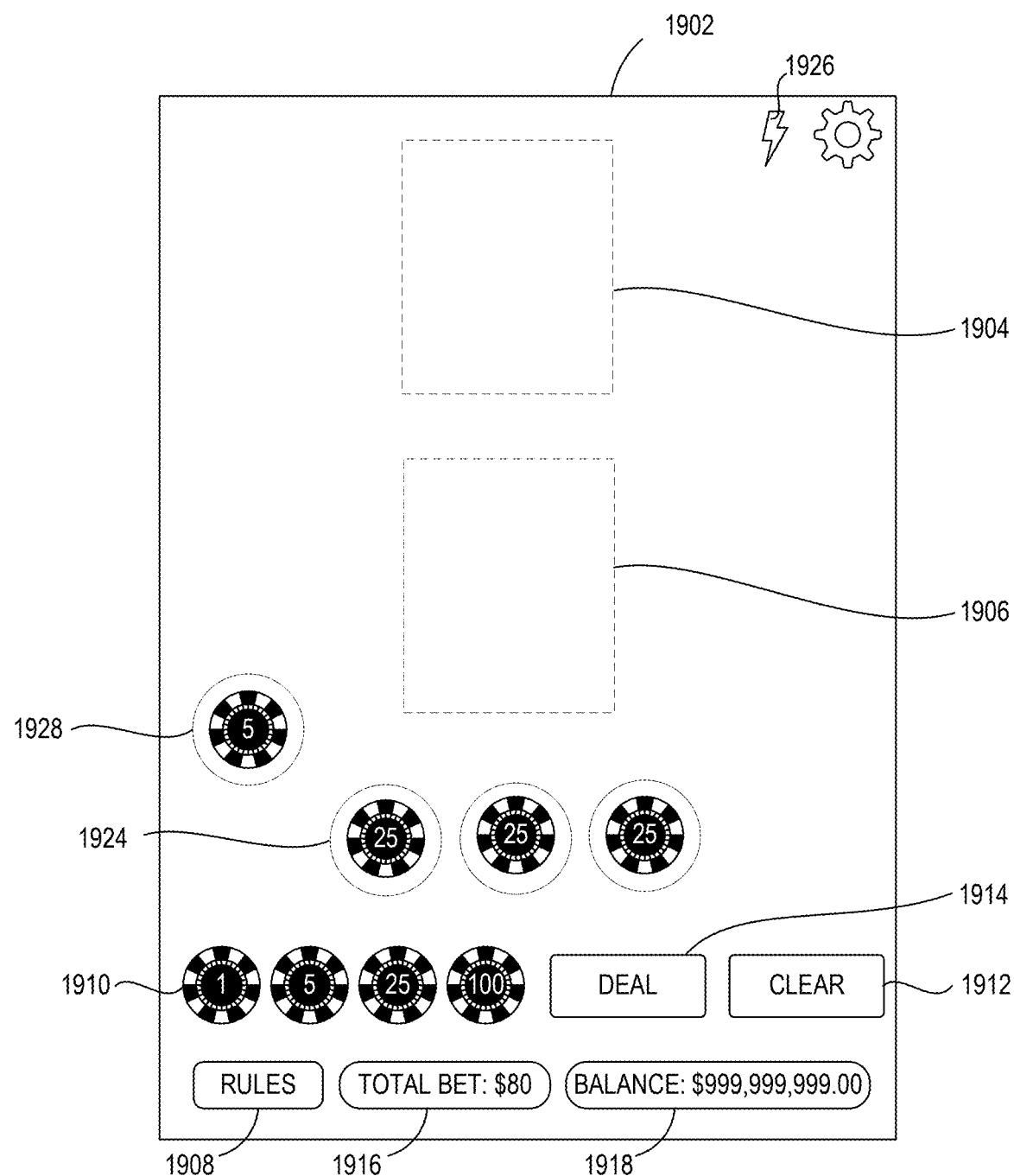
FIGS. 19A, 19B, 19C, 19D, and 19E depict further diagrams of example graphical user interfaces that may be displayed in connection with network communication sessions established according to the techniques described herein, in accordance with one or more implementations.

Referring now to FIG. 19A in the context of the components described in connection with FIG. 2, a graphical user interface 1902 is presented on a client device 120, for example, for initiating a play of a card game having additional outcomes from bonus wagers. As discussed above, the device communicator 230 facilitates communication between the client device 120 and the data processing system 205, allowing players to interact with a graphical user interface 1902 and transmit their actions to the data processing system 205. As players engage with the graphical user interface 1902, their actions, such as placing bets or initiating the game, may be captured and stored in their player profile 270.

As shown in FIG. 19A, the graphical user interface 1902 displays a community card region 1904 and a player hand card region 1906. A rules button 1908 displayed on the graphical user interface 1902 is a button that, when interacted with, causes the graphical user interface 1902 to transition to a second interface showing a player how to play the game (e.g., listing gameplay instructions 280). The graphical user interface 1902 shows interactive wager elements 1910, which enable a player to specify a first wager (sometimes referred to herein as the "main wager") and a second wager (sometimes referred to herein as the "bonus wager") for a play of the game. In this example implementation, the wager is shown as separate chips with denominations of 1, 5, 25, and 100. In some implementations, there can be distinct areas designated for placing the main wager and the bonus wager. Players can interact with and release chips into these separate regions. However, it should be understood that any type of wagering interface may be used to place the main wager and the bonus wager for the game.

The graphical user interface 1902 displays a number of wager slots 1924, allowing players to select the main wager and the bonus wager by interacting with the chips 1910 (e.g., by tapping, clicking, etc.) and dragging them into the respective wager slots 1924. The number of wager slots can vary. For example, in the example implementation, three wager slots 1924 (or any positive integer) displayed below the card regions 1904, 1906 can be used to indicate the amount of the main wager selected for a play of the game. In this example, the main wager may be split into three equal (or about equal) portions of the main wager, represented via the graphical elements 1924 on the graphical user interface 1902. Additionally, on the left side of the graphical user interface 1902, a standalone wager slot 1928 can be used to indicate the amount of the bonus wager selected for a play of the game. In some implementations, the bonus wager can be a predetermined percentage of the main wager. If the player wins the bonus wager, they can receive a payout in accordance with a paytable. In other implementations, bonus wagers may be adjustable by the player, enabling players to place the bonus wager of any percentage of the main wager. Upon selecting the main wager and the bonus wager, the data processing system 205 updates a total bet region 1916, as described herein.

As shown, the total bet region 1916 displays the wager amount for the play of the game specified by the player. A balance region 1918 displays an amount of credits available for the player to wager on the game. The amount shown in the balance region 1918 may be determined from a credit balance specified in the player profile 270 of the player. The total bet region 1916 may be updated in response to interactions with the interactive wager elements 1910. Wagers made on the play of the game can be subtracted from the balance of the player. Any changes to the credit balance can be reflected via dynamic updates to the balance region 1918. Once the main wager and the bonus wager have been placed, a player can initiate the game by interacting with a deal button 1914, as shown in connection with FIG. 19B.

The graphical user interface 1902 displays a clear button 1912 that the player can interact with. In response to an interaction with the clear button 1912, the data processing system 205 removes or erases the wagers that the player has entered. In some implementations, the graphical user interface 1902 can be updated via the clear button 1912 to reset all the selections made by a player to their default state. In this example, a player can interact with the interactive wager elements 1910 of the graphical user interface 1902 to place the main wager and the bonus wager prior to initiating a play of the game. Subsequently, the wager information is transmitted from the client device 120 to the data processing system 205. The player profile 270 can be updated with the wager information, for example, by subtracting the wager amount from a credit balance indicated in the player profile 270.

In some implementations, the graphical user interface 1902 may display a lightning bolt button 1926 (or the graphical user interface 1902 may include other indicators in some implementations) that can cause the data processing system 205 to alter the animation speeds in response to an interaction with the lightning bolt button 1926. The lightning bolt button 1926 can be toggled on or off by the player during the gameplay. The animation speeds may be modified to increase or decrease the amount of time taken to update the game state. In some implementations, the lightning bolt button 1926 can be a part of the manual bet interface to allow manual control of the speed of the game.

Figure 19B:
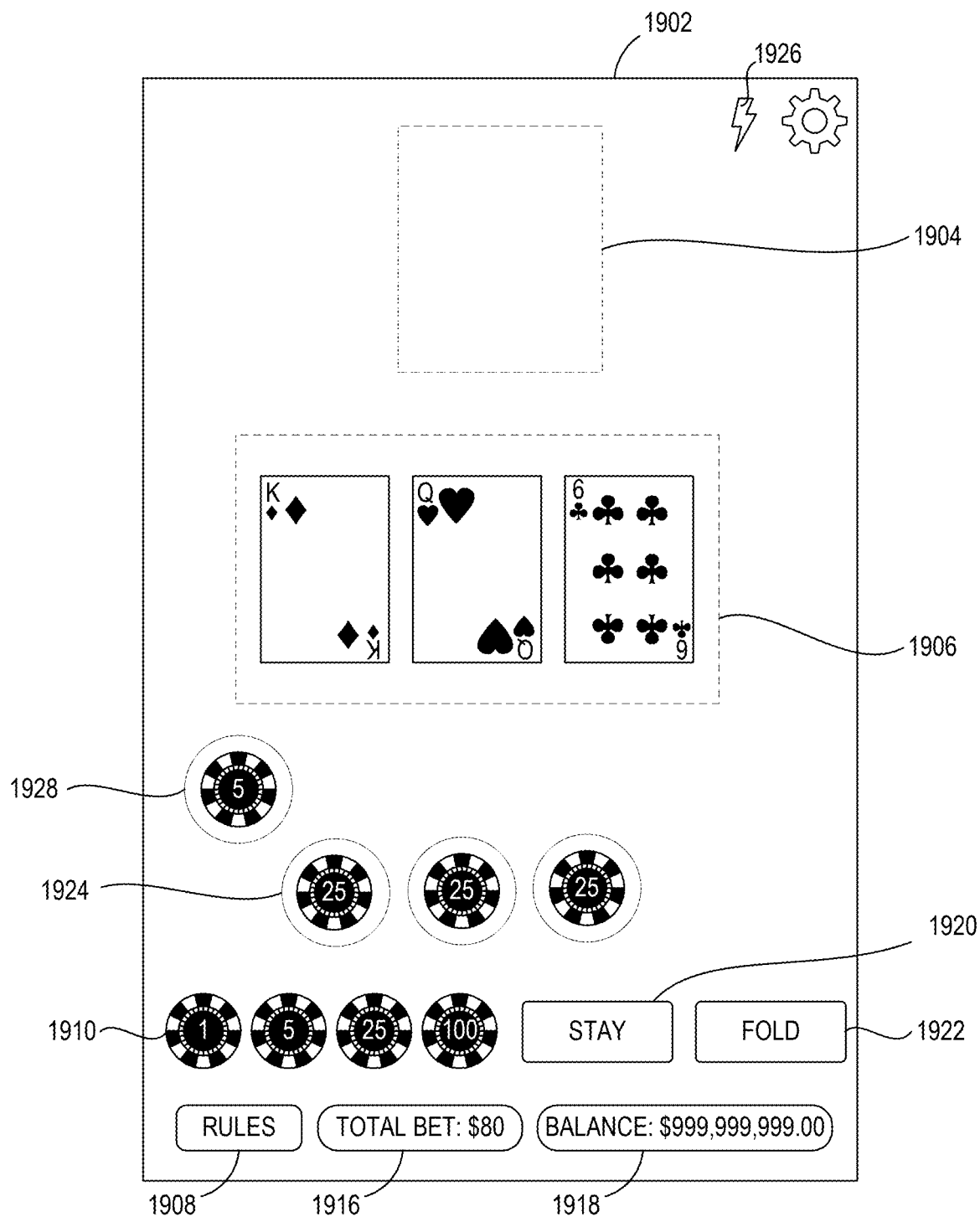

Referring now to FIG. 19B, in the context of the components described in connection with FIG. 2, an updated graphical user interface 1902 is presented on the client device 120 in response to an interaction with the deal button 1914 shown in FIG. 19A. This interaction causes the data processing system 205 to add a predetermined number of hole cards to player hand card region 1906. In this example, the data processing system 205 adds three hole cards (e.g., a King of diamonds, a Queen of hearts, and a six of clubs) to the player hand card region 1906. In some implementations, the data processing system 205 may randomly select hole cards from one or more virtual decks of cards. In some implementations, any number of hole cards may be selected. Additionally, other variations of poker may be implemented, such as 5-card draw, 5-card stud, or any number of cards. After the hole cards are displayed, the data processing system 205 can update the game state information 275 and can randomly select and add community cards to the community card region 1904.

In some implementations, the community cards can be added one at a time, with the player having the opportunity to withdraw a predetermined amount of their main wager by interacting with a "fold" button 1922. The predetermined amount can be one-third or two-thirds of the main wager, depending on whether the player decides to withdraw before or after the community cards are added. In some implementations, the player can also withdraw following a first community card but before a second community card is added. According to one or more paytables, the amount withdrawn before the community cards are added may be different from the amount withdrawn after the community cards are added, or even after the first community card is added. In some implementations, after adding the first community card, if the player maintains their main wager, the data processing system 205 updates the game state information 275 and adds the second community card to determine the corresponding outcome, as shown in connection with FIG. 19C.

Figure 19C:
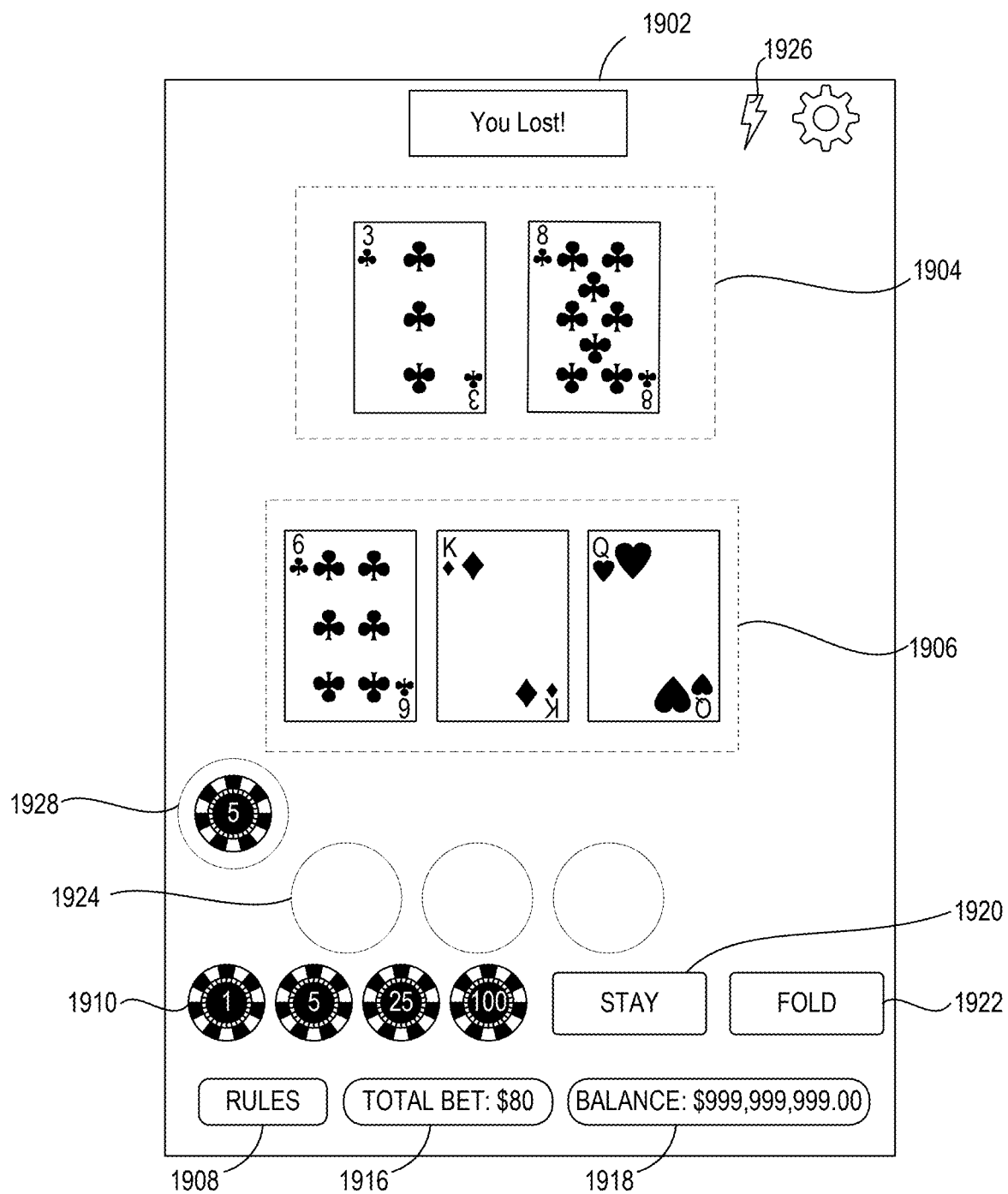

Referring now to FIG. 19C, in the context of the components described in connection with FIG. 2, an updated graphical user interface 1902 is presented on the client device, depicting that a losing condition has been satisfied. The data processing system 205 can add a predetermined number of community cards on the graphical user interface 1902, for example, up to and including five, based on the game instructions 280. In some implementations, one or more community cards may be displayed on the graphical user interface 1902 (e.g., showing the face value and suit) via the data processing system 205 based on whether a player decides to maintain their main wager. After a first community card is added to the community card region 1904, the player can withdraw a predetermined portion of their main wager, as described herein. The player can select one of the main wager portions in the wager slots 1924 to withdraw the corresponding portion. In some implementations, the player can interact with a "stay" button 1920 that causes the data processing system 205 to randomly select and add a second community card to the community card region 1904 and display the face value and suit of the second community card via the graphical user interface 1902.

In this example, upon interacting with the stay button 1920, the graphical user interface 1902 is updated to displays the community cards (e.g., a three of clubs and an eight of clubs). In some implementations, the number of hole cards and community cards may vary or alternate. The data processing system 205 uses the hole cards and the community cards to determine the highest ranking five-card hand (e.g., according to poker ranking rules, the game instructions 280, etc.) for the player. For example, in some implementations, a player may engage in a game against a paytable without a virtual dealer. In such cases, the data processing system 205 determines the hand rank of the player by comparing it to the hands listed on the paytable. In some implementations, a player may play against a virtual dealer. The dealer hand can access the community cards to form their hand. For example, the dealer may be dealt two or three cards, similar to the player. The rank of the dealer hand is determined as the highest ranking five-card hand from the dealer's cards and the community cards.

In this example, the player hand is not the highest ranking five-card hand according to the paytable, which can be structured according to standard poker rules, the game instructions 280, among other criteria. Accordingly, the game state information 275, as well as the graphical user interface 1902, is updated to indicate that the player has lost the hand (e.g., satisfying the losing condition). In response to the player hand satisfying the losing condition, the data processing system 205 updates the graphical user interface 1902 while maintaining the bonus wager represented on the graphical user interface 1902. As shown, the wager slots 1924 that initially displayed the main wager are now vacant, which indicates that the main wager has been lost. The bonus wager as shown on the graphical user interface 1902 is not affected, and the wager slot 1928 initially displaying the bonus wager is still populated. In some implementations, upon determining that the gameplay includes the bonus wager, the data processing system 205 randomly selects a third community card from the virtual deck of cards and determines the outcome of the bonus wager, as shown in connection with FIG. 19D.

Figure 19D:
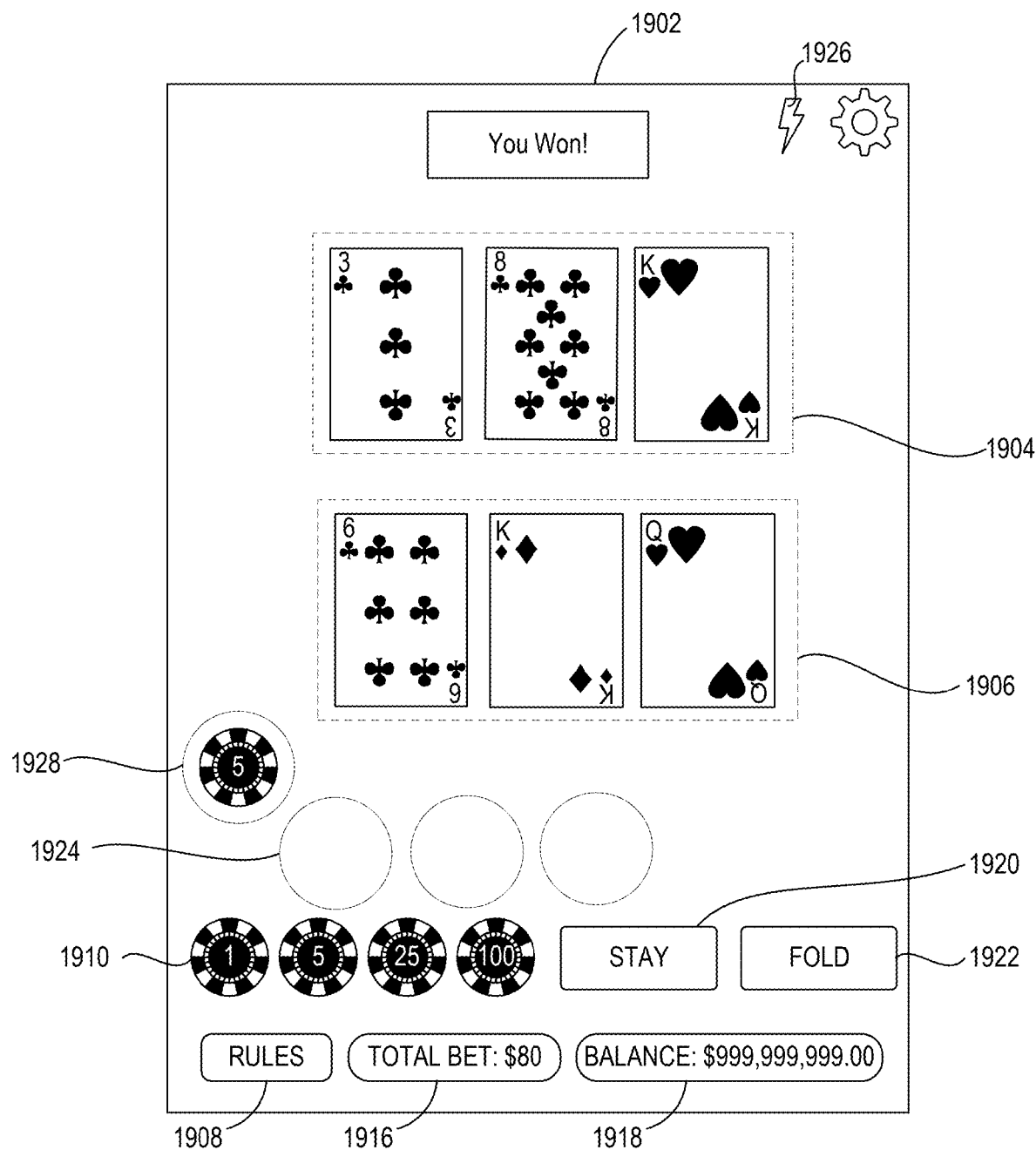

Referring now to FIG. 19D, in the context of the components described in connection with FIG. 2, an updated graphical user interface 1902 is presented on the client device 120, depicting that a win condition has been satisfied in response to inclusion of an additional card in the set of cards shown in FIG. 19C. In response to determining that the request to play the game included the bonus wager after initially losing the hand, the data processing system 205 automatically selects and displays a third community card (e.g., a king of hearts) on the graphical user interface 1902, as shown. In this example, the best-ranking player hand is a pair (e.g., a pair of Kings) according to the payable. Accordingly, the game state information 275 is updated to indicate the player has won the hand, thereby satisfying the bonus condition.

In some implementations, upon satisfying the bonus condition, the data processing system 205 may provide one or more additional awards, including but not limited to an additional game play or a bonus award amount. The data processing system 205 can update the player profile 270 accordingly. In some implementations, an award amount for the player may be determined based on the main wager and a paytable. In some implementations, a separate award amount may be determined based on the bonus wager and one or more pay tables. In one example, an award amount may be calculated for the bonus wager to result in a 1:1 payout, meaning that for every unit wagered, the player receives an equal amount in winnings when they win using the bonus wager. In other words, the players break even on the bonus wager if they win. The data processing system 205 can store additional metadata relating to the plays of the game, including but not limited to the award amount(s) won, along with corresponding timestamps indicating the time the award amount(s) were won, in the player profile 270. In some implementations, if the third community card does not increase (or improve) the value of the player hand according to the paytable, the player will lose the bonus wager and the gameplay will terminate, as shown in connection with FIG. 19E.

Figure 19E:
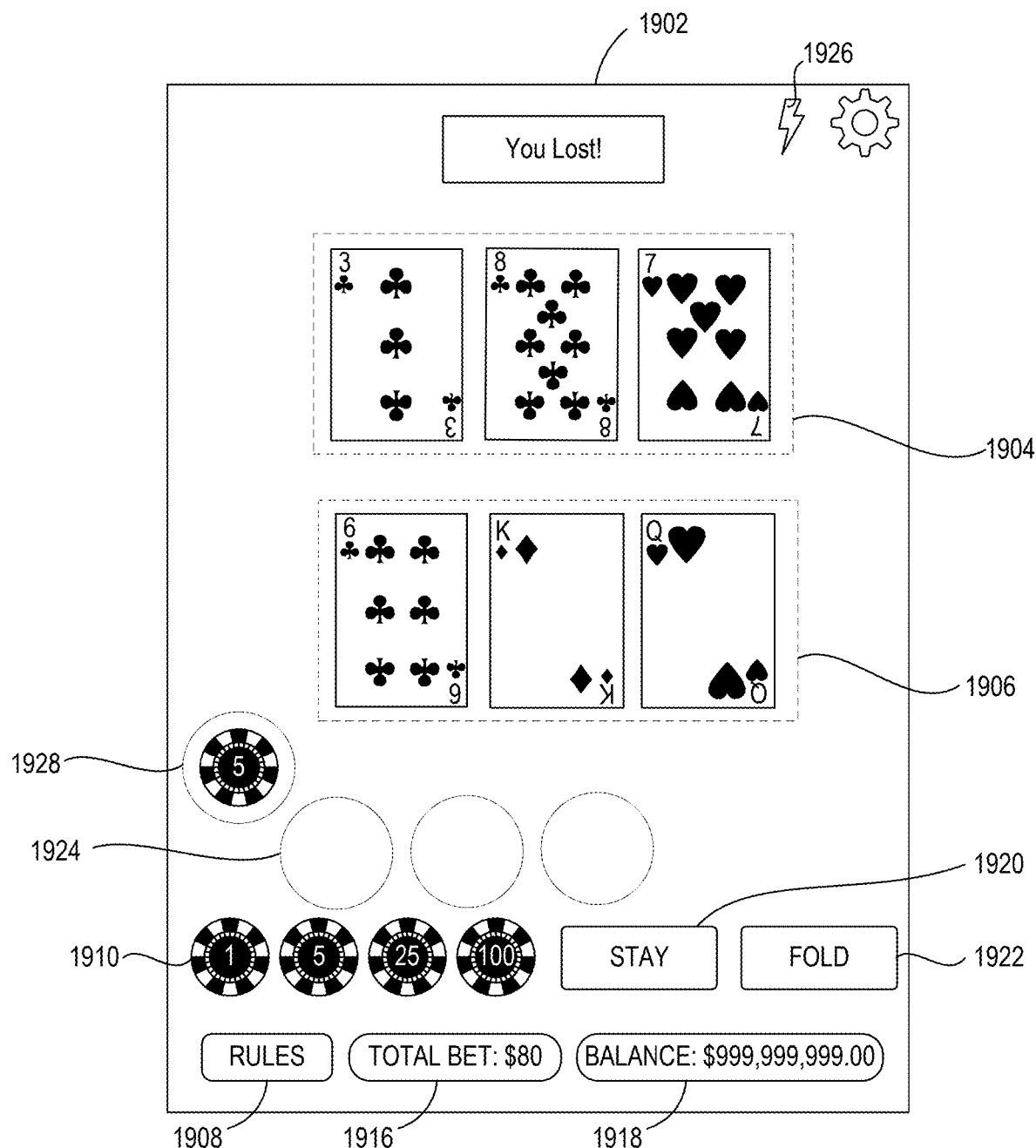

Referring now to FIG. 19E, in the context of the components described in connection with FIG. 2, an updated graphical user interface 1902 is presented on the client device 120, depicting that the card game has been lost in response to inclusion of an additional card in the set of cards shown in FIG. 19C. As described herein, in response to determining that the play of the game included the bonus wager after initially losing the hand, the data processing system 205 automatically selects and displays a third community card (e.g., a seven of hearts) on the graphical user interface 1902, as shown. In this example, the best-ranking player hand does not result in a winning hand, according to the paytable. The game state information 275 is updated to indicate the player has lost the hand, resulting in the loss of the bonus wager and the termination of the gameplay.

The data processing system 205 can update the graphical user interface 1902 to provide feedback to the player, indicating that a game condition (e.g., win, lose, and/or bonus condition(s)) has been satisfied. The feedback can include various sensory elements, such as visual, auditory, or tactile (e.g., haptic) feedback. The data processing system 205 can update the player profile 270 in response to the termination of gameplay.

Figure 20:
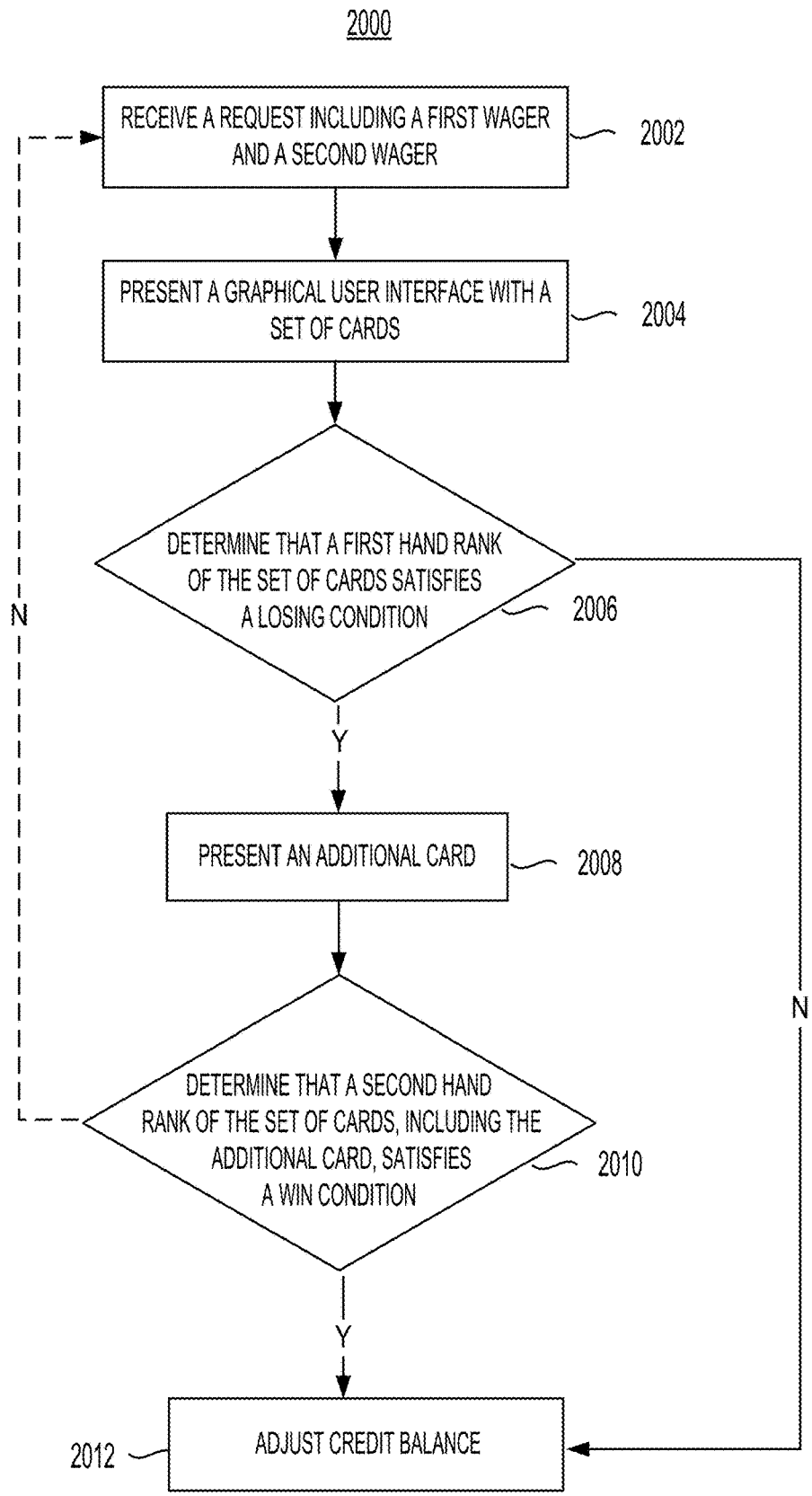
FIG. 20 depicts an example flow diagram of an example network application that may be accessed via network communication sessions established according to the techniques described herein, in accordance with one or more implementations.

Referring now to FIG. 20, depicted is an illustrative flow diagram of a method 2000 for providing a card game having additional outcomes from bonus wagers. The method 2000 can be executed, performed, or otherwise carried out by a data processing system. A data processing system (e.g., the data processing system 205) can be remote to one to one or more client devices and communicate with the one or more client devices via a computer network. In some implementations, the operations of method 2000 can be performed by a stand-alone gaming device (e.g., without communicating with a gaming server to perform the method steps). In a brief overview of method 2000, the gaming server can receive a request, including a first wager and a second wager, for a play of the card game (STEP 2002), present a graphical user interface including a set of cards (STEP 2004), determine that a first hand rank of the set of cards satisfies a losing condition (STEP 2006), present an additional card if the first hand rank of the set of cards satisfies the losing condition (STEP 2008), or adjust the credit balance if the first hand rank of the set of cards does not satisfy the losing condition, determine that a second hand rank of the set of cards, including the additional card, satisfies a win condition (STEP 2010), adjust a credit balance if the second hand rank of the set of cards, including the additional card, satisfies a win condition (STEP 2012), or receive the request for a second play of the game if the second hand rank of the set of cards, including the additional card, does not satisfy the win condition.

In further detail of method 2000, the data processing system can receive a first wager and a second wager for a play of the card game (STEP 2002). The wager can be received in one or more messages received from a client device. The message, or request, can indicate that a player intends to play a game provided by the data processing system. The message can include an indication of a player profile with which to access functionalities related to the game (e.g., placing wagers using earned credits, purchasing additional credits, etc.). The wager can be provided via a graphical user interface (e.g., the graphical user interface of FIG. 19A). The wager amounts provided can be a specified amount of credits, such as 1, 5, 25, 100, 500, or 1000 credits. In some implementations, the player can specify a custom number or fractional number of credits used in the game. Once the wager has been selected, the client device can transmit a request to place the wagers for the play of the game.

Upon receiving the wager, the data processing system can generate a graphical user interface and provide a predetermined number of hole cards to a player hand card region (STEP 2004). In some implementations, the data processing system may randomly select hole cards from one or more virtual decks of cards. In some implementations, any number of hole cards may be selected. After the hole cards are displayed, the data processing system can update the game state information and randomly select and add community cards to a community card region.

In some implementations, the community cards can be added one at a time, with the player having the opportunity to withdraw a predetermined amount of their main wager by interacting with a "fold" button. The predetermined amount can be one-third or two-thirds of the main wager, depending on whether the player decides to withdraw before or after the community cards are added. In some implementations, the player can also withdraw following a first community card but before a second community card is added. According to one or more paytables, the amount withdrawn before the community cards are added may be different from the amount withdrawn after the community cards are added, or even after the first community card is added. In some implementations, after adding the first community card, if the player maintains their main wager, the data processing system updates the game state information and adds the second community card to determine the corresponding outcome.

The data processing system can add a predetermined number of community cards on the graphical user interface, for example, up to and including five, based on the game instructions. In some implementations, one or more community cards may be displayed on the graphical user interface (e.g., showing the face value and suit) via the data processing system based on whether a player decides to maintain their main wager. After a first community card is added to the community card region, the player can withdraw a predetermined portion of their main wager. The player can select one of the main wager portions in wager slots to withdraw the corresponding portion. In some implementations, the player can interact with a "stay" button that causes the data processing system to randomly select and add a second community card to the community card region and display the face value and suit of the second community card via the graphical user interface.

The data processing system uses the hole cards and the community cards to determine the highest ranking five-card hand (e.g., according to poker ranking rules, the game instructions, etc.) for the player. If the player hand is not the best ranking five-card hand (e.g., a first hand rank in this example), the graphical user interface is updated to indicate that the player has lost the hand (e.g., satisfying the losing condition) (STEP 2006).

In response to the player hand satisfying the losing condition, the data processing system updates the graphical user interface while maintaining the bonus wager represented on the graphical user interface. In some implementations, upon determining that the gameplay includes the bonus wager, the data processing system randomly selects a third community card from the virtual deck of cards and determines the outcome of the bonus wager (STEP 2008).

In response to inclusion of the additional card (e.g., the third card), if the updated player hand satisfies a win condition, the game state information is updated to indicate the player has won the hand, thereby satisfying the bonus condition (STEP 2010). In some implementations (not shown in the example implementations), if the third community card does not increase (or improve) the value of the player hand according to the paytable, the player will lose the bonus wager and the gameplay will terminate. The data processing system can update the graphical user interface to provide feedback to the player, indicating that a game condition (e.g., win, lose, and/or bonus condition(s)) has been satisfied.

In some implementations, upon satisfying the win or bonus condition, the data processing system may provide one or more additional awards, including but not limited to an additional game play or a bonus award amount. The data processing system can update the player profile accordingly (STEP 2012). In some implementations, an award amount for the player may be determined based on the main wager and a paytable. In some implementations, a separate award amount may be determined based on the bonus wager and one or more paytables. In one example, an award amount may be calculated for the bonus wager to result in a 1:1 payout, meaning that for every unit wagered, the player receives an equal amount in winnings when they win using the bonus wager. In other words, the players break even on the bonus wager if they win. The data processing system can store additional metadata relating to the plays of the game, including but not limited to the award amount(s) won, along with corresponding timestamps indicating the time the award amount(s) were won, in the player profile.

At least one aspect of the present disclosure is directed to a system. The system can include one or more processors coupled to memory. The one or more processors may receive a request, including a first wager and a second wager, for a play of a card game. Upon receiving the request, the one or more processors may generate a graphical user interface including a set of cards for the play of the game. In response to determining that a first hand rank of the set of cards satisfies a losing condition and in response to determining that the request includes the second wager, the one or more processors may update a game state of the play of the game to indicate the first wager has been lost and update the graphical user interface to present an additional card for inclusion in the set of cards. The one or more processors may adjust a credit balance by an award amount determined based on the second wager in response to determining that a second hand rank of the set of cards, including the additional card, satisfies a win condition for the play of the game. In some implementations, the second wager can be a predetermined percentage of the first wager.

In some implementations, the one or more processors may determine the first hand rank based on a set of hole cards and a first set of community cards. The set of hole cards can include at least three cards, and the first set of community cards can include at least two cards. In some implementations, the one or more processors may determine the second hand rank based on the set of hole cards and a second set of community cards, including the first set of community cards and the additional card. In some implementations, the one or more processors may determine the award amount further based on a paytable. In some implementations, the one or more processors may receive the request for a second play of the card game. The request may include a third wager and a fourth wager. The one or more processors may cause presentation of the graphical user interface including a second set of cards. In response to determining that a third hand rank of the second set of cards satisfies the win condition, the one or more processors may update the game state to indicate that the play of the game has been won and adjust the credit balance by the award amount determined based on the third wager and the fourth wager.

In some implementations, the one or more processors may receive the request for a second play of the card game. The request may include a third wager and a fourth wager. The one or more processors may cause presentation of the graphical user interface, including a second set of cards. In response to determining that a third hand rank of the second set of cards satisfies the losing condition and in response to determining that the request includes the fourth wager, the one or more processors may update the game state to indicate that the third wager has been lost and update the graphical user interface to present a second additional card for inclusion in the second set of cards. The one or more processors may update the graphical user interface to indicate that the play of the game has been lost in response to determining that a fourth hand rank of the second set of cards, including the second additional card, satisfies the losing condition. In some implementations, the one or more processors may determine that a bonus condition is satisfied based on the second hand rank of the set of cards satisfying a predetermined threshold. In some implementations, the one or more processors may further adjust the credit balance based on a bonus value in response to determining that the bonus condition is satisfied.

At least one aspect of the present disclosure is directed to a method. Upon receiving a request, including a first wager and a second wager, the method can include generating a graphical user interface having a set of cards for the play of the game. In response to determining that a first hand rank of the set of cards satisfies a losing condition and in response to determining that the request includes the second wager, the method can include updating a game state of the play of the game to indicate the first wager has been lost and updating the graphical user interface to present an additional card for inclusion in the set of cards. The method can include adjusting a credit balance by an award amount determined based on the second wager in response to determining that a second hand rank of the set of cards, including the additional card, satisfies a win condition for the play of the game. In some implementations, the second wager can be a predetermined percentage of the first wager.

The method can include determining the first hand rank based on a set of hole cards and a first set of community cards. The set of hole cards can include at least three cards, and the first set of community cards can include at least two cards. The method can include determining the second hand rank based on the set of hole cards and a second set of community cards, including the first set of community cards and the additional card. The method can include determining the award amount further based on a paytable. The method can include receiving the request for a second play of the card game. The request may include a third wager and a fourth wager. The method can include causing presentation of the graphical user interface including a second set of cards. In response to determining that a third hand rank of the second set of cards satisfies the win condition, the method can include updating the game state to indicate that the play of the game has been won and adjusting the credit balance by the award amount determined based on the third wager and the fourth wager. The method can include receiving the request for a second play of the card game. The request may include a third wager and a fourth wager.

The method can include causing presentation of the graphical user interface, including a second set of cards. In response to determining that a third hand rank of the second set of cards satisfies the losing condition and in response to determining that the request includes the fourth wager, the method can include updating the game state to indicate that the third wager has been lost and updating the graphical user interface to present a second additional card for inclusion in the second set of cards. The method can include updating the graphical user interface to indicate that the play of the game has been lost in response to determining that a fourth hand rank of the second set of cards, including the second additional card, satisfies the losing condition. The method can include determining that a bonus condition is satisfied based on the second hand rank of the set of cards satisfying a predetermined threshold. The method can include adjusting the credit balance based on a bonus value in response to determining that the bonus condition is satisfied.

Referring now to an example implementation of an electronic card game having bonus indicia, the data processing system 205 can receive a request to initiate a play of a card game. The request can include one or more of a first wager and a second wager. The data processing system 205 can generate a graphical user interface with a set of cards for a player hand for a play of the card game. The graphical user interface can display the first wager placed as a bet on the game and the second wager (e.g., as a side wager in some implementations) that can activate additional game features (e.g., inclusion of bonus indicators). Each card of the set of cards may include a respective face value indicator that indicates a face value and a suit of the card. Additionally, a card may be presented with a bonus indicator that indicates a bonus value of the card in response to determining that the request includes the second wager.

The bonus indicator may be different from the respective face value indicator. The data processing system 205 can instantly adjust the credit balance based on the bonus indicator(s). For example, if a bonus indicator corresponds to a progressive jackpot or a bonus award amount, the credit balance will be immediately adjusted. If the bonus indicator corresponds to a multiplier value or something similar, the credit balance may be adjusted upon the determination of an outcome of the game. The data processing system 205 can determine the outcome of the game based on the face value indicator cards and, where applicable, provide award amounts in connection with the bonus indicator cards.

In some implementations, an outcome of a hand/play (e.g., a loss, win, or tie) of the card game may be determined based on a rank or a total point value of the cards in the player hand. The rank or total value of the cards in the play hand can be determined based on a paytable or game instructions 280. In some implementations, the paytable can be structured in accordance with the hand rankings of poker, the point values of blackjack, the counting system of baccarat, or any other suitable criteria relevant to the game being played. If a player wins or ties the hand, the credit balance is adjusted. The data processing system 205 can update and display updated information (e.g., the player hand, the wager, the player interactions, etc.) on the graphical user interface. Example graphical user interfaces showing an example implementation of an electronic card game having bonus indicia are shown in FIGS. 21A-21E.

Figure 21A:
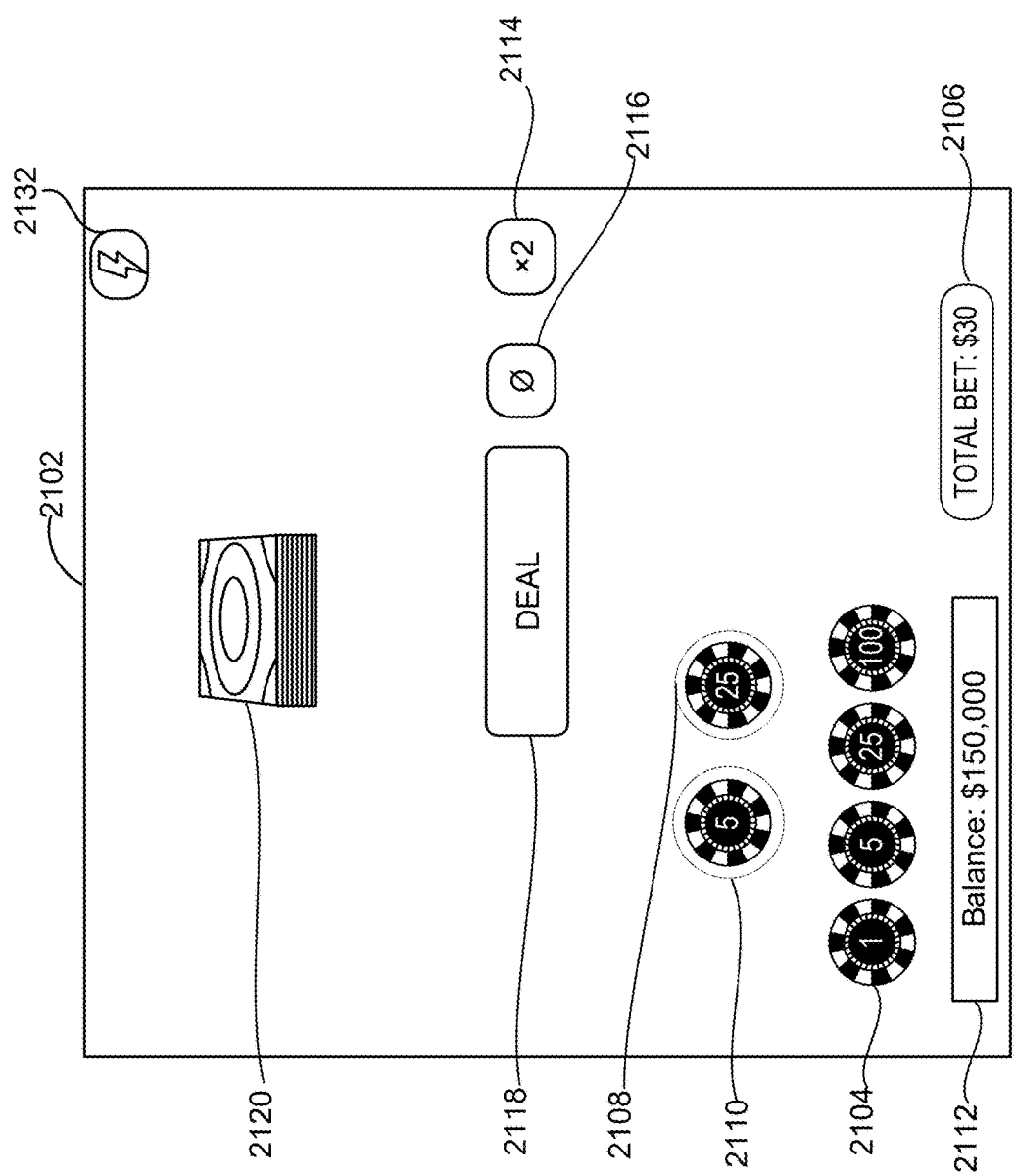
FIGS. 21A, 21B, 21C, 21D, and 21E depict further diagrams of example graphical user interfaces that may be displayed in connection with network communication sessions established according to the techniques described herein, in accordance with one or more implementations.

Referring now to FIG. 21A in the context of the components described in connection with FIG. 2, a graphical user interface 2102 is presented on a client device 220 for initiating a play of an electronic card game having bonus indicia. As discussed above, the device communicator 130 facilitates communication between the client device 220 and the data processing system 205, allowing players to interact with a graphical user interface 2102 and transmit their actions to the data processing system 205. As players interact with the graphical user interface 2102, their actions, such as placing bets or initiating the game, may be captured and stored in their player profile 270.

As depicted in FIG. 21A, the graphical user interface 2102 presents one or more interactive wager elements 2104, which can enable a player to specify a wager for a play of the card game. In the example graphical user interface 2102, the wager elements 2104 are shown as separate chips with denominations of 1, 5, 25, and 100. However, any type of interactive element, such as an interactive text box, or wagering interface, such as the wager receiver 165, may be used to place a wager for the game. The graphical user interface can include elements that indicate a main wager (e.g., a first wager) and any side wager(s) (e.g., second wager(s)) provided in the request to initiate the play of the card game. In some implementations, the graphical user interface 2102 can display a first wager slot 2108 for selecting a first (main) wager and a second wager slot 2110 for selecting a second (side) wager. Players can select the first and second wagers by interacting with the chips 2104 (e.g., by tapping, clicking, etc.) and dragging them into the respective wager slots. The second wager can be used to activate the selection of a bonus indicator, as described herein. In some implementations, the second wager can be a predetermined percentage of the first wager. In some implementations, the second wager may be adjustable by the player, enabling players to place the second wager of any percentage of the first wager. However, it should be understood that any type of graphical element may be utilized to represent any wager placed by the player. Upon selecting the first wager and the second wager, the data processing system 205 updates a total bet region 2106 to reflect the bet amount.

A player can interact with a deal button 2118 to request initiation of the play of the game. Wager information can be transmitted with the request from the client device 220 to the data processing system 205. The data processing system 205 receives and processes the wager to perform any of the techniques described herein. The player profile 270 can be updated with the wager information. A balance region 2112 can be presented in the graphical user interface 2102 and can display an amount of credits available for the player to wager on the game, which may be retrieved from the player profile 270 of the player.

The graphical user interface 2102 can present one or more multiplier buttons 2114 that, when interacted with, can cause a wager amount (e.g., the first wager and/or the second wager) to be doubled. The graphical user interface 2102 can present a clear button 2116 that, when interacted with, may cause the wager to be reset (e.g., removed or erased). In some implementations, the graphical user interface 2102 can be updated via the clear button 2116 to reset the wager amount to a default value. In some implementations, the graphical user interface 2102 may display a button 2132 (shown here as a lightning bolt) that can cause the data processing system 205 to alter the animation speeds in response to an interaction with the lightning bolt button 2132. The lightning bolt button 2132 can be toggled on or off by the player during gameplay. The animation speeds may be modified to increase or decrease the amount of time taken to update the game state.

Once one or more wagers have been specified via the graphical user interface 2102, a player can initiate a play of the game by interacting with the deal button 2118. The interaction can cause the client device 220 to transmit the request to initiate the play of the game, as described herein, causing the data processing system 205 to randomly generate, select, or otherwise present selected cards for a player hand at the graphical user interface 2102 (e.g., by transmitting corresponding display instructions, data structures, or updated game state information). In some implementations, the selection may be graphically represented as cards being "dealt" from a virtual deck of cards (represented here as the deck of cards 2120). The virtual deck of cards may include any type of playing card suitable for use in the card games described herein. In some implementations, the virtual deck of cards 2120 may include multiple copies of the same cards (e.g., may include multiple virtual decks of playing cards).

In some implementations, the cards may be randomly selected from the virtual deck of cards according to the odds information in the game instructions 280. In some implementations, each card that may be selected for the player hand may include a bonus indicator. The bonus indicator may be predetermined for each card, such that the indicator for each card is predetermined (e.g., assigned, selected, etc.) prior to selection as part of the player hand. In some implementations, the data processing system 205 can use a random generator to randomly select bonus indicators for each card. Once the bonus indicators are selected or assigned, the data processing system 205 can use a database or a memory structure to maintain the bonus indicators for each card. For example, the data processing system 205 may randomly select a "2×" multiplier for a three of spades or a "MAJOR" progressive jackpot for a six of spades, and when these cards are selected for the player hand, they come with their predetermined bonus indicators.

In some implementations, the bonus indicator for a card in the player hand may be selected/assigned separately (e.g., subsequent to selection for inclusion in the player hand) from any face value (e.g., suit, number, etc.) indicator of the card. In some implementations, the data processing system 205 can identify specific patterns or combinations of cards selected for the player hand based on the face values, suits, or sequences. Upon identifying the card patterns or combinations, the data processing system 205 can assign or select bonus indicators for the cards. For example, if the data processing system 205 identifies a pair or a particular sequence among the cards, the data processing system 205 can assign a higher multiplier or a numeric value to one or more of the selected cards, or vice versa. An example of a player hand shown on the graphical user interface 2102 is described in connection with FIG. 21B.

Figure 21B:
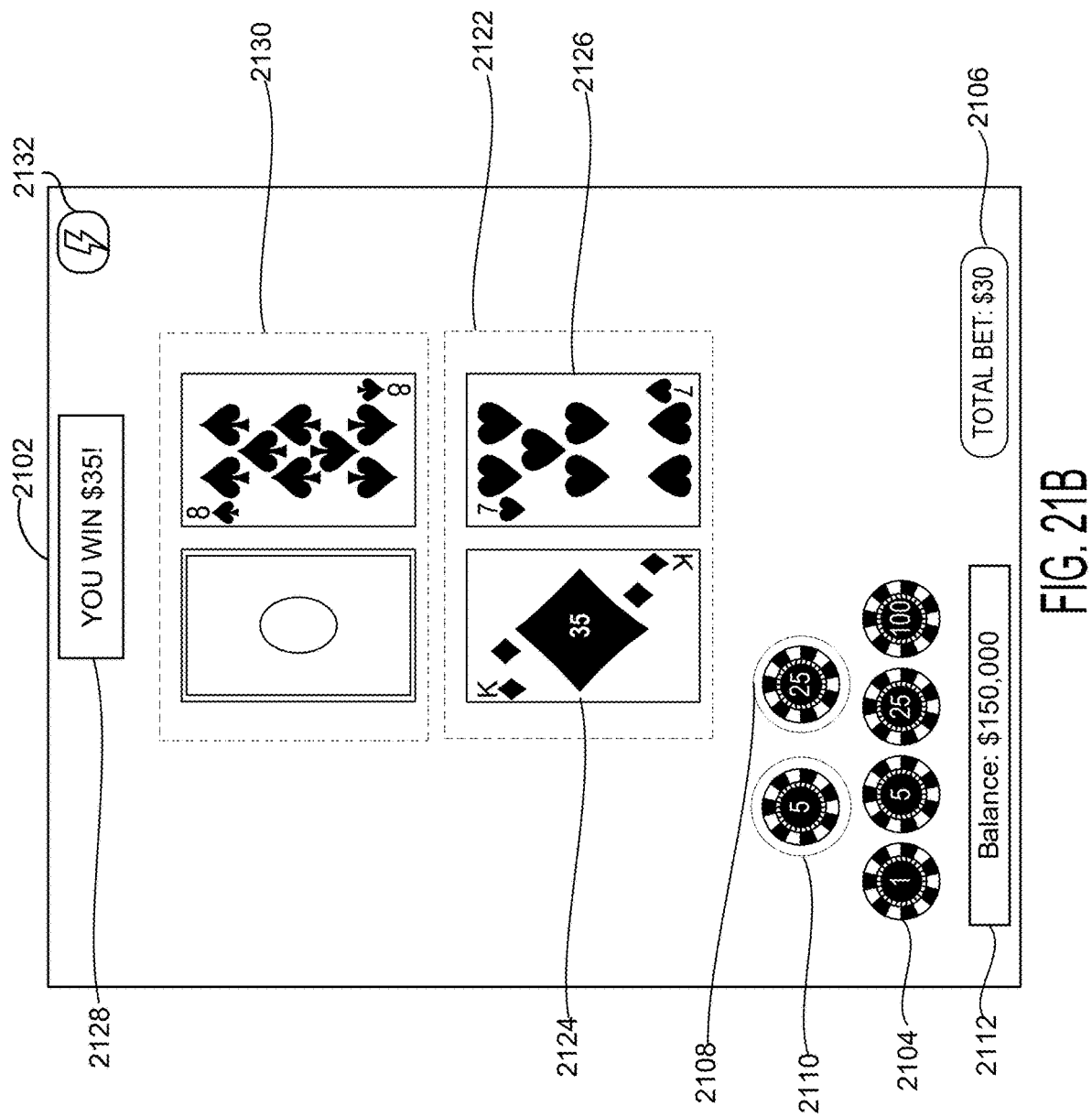

Referring now to FIG. 21B in the context of the components described in connection with FIG. 2, an updated graphical user interface 2102 is presented on the client device in response to an interaction with the deal button 2118 shown in FIG. 21A. Upon interacting with the deal button 2118, the data processing system 205 generates a player hand 2122 and a virtual dealer hand 2130 and displays both the player hand 2122 and the dealer hand 2130 on the graphical user interface 2102. In this example, the data processing system 205 randomly selects a predetermined number of cards (e.g., 2 cards, any positive integer, etc.) for the player hand 2122 and the dealer hand 2130. The graphical user interface 2102 is dynamically updated to reflect any changes in the game state information 275. In this example, the dealer hand 2130 is updated with one card shown "facing down" (e.g., having its suit and face value concealed from the player) and the other card "facing up" (e.g., having its suit and face value visible to the player). The data processing system 205 may render virtual cards in a face-down state by presenting a graphical element showing the backside of a card on the graphical user interface 2102. The player hand 2122 is also updated to include the cards facing up, displaying their face value and suit.

A virtual deck of cards (graphically represented as the deck of cards 2120) can have a predetermined number of cards (e.g., 52 standard cards, additional joker cards, any number of cards from one or more standard decks, any number of any type of virtual card, etc.). The data processing system 205 may use indicators to reflect the attributes of each card. Each card can have a face value indicator that indicates the card's face value and suit. The face values can be Ace, 2, 3, 4, 5, 6, 7, 8, 9, 10, Jack, Queen, or King, and the suits can be Hearts, Diamonds, Clubs, or Spades, in a non-limiting example. The data processing system 205 can determine a rank for the player hand 2122 based on the face value indicators (which may include the suits) of the cards in the player hand 2122. To do so, the data processing system 205 may identify the face value indicators for each card in the player hand 2122 and compare the combinations of face value indicators to rank values stored in a look-up table, in some implementations.

In some implementations, to generate a player hand, the data processing system 205 may utilize a random number generator that generates random numbers and use the random numbers as index values for one or more lookup tables that store card values (e.g., standard cards) for the card game. The card values may represent cards having different face values and/or bonus indicators. In some implementations, a first lookup table with a first random number may be utilized to select a face value indicator for a card, and a second lookup table with a second random number may be utilized to select a second indicator (e.g., a bonus indicator) for the card. In some implementations, a single lookup table and a single random number may be utilized to determine the face value indicator and the bonus indicator for each card. The data processing system 205 may sort the cards in player hand 2122 by their face value indicators and determine the hand rank based on the sorted cards. The specific hand rank determined will depend on the game instructions 280 or the standard rules of the game. In some implementations, virtual cards may be represented in a data structure corresponding to a "deck" of cards, where virtual cards provided for the player hand are removed (e.g., via random selection) from the data structure until they are "returned" to the virtual deck of cards.

In the example implementations, the data processing system 205 may assign a bonus indicator to a card, which indicates a bonus value of the card. In some implementations, the data processing system 205 may graphically represent the bonus indicator on the virtual card in various ways on the graphical user interface 2102. For example, the graphical user interface 2102 can be updated to display the bonus indicator on the virtual "face" of the card, on the back of the card, or next to the card, among other visual representations. In some implementations, one or more bonus indicators may be presented in corresponding regions of the graphical user interface 2102.

As described herein, the cards in the player hand 2122 may be represented as graphical user interface elements on the graphical user interface 2102. The face value indicator of the card may also be displayed on the virtual face of the card. In some implementations, the bonus indicators may be represented by different colors or shapes (including polygonal shapes, circles, etc.). In some implementations, the bonus indicators can be represented by a variety of visual representations, including digits, symbols, words, and other representations. For example, the bonus indicator can be represented by a special card (e.g., progressive jackpot), a number (e.g., digital values, multiplier values, etc.) on the card, a symbol (e.g., a star, a heart, etc.) on the card, or a word (e.g., major, mini, minor, etc.) on the card, among other possibilities. The visual representation of the bonus indicators may be dynamically generated based on one or more conditions of the game, the wager, or the player profile, among other factors.

In some implementations, the data processing system 205 can randomly assign the bonus indicator to one or more cards in the virtual deck of cards 2120 for the play of the game. In some implementations, depending on configuration in the game instructions 280, if the player is dealt a card with the bonus indicator, the player can receive a bonus payout, as described herein. In some implementations, the data processing system 205 can randomly assign the bonus indicator to one or more cards selected for the player hand 2122 in response to the identification of the second wager in the request. In some implementations, bonus indicators may be assigned to cards irrespective of the presence of the second wager in the request. In some implementations, bonus indicators may be assigned to cards irrespective of the presence of the second wager in the request, but any bonus awards associated with the bonus indicators may only be provided to the player upon determining that the request included the second wager (e.g., a side wager in addition to the main wager).

In some implementations, the data processing system 205 may use a lookup table that maps different second wager amounts to different lists of random bonus indicators for assignment to virtual cards. In some implementations, the data processing system 205 can use the lookup table to identify which bonus indicators can be randomly assigned to one or more virtual cards, according to the techniques described herein. In some implementations, the data processing system 205 may use a lookup table that maps different second wager amounts to different lists of random cards to which bonus indicators may be assigned. For example, when a request including a second wager is received, the data processing system 205 can use the lookup table to determine which cards in the virtual deck of cards 2120 can be assigned a corresponding bonus indicator. In some implementations, the data processing system 205 may use a lookup table to store a mapping between the face value indicators and the bonus indicators. When the data processing system 205 selects a face value indicator for a card, the data processing system 205 can use the face value indicator of the card as an index value for the lookup table to determine the bonus indicator for the card.

The gameplay may include several game conditions, including, but not limited to, a winning condition, a losing condition, a tie condition, and a bonus condition. The game conditions may be defined by the game instructions 280, which can vary from game to game. The data processing system 205 can determine which game condition is satisfied based on the combination of face value indicators of the cards in the player hand 2122, individually or in combination with bonus indicators, if present.

Once the play of the game has been initiated (e.g., in response to an interaction with the deal button 2118), the data processing system 205 can randomly select cards for the player hand 2122, and cause presentation of the selected cards on the graphical user interface 2102, as shown. In some implementations, prior to selecting the face value indicators for the cards in the player hand 2122, the data processing system 205 can randomly select the bonus indicators (e.g., the respective bonuses) for each card in the player hand 2122 and evaluate any bonus conditions resulting therefrom. In some implementations, both the face value indicators and the bonus indicators may be determined by the data processing system 205 prior to evaluating whether a bonus condition is satisfied. As shown, at least one card of the set of cards selected for the player hand 2122 is presented with a bonus indicator (e.g., having numeric value of "35"). In some implementations, the data processing system 205 determines that a bonus condition has been satisfied upon determining that the bonus indicator has been assigned to a card in the player hand 2122.

In some implementations, upon satisfying the bonus condition, the data processing system 205 can update the graphical user interface 2102 to display feedback 2128 indicating the amount of a bonus award or that the bonus condition has been satisfied. The feedback 2128 can be implemented in a variety of ways, including, but not limited to, a simple message ("YOU WIN $35!" in this example) that appears on the player device (e.g., client device 220), a more complex animation, or a visual effect, among others. In some implementations, the feedback 2128 can include various sensory elements, such as visual, auditory, or tactile (e.g., haptic) feedback. Upon determining that the bonus condition is satisfied, the data processing system 205 can update the credit balance of the player profile 270. In some implementations, the data processing system 205 may provide one or more additional awards, including, but not limited to, an additional game play or a bonus award amount (e.g., a bonus award amount of 35 credits in this example).

In some implementations, the data processing system 205 may determine and/or display outcomes resulting from the face value indicators of the cards (e.g., an outcome of the card game according to the game instructions 280) while displaying the feedback 2128. The data processing system 205 can determine whether a hand rank of the player hand 2122 satisfies a winning, tie, or losing condition according to the game instructions 280 or based on the type of card game being played. For example, the card game may be poker, blackjack, or baccarat, and the outcome can be determined based on the standard rules of the game. If the card game is blackjack, as shown in FIG. 21C, the cards in the player hand 2122 may satisfy a bonus condition along with other game outcomes (e.g., winning condition, tie condition, losing condition, etc.).

Figure 21C:
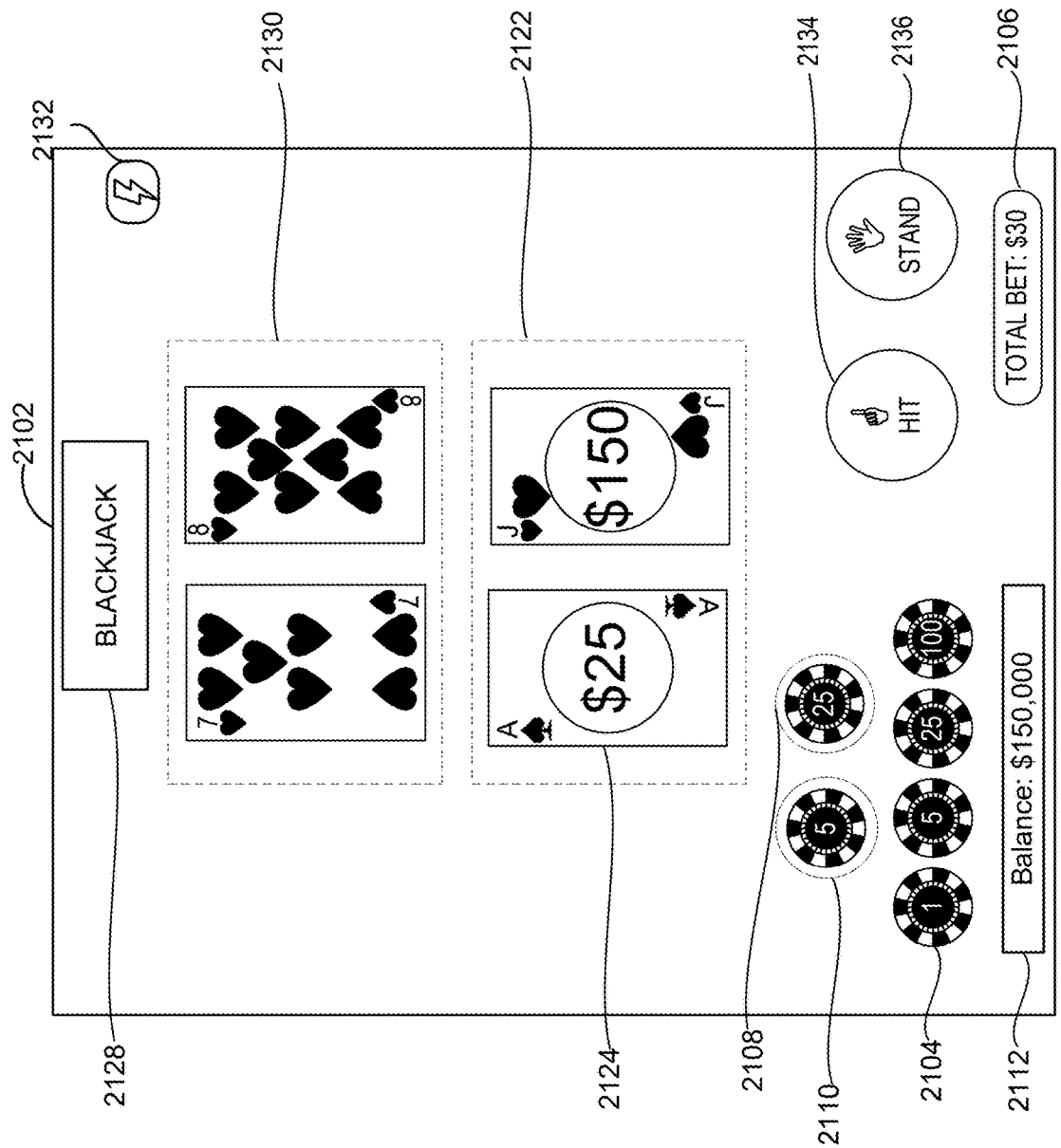

Referring now to FIG. 21C in the context of the components described in connection with FIG. 2, a graphical user interface is generated for a blackjack game depicting that the play of the game has been won. In this example, the data processing system 205 randomly selects two initial cards for presentation on the graphical user interface 2102 as part of the player hand 2122 and the dealer hand 2130. As shown on the graphical user interface 2102, both cards selected for the player hand 2122 are presented with a bonus indicator. As described herein, the data processing system 205 can update the graphical user interface 2102 to display the bonus indicators in various ways. In this example, the left bonus indicator card 2124 is displayed on the graphical user interface 2102 to present a bonus value of $25, and the right bonus indicator card 2124 is displayed to present a bonus value of $150. In some implementations, the data processing system 205 can randomly assign a bonus amount represented by numeric digits to the bonus indicator cards 2124. For example, the bonus indicator may be a random number generated using a random number generator, or randomly sampled from a set of bonus values. Upon identifying the bonus indicator cards 2124 and their associated bonus values, the data processing system 205 can update the game state information 275. Additionally, the face values of the bonus indicator cards 2124 are displayed on the graphical user interface 2102 as an ace of spades and a jack of hearts.

As shown on the graphical user interface 2102, a "hit" button 2134 is presented that, when interacted with, causes the data processing system 205 to randomly select an additional card from the virtual deck of cards 2120 and update the player hand 2122 accordingly. The player can repeatedly interact with the hit button 2134 to cause the data processing system 205 to randomly select additional cards from the virtual deck of cards 2120, thereby increasing the value of the player hand (e.g., increasing the hand rank). A "stand" button 2136 is also shown on the graphical user interface 2102. When a player interacts with the stand button 2136, no new cards are generated, and instead the dealer hand is updated. In response to interacting with the stand button 2136, the graphical user interface 2102 is updated to transition the initially face-down card in the dealer hand from facing down to facing up, showing its face value and suit. In some implementations, additional interactive elements may be included in the graphical user interfaces 2102, including commands specific to the card game being played. Furthering the example of a blackjack game, graphical user interface 2102 may present a "double down" interactive element, among other interactive elements to advance the game state of the card game.

In this example, an updated virtual dealer hand 2130 is shown on the graphical user interface in response to the player interacting with the stand button 2136. The face values of the cards in the dealer hand 2130 are shown as seven of hearts and eight of hearts. In some implementations, the data processing system 205 can determine an outcome of the game based on the face value indicators of the cards in the player hand 2122 and the dealer hand 2130, regardless of the presence or absence of bonus indicators. In blackjack, a winning hand can include a hand that exceeds a total value of a virtual dealer hand, without exceeding a threshold (e.g., twenty-one). A "Blackjack" is outcome of the play that results from a hand that includes an ace and any 10-point card, such as a ten, jack, queen, or king, that is initially dealt to the player. In some implementation, a Blackjack hand is an automatically winning hand. In this example, the player hand 2122 includes an ace of spades and a jack of hearts, resulting in a Blackjack. Upon satisfying a winning combination according to the game instructions 280 or paytable, the data processing system 205 updates the credit balance of the player according to a paytable for the card game and the main wager provided in the request.

In some implementations, the data processing system 205 can provide any awards associated with the bonus indicators only upon determining that the player has won the play of the game. For example, if a player has a winning Blackjack hand, the data processing system 205 can adjust the credit balance based on a winning amount (or a main award), determined based on the outcome of the game and the main wager according to a paytable, in addition to any credits associated with the bonus indicator cards 2124. In some implementations, the value of the credits/digits on each bonus indicator card 2124 can be combined by the data processing system 205 to generate a bonus award. For example, as the bonus digits $25 and $150 are displayed on the graphical user interface 2102, the data processing system 205 can determine a total bonus value of $175 by summing the bonus digits and adjusting the credit balance accordingly. In some implementations, the bonus indicators may correspond to one or more multiplier values, as shown in connection with FIG. 21D.

Figure 21D:
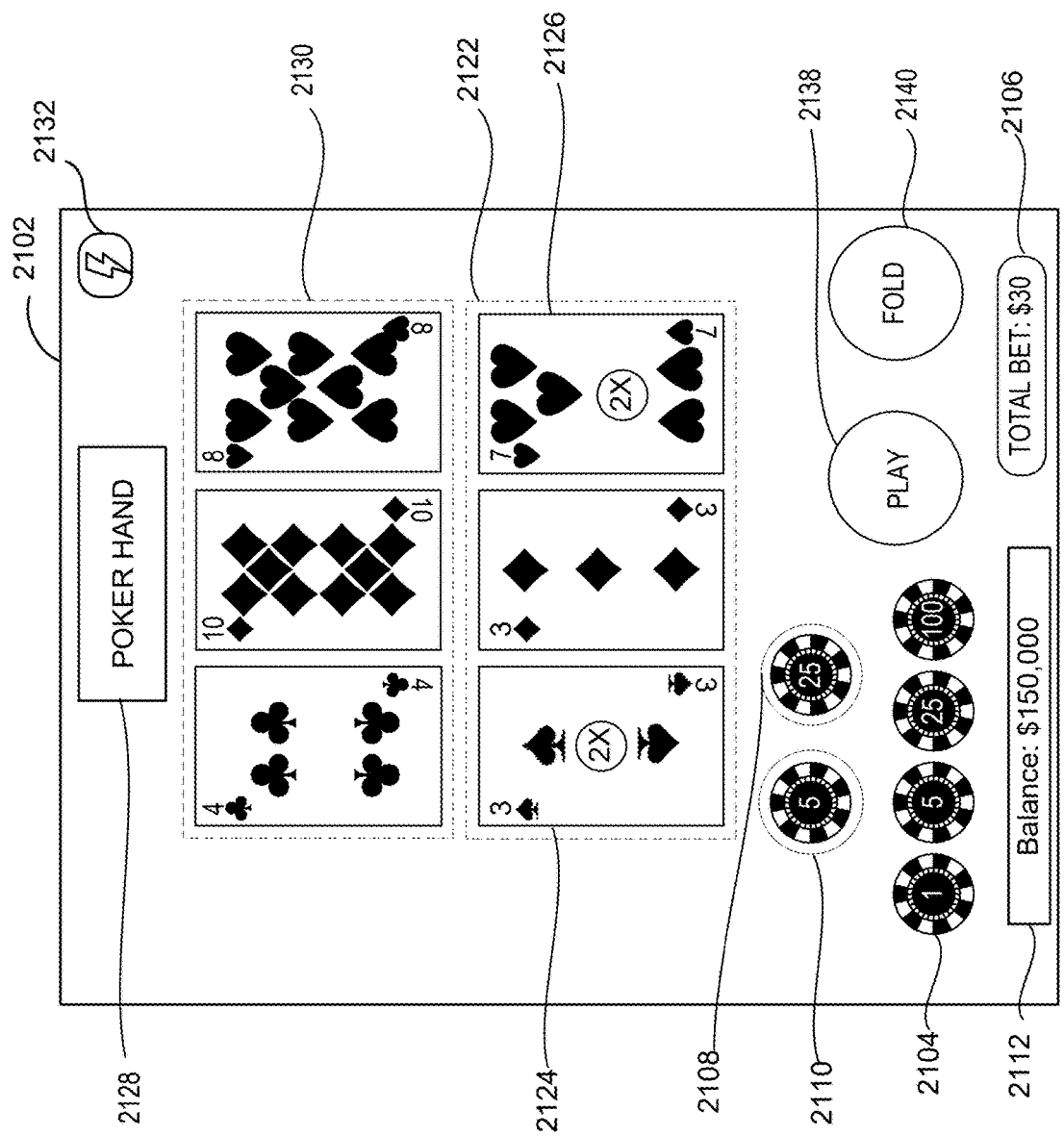

Referring now to FIG. 21D in the context of the components described in connection with FIG. 2, a graphical user interface is generated for an example poker game depicting that the play of the game has been won. In this example, the variant of poker known as "three card poker" is implemented, however, other poker variations with their own rules, such as Texas Hold'em, Omaha, seven-card stud, five-card draw, Badugi, 2-7 triple draw, Pai Gow poker, and horse, among others, can be implemented in connection with the techniques described herein. In some implementations, the data processing system 205 can perform operations to implement and present actions of a virtual dealer. In response to an interaction with a play button 2138, the data processing system 205 can generate and present a predetermined number of cards for a player hand, as described herein. When the play of the game has completed, the data processing system 205 can determine an outcome according to the game instructions 280. In some implementations, when the player interacts with a fold button 2140, the data processing system 205 updates the game state information 275 to forfeit the main wager. in some implementations, the player can interact with the interactive wager elements 2104 to increase the main wager, for example, in response to being presented with an additional card for the player hand (or an additional community card, depending on the variant of poker being implemented).

As shown on the graphical user interface 2102, the player hand 2122 includes a three of spades, a three of diamonds, and a seven of hearts, each corresponding to their respective face value indicators. Additionally, one or more cards in the player hand 2122 are presented with a bonus indicator. For example, the three of spades card is displayed on the graphical user interface 2102 to present a multiplier value of "2×". Similarly, the seven of hearts card is displayed on the graphical user interface 2102 to present a multiplier value of "2×". In some implementations, the data processing system 205 can randomly assign a variable number of multiplier digits with different multiplier values as one or more bonus indicators.

To win at three card poker, a player is to have a hand with a better hand-rank than that of the dealer. A hand in the three card poker is ranked in the same way as a hand in regular poker, with the highest-ranking hand being a straight flush and the lowest-ranking hand being a high card. A dealer hand 2130, as shown, includes a four of clubs, a ten of diamonds, and an eight of hearts. Since the player hand 2122 makes a pair of threes and outranks the dealer hand 2130, the player wins the hand. Upon identifying a winning hand, the data processing system 205 determines a corresponding payout based on the game instructions 280 or paytable. In some implementations, a winning hand may win with a single card (e.g., "ace high," where the ace is the highest card). In some implementations, if a winning hand includes two or more cards with multiplier values, the data processing system 205 can determine a multiplier value by summing (or multiplying) the multiplier values/digits associated with the winning cards. In some implementations, the bonus awards or multipliers can be provided if the bonus indicators corresponding thereto are presented with cards that contribute to the winning hand (in this example, each of the cards with the face value of "three"). A final payout for the play of the game can be generated by multiplying the multiplier by the corresponding payout generated according to the main wager and the outcome of the game. In some implementations, the data processing system 205 can determine the multiplier value by summing or multiplying the multiplier values/digits associated with the bonus indicator cards 2124 and then determining the payout as described herein. In some implementations, the bonus indicators can correspond to a progressive jackpot, as shown in connection with FIG. 21E.

Figure 21E:
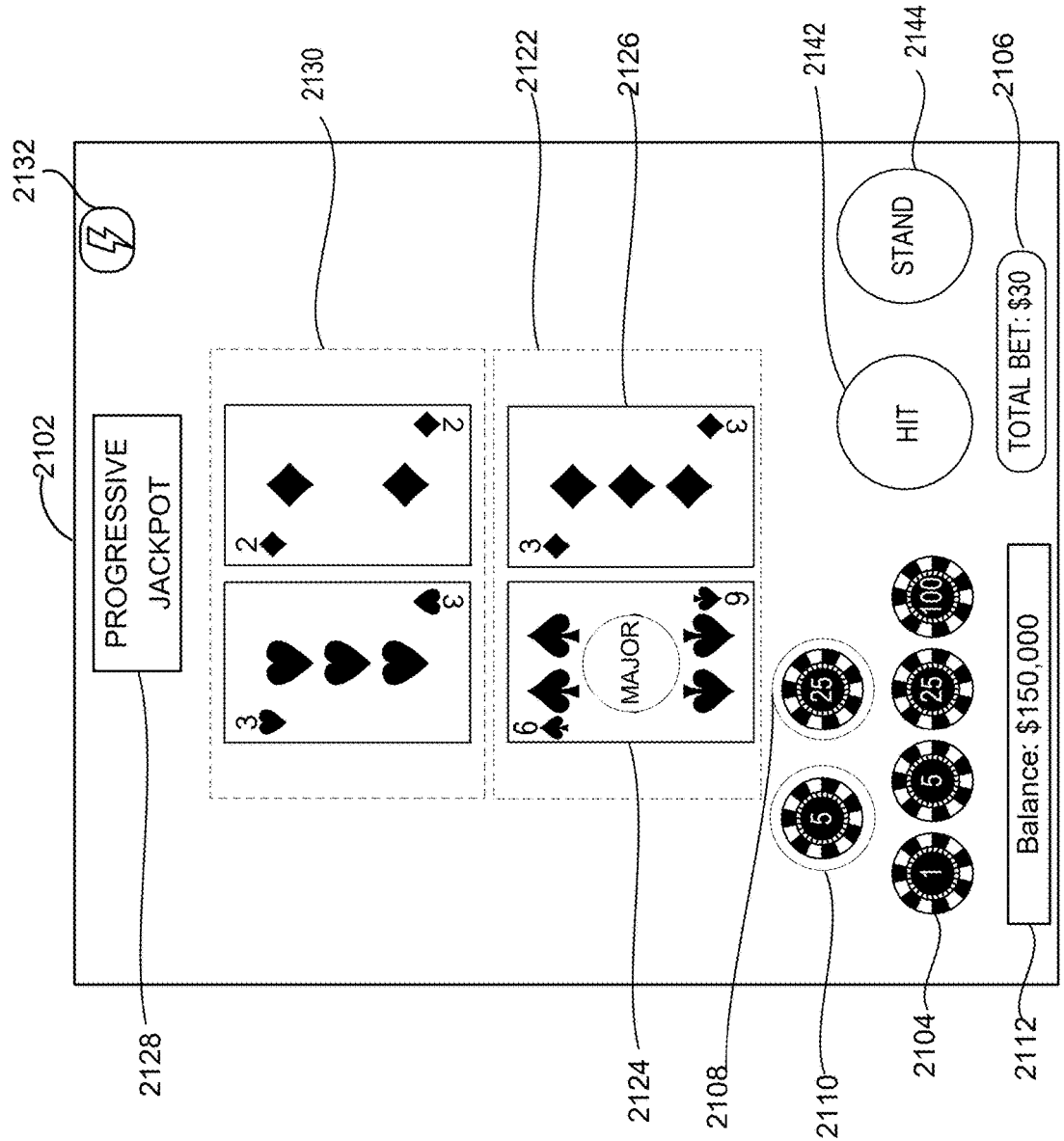

Referring now to FIG. 21E in the context of the components described in connection with FIG. 2, a graphical user interface is generated for a baccarat game depicting that a progressive jackpot has been won. In some implementations, a player can place the second wager as an additional side bet to participate in the progressive jackpot. The jackpot increases progressively as more players participate, until it is won. In some implementations, the data processing system 205 can receive contributions to the progressive jackpot from each side wager provided by client devices 220 that engage with the data processing system 205 to play the game. For example, the device communicator 130 can enable the transfer of wager information from the client devices 220 to the data processing system 205. Additionally, the data processing system 205 can maintain and update a record of the progressive jackpot amount in a database or in storage 115A, associating each side wager information with the player profile 270 of the respective client devices. In some implementations, the data processing system 205 can calculate the current jackpot amount from the stored record and the contributions from side wagers and update the game state information 275 to reflect the new jackpot amount. In some implementations, once a player wins the progressive jackpot, the data processing system 205 can reset the jackpot amount to a predetermined value, allowing the jackpot to accumulate again for subsequent gameplay.

The criteria for winning the progressive jackpot in baccarat may vary depending on the implementation. In some implementations, the gameplay may involve getting a rare hand or satisfying other predetermined conditions. For example, in some implementations, the presence of bonus indicators with the words "MINI", "MINOR", or "MAJOR" on any of the cards in the player hand 2122 can satisfy the progressive jackpot, with different payouts depending on the presence of the words and their probability. For example, in some implementations, a player hand having the bonus indicator card 2124 presented with the word "MINI" may win a small progressive jackpot payout, whereas a player hand that includes the bonus indicator card 2124 with the word "MAJOR" may win a much larger progressive jackpot payout, or vice versa. In this example, the bonus indicator card (e.g., a six of spades) in the player hand 2122 presents the bonus indicator "MAJOR", which indicates that the player has won the progressive jackpot. Upon winning the progressive jackpot, the data processing system 205 updates the game state information 275 and adjusts the credit balance independently of the hand outcome. In some implementations, a player hand is to satisfy the progressive jackpot condition and win the game to claim the jackpot payout, as shown in this example.

In response to an interaction with the deal button 2118 shown in FIG. 21A, the data processing system 205 randomly selects two initial cards for presentation on the graphical user interface 2102 as part of the player hand 2122 and the dealer hand 2130. The face values of the cards in the player hand 2122 are shown as six of spades and three of diamonds, and the face values of the cards in the dealer hand 2130 are shown as three of hearts and two of diamonds.

In baccarat, a winning hand can include a player hand that has a point value closest to a predetermined number while outranking a virtual dealer hand. The predetermined number may be "nine" or any positive integer defined according to the game instructions 280. The point value of a hand is determined by adding the face values of the cards, with face cards (jack, queen, and king) and tens having a value of zero and all other cards having their face value. If the total point value exceeds nine, the unit digit of the sum is considered. In this example, the player hand 2122 has a point value of nine (derived from the sum of six and three), while the dealer hand 2130 has a point value of five (derived from the sum of three and two), resulting in the player hand 2122 that outranks the dealer hand 2130 and therefore satisfies a winning condition specified in the game instructions 280. Upon satisfying the winning condition, the data processing system 205 updates the credit balance of the player according to a paytable for the card game and the main wager provided in the request, as described herein. In some implementations, the graphical user interface 2102 can display a hit button 2142 and a stand button 2144 that a player can interact with. For example, when the player interacts with the hit button 2142, the data processing system 205 may use Baccarat's rules or the game instructions 280 to determine if an additional card is to be added to the player hand 2122. In some implementations, when the player interacts with the stand button 2144, the data processing system 205 updates the game state information 275, and no new cards are generated for the player. Additionally, in response to an interaction with the stand button 2144, the data processing system may determine whether the dealer hand 2130 is to receive another card or stand based on the game instructions 280 or the standard rules of the game.

In some implementations, in addition to the bonus conditions satisfied through the bonus indicators, the game can incorporate a diverse range of additional bonus features, dictated by the game instructions 280 or the rules of the game being played. For example, in poker-style games, players may receive additional rewards for a strong hand rank, such as a straight flush or full house. In blackjack variants, hitting a natural Blackjack can trigger an additional bonus, while in baccarat, a progressive jackpot can be won when a player hand includes cards having a predetermined value, among others. In some implementations, the data processing system 205 can independently determine the outcome of the game and adjust the credit balance accordingly upon determining that the player hand satisfies a winning condition. In some implementations, the game outcomes shown can be understood to be applicable if the player hand 2122 only satisfies a normal hand condition without satisfying the bonus condition. A normal hand condition may be satisfied if the data processing system 205 identifies that none of the cards in the player hand 2104 have bonus indicators.

The data processing system 205 can adjust the credit balance based on the computed bonus award and the individual award amounts calculated for each outcome. In some implementations, the data processing system 205 can increase the credit balance in the player's player profile 270 by the sum of the bonus award amount and the award amount for each successful outcome. However, if the bonus award condition is not satisfied, resulting in a zero bonus award amount, the data processing system 205 can increase the credit balance only by the award amounts for winning outcome(s) of the play of the card game, if any. In cases where the bonus award is credited to the player before the completion of the game, the data processing system 205 can update first update the credit balance with the bonus award, and then subsequently update the credit balance by adding the award amounts for any winning outcome(s) of the play of the game.

Figure 22:
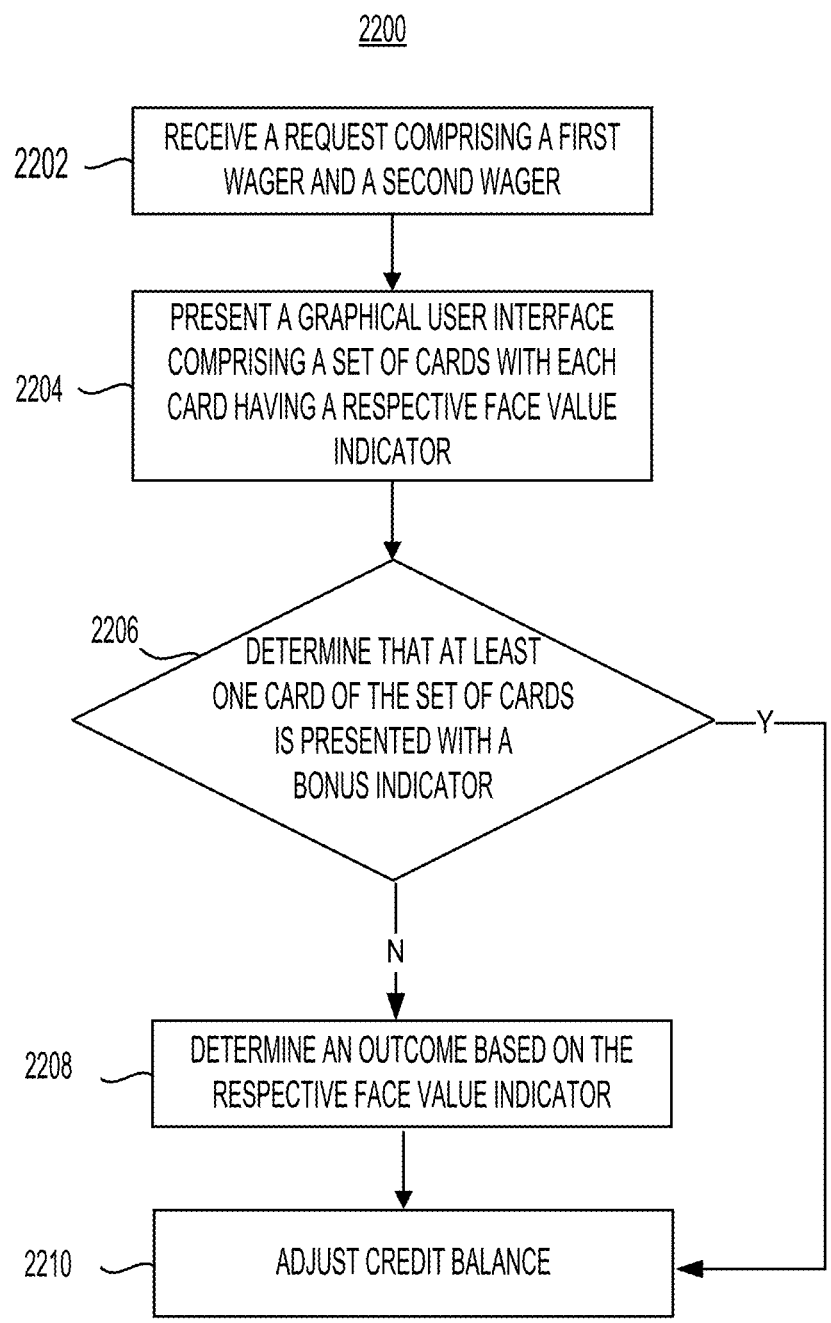
FIG. 22 depicts an example flow diagram of an example network application that may be accessed via network communication sessions established according to the techniques described herein, in accordance with one or more implementations.

Referring now to FIG. 22, depicted is an illustrative flow diagram of a method 2200 for providing electronic card game having bonus indicia. The method 2200 can be executed, performed, or otherwise carried out by a data processing system. A data processing system (e.g., the data processing system 205, the data processing system 205B) can be remote to one to one or more client devices and communicate with the one or more client devices via a computer network. In some implementations, the operations of method 2200 can be performed by a standalone gaming device (e.g., without communicating with a gaming server to perform the method steps, the data processing system 205B). In a brief overview of method 2200, the gaming server can receive a request, including a first wager and a second wager, for a play of the card game (STEP 2202), present a graphical user interface including a set of cards, with each card having a respective face value indicator (STEP 2204), determine that at least one card of the set of cards is presented with a bonus indicator (STEP 2206), adjust a credit balance if at least one card of the set of cards is presented with the bonus indicator, or determine an outcome based on the respective face value indicator if none of the cards are presented with the bonus indicator (STEP 2208), and adjust the credit balance according to the outcome (STEP 2210).

In further detail of method 2200, the data processing system can receive a request, including a first wager and a second wager, for a play of the card game (STEP 2202). The wagers can be received in one or more messages received from a client device. The message, or request, can indicate that a player intends to play a game provided by the data processing system. The message can include an indication of a player profile with which to access functionalities related to the game (e.g., placing wagers using earned credits, purchasing additional credits, etc.). The wagers can be provided via a graphical user interface (e.g., the graphical user interface of FIG. 21A). The wager amounts provided can be a specified amount of credits, such as 1, 5, 25, 100, 500, or 1000 credits. In some implementations, the player can specify a custom number or fractional number of credits used in the game. Once the wagers have been selected, the client device can transmit a request to place the wagers for the play of the game.

Upon receiving the request, including the first wager and the second wager, the data processing system can generate a graphical user interface, including a set of cards, with each card having a respective face value indicator (STEP 2204). In some implementations, the data processing system can generate a player hand and a virtual dealer hand and displays both the player hand and the dealer hand on the graphical user interface. The data processing system can randomly select a predetermined number of cards (e.g., 2 cards, any positive integer, etc.) for the player hand and the dealer hand. The graphical user interface is dynamically updated to reflect any changes in the game state information.

In some implementations, the data processing system may use indicators to reflect the attributes of each card. Each card can have a face value indicator that indicates the card's face value and suit. The face values can be Ace, 2, 22, 4, 5, 6, 7, 8, 9, 10, Jack, Queen, or King, and the suits can be Hearts, Diamonds, Clubs, or Spades, in a non-limiting example. The data processing system can determine a rank for the player hand based on the face value indicators (which may include the suits) of the cards in the player hand. To do so, the data processing system may identify the face value indicators for each card in the player hand and compare the combinations of face value indicators to rank values stored in a look-up table, in some implementations. The specific hand rank determined will depend on the game instructions or the standard rules of the game.

In some implementations, the data processing system can determine that a bonus condition has been satisfied upon determining that a card in the player hand is presented with a bonus indicator, which indicates a bonus value of the card (STEP 2206). In some implementations, the bonus indicators can include numbers, symbols, words, multiplier values, or progressive jackpots, as described herein. The data processing system may graphically represent the bonus indicator on the virtual card in various ways on the graphical user interface. For example, the graphical user interface can be updated to display the bonus indicator on the virtual "face" of the card, on the back of the card, or next to the card, among other visual representations. In some implementations, one or more bonus indicators may be presented in corresponding regions of the graphical user interface.

In some implementations, the data processing system can randomly assign the bonus indicator to one or more cards in the virtual deck of cards for the play of the game. In some implementations, the data processing system can randomly assign the bonus indicator to one or more cards selected for the player hand in response to the identification of the second wager in the request. In some implementations, bonus indicators may be assigned to cards irrespective of the presence of the second wager in the request. In some implementations, bonus indicators may be assigned to cards irrespective of the presence of the second wager in the request, but any bonus awards associated with the bonus indicators may only be provided to the player upon determining that the request included the second wager (e.g., a side wager in addition to the main wager).

In some implementations, prior to selecting the face value indicators for the cards in the player hand, the data processing system can randomly select the bonus indicators (e.g., the respective bonuses) for each card in the player hand and evaluate any bonus conditions resulting therefrom. In some implementations, both the face value indicators and the bonus indicators may be determined by the data processing system prior to evaluating whether a bonus condition is satisfied.

In some implementations, depending on configuration in the game instructions, upon satisfying the bonus condition, the data processing system can adjust the credit balance with a bonus payout (STEP 2210). For example, if the bonus indicator corresponds to a progressive jackpot or a bonus award amount, the credit balance will be immediately adjusted. If the bonus indicator corresponds to a multiplier value or something similar, the credit balance may be adjusted upon the determination of an outcome of the game. In some implementations, the data processing system may provide one or more additional awards, including, but not limited to, an additional game play or a bonus award amount.

In some implementations, the data processing system may determine and/or display outcomes resulting from the face value indicators of the cards (e.g., an outcome of the card game according to the game instructions) (STEP 2208). The data processing system can determine whether a hand rank of the player hand satisfies a winning, tie, or losing condition according to the game instructions or based on the type of card game being played. For example, the card game may be poker, blackjack, or baccarat, and the outcome can be determined based on the standard rules of the game.

In some implementations, the data processing system can provide any awards associated with the bonus indicators only upon determining that the player has won the play of the game. For example, if a player has a winning Blackjack hand, the data processing system can adjust the credit balance based on a winning amount (or a main award), determined based on the outcome of the game and the main wager according to a paytable, in addition to any credits associated with the bonus indicator cards.

In some implementations, in addition to the bonus conditions satisfied through the bonus indicators, the game can incorporate a diverse range of additional bonus features, dictated by the game instructions or the rules of the game being played. For example, in poker-style games, players may receive additional rewards for a strong hand rank, such as a straight flush or full house. In blackjack variants, hitting a natural Blackjack can trigger an additional bonus, while in baccarat, a progressive jackpot can be won when a player hand includes cards having a predetermined value, among others. In some implementations, the data processing system can independently determine the outcome of the game and adjust the credit balance accordingly upon determining that the player hand satisfies a winning condition. In some implementations, the game outcomes shown can be understood to be applicable if the player hand only satisfies a normal hand condition without satisfying the bonus condition. A normal hand condition may be satisfied if the data processing system identifies that none of the cards in the player hand have bonus indicators.

The data processing system can adjust the credit balance based on the computed bonus award and the individual award amounts calculated for each outcome (STEP 2210). In some implementations, the data processing system can increase the credit balance in the player's player profile by the sum of the bonus award amount and the award amount for each successful outcome. However, if the bonus award condition is not satisfied, resulting in a zero bonus award amount, the data processing system can increase the credit balance only by the award amounts for winning outcome(s) of the play of the card game, if any. In cases where the bonus award is credited to the player before the completion of the game, the data processing system can update first update the credit balance with the bonus award, and then subsequently update the credit balance by adding the award amounts for any winning outcome(s) of the play of the game. In some implementations, the data processing system can store additional metadata relating to the plays of the game, including but not limited to the award amount(s) won, along with corresponding timestamps indicating the time the award amount(s) were won, in the player profile.

At least one aspect of the present disclosure is directed to a system. The system can include one or more processors coupled to memory. The one or more processors may receive a request, including a first wager and a second wager, to initiate a play of a card game. Responsive to receiving the first wager and the second wager for the play of the card game, the one or more processors may cause presentation of a graphical user interface, including one or more graphical elements representing a set of cards for a player hand of the play of the card game. Each card of the set of cards can include a respective face value indicator that indicates a face value and a suit of the card. Additionally, at least one card of the set of cards can be presented with a bonus indicator of a plurality of bonus indicators responsive to determining that the request includes the second wager. The bonus indicator may be different from the respective face value indicator of the at least one card. The one or more processors may determine an outcome of the game based on the respective face value indicator of each card of the set of cards. The one or more processors may adjust a credit balance based on the first wager, the outcome of the game, and the bonus indicator.

In some implementations, the one or more processors may randomly assign the bonus indicator of the plurality of bonus indicators to the one or more cards of the set of cards for the play of the card game. In some implementations, the one or more processors may randomly assign the bonus indicator of the plurality of bonus indicators to the one or more cards of the set of cards for the player hand. The plurality of bonus indicators can include numbers, symbols, words, multiplier values, or progressive jackpots. In some implementations, where a second card of the player hand is presented with a second bonus indicator, the one or more processors may generate a multiplier value based on the bonus indicator and the second bonus indicator.

In some implementations, the one or more processors may receive the request, including a third wager and a fourth wager, to initiate a second play of the card game. Responsive to receiving the third wager and the fourth wager for the second play of the card game, the one or more processors may cause presentation of a second graphical user interface, including one or more second graphical elements representing a second set of cards for a second player hand. Each card of the second set of cards can include a respective second face value indicator. Additionally, at least one second card of the second set of cards can be presented with a second bonus indicator of the plurality of bonus indicators responsive to determining that the request includes the fourth wager. The second bonus indicator may be different from the respective second face value indicator of the at least one second card. The one or more processors may adjust the credit balance based on the second bonus indicator.

In some implementations, the one or more processors may receive the request, including a third wager, to initiate a second play of the card game. Responsive to receiving the third wager for the second play of the card game, the one or more processors may cause presentation of a second graphical user interface, including one or more second graphical elements representing a second set of cards for a second player hand. Each card of the second set of cards can include a respective second face value indicator. Additionally, at least one second card of the second set of cards can be presented with a second bonus indicator of the plurality of bonus indicators. The second bonus indicator may be different from the respective second face value indicator of the at least one second card. The one or more processors may determine the outcome of the game based on the respective second face value indicator of each card of the second set of cards. The one or more processors may adjust the credit balance based on the third wager, the outcome of the game, and the second bonus indicator. In some implementations, where the card game is Blackjack, the one or more processors may determine the outcome based on a total value of the set of cards of the player hand. In some implementations, where the card game is a poker game, the one or more processors may determine the outcome of the play based on a hand rank for the player hand determined based on the set of cards for the player hand.

At least one aspect of the present disclosure is directed to a method. Upon receiving a request, including a first wager and a second wager, the method can include causing presentation of a graphical user interface, including one or more graphical elements representing a set of cards for a player hand of the play of the card game. Each card of the set of cards can include a respective face value indicator that indicates a face value and a suit of the card. Additionally, at least one card of the set of cards can be presented with a bonus indicator of a plurality of bonus indicators responsive to determining that the request includes the second wager. The bonus indicator may be different from the respective face value indicator of the at least one card. The method can include determining an outcome of the game based on the respective face value indicator of each card of the set of cards. The method can include adjusting a credit balance based on the first wager, the outcome of the game, and the bonus indicator.

The method can include randomly assigning the bonus indicator of the plurality of bonus indicators to the one or more cards of the set of cards for the play of the card game. The method can include randomly assigning the bonus indicator of the plurality of bonus indicators to the one or more cards of the set of cards for the player hand. The plurality of bonus indicators can include numbers, symbols, words, multiplier values, or progressive jackpots. The method can include, where a second card of the player hand is presented with a second bonus indicator, generating a multiplier value based on the bonus indicator and the second bonus indicator.

The method can include receiving the request, including a third wager and a fourth wager, to initiate a second play of the card game. Responsive to receiving the third wager and the fourth wager for the second play of the card game, the method can include causing presentation of a second graphical user interface, including one or more second graphical elements representing a second set of cards for a second player hand. Each card of the second set of cards can include a respective second face value indicator. Additionally, at least one second card of the second set of cards is presented with a second bonus indicator of the plurality of bonus indicators responsive to determining that the request includes the fourth wager. The second bonus indicator may be different from the respective second face value indicator of the at least one second card. The method can include adjusting the credit balance based on the second bonus indicator.

The method can include receiving the request to initiate a second play of the card game comprising a third wager. Responsive to receiving the third wager for the second play of the card game, the method can include causing presentation of a second graphical user interface, including one or more second graphical elements representing a second set of cards for a second player hand. Each card of the second set of cards can include a respective second face value indicator. Additionally, at least one second card of the second set of cards is presented with a second bonus indicator of the plurality of bonus indicators. The second bonus indicator may be different from the respective second face value indicator of the at least one second card. The method can include determining the outcome of the game based on the respective second face value indicator of each card of the second set of cards. The method can include adjusting the credit balance based on the third wager, the outcome of the game, and the second bonus indicator. The method can include, where the card game is Blackjack, determining the outcome based on a total value of the set of cards of the player hand. The method can include, where the card game is a poker game, determining the outcome of the play based on a hand rank for the player hand determined based on the set of cards for the player hand.

At least one aspect of the present disclosure is directed to a system. The system can include one or more processors coupled to memory. The one or more processors may receive a request, including a first wager and a second wager, to initiate a play of a card game. Responsive to receiving the first wager and the second wager for the play of the card game, the one or more processors may cause presentation of a graphical user interface, including one or more graphical elements representing a set of cards for a player hand of the play of the card game. Each card of the set of cards can include a respective face value indicator that indicates a face value and a suit of the card. Additionally, at least one card of the set of cards can be presented with a bonus indicator of a plurality of bonus indicators. The bonus indicator may be different from the respective face value indicator of the at least one card. Responsive to the request including the second wager, the one or more processors may determine that the bonus indicator presented with the at least one card of the set of cards of the player hand satisfies a predetermined condition. The one or more processors may adjust a credit balance in response to determining that the bonus indicator presented with the at least one card of the set of cards of the player hand satisfies the predetermined condition.

In some implementations, where a second card of the player hand is presented with a second bonus indicator, the one or more processors may determine a multiplier value corresponding to the second bonus indicator and adjust the credit balance based on an outcome of the play and the multiplier value corresponding to the second bonus indicator.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus," "data processing system," "client device," "computing platform," "computing device," or "device" encompass all kinds of apparatuses, devices, and machines for processing data, including by way of example a programmable processor, a computer, a system on a chip, or multiple ones, or combinations, of the foregoing. The apparatus can include special purpose logic circuitry (e.g., an FPGA, an ASIC, etc.). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the data processing system 205 can include clients and servers. For example, the data processing system 205 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the various computing systems described herein can include a single module, a logic device having one or more processing modules, or one or more servers.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for synchronizing data structures in computer networks and distributed computing environments, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A system, comprising:
   at least one server comprising one or more processors coupled to non-transitory memory, the one or more processors to:
   provide a network resource to a client device corresponding to a network profile;
   establish, responsive to at least one packet identifying a request, a network communication session with the client device accessing the network resource, the network communication session established for a network application;
   transmit, to the client device, instructions for network application formatting during the network communication session;
   receive, from the client device, a second request for a network exchange during the network communication session, the second request storing a data structure having at least one a first transmission value and a second transmission value for the network communication session;
   assign, responsive to determining that the second request includes the second transmission value, an indicator value to a first graphical element of a plurality of graphical elements, each graphical element of the plurality of graphical elements corresponding to a respective face value and a respective suit;
   responsive to the second request, select, based on the second request, using a random number generator function, a subset of the plurality of graphical elements for provisioning to the client device during the network communication session, the subset including the first graphical element to which the indicator value is assigned;

in response to an input to advance a state of the network application, generate an outcome value for the network communication session based at least on the subset of the plurality of graphical elements and the indicator value; and update a data structure of the network profile according to the outcome value.

2. The system of claim 1, wherein the one or more processors are to:
establish the network communication session using an identifier of the network profile.

3. The system of claim 1, wherein the indicator value is randomly selected according to a predetermined probability value.

4. The system of claim 1, wherein the instructions cause the client device to generate a graphical user interface.

5. The system of claim 1, wherein the one or more processors are to select a second indicator for a second graphical element of the plurality of graphical elements.

6. The system of claim 1, wherein the one or more processors are to cause presentation of the indicator value overlayed on the first graphical element of the plurality of graphical elements.

7. The system of claim 1, wherein the one or more processors are to:
transmit a network communication to the client device comprising second instructions to modify a graphical user interface presented at the client device according to the outcome value.

8. The system of claim 1, wherein the one or more processors are to:
receive a third request for a second network exchange during the network communication session; and
transmit, to the client device, second instructions for to update the network communication session in response to the third request.

9. The system of claim 1, wherein the one or more processors are to:
synchronize at least one data structure with the client device during the network communication session.

10. The system of claim 1, wherein the one or more processors are to:
generate the instructions for network application formatting to graphically represent the indicator value adjacent to the first graphical element.

11. A method, comprising:
providing, by at least one server comprising one or more processors, a network resource to a client device corresponding to a network profile;
establishing, by the at least one server, responsive to at least one packet identifying a request, a network communication session with the client device accessing the network resource, the network communication session established for a network application;
transmitting, by the at least one server, to the client device, instructions for network application formatting during the network communication session;
receiving, by the at least one server, from the client device, a second request for a network exchange during the network communication session, the second request storing a data structure having at least one first transmission value and a second transmission value for the network communication session;

assigning, by the at least one server, responsive to determining that the second request includes the second transmission value, an indicator value to a first graphical element of a plurality of graphical elements, each graphical element of the plurality of graphical elements corresponding to a respective face value and a respective suit;
responsive to the second request, selecting, by the at least one server, based on the second request, using a random number generator function, values for a subset of the plurality of graphical elements for provisioning to the client device during the network communication session, the subset including the first graphical element to which the indicator value is assigned;
in response to an input to advance a state of the network application, generating, by the at least one server, an outcome value for the network communication session based at least on the subset of the plurality of graphical elements and the indicator value; and
updating, by the at least one server, a data structure of the network profile according to the outcome value.

12. The method of claim 11, further comprising:
establishing, by the at least one server, the network communication session using an identifier of the network profile.

13. The method of claim 11, wherein the indicator value is randomly selected according to a predetermined probability value for the network communication session.

14. The method of claim 11, wherein the instructions cause the client device to generate a graphical user interface for the network communication session.

15. The method of claim 11, further comprising:
selecting, by the at least one server, a second indicator for a second graphical element of the plurality of graphical elements.

16. The method of claim 11, further comprising, causing, by the at least one server, presentation of the indicator value overlayed on the first graphical element of the plurality of graphical elements.

17. The method of claim 11, further comprising:
transmitting, by the at least one server, a network communication to the client device comprising second instructions to modify a graphical user interface presented at the client device according to outcome value.

18. The method of claim 11, further comprising:
receiving, by the at least one server, a third request for a second network exchange during the network communication session; and
transmitting, by the at least one server, to the client device, second instructions for to update the network communication session in response to the third request.

19. The method of claim 11, further comprising:
synchronizing, by the at least one server, at least one data structure with the client device during the network communication session.

20. The method of claim 11, further comprising:
generating, by the at least one server, the instructions for network application formatting to graphically represent the indicator value adjacent to the first graphical element.

* * * * *